US011085417B2

(12) United States Patent
Kanstoroom

(10) Patent No.: US 11,085,417 B2
(45) Date of Patent: Aug. 10, 2021

(54) KINETIC FLUID ENERGY CONVERSION SYSTEM

(71) Applicant: SJK Energy Solutions, LLC, Ashton, MD (US)

(72) Inventor: Steven J. Kanstoroom, Ashton, MD (US)

(73) Assignee: SJK Energy Solutions, LLC, Ashton, MD (US)

( * ) Notice: Subject to any disclaimer, the term of this patent is extended or adjusted under 35 U.S.C. 154(b) by 0 days.

(21) Appl. No.: 17/129,893

(22) Filed: Dec. 21, 2020

(65) Prior Publication Data

US 2021/0190037 A1 Jun. 24, 2021

Related U.S. Application Data

(60) Provisional application No. 62/950,784, filed on Dec. 19, 2019, provisional application No. 62/951,801,
(Continued)

(51) Int. Cl.

| | |
|---|---|
| ***F03D 7/02*** | (2006.01) |
| ***F03D 7/06*** | (2006.01) |
| ***F03B 3/14*** | (2006.01) |

(52) U.S. Cl.
CPC ............ *F03D 7/0224* (2013.01); *F03B 3/145* (2013.01); *F03D 7/06* (2013.01); *F05B 2220/30* (2013.01);
(Continued)

(58) Field of Classification Search
CPC ............................... F03D 7/0224; F03B 3/145
See application file for complete search history.

(56) References Cited

U.S. PATENT DOCUMENTS 744,786 A * 11/1903 McDonald ............ B64C 11/006 416/113
794,706 A 7/1905 Fine
(Continued)

FOREIGN PATENT DOCUMENTS

FR 614938 12/1926
GB 2463957 A 4/2010
(Continued)

OTHER PUBLICATIONS

International Search Report and Written Opinion dated Aug. 20, 2019 issued in International Application No. PCT. US2019/038219. (15 pages).

(Continued)

*Primary Examiner* — Woody A Lee, Jr.
(74) *Attorney, Agent, or Firm* — Rothwell, Figg, Ernst & Manbeck, P.C.

(57) ABSTRACT

A kinetic fluid energy to mechanical energy conversion includes rotatable hubs supporting one or more independently controlled articulating energy conversion plates ("ECP") and systems and components for alternating the independent control of each ECP in response to operating conditions thereby comprising an energy conversion regulation method. Separator plates for controlling fluid flow with respect to each ECP may be employed above and below the hub and may also be directionally altered in response to operating conditions and included within the energy conversion method.

30 Claims, 94 Drawing Sheets

Related U.S. Application Data filed on Dec. 20, 2019, provisional application No. 62/953,122, filed on Dec. 23, 2019.

(52) U.S. Cl.
CPC ....... *F05B 2220/32* (2013.01); *F05B 2240/21* (2013.01)

(56) References Cited

U.S. PATENT DOCUMENTS 985,131 A * 2/1911 Gimenez .......................... 416/17
1,527,097 A * 2/1925 Watson ................... F03D 3/068 416/113
2,069,110 A 1/1937 Naus
2,397,346 A * 3/1946 Gimenez ................. F03D 3/068 416/113
3,920,354 A 11/1975 Decker
4,186,313 A 1/1980 Wurtz
4,203,707 A 5/1980 Stepp
4,648,345 A 3/1987 Wham et al.
5,083,902 A * 1/1992 Rhodes ................... F03D 3/067 416/117
5,195,871 A 3/1993 Hsech-Pen
6,327,994 B1 12/2001 Labrador
6,619,921 B1 * 9/2003 Lindhorn ................ F03D 3/067 416/117
7,118,341 B2 10/2006 Hartman
7,284,949 B2 10/2007 Haworth
7,696,635 B2 4/2010 Boone
8,004,101 B2 8/2011 Aaron
8,164,210 B2 4/2012 Boone et al.
8,382,435 B2 2/2013 Deeley
8,414,266 B2 4/2013 Lam et al.
8,459,949 B2 6/2013 Lee
8,696,313 B2 * 4/2014 Deeley .................... F03D 3/068 416/110
8,894,348 B2 11/2014 Thacker, II
9,366,231 B2 6/2016 Longmire et al.
9,377,006 B2 6/2016 Dulcetti Filho
10,767,616 B2 9/2020 Kanstoroom
2002/0187038 A1 * 12/2002 Streetman ............... F03D 3/067 415/3.1
2004/0001752 A1 1/2004 Noble
2005/0074323 A1 * 4/2005 Chio ....................... F03D 3/068 415/4.2
2005/0082838 A1 4/2005 Collins
2008/0075594 A1 * 3/2008 Bailey ..................... F03D 3/068 416/104
2009/0035134 A1 2/2009 Kuo et al.
2009/0066088 A1 3/2009 Liang
2010/0080706 A1 * 4/2010 Lam ........................ F03D 3/067 416/147
2010/0133838 A1 6/2010 Borgen
2011/0223023 A1 9/2011 Carden
2012/0043762 A1 * 2/2012 Lee ......................... F03D 3/068 290/55
2012/0121379 A1 5/2012 Chio
2012/0134829 A1 * 5/2012 Vance ..................... F03D 3/068 416/155
2012/0148403 A1 6/2012 Flaherty et al.
2013/0241200 A1 9/2013 Kim
2014/0050583 A1 * 2/2014 Wang ...................... F03D 3/068 416/98
2014/0140812 A1 5/2014 Swamidass
2015/0118050 A1 4/2015 Joosten
2015/0292481 A1 * 10/2015 Whinney .................. F03D 7/06 416/17
2015/0292482 A1 10/2015 Sheorey
2015/0308405 A1 10/2015 Rho
2019/0390644 A1 * 12/2019 Kanstoroom ........... F03D 3/068
2020/0102930 A1 4/2020 Kanstoroom

FOREIGN PATENT DOCUMENTS

JP 2014-77427 A 5/2014
NL 9001343 1/1992
WO 2009/060107 A1 5/2009
WO 2009142514 A1 11/2009
WO 2019/246385 A1 12/2019

OTHER PUBLICATIONS

Non-Final Office Action dated Mar. 23, 2020 issued in U.S. Appl. No. 16/446,266. (30 pages).

Final Office Action dated Jun. 22, 2020 issued in U.S. Appl. No. 16/446,266. (21 pages).

Notice of Allowance dated Jul. 29, 2020 in U.S. Appl. No. 16/446,266 (40 pages total).

Partial International Search Report dated Apr. 6, 2021 in related International Application No. PCT/US2020/066497 (15 pages total).

Office Action dated May 3, 2021 in Indian Patent Application No. 202037054278 with English translation (6 page total).

International Search Report and Written Opinion dated Jun. 18, 2021 in International Applicaton No. PCT/US2020/066497 (27 page total).

* cited by examiner

FRONT VIEW

FRONT VIEW

REAR VIEW

FRONT VIEW

REAR VIEW

REAR VIEW

Uncoupled Follower Head

Uncoupled Spherical Bearing

Uncoupled Triple Follower Assembly

ROTATION
BACK
FRONT
X
Y
A
20
21
22
23
24
25
26
27
28
29
30
31
32
33
34

Dimpled Surface

Aggregate Coated Surface

OPTIMIZED PERFORMANCE
WITH WIND FROM 330°

KINETIC FLUID ENERGY CONVERSION SYSTEM

CROSS REFERENCE OF RELATED APPLICATION

This application claims the benefit under 35 U.S.C. § 119(e) of the filing date of provisional patent application Ser. Nos. 62/950,784 filed Dec. 19, 2019, 62/951,801 filed Dec. 20, 2019, and 62/953,122 filed Dec. 23, 2019, the respective disclosure of which are incorporated herein by reference.

FIELD OF DISCLOSURE

This disclosure relates to kinetic fluid energy to mechanical energy conversion employing rotatable hubs supporting one or more independently controlled articulating energy conversion plates and systems and components for alternating the independent control of the energy conversion plates in response to operating conditions. Separator plates for controlling fluid flow with respect to the hub may be employed above and below the hub and may also be directionally altered in response to operating conditions.

BACKGROUND

No document is admitted to be prior art to the claimed subject matter.

Machines used for converting kinetic fluid energy to mechanical energy are known in the art and include horizontal axis wind turbines ("HAWT"), vertical axis wind turbines ("VAWT"), and water turbines used to convert stored energy, for example water retained by a dam, or convert energy from a channeled flow, for example from a higher elevation to a lower elevation, to mechanical energy. Challenges exist within HAWTs whereby their blades are monolithic, industrial-scale units with blades weighing upwards of 30 tons each, and, in many cases, the blades require months to transport from their place of manufacture to their installation site. Up to a year of logistical planning for the transport of a single 32-ton blade is not uncommon. Another challenge exists with HAWTs whereby the gearbox/generator assembly, which can weigh more than 30 tons, is located within the nacelle upon a tower assembly. In addition, the high rotational tip speed of industrial-scale turbine blades can approach 200 mph, and, consequentially HAWTs kill an estimated 300,000 birds per year. Industrial scale HAWTs high rotational tip speed also produces what some describe as unbearable low-frequency noise for persons living within 3,200 feet of such machines and consequential related headaches, ear pain, nausea, blurred vision, anxiety, memory loss, and an overall feeling of unsettledness. These negative effects upon people have prompted legislators in the United States, Canada and Australia to seek minimum distance requirements for which industrial scale HAWTs can be located from residential housing. Challenges also exist with VAWTs, such as the Savonius Rotor, whereby energy converted by their airfoils, while moving in the direction of the wind, is largely canceled out when the airfoil completes its rotation while moving against the wind. With respect to the Darrieus Turbine (VAWT), which comprises vertical wing-like blades, challenges exist whereby the machine is not self-starting. Once started, however, the turbine also has a high rotational speed which can be fatal to birds. Additionally, the energy conversion of VAWTs is less than a HAWT relative to the volumetric area within which VAWTs operate as compared to HAWTs. Neither HAWTs nor VAWTs have designs or features to effectively protect them from winds that far exceed their rated capacity and neither turbine type works in water. Likewise, water turbines do not work in wind.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present concepts in a simplified form as a prelude to the more detailed description that is presented later.

In accordance with examples described herein a system includes first and second hubs, one or more articulating plates, an articulation control system, a separator plate, a top separator plate, and a bottom separator plate. Each of the first and second hubs is axially adjacent with respect to a hub axis of rotation to the other hub, each hub is rotatable about the same hub axis of rotation, and the first hub is configured to rotate in an opposite direction than the second hub. The one or more articulating plates extend radially from each hub and are rotatable therewith, each articulating plate is configured to be articulable about a plate articulation axis that is oriented radially with respect to the hub axis of rotation, and each plate has opposed surfaces, a leading edge, and a trailing edge. An articulation control system is associated with each hub and is configured to independently control orientation of each plate of the associated hub with respect to the associated plate articulation axis. Each plate is operably coupled to the articulation control system so that the articulation control system changes the orientation of the plate as the associated hub rotates about the hub axis of rotation. The articulation control system is configured to orient each plate in a slipstream orientation in which the opposed surfaces of the plate are generally parallel to the plane of rotation of the hub for a first portion of each rotation of the associated hub and in a working orientation in which the opposed surfaces are not parallel to the plane of rotation of the hub for a second portion of each rotation of the associated hub. The separator plate is disposed between the first and second hubs and includes a first portion and a second portion, and the first and second portions of the separator plate are oriented radially with respect to the hub axis of rotation and are disposed at different axial locations with respect to the hub axis of rotation. The top separator plate is disposed at an opposite axial side of the first hub from the separator plate and includes a first portion and a second portion, and the first and second portions of the top separator plate are oriented radially with respect to the hub axis of rotation and are disposed at different axial locations with respect to the hub axis of rotation. The bottom separator plate is disposed at an opposite axial side of the second hub from the separator plate and includes a first portion and a second portion, and the first and second portions of the top separator plate are oriented radially with respect to the hub axis of rotation and are disposed at different axial locations with respect to the hub axis of rotation.

In some examples, the articulation control system of the first hub and the articulation control system of the second hub are configured so that the first portion and second portion of each rotation of the first hub are different than the first portion and second portion of each rotation of the second hub.

In some examples, an axial spacing between the first portion of the top separator plate and the first portion of the separator plate is less than an axial spacing between the second portion of the top separator plate and the second portion of the separator plate, and an axial spacing between the first portion of the bottom separator plate and the first portion of the separator plate is greater than an axial spacing between the second portion of the bottom separator plate and the second portion of the separator plate.

In some examples, the articulating plates of the first hub pass between the first portion of the top separator plate and the first portion of the separator plate during the first portion of rotation of the first hub, the articulating plates of the first hub pass between the second portion of the top separator plate and the second portion of the separator plate during the second portion of rotation of the first hub, the articulating plates of the second hub pass between the first portion of the top separator plate and the first portion of the separator plate during the second portion of rotation of the second hub, and the articulating plates of the second hub pass between the second portion of the bottom separator plate and the second portion of the separator plate during the first portion of rotation of the second hub.

In some examples, the separator plate, the top separator plate, and the bottom separator plate each have a transition between their respective first and second portions.

In some examples, system further includes first and second upper connector plates extending in an axial direction with respect to the hub axis of rotation between the separator plate and the upper separator plate, wherein each of the first and second upper connector plates is disposed on an opposite side of the hub axis of rotation and first and second lower connector plates extending in an axial direction with respect to the hub axis of rotation between the separator plate and the lower separator plate, wherein each of the first and second lower connector plates is disposed on an opposite side of the hub axis of rotation.

In some examples, the system further includes at least one counter-rotating transmission between the first and second hubs to rotationally couple the first hub to the second hub. The counter-rotating transmission includes a ring gear on each hub and the axially-adjacent hub, wherein each ring gear is coaxially arranged with respect to the hub axis of rotation, and a plurality of pinion gears angularly spaced about the hub axis of rotation. Each pinion gear is rotatable about a pinion axis that is oriented radially with respect to the hub axis of rotation, and the pinion gears are disposed between the ring gears on the first hub and the second hub, such that rotation of the first hub about the hub axis of rotation in a first direction causes a corresponding rotation of the second hub in a second direction about the hub axis of rotation opposite the first direction.

In some examples, the system further includes comprising a vertical support structure supporting the separator plate, the top separator plate, and the bottom separator plate.

In some examples, the support structure may include a coupling fixed in an axial position with respect to the hub axis of rotation and a plurality of structural supports, and each structural support is connected at one end to the coupling and at an opposite end to one of the separator plate, the top separator plate and the bottom separator plate.

In some examples, the coupling is configured to be rotatable about the hub axis of rotation.

In accordance with other examples described herein, a system includes at least one hub rotatable about a hub axis of rotation, one or more articulating plates; an articulation control system, and a track orientation control mechanism. The one or more articulating plates extend radially from each hub and are rotatable therewith, each articulating plate is configured to be articulable about a plate articulation axis that is oriented radially with respect to the hub axis of rotation, and each articulating plate may include a shaft rotatably mounted to the hub and defining the articulation axis of the associated articulating plate. An articulation control system is associated with each hub and is configured to independently control orientation of each articulating plate of the associated hub with respect to the associated plate articulation axis. Each articulating plate is operably coupled to the articulation control system so that the articulation control system changes the orientation of the articulating plate as the associated hub rotates about the hub axis of rotation. Each articulation control system includes a rotatable track assembly and a follower assembly. The rotatable track assembly is rotatable about the hub axis of rotation and has a continuous track about its perimeter, and the continuous track circumscribes the hub axis of rotation. The follower assembly is coupled to each shaft of the associated hub and traverses the continuous track as the associated hub and articulating plate rotate about the hub axis of rotation to vary the orientation of the articulating plate with respect to the articulation axis of the articulating plate. The continuous track includes a first section, a second section, and first and second transition sections between the first and second sections. As the follower assembly traverses the first section of the track, engagement of the follower assembly with the first track section causes the associated articulating plate to assume a first orientation with respect to the articulation axis of the articulating plate. As the follower assembly traverses the second section of the track, engagement of the follower assembly with the second track section causes the associated articulating plate to assume a second orientation with respect to the articulation axis of the articulating plate. As the follower assembly traverses the first transition section of the track, engagement of the follower assembly with the first transition section causes the associated articulating plate to transition from the first orientation with respect to the articulation axis of the articulating plate to the second orientation with respect to the articulation axis of the articulating plate. And as the follower assembly traverses the second transition section of the track, engagement of the follower assembly with the second transition section causes the associated articulating plate to transition from the second orientation with respect to the articulation axis of the articulating plate to the first orientation with respect to the articulation axis of the articulating plate. The track orientation control mechanism is operatively coupled to the rotatable track assembly of each articulation control system and is configured to effect powered rotation of each rotatable track assembly to alter the rotational positions of the first section, the second section, the first transition section, and the second transition section about the hub axis of rotation.

In some examples, the track orientation control mechanism may include a first gear associated with each rotatable track assembly and arranged coaxially with the hub axis of rotation and a second gear associated with each rotatable track assembly and operatively engaged with the first gear of the associated rotatable track assembly.

In some examples the first gear may include a ring gear and the second gear may include a pinion gear.

In some examples, the first gear and the second gear are located internally to the associated rotatable track assembly.

In some examples, the first gear and the second gear are located externally to the associated rotatable track assembly.

In some examples, the track orientation control mechanism may further include a rotary encoder coupled to the rotatable track assembly.

In some examples, the track orientation control mechanism may further include at least one motor, an orientation control shaft operatively coupled to the at least one motor, a coupling gear associated with each second gear to transmit rotation of the orientation control shaft into rotation of the second gear.

In some examples, the orientation control shaft is oriented generally parallel to the hub axis of rotation and each second gear is oriented radially with respect to the hub axis of rotation.

In some examples, the motor is operatively coupled to the orientation control shaft by respective bevel gears associated with each of the motor and the orientation control shaft.

In some examples, the coupling gear associated with each second gear may include a bevel gear associated with the second gear and operatively engaged with a bevel gear of the orientation control shaft.

In some examples, the motor may include an electric motor or a hydraulic motor.

In some examples, the track orientation control mechanism may further include a track motor operatively coupled to each second gear.

In some examples, each second gear includes a shaft oriented radially with respect to the hub axis of rotation.

In some examples, each second gear includes a shaft oriented generally parallel to the hub axis of rotation.

In some examples, the track motor may include an electric, hydraulic, or pneumatic motor.

In some examples, the track motor may include a hydraulic or pneumatic motor, and the track orientation control mechanism may further include at least one pressure pump for generating hydraulic or pneumatic pressure, as applicable, and pressure lines connecting each track motor to the at least one pressure pump.

In some examples, the pressure lines may include input pressure lines and output pressure lines.

In some examples, the rotatable track assembly may include a stationary hub section and a movable hub section, wherein the track orientation control mechanism may include a track motor mounted to a motor mounting plate and configured to rotate the second gear, and wherein the system may further include a linear actuator mounted to the motor mounting plate and engaged with the movable hub section so as to permit relative rotation between the rotatable track assembly and the linear actuator.

In some examples, the linear actuator may include a ball screw motor mounted to the motor mounting plate and a ball screw extending into an annular groove formed in the movable hub section and wherein the ball screw is fixed against axial movement with respect to the annular groove and is configured to move circumferentially within the annular groove.

In some examples, the movable hub section includes a female conical mating surface and the stationary hub section includes a male conical mating surface, so that the stationary track member and the movable track member are self aligning.

In some examples, each plate has opposed surfaces, a leading edge, and a trailing edge, and wherein the articulation control system is configured to orient each plate in a slipstream orientation in which the opposed surfaces of the plate are generally parallel to the plane of rotation of the hub for a first portion of each rotation of the hub and in a working orientation in which the opposed surfaces are not parallel to the plane of rotation of the hub for a second portion of each rotation of the hub. The linear actuator is configured to axially separate the stationary hub section from the movable hub section to disengage the follower assembly of each articulating plate from the fixed track of the rotatable track assembly; and the system may further include an articulation override system configured to override the articulation control system and orient each plate in its slipstream orientation at any angular position about the hub axis of rotation. In some examples, the articulation override system may include rocker arms coupling the movable hub section to a primary override ring that is coaxially oriented with respect to the hub axis of rotation so that axial movement of the movable hub section causes a corresponding axial movement of the primary override ring and an actuator cam attached to the shaft of each articulating plate configured to be contacted by the axially moving primary override ring and retain each articulating plate at its slipstream orientation.

In some examples, the system may further include a separator plate disposed adjacent the at least one hub, wherein the separator plate is configured to be rotatable with respect to the hub axis of rotation and wherein the separator plate is operably coupled to a motor for selectively effecting powered rotation of the separator plate with respect to the hub axis of rotation.

In some examples, the separator plate includes a first portion and a second portion, and wherein the first and second portions of the separator plate are oriented radially with respect to the hub axis of rotation and are disposed at different axial locations with respect to the hub axis of rotation.

In some examples, the system may further include a cowling surrounding the at least one hub, wherein the cowling is fixed to the separator plate and rotatable therewith.

In some examples, the powered rotation of the separator plate is synchronized with the powered rotation of the rotatable track assembly.

In some examples, the system may further include a motor and a gear driven by the motor and a gear fixed to the separator plate and operatively engaged with the gear driven by the motor.

In some examples, the motor is mounted in a fixed position with respect to the hub axis of rotation, the gear driven by the motor is a pinion gear, and the gear fixed to the separator plate is a beveled ring gear arranged coaxially with respect to the hub axis of rotation.

In some examples, the motor is mounted to a motor mounting plate in the fixed position with respect to the hub axis of rotation, and the system may further include dual bearing races comprising an upper bearing between the motor mounting plate and a separator plate assembly including the separator plate and a lower bearing between the motor mounting plate and the hub.

In some examples, the system may further include a fluid flow direction sensor and a computer controller configured to control operation of the track orientation control mechanism to alter the rotational positions of the first section, the second section, the first transition section, and the second transition section about the hub axis of rotation based at least in part on a signal from the fluid flow sensor.

In accordance with other examples described herein, a system includes at least one hub, one or more articulating plates, and an articulation control system. The at least one hub is rotatable about a hub axis of rotation. The one or more articulating plates extend radially from each hub and are rotatable therewith, each articulating plate is configured to be articulable about a plate articulation axis that is oriented radially with respect to the hub axis of rotation, and each plate has opposed surfaces, a leading edge, and a trailing edge and one or more lips projecting transversely with respect to one of the opposed surfaces. An articulation control system associated with each hub and configured to independently control orientation of each plate with respect to the associated plate articulation axis, and each plate is operably coupled to the articulation control system so that the articulation control system changes the orientation of the plate as the associated hub rotates about the hub axis of rotation.

In some examples, the one or more lips may include one or more of a leading edge lip extending transversely from the leading edge of the plate, a trailing edge lip extending transversely from the trailing edge of the plate, and an inboard end lip extending transversely from an inboard end of the plate.

In some examples, each plate has opposed surfaces, a leading edge, and a trailing edge, and wherein the articulation control system is configured to orient each plate in a slipstream orientation in which the opposed surfaces of the plate are generally parallel to the plane of rotation of the associated hub for a first portion of each rotation of the hub and in a working orientation in which the opposed surfaces are not parallel to the plane of rotation of the associated hub for a second portion of each rotation of the hub.

In some examples, the system may include a plurality of articulating plates disposed at angularly-spaced positions about each hub, adjacent articulating plates that are in their slipstream orientations overlap one another, each articulating plate has a leading edge pocket of reduced thickness on a first surface of the plate and a trailing edge pocket of reduced thickness on a second surface of the plate, and the leading edge pocket of one articulating plate nests with the trailing edge pocket of an adjacent overlapped articulating plate when the plates are in their slipstream orientations.

In some examples, the one or more lips may include a leading edge lip extending transversely from the leading edge of the plate, and the leading edge lip includes a rounded surface extending across the width of the leading edge lip.

In accordance with other examples described herein, a system includes at least one hub rotatable about a hub axis of rotation, one or more articulating plates, an articulation control system, and a cowling surrounding the at least one hub. The one or more articulating plates extend radially from the hub and are rotatable therewith, each articulating plate is configured to be articulable about a plate articulation axis that is oriented radially with respect to the hub axis of rotation, and each plate has opposed surfaces, a leading edge, and a trailing edge. The articulation control system is configured to independently control orientation of each plate with respect to the associated plate articulation axis, each plate is operably coupled to the articulation control system so that the articulation control system changes the orientation of the plate as the hub rotates about the hub axis of rotation, and the articulation control system is configured to orient each plate in a slipstream orientation in which the opposed surfaces of the plate are generally parallel to the plane of rotation of the hub for a first portion of each rotation of the hub and in a working orientation in which the opposed surfaces are not generally parallel to the plane of rotation of the hub for a second portion of each rotation of the hub. A part of the cowling associated with each hub is closed on a side of the cowling corresponding to the first portion of the hub's rotation and includes an intake port and an exhaust port on a side the cowling corresponding to the second portion of the hub's rotation, and the cowling is operably coupled to a motor for selectively effecting powered rotation of the cowling with respect to the hub axis of rotation.

Other examples described herein include a method for regulating output of an energy conversion system. The energy conversion system includes at least one hub rotatable about a hub axis of rotation and one or more articulating plates extending radially from each hub and rotatable therewith. Each articulating plate is configured to be articulable about a plate articulation axis that is oriented radially with respect to the hub axis of rotation, and each articulating plate is operably coupled to a cam track extending around the hub axis of rotation to change the orientation of the articulating plate with respect to its plate articulation axis as the hub rotates about the hub axis of rotation. The method includes the step of rotating the cam track about the hub axis of rotation to vary the rotational positions at which each articulating plate changes its orientation with respect to its plate articulation axis.

In some examples, the cam track is part of a rotatable track assembly that is rotatable about the hub axis of rotation, and rotating the cam track may include operatively engaging a first gear associated with the rotatable track assembly with a second gear associated with the rotatable track assembly.

In some examples, the first gear may include a ring gear and the second gear may include a pinion gear, and the ring gear and pinion gear are internal to the rotatable track assembly.

In some examples, the first gear may include a ring gear and the second gear may include a pinion gear, and the ring gear and pinon gear are external to the rotatable track assembly.

In some examples, the method may further include operatively coupling a motor to the second gear.

In some examples, operatively coupling the motor to the second gear may include operatively coupling the motor to an orientation control shaft to transmit rotation by the motor to the orientation control shaft and operatively coupling the orientation control shaft to the second gear to transmit rotation of the orientation control shaft to rotation of the second gear.

In some examples, operatively coupling the motor to the second gear may include operatively coupling a track motor to each second gear.

In some examples, each track motor is fixed with respect to the hub axis of rotation and the track motor is a fluid pressure motor, and the method may further include transmitting fluid pressure from a pump that is fixed with respect to the hub axis of rotation to each track motor.

In some examples, the method may further include monitoring a rotational position of the cam track with a rotary encoder.

Other examples described herein include a system for powering or controlling articulation control systems for one or more rotating hubs, and one of the articulation control systems is associated with each hub, wherein. The system includes a chase or bore that passes through the one or more hubs and service lines passing through the chase or bore. The service lines include electric and/or signal cables and/or fluid pressure lines, and the service lines provide power and/or control to each articulation control system without rotatable couplings.

In some examples, each articulation control mechanism may include a rotatably track assembly, a first gear associated with each rotatable track assembly and arranged coaxially with the hub, and a second gear associated with each rotatable track assembly and operatively engaged with the first gear of the associated rotatable track assembly.

In some examples, the first gear may include a ring gear, and the second gear may include a pinion gear.

In some examples, the system, may further include a pinion motor operatively coupled to each pinion gear, wherein each pinion motor may include one of an electric motor, a hydraulic motor, and a pneumatic motor, and the service lines may include one of electrical cables connected to the electric motor, hydraulic lines connected to the hydraulic motor, and pneumatic lines connected to the pneumatic motor, as applicable.

In some examples, the system may further include a track motor operatively coupled to each pinion gear, and each track motor may include a fluid pressure motor, and the service lines may include fluid lines connected to each fluid pressure motor, and the system may further include at least one fluid pressure pump connected to the fluid pressure motors via the fluid lines.

In some examples, the system may further include a hub carrier defining a hub axis of rotation on which the one or more rotating hubs are rotatably mounted for rotation with respect to the hub carrier about the hub axis of rotation and a motor associated with each articulation control system and fixed with respect to the hub carrier, and the service lines pass through the hub carrier to each motor.

In some examples, the articulation control mechanism may include a rotatable track assembly, a first gear associated with each rotatable track assembly and arranged coaxially with the one or more rotating hubs, and a second gear associated with each rotatable track assembly and operatively engaged with the first gear of the associated rotatable track assembly, wherein the second gear is operatively coupled to the motor.

In some examples, the first gear comprises a ring gear, and the second gear comprises a pinion gear.

In some examples, the motor may include one of an electric motor, a hydraulic motor, and a pneumatic motor, and the service lines may include one of electrical cables connected to the electric motor, hydraulic lines connected to the hydraulic motor, and pneumatic lines connected to the pneumatic motor, as applicable.

In some examples, the motor may include a fluid pressure motor and the service lines may include fluid lines, the system may include at least one pump fixed with respect to the hub carrier, and the fluid lines connect the pump to the fluid pressure motor In some examples, the one or more rotating hubs may include two or more counter-rotating hubs configured to be rotatable in opposite directions about the hub axis of rotation.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the preferred embodiments are set forth with particularity in the claims. A better understanding of the features and advantages of the present embodiments will be obtained by reference to the following detailed description that sets forth illustrative embodiments, in which the principles of the preferred embodiments are utilized, and the accompanying drawings of which:

FIG. 18 H is an end view of the lipped ECP in a working orientation.

FIG. 18 I is a side view of the rear side of the lipped ECP in a working orientation.

FIG. 18J is a cross-sectional view of the lipped ECP taken along the line A-A in FIG. 181.

DETAILED DESCRIPTION

Figure 1:
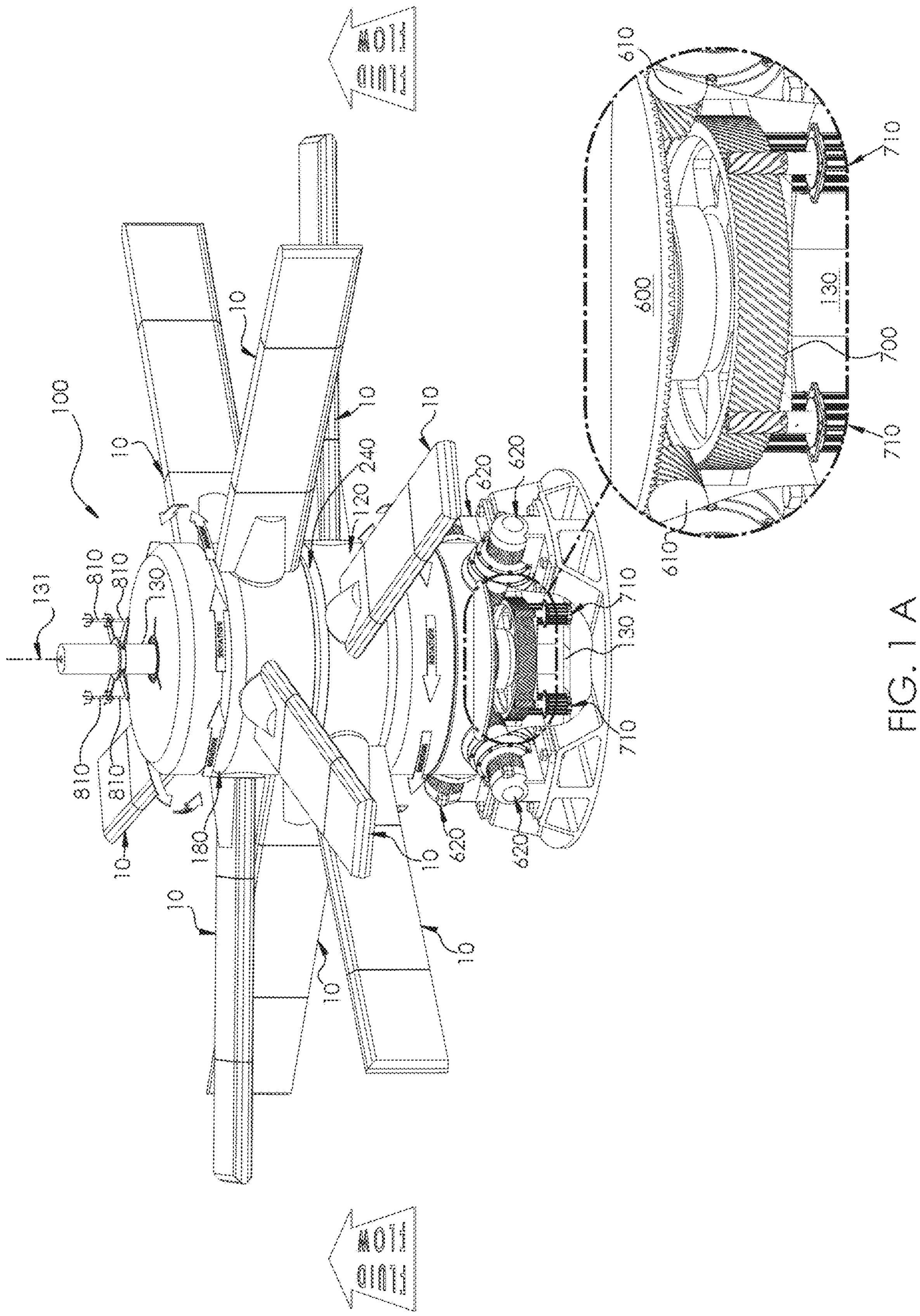
FIG. 1A is an isometric view of a vertical axis embodiment of a kinetic fluid energy conversion system ("KFECS") with a broken-out section and enlarged partial isometric view of the hub orientation control motors and gears used to orient the KFECS toward the oncoming fluid flow or any other direction when used in a land-based application.
FIG. 1B is a top view of the KFECS, configured with a single hub, with angular positions depicting where energy conversion plate articulations start and stop relative to the oncoming fluid flow.
Figure 1:
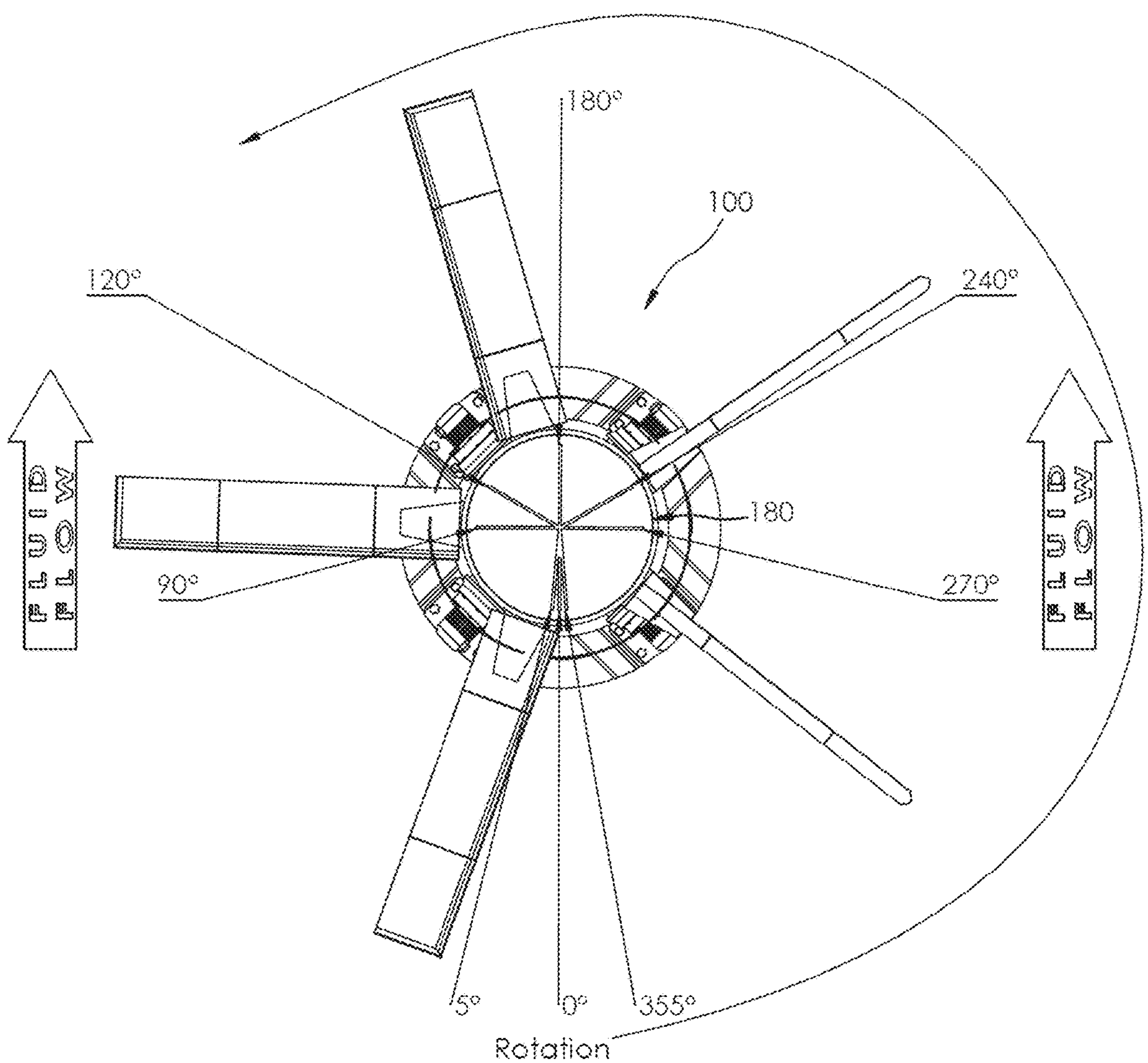

Unless defined otherwise, all terms of art, notations and other technical terms or terminology used herein have the same meaning as is commonly understood by one of ordinary skill in the art to which this disclosure belongs. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing an absolute or relative position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the terms "fixedly linked," "operationally connected," "operationally coupled," "operationally linked," "operably connected," "operably coupled," "operably linked," "operably couplable" and like terms, refer to a relationship (mechanical, linkage, coupling, etc.) between elements whereby operation of one element results in a corresponding, following, or simultaneous operation or actuation of a second element. It is noted that in using such terms to describe inventive embodiments, specific structures or mechanisms that link or couple the elements are typically described. However, unless otherwise specifically stated, when one of such terms is used, the term indicates that the actual linkage or coupling take a variety of forms, which in certain instances will be readily apparent to a person of ordinary skill in the relevant technology.

As used herein, the term "KFECS", refers to any embodiment of a kinetic fluid energy conversion system described herein, including without limitation, embodiments used for converting wind energy or water energy to mechanical energy, irrespective of the orientation of the longitudinal axis (axis of rotation) of the hub carrier relative to the land or land-based structure upon which the KFECS is located, or the water surface under which the KFECS is located.

As used herein, the term "bearing" refers to a component used to support and/or guide a rotating, oscillating, articulating or sliding shaft, pivot, wheel or assembly. Irrespective of the bearing described or shown, it may take on numerous forms, including without limitation sealed, unsealed, roller, ball, angular, needle and thrust. However, unless otherwise specifically stated, when such term is used, the term indicates that the actual linkage or coupling take a variety of forms, which in certain instances will be readily apparent to a person of ordinary skill in the relevant technology.

As used herein, the descriptions and depictions of meshed and/or otherwise mating gears, such as ring gear and pinion gear, bevel gear and pinion or pinion gear, bevel gear and pinion and any other similar use of such terms and depictions specifically related to gear types and styles, are not intended to be limiting but rather describe the transfer of mechanical motion between inter-engaged mechanical components in a particular embodiment shown. Such transfers of mechanical motion may occur through an operable coupling of two or more gears via a (i) rotational motion to a translational motion or vice versa, (ii) rotational motion to rotational motion, (iii) linear motion to linear motion, (iv) rotational motion to translational motion, (v). or otherwise transfer of mechanical motion through a gear set, irrespective of the type or style of gear depicted or described.

As used herein, terms used to describe or depict components in a particular alignment or spatial orientation, including, but not limited to, co-planar, planar, parallel, coaxial, transverse, longitudinal, angular, vertical, horizontal or other orientation, unless specifically otherwise stated, and are used to describe or depict a general spatial orientation and/or position or concept and are intended to encompass variations from the stated term that one of ordinary skill in the art would consider as a reasonable amount of deviation to the stated term (i.e., having the equivalent function or result) in the context of the present disclosure.

As used herein, the terms "computer," "computer-controlled" and like terms refer to a computer and/or redundant computer(s) within or connected to the KFECS, irrespective of its physical location, that may include one or more uninterruptible power supplies.

As used herein, the term "land-based system" refers to a KFECS that is intended to convert kinetic fluid energy from a moving gas or gaseous mixture, including, without limitation, air, to mechanical energy.

As used herein, the term "water-based system" refers to a KFECS that is intended to convert kinetic fluid energy from a moving liquid, or liquid mixture, including without limitation, water, to mechanical energy.

As used herein, the term "independent control" in describing articulation of an energy conversion plate refers to the rotation of an energy conversion plate, relative to its articulation axis, independent of, and unrelated to, any other energy conversion plate included within the KFECS.

As used herein, the term "clutch/gearbox/electrical generator/pump assembly" refers to any device or assembly of components that may be operably coupled to the KFECS and which may be driven by mechanical energy that flows from the KFECS.

As used herein, the term "energy conversion plate" when used in a land-based system, are commonly known as airfoils, and when used in a water-based system, are commonly known as hydrofoils.

As used herein, the term "ECP" refers to an energy conversion plate.

As used herein, the term "nesting ECP" refers to an ECP that, when all ECPs are in their slipstream orientation, are configured such that the ECP's leading edge parallel to the ECP's axis overlaps and nests with the ECP that is immediately ahead of it in its direction of rotation about the longitudinal axis of the hub carrier.

As used herein, the term "lipped ECP" refers to an ECP or nesting ECP that has one or more lips that extend from the ECP in a direction that is not co-planar with a fluid impingement side of the ECP.

As used herein, the term "working mode" refers to the orienting of an energy conversion plate whereby opposed, planar surfaces of the plate are not parallel to—and may be perpendicular to—the fluid flow and will convert kinetic fluid energy to mechanical energy when subjected to an oncoming fluid flow.

As used herein, the term "slipstream orientation" refers to the orienting of energy conversion plates whereby opposed, planar surfaces of the plate are parallel to an oncoming fluid flow and will not convert kinetic fluid energy to mechanical energy when subjected to an oncoming fluid flow.

As used herein, the term "AOS" refers to an articulation override system that comprises multiple redundant systems that enable the KFECS to articulate all ECPs to their slipstream position and stop the rotations of the hubs.

As used herein, the term "AOS standby mode" refers to the operation of the AOS system whereby it (i) is monitoring the KFECS for conditions incompatible with the KFECS working mode, and (ii) all moving parts of the AOS are retracted or otherwise in a position or state where such parts are not subjected to mechanical wear.

As used herein, the term "AOS active mode" refers to the operation of the AOS whereby all energy conversion plates are moved to and/or retained in their slipstream orientations.

As used herein, the term "stopped mode" refers to the reorienting of all energy conversion plates (i) to their parallel to the flow (slipstream) orientations whereby they will not convert kinetic fluid energy to mechanical energy when subjected to a fluid flow, (ii) to a position whereby the KFECS can withstand fluid speeds and pressures far in excess of its design limit, and (iii) whereby the rotation of the KFECS is stopped for maintenance or any other purpose.

As used herein, the term "AOS Triggering Event" refers to any event or condition that causes an AOS active mode operation to occur. Triggering events include, without limitation, a signal received by the computer indicating (i) the fluid speed exceeds the KFECS's design specification, (ii) an error condition is detected by one or more sensors within the KFECS where such error condition require the KFECS's rotations to cease, (iii) maintenance of, or relating to, the KFECS is required or requested by the AOS or a maintenance crew, or (iv) any other specified condition is met.

As used herein, term "hydraulic/pneumatic" means any system or that could be controlled and/or actuated via hydraulic or pneumatic pressure.

The preferred embodiments will now be described with reference to the accompanying figures, wherein like reference numerals, including reference numerals followed by alphabetic characters" refer to like elements (e.g., identical and/or functionally equivalent elements) throughout the disclosure. The terminology used in the descriptions below, including without limitation the words "upper" and "lower," are not to be interpreted in any limited or restrictive manner simply because it is used in conjunction with detailed descriptions of certain specific embodiments. Furthermore, the preferred embodiments include numerous novel features, no single one of which is solely responsible for its desirable attributes or which is essential to practicing the preferred embodiments described. Furthermore, many components described herein and shown within the drawings, and which are drawn as solid components, are done so for ease of understanding the drawings. All such components may be manufactured using conventional (i) assembly techniques whereby a single component may be split into multiple parts and, when reassembled, embody the characteristics of the component described herein and/or shown in the drawings, and (ii) weight saving methods, including without limitation designing all such components, including without limitation ECP 10, ECP 20, hub 120, hub carrier 130, hub 180, perimeter plate 215, brake housing 121, base 900 and cowling 1000, in multiple sub-assemblies, which can be assembled with conventional assembly techniques, into the particular component as shown. All components, at the designer's choice, may also have an interior lattice-like, or other non-solid interior design with strengthened and/or thickened areas where required, for example at areas in contact with bearings, and an external skin whereby such components may appear to be solid when in fact they need not be to achieve their desired functionality.

Provided herein and shown on accompanying figures are configurations of a kinetic fluid energy to mechanical energy conversion system (KFECS) based on one or more independently controlled energy conversion plates operationally coupled to one or more counter-rotating hubs, with all hubs operationally coupled to an integral hub carrier.

Provided herein and shown on accompanying figures are configurations of hubs capable of being operably coupled to one or more counter-rotating adjacent hubs, with each hub including one or more independently controlled articulating energy conversion plates.

Embodiments disclosed herein and shown on accompanying figures support the configuration of one or more clutch/gearbox/electric generator and/or pump assemblies on or near the ground, for a land-based KFECS, and near or above the water surface, for a water-based KFECS.

Embodiments disclosed herein and shown on accompanying figures permit positioning a longitudinal axis of a hub carrier as described herein in any orientation relative to the land or land-based structure upon which the KFECS is erected, or water in which the KFECS is erected, including without limitation, horizontal, or vertical. Irrespective of the orientation of the hub carrier's axis to the land or water surface as the case may be, the operably coupled clutch/gearbox/electrical generator or pump assembly(ies) may be located at or near the ground, or floor as the case may be, for a land-based KFECS, and at or near the water surface, for a water-based KFECS.

Embodiments disclosed herein and shown on accompanying figures are also related to the independent control of an energy conversion plate by articulation of it about a rotational axis that is substantially parallel to the plane of the ECP to achieve optimal energy conversion, while an energy conversion plate is moving in the direction of the fluid flow and to encounter minimal drag while moving against the fluid flow. In some embodiments, adjustment of the energy conversion plate articulation can be automatically overridden by an Articulation Override System (AOS) which causes each energy conversion plate, irrespective of the angular position about the hub carrier where it is located or traveling, to articulate to a position parallel to the fluid flow, and then causes all hubs and to cease rotating about the hub carrier (KFECS stopped position).

Embodiments disclosed herein permit multiple configurations of size and shape of KFECS components, including without limitation (i) differing aspect ratios of ECPs, and (ii) KFECS vertical, horizontal or their orientations relative to the ground or water bottom. Moreover, the descriptions and drawings are not intended to be limiting with respect to a KFECS physical shape, size, installation location or fluid type in which a KFECS is operating.

System Overview Hub and Energy Conversion Plate Assemblies—FIG. 1A

The kinetic fluid energy conversion system ("KFECS") is based upon an integral hub carrier, with one or more rotating operationally coupled hubs rotating around the hub carrier, with each hub having equally-spaced, independently-articulating, fully controlled energy conversion plates ("ECP") located around the hub's perimeter. The hub carrier remains oriented directly to the oncoming fluid flow, or any other computer-controlled orientation, via a hub orientation control system comprising, in an embodiment, one or more computer-controlled hub orientation control motors.

Each energy conversion plate is independently controlled from within its respective hub and synchronized with the system's revolutions, such that each energy conversion plate can be oriented for optimum overall energy conversion while moving in the direction of the fluid flow, and then articulated to be oriented for minimum drag, while the energy conversion plate is blocked from the fluid flow or moving against the flow.

Different numbers of hubs can be configured in different aspect ratios (height to width) to support a variable range of installation conditions and/or designer's choice, including without limitation fluid speed, fluid type, ECP types and shapes. Different numbers ECPs can be configured in multiple desired geometric shapes to achieve overall KFECS operating characteristics, including without limitation the desired aspect ratio of the energy conversion system, mechanical energy output desired, and the overall energy conversion system size. All KFECS hub embodiments may be operably coupled to one or more power take-offs, including without limitation clutch/gearbox/generator or pump assemblies. The operable couplings, including without limitation clutches, may be computer controlled to selectively and individually couple and decouple to the KFECS to achieve a range of loads enabling the KFECS to operate in a wide range of fluid speeds. For example, only one of the multiple gearbox/generator assemblies may be coupled, for example by an engaged clutch, to the KFECS during low fluid speed operating conditions while two or more or all of the gearbox/generator assemblies may be coupled to the KFECS during relatively high fluid speed operating conditions.

KFECS embodiments may have a lower cut-in speed (the minimum speed at which a fluid energy conversion system begins to convert energy, typically by rotating or moving, sufficiently to rotate a generator or pump). KFECS lower cut-in speed results from the much larger square area of fluid conversion surface (ECPs) that may be configured in a given volumetric area, and the time over which the ECPs are in contact with the fluid flow as described herein, as compared to traditional wind and water kinetic energy conversions systems configured within the same volumetric area.

KFECS embodiments may also have a higher cut-out speed (the speed at which wind powered kinetic energy conversion systems, such as conventional horizontal and vertical axis wind turbines, are either attempted to be brought to rest or otherwise subjected to a lesser amount of dynamic pressure in an attempt to prevent damage to such systems. The embodiments described herein permit higher cut-out speeds as a result of its integral internal supporting structure and hub design, the plurality of which may be configured to be greater than twenty percent of the total area exposed to an oncoming fluid flow.

Embodiments described herein include an ECP tip speed that may never exceed the fluid speed and consequently rotates at a low RPM thereby (i) reducing wear on energy conversion components and related parts, and (ii) possibly reducing the risk of moving parts injuring birds and other flying animals, when used in air, or marine life, when used in water.

The embodiment used in this summary, as shown in FIGS. 1A and 1B comprises a five ECP design, the axis of each ECP is configured at 72-degree intervals about the hub, with the 0 degree positioned located nearest the oncoming fluid flow. As the first ECP in this embodiment moves in a rotation about the hub carrier's longitudinal axis, in the direction of the fluid flow, it will begin to convert kinetic fluid energy to mechanical energy after it passes the 0-degree position, increasing its energy conversion output through the 90-degree position, and then decreasing its energy conversion output to the 120-degree position. After passing the 120-degree position, the fluid flow toward the ECP will be completely blocked by the following, adjacent, ECP. Consequently, the first ECP in this example is then articulated to its 0-degree (angle of attack) slipstream orientation where the surfaces of the ECP will be substantially parallel to the fluid flow. Once the ECP passes the 180-degree position, it will remain in its parallel to the flow (slipstream) orientation while it rotates against the oncoming fluid or until it otherwise reaches the angular position at which the articulation control system is configured to begin controlled articulation of the ECP to its perpendicular (90 degree angle of attack) to the fluid flow (working) orientation.

Figure 2:
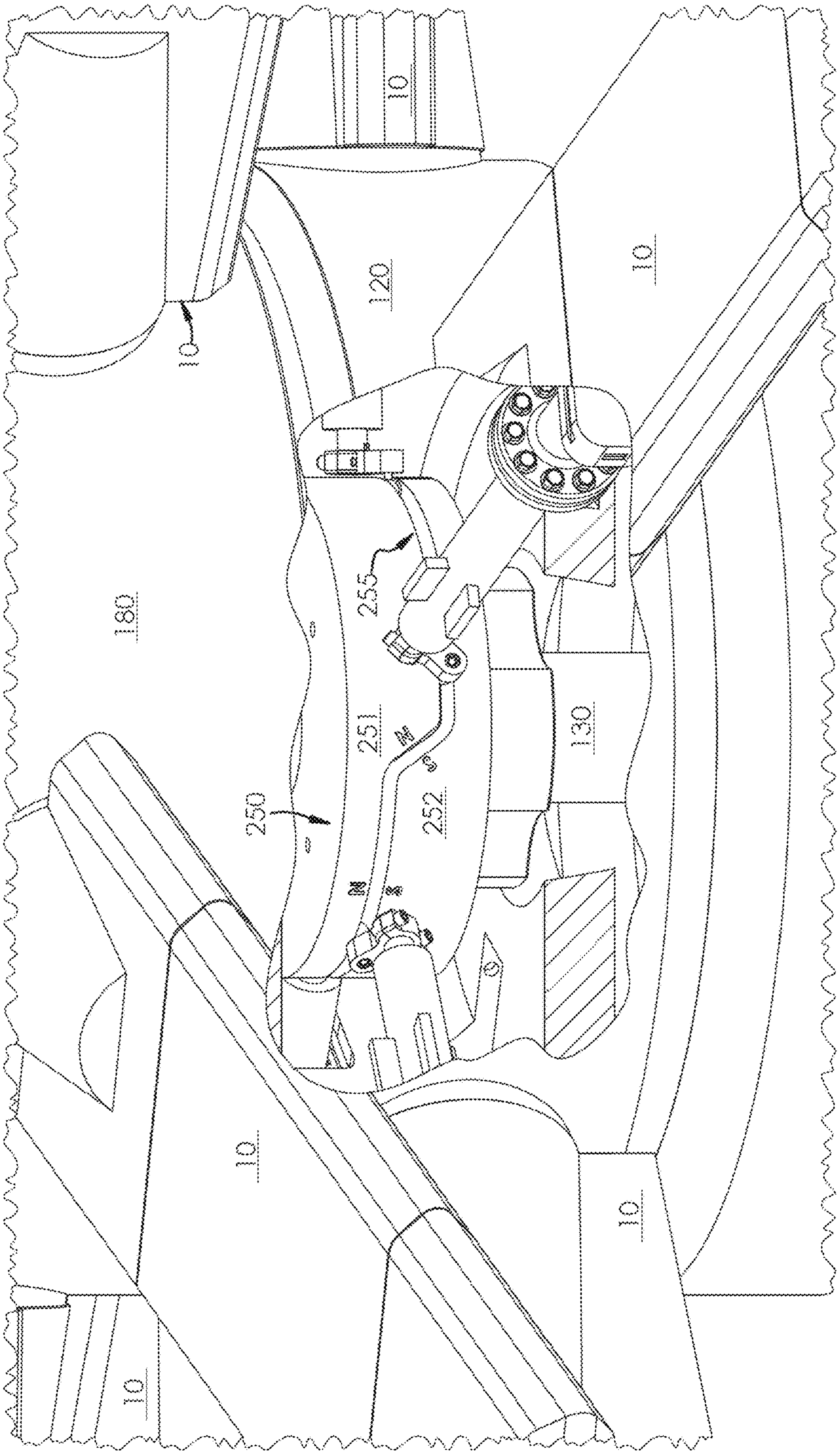
FIG. 2A is a partial isometric view of a hub, with a broken-out section which reveals one embodiment of an energy conversion plate articulation system, contained within a hub or enclosed by it.
FIG. 2B is a partial front view of a hub, oriented nearest the fluid flow, with a broken-out section which reveals the portions of a cam track assembly that controls the energy conversion plates when they are in their orientations parallel and perpendicular to the fluid flow.
FIG. 2C is a partial front view of a hub, with a broken-out section revealing a cross-sectional view of the cam track assembly, oriented nearest to the fluid flow, which reveals the portions of the cam track assembly that control the energy conversion plates when they are in their orientations parallel and perpendicular to the fluid flow.
FIG. 2D is a partial front view of a hub, oriented nearest to the fluid flow, with a broken-out section which reveals the portions of the cam track assembly that controls the energy conversion plates when they are in their orientations parallel and perpendicular to the fluid flow.
FIG. 2E is a partial front view of a hub, oriented nearest the fluid flow, with a broken-out section which reveals an energy conversion plate shaft, on the right, in its parallel to the flow orientation, rotating clockwise about a longitudinal axis of a hub carrier, immediately before it begins its 90° articulation to its perpendicular to the flow orientation, and an energy conversion plate shaft on the left, after it has articulated to its perpendicular to the flow orientation.
FIG. 2F is a partial front view of a hub, oriented nearest the fluid flow, with a broken-out section which reveals an energy conversion plate shaft that is transitioning from a parallel to the fluid flow orientation to its perpendicular to the flow orientation.
FIG. 2G is a partial front view of a hub, oriented nearest the fluid flow, with a broken-out section which reveals an energy conversion plate shaft cross-sectional view, that has completed its articulation from its parallel to the flow orientation, to its perpendicular to the flow orientation.
Figure 2:
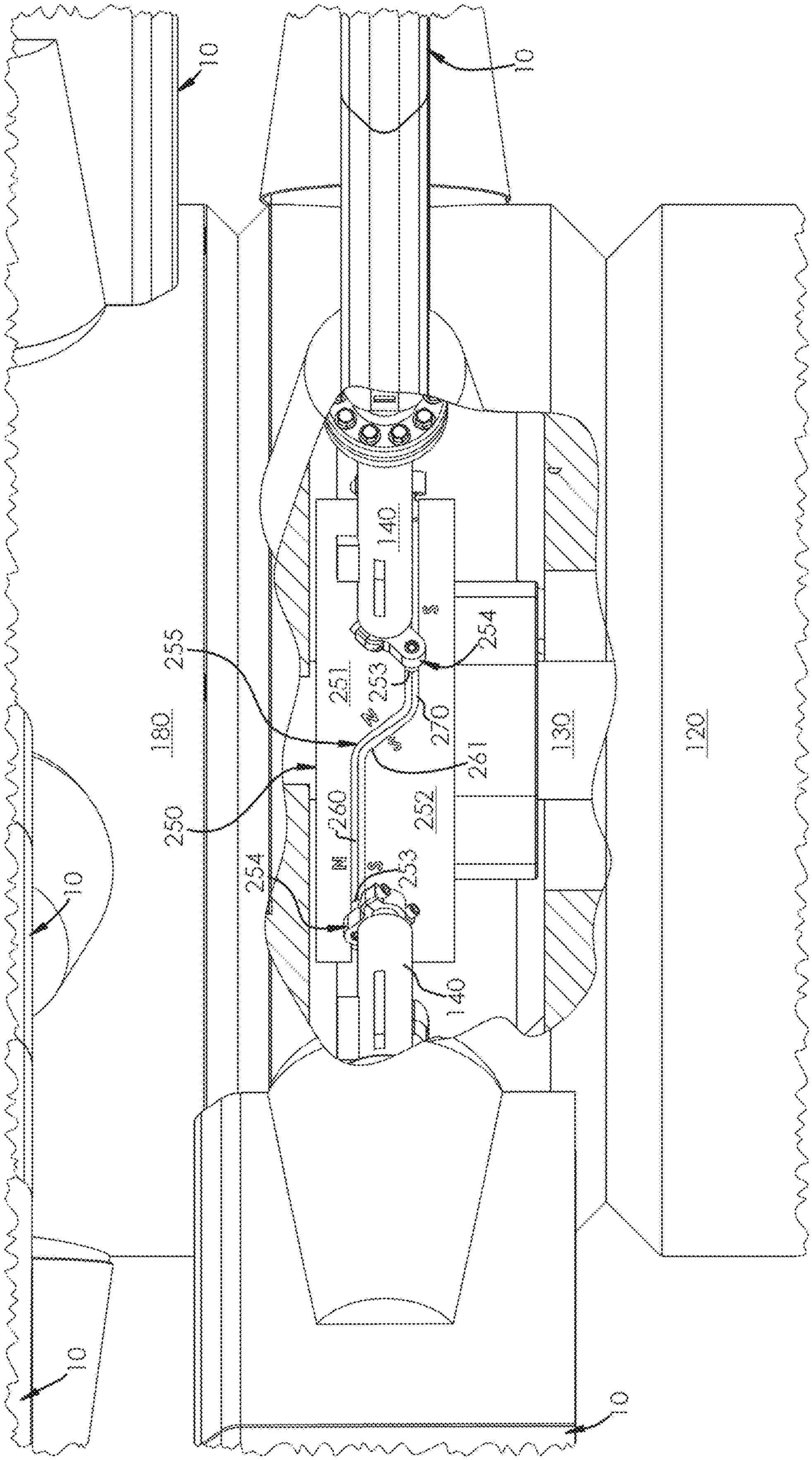
Figure 2:
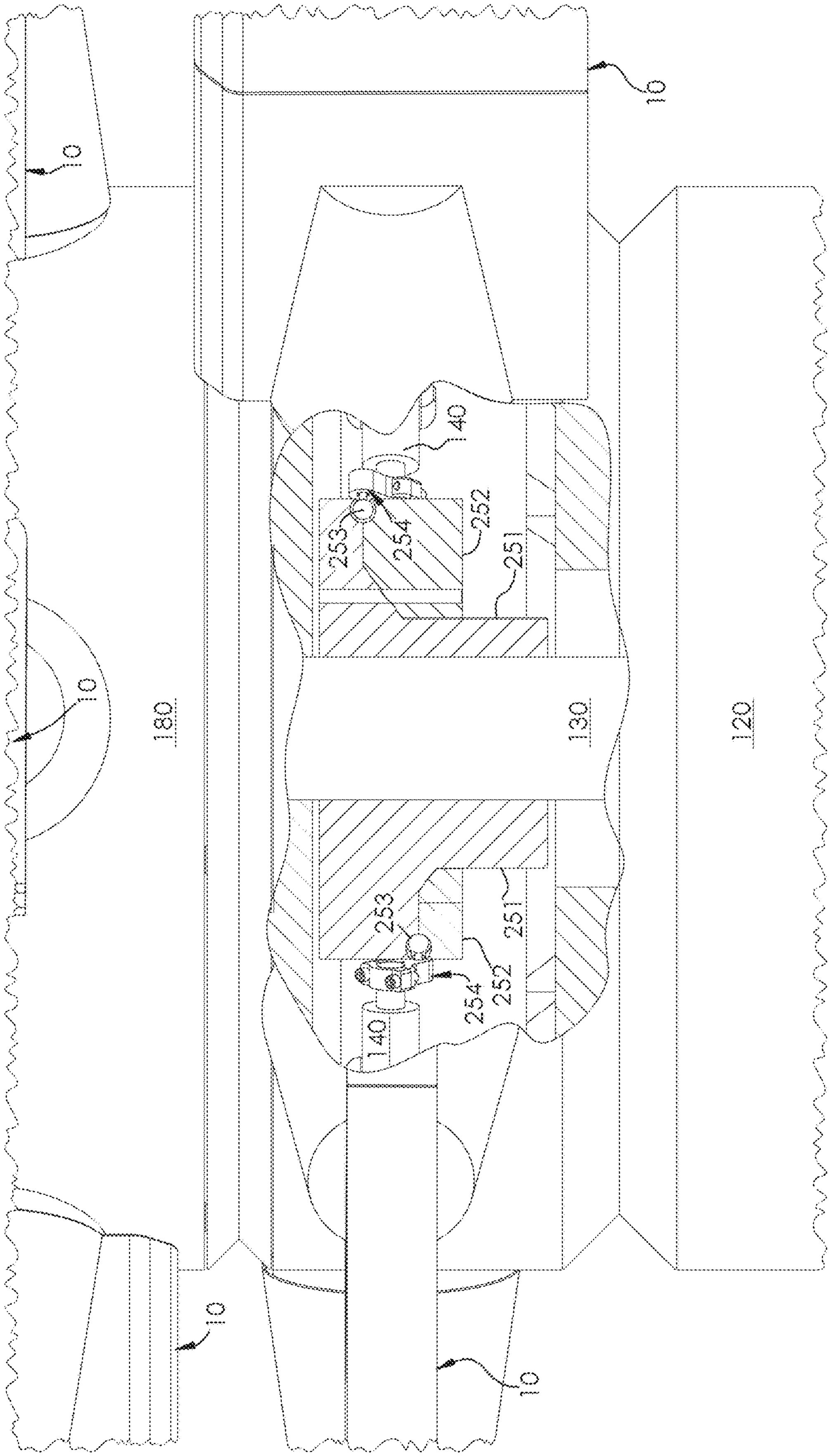
Figure 2:
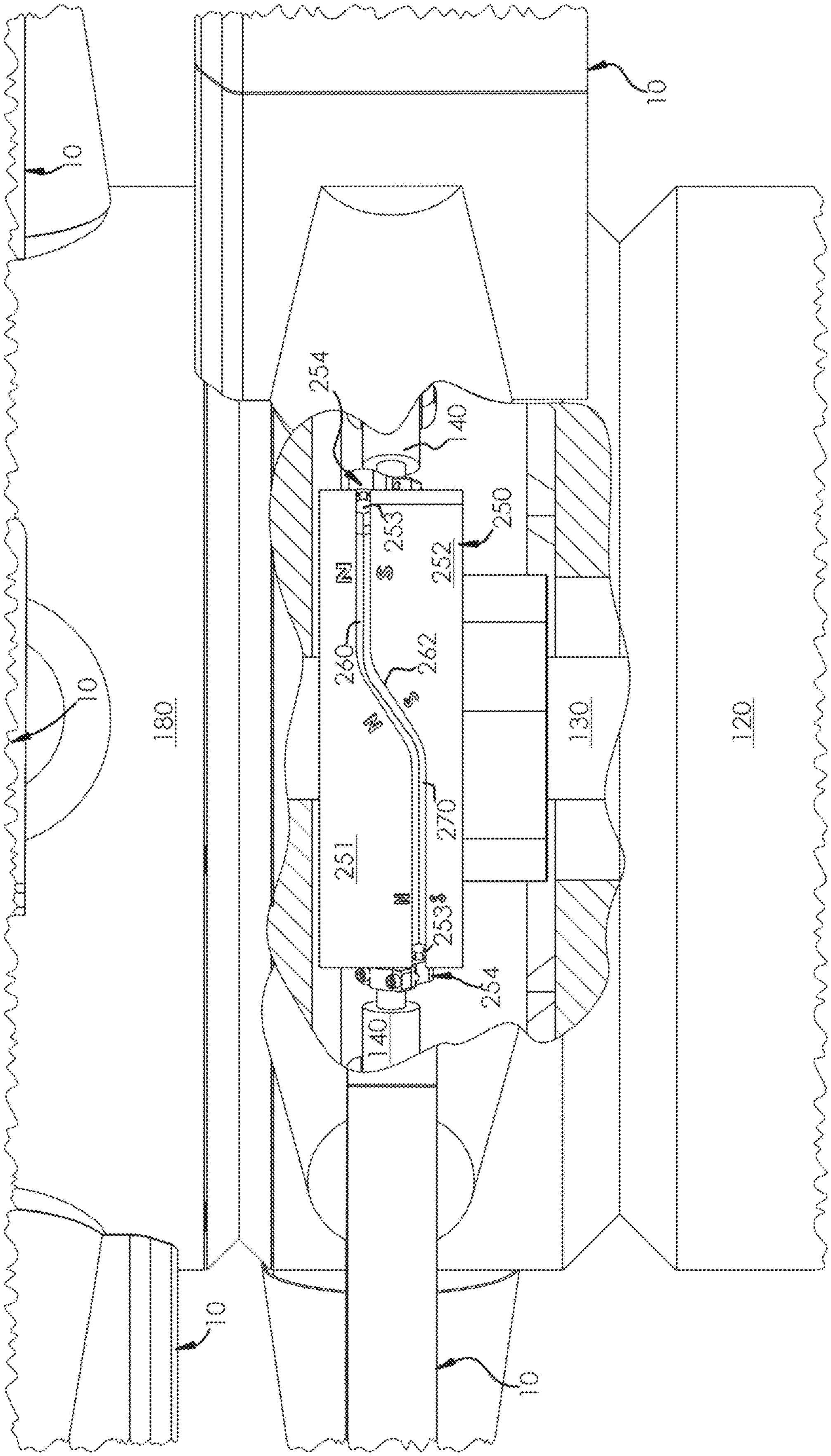
Figure 2:
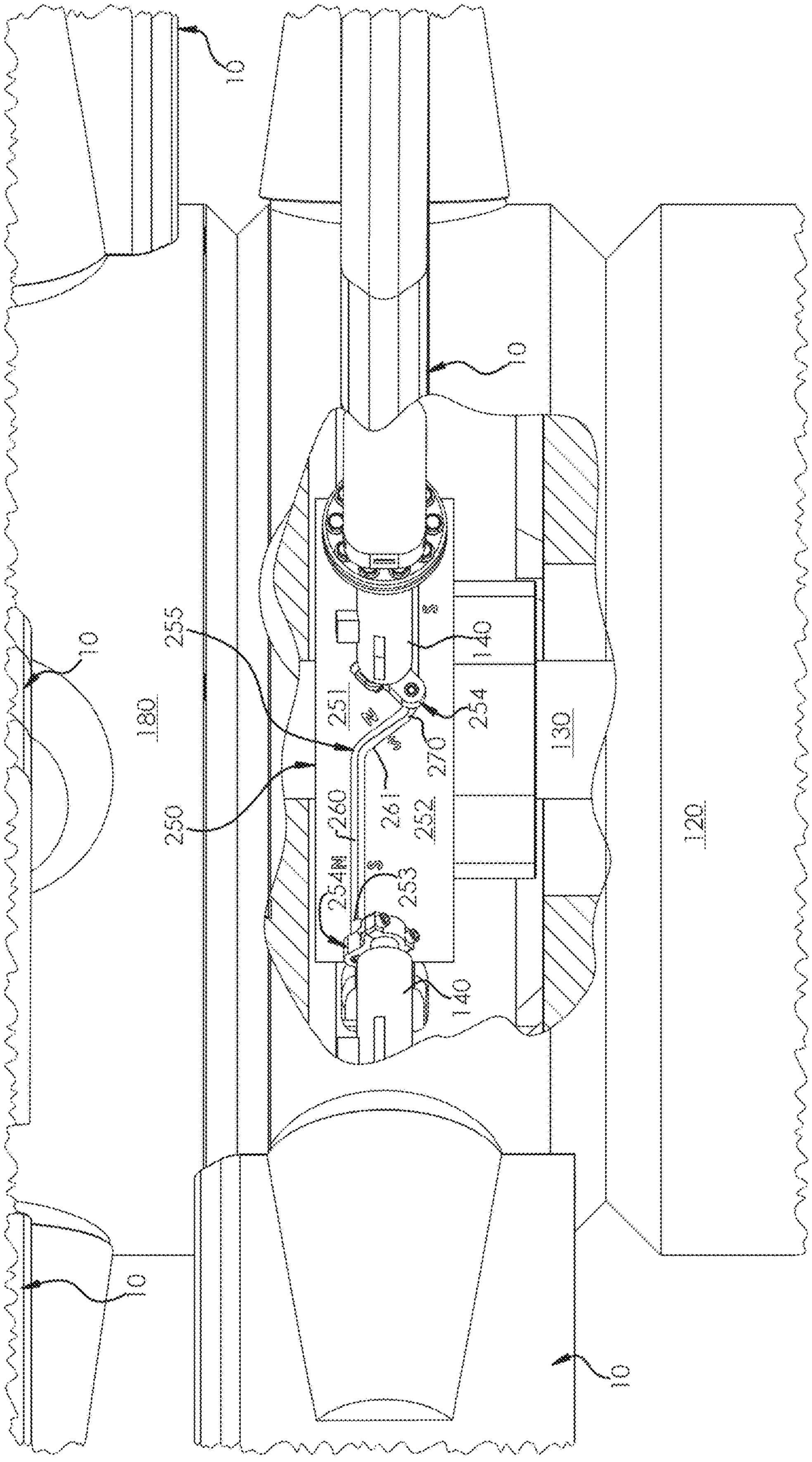

Articulation Control—FIG. 2A

The articulation and orientation of each energy conversion plate is controlled at all times by components within its respective hub. In an embodiment, as shown in FIG. 2A, that articulation control system comprises a split track assembly comprised of a stationary section and a movable section joined together to form a continuous track. The track assembly is fixed to the hub carrier so that it acts as a part of the hub carrier, immovable from the hub carrier while the KFECS is in its working mode, and rotating with the hub carrier when the hub carrier is rotated by the hub orientation control system.

The stationary and moveable sections of the track assembly are connected by splines around its circumference, as shown in FIGS. 2B-2C, and are followed by a follower assembly operably linked to the energy conversion plate shaft of the respective energy conversion plate.

In one embodiment, each section of the track assembly, and the follower assembly that travel within it, are magnetically charged and arranged so a spherical magnetic assembly levitates within the spherical magnetic track. As the fluid pressure increases upon an energy conversion plate, while in an orientation perpendicular to the fluid flow and moving with it, the energy conversion plate will cause the operably coupled hub to rotate about the hub carrier in the direction of the fluid flow and consequently, the energy conversion plate, operably linked shaft and operably coupled hub will rotate around the track assembly. As the follower assembly moves into a spline within the magnetic track, in this example, FIG. 2E-2G, from the lower track to the upper track, its path of travel will cause the operably linked shaft to articulate the operably linked energy conversion plate from its orientation parallel to the fluid flow, shown in FIG. 2E, to an orientation perpendicular to the fluid flow position, shown in FIG. 2G.

Figure 3:
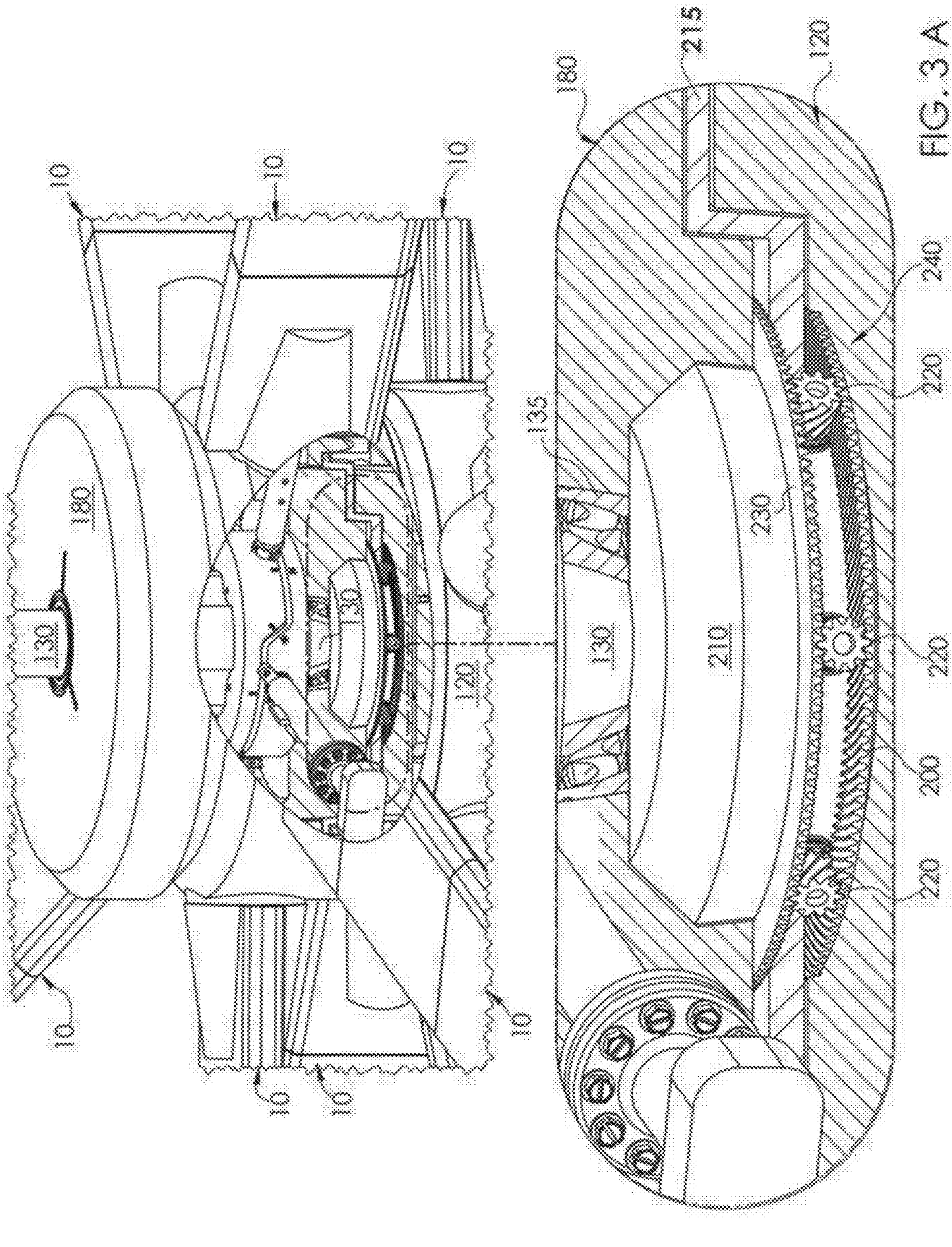
FIG. 3A is a partial isometric view of two counter-rotating hub assemblies with a broken-out section revealing a counter-rotating transmission with a magnified detail partial isometric view of the counter-rotating transmission.
FIG. 3B is a partial isometric view of two counter-rotating hub assemblies with a broken-out section revealing an alternate embodiment of (i) a counter-rotating transmission with a magnified detail partial isometric view of an additional counter-rotating transmission and (ii) outboard hub to perimeter plate thrust bearings.

Counter-Rotating Hub—FIG. 3

Each hub may be operably coupled to one or more counter-rotating hubs thereby transferring mechanical energy between them to a clutch/gearbox/electrical generator or pump assembly. One coupling method is achieved via a synchronous gear mesh. In this embodiment, each hub is fitted with a ring gear, with pinion gears meshed between each ring gear. This arrangement embodies a counter-rotating transmission which enables an evenly distributed load across the hub carrier and a synchronized counter-rotation of the meshed hubs. The counter-rotating transmission is designed and configured to work in any hub carrier longitudinal axis orientation, including horizontal, and vertical. However, when used in a vertical axis orientation, all gear surfaces can be immersed in a reservoir suitable for holding liquid lubricant, while not requiring any seals about rotating shafts or between components located under the liquid lubricant level.

Figure 4:
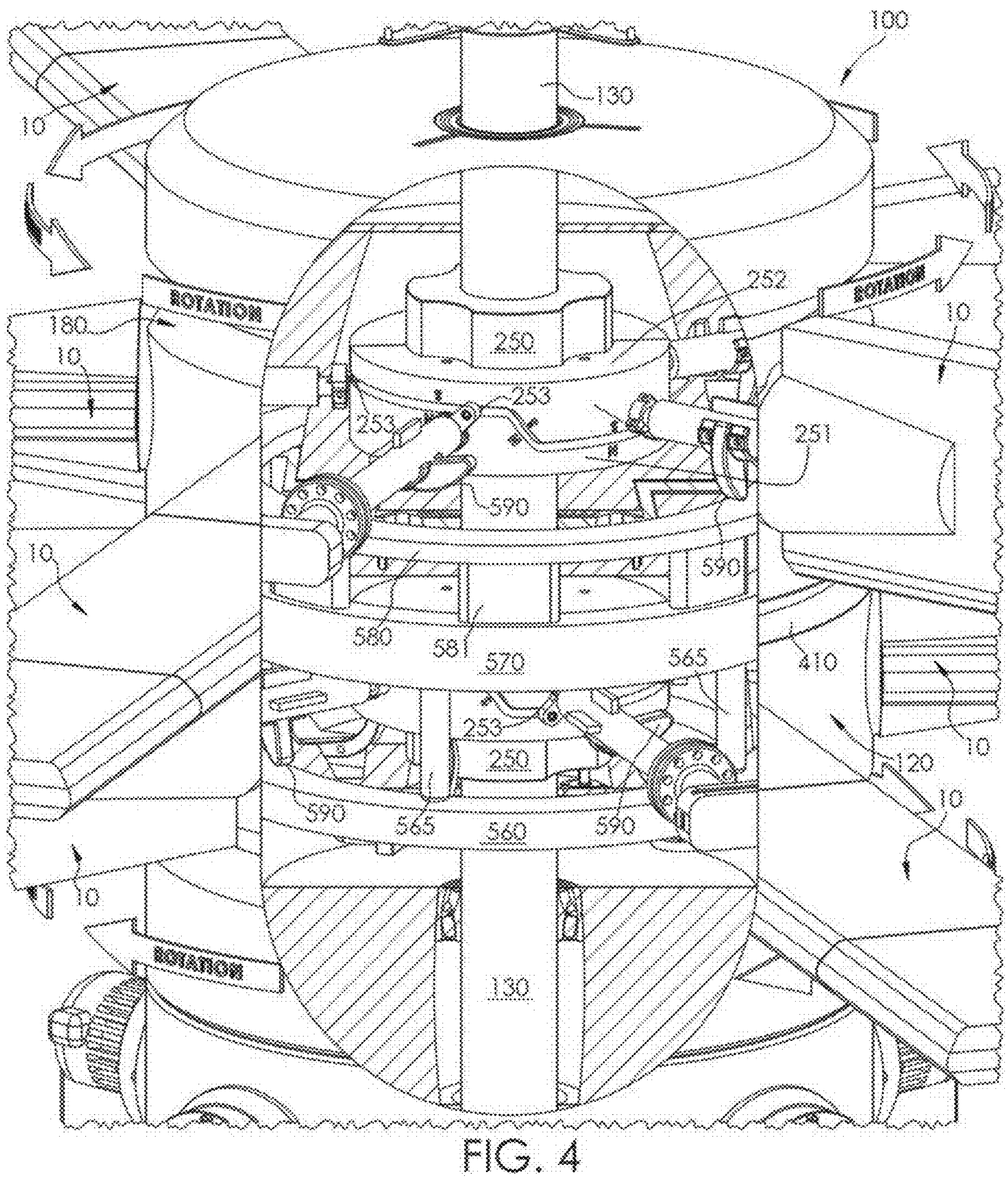
FIG. 4 is a cropped isometric view of a vertical axis embodiment of the KFECS with a broken-out section revealing primary operationally linked components used to override the articulation of energy conversion plates from a working orientation to a position where all energy conversion plates are simultaneously in the slipstream orientation.

Articulation Override System—FIG. 4

A computer-controlled articulation override system ("AOS") provides a series of failsafe mechanisms to automatically override the articulation control of all energy conversion plates in the event the fluid speed exceeds the design specification, error conditions are detected, maintenance is required, or any other specified condition is met, and stop the rotation of the energy conversion system. Moveable and lockable rings, and related components, contained within each hub remain in their respective retracted position during normal operations whereby they are not subjected to any wear. When actuated, the rings travel along the hub carrier axis and engage, through the counter-rotating hubs, and may slide against and move against any cam operably linked to an energy conversion plate shaft that is not in a slipstream orientation. Simultaneously, the operationally coupled cam track separates to permit each follower assembly to travel to its slipstream orientation, irrespective of the radian about the hub carrier's longitudinal axis it is moving through or is at which it is stopped.

Figure 13:
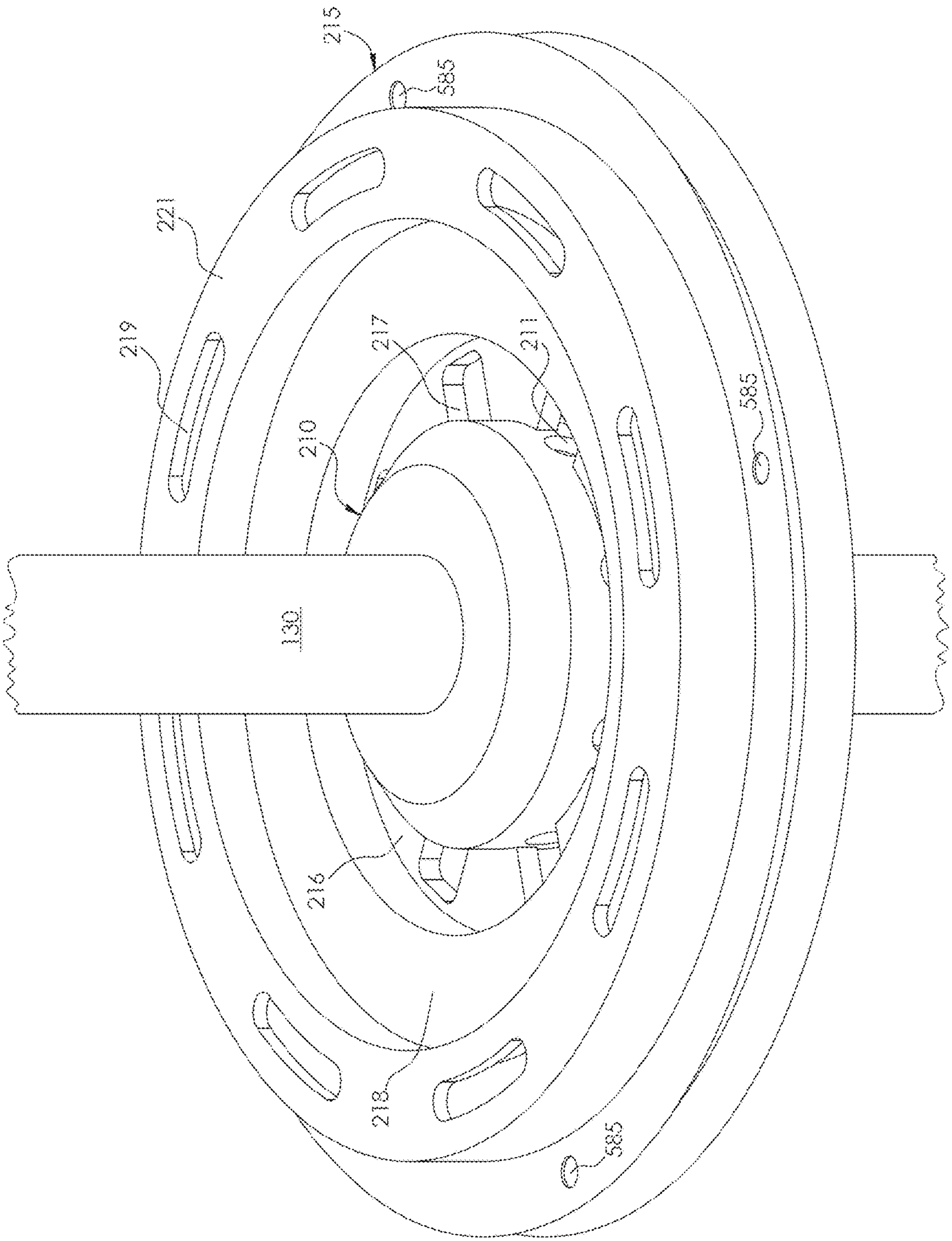
FIG. 13A is an isometric view of the pinion carrier and perimeter plate fixedly linked to the hub carrier.
FIG. 13B is a plan view of the pinion carrier and perimeter plate fixedly linked to the hub carrier with a dashed line depicting two of many paths that electric wiring, hydraulic lines, fiber optic cable and other similar support systems may be physically routed from a hub carrier chase to the perimeter plate without the need for rotatable couplings.
FIG. 13C is an isometric view of an alternate embodiment of the perimeter plate configured to be fixedly linked to the hub carrier and which may be used with up to two counter-rotating transmissions and which may accommodate up to two optional perimeter thrust bearings.
FIG. 13D is a plan view of the alternate embodiment of the perimeter plate and including dashed lines depicting two of many paths that electric wiring, hydraulic lines, fiber optic cable and other similar support systems may be physically routed from a hub carrier chase to the perimeter plate without the need for rotatable couplings.
FIG. 13E is a transverse cross-section of the KFECS an alternate embodiment of brake housing and perimeter plate.
Figure 13:
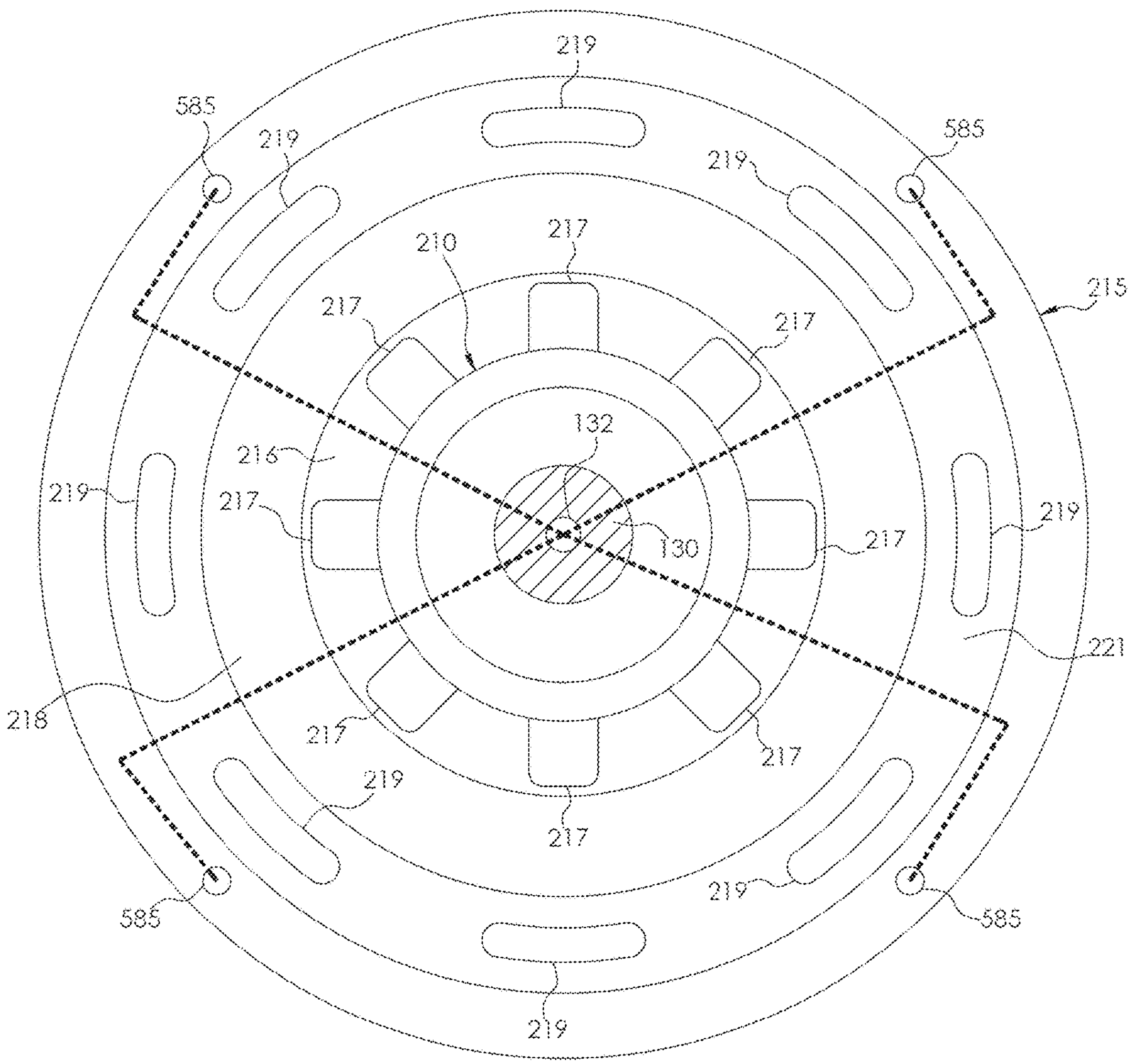
Figure 13:
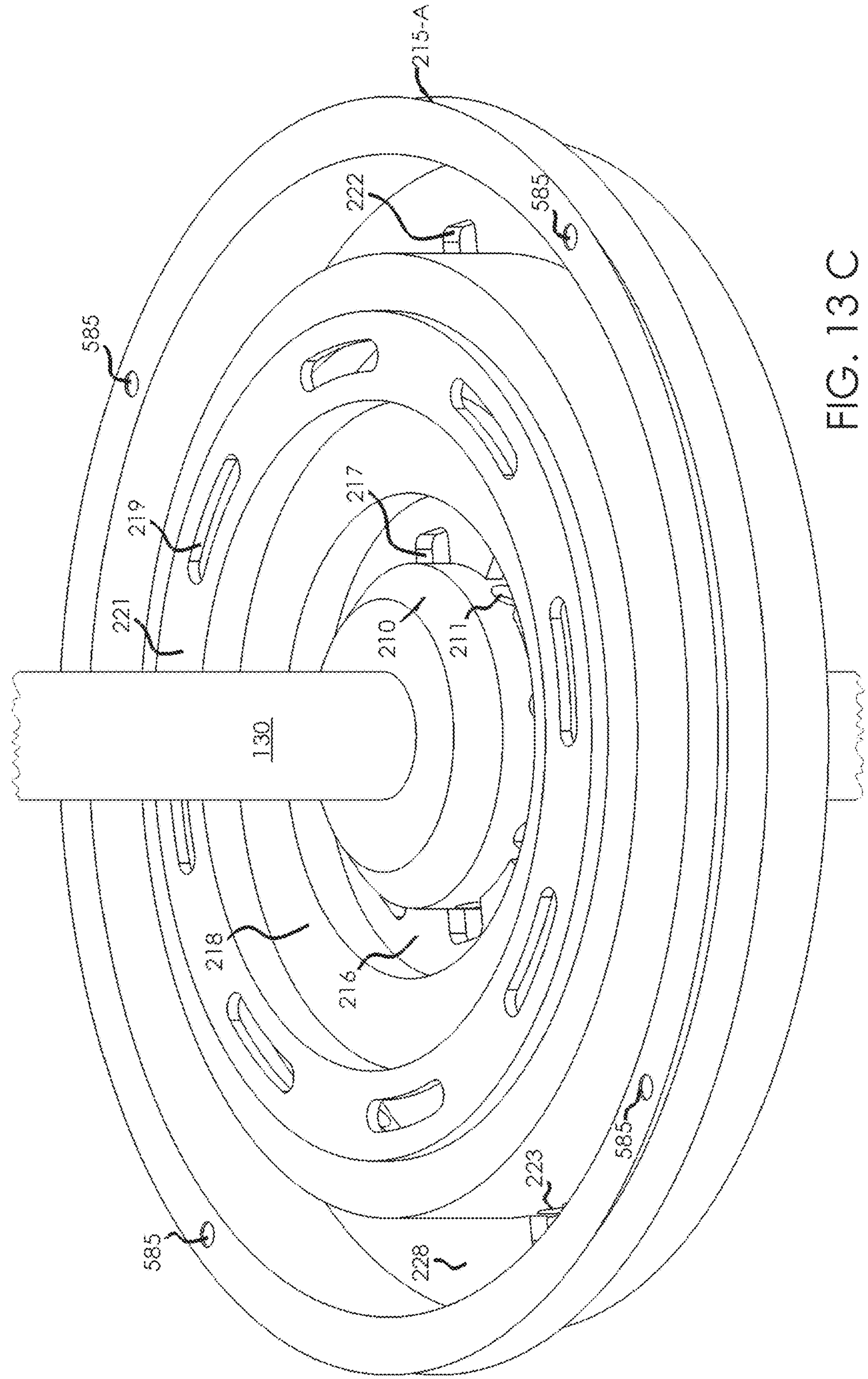
Figure 13:
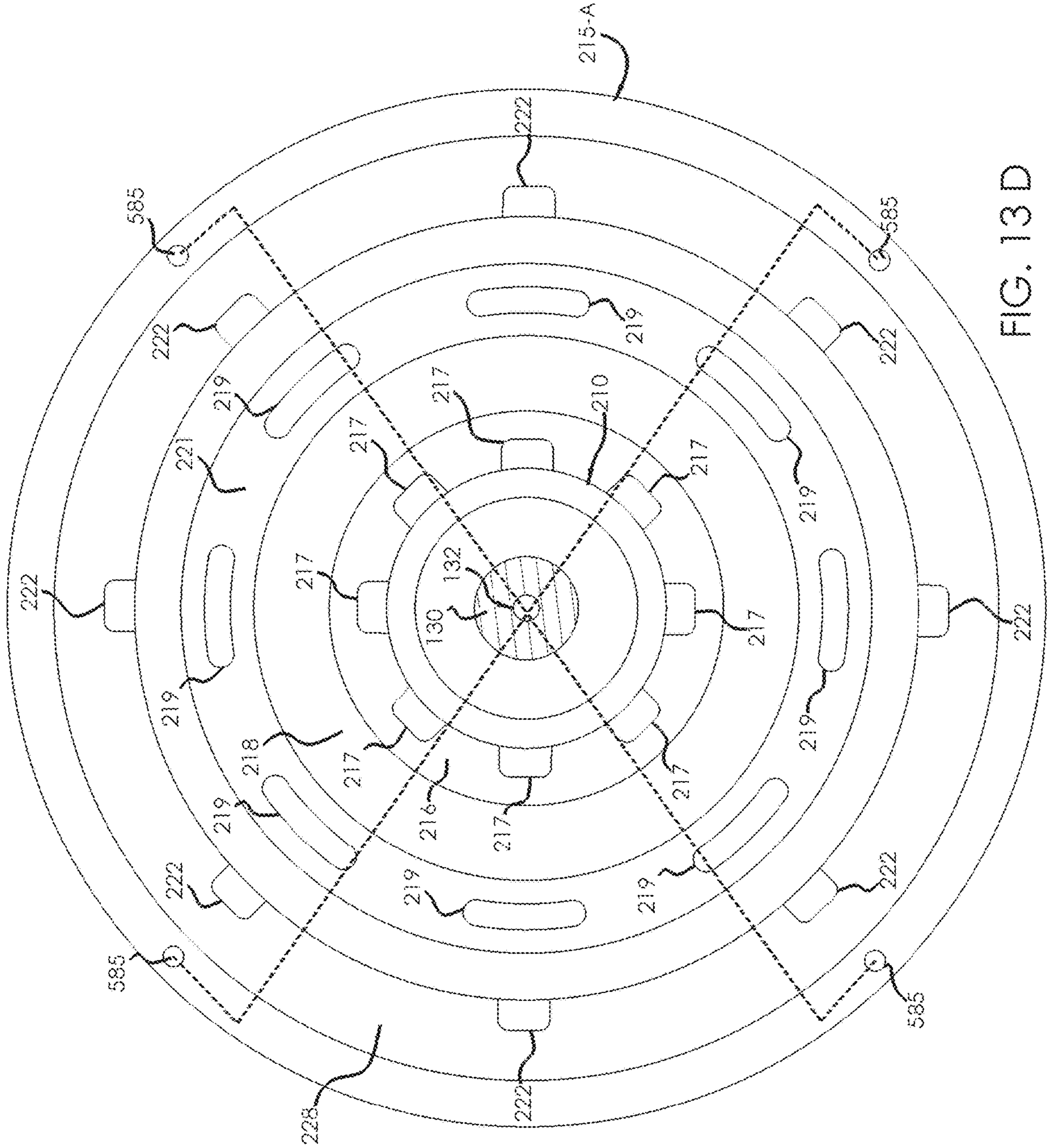
Figure 13:
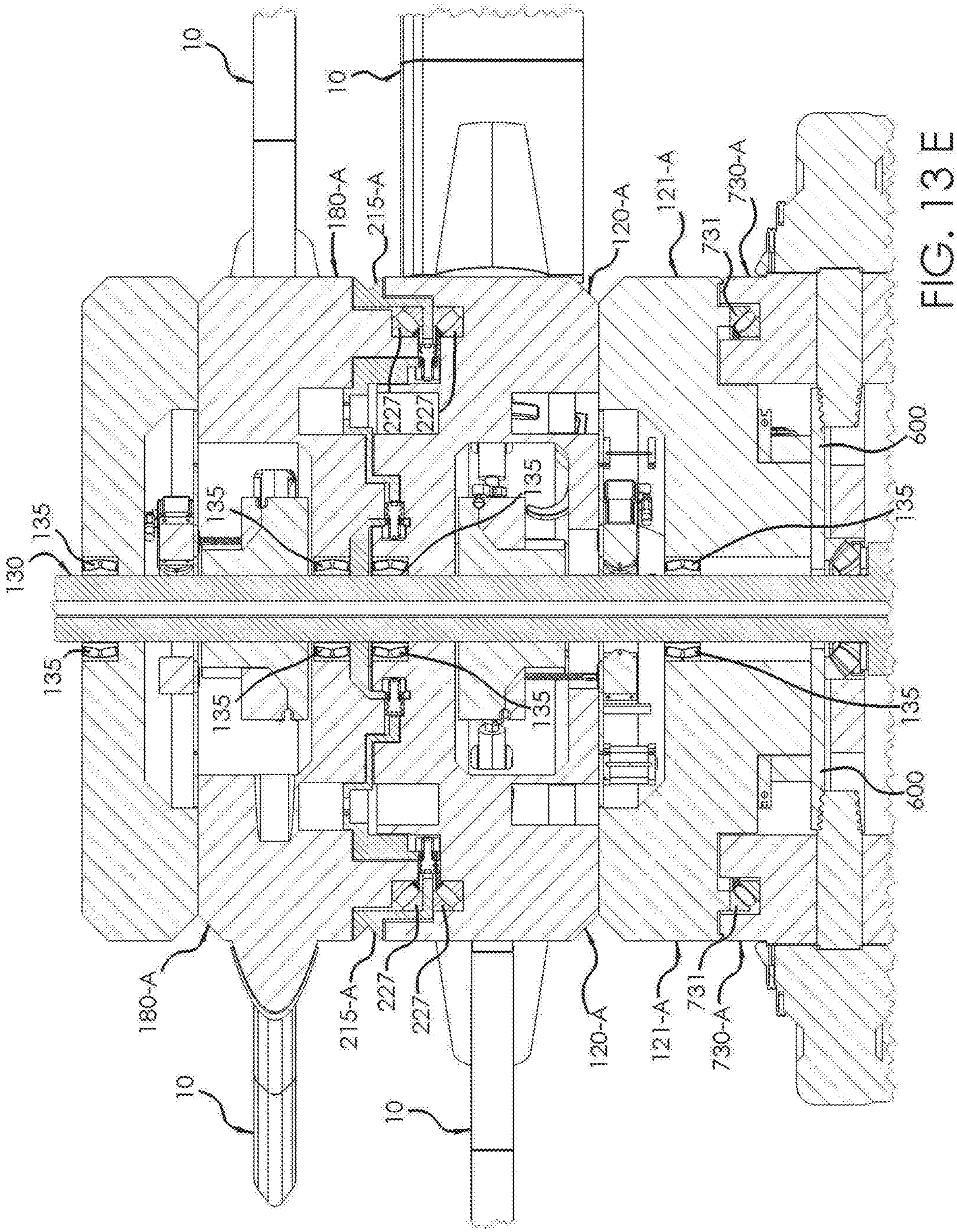

1. Hub & Energy Conversion Plate Assembly—Working Principles—FIGS. 1A and 1B Referring now to FIG. 1A, the kinetic fluid energy conversion system ("KFECS") 100 has an integral hub carrier 130, which may comprise a central shaft, with two or more counter-rotatable hubs 120 and 180 carried co-axially on the hub carrier 130 and mounted for rotation in opposite directions about a longitudinal axis of the hub carrier 130 (a hub axis of rotation 131). A perimeter plate 215 is rotationally fixed to the hub carrier 130 and is disposed between hubs 120 and 180 (see FIGS. 7A and 13A). Each such hub 120 and 180 has equally-spaced, internally controlled, independently-articulating energy conversion plates 10 (ECP) located around the respective hub's 120 and 180 perimeter and each ECP 10 is operably coupled to the respective hub by an associated shaft 140 extending radially from the hub to effect fluid flow-powered rotation of the respective hub. As the fluid pressure increases upon an ECP 10, while the ECP 10 is in an orientation perpendicular to the fluid flow and moving with the fluid flow, the ECP 10 will generate a torque applied to the respective hub 120, or hub 180, thereby causing the respective hub 120 or hub 180 to rotate about the hub carrier 130. Hubs 120 and 180 may be provided in pairs of counter rotating hubs—one hub 120 or 180 of the pair rotating in a clockwise direction and the other hub 120 or 180 of the pair rotating in a counterclockwise direction—to balance torsional loads generated by each hub.

During rotation of a hub 120 or 180 and its corresponding ECPs 10 in the presence of a fluid flow in a direction transverse to the longitudinal axis of the hub carrier 130, each hub/ECP assembly will be rotating with the direction of the fluid flow for half of its rotation and against the direction of the fluid flow for the other half of its rotation. To harness the motive power of the fluid flow, each ECP 10 is articulated so as to maximize the surface area exposed to the fluid flow during at least part of the rotation in the direction of the fluid flow and is articulated to minimize the surface area exposed to the fluid flow during at least part of the rotation in the direction against the fluid flow. In the embodiment illustrated in FIG. 1A, to generate a clockwise rotation in the lower hub 120, the ECPs 10 on the left side of the hub carrier 130 are articulated (about a plate articulation axis) so as to maximize the surface area exposed to the fluid flow while the ECPs 10 on the right side of the hub carrier 130 are articulated (about the plate articulation axis) to minimize the surface area exposed to the fluid flow. To generate a counterclockwise rotation in the upper hub 180, the ECPs 10 on the right side of the hub carrier 130 are articulated so as to maximize the surface area exposed to the fluid flow while the ECPs 10 on the left side of the hub carrier 130 are articulated to minimize the surface area exposed to the fluid flow.

Figure 17A:
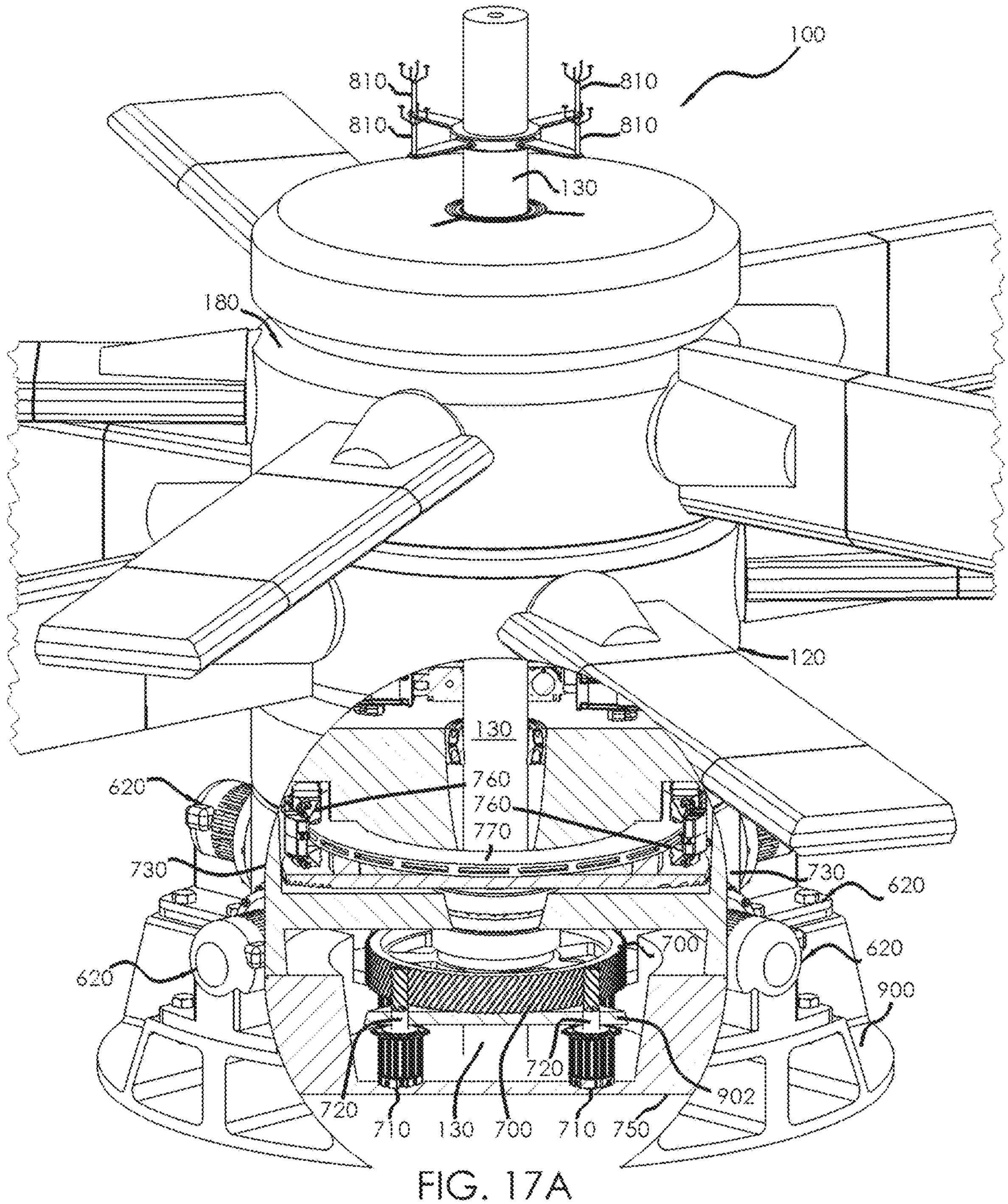
FIG. 17A is an isometric view of an embodiment of the KFECS with a broken-out section revealing components which orient the KFECS relative to the fluid flow, transfer mechanical energy to generators or pumps, and stop the KFECS's hub rotations.
Figure 17:
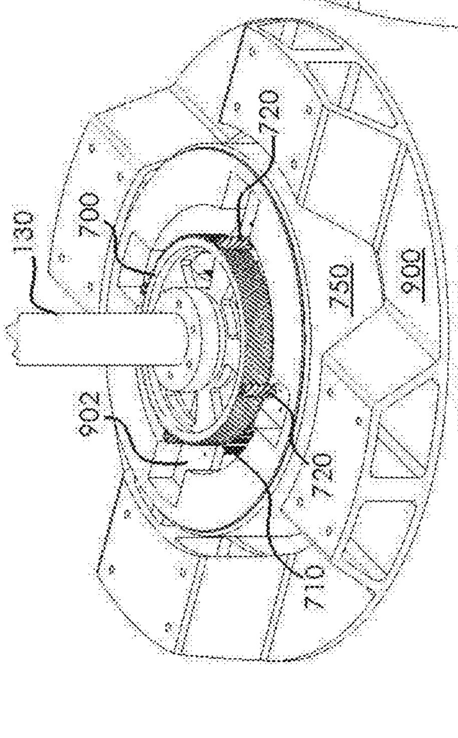
FIG. 17B is an isometric view of an embodiment of a base superstructure of the KFECS and components used to orient the KFECS toward the oncoming fluid flow or other computer directed orientation.
FIG. 17C is a plan view of the base superstructure and components used to orient the KFECS toward the oncoming fluid flow or other computer directed orientation.
FIG. 17D is a transverse cross section of FIG. 17C, in the direction 17D, of the base superstructure and components used to orient the KFECS toward the oncoming fluid flow or other computer directed orientation.
Figure 17:
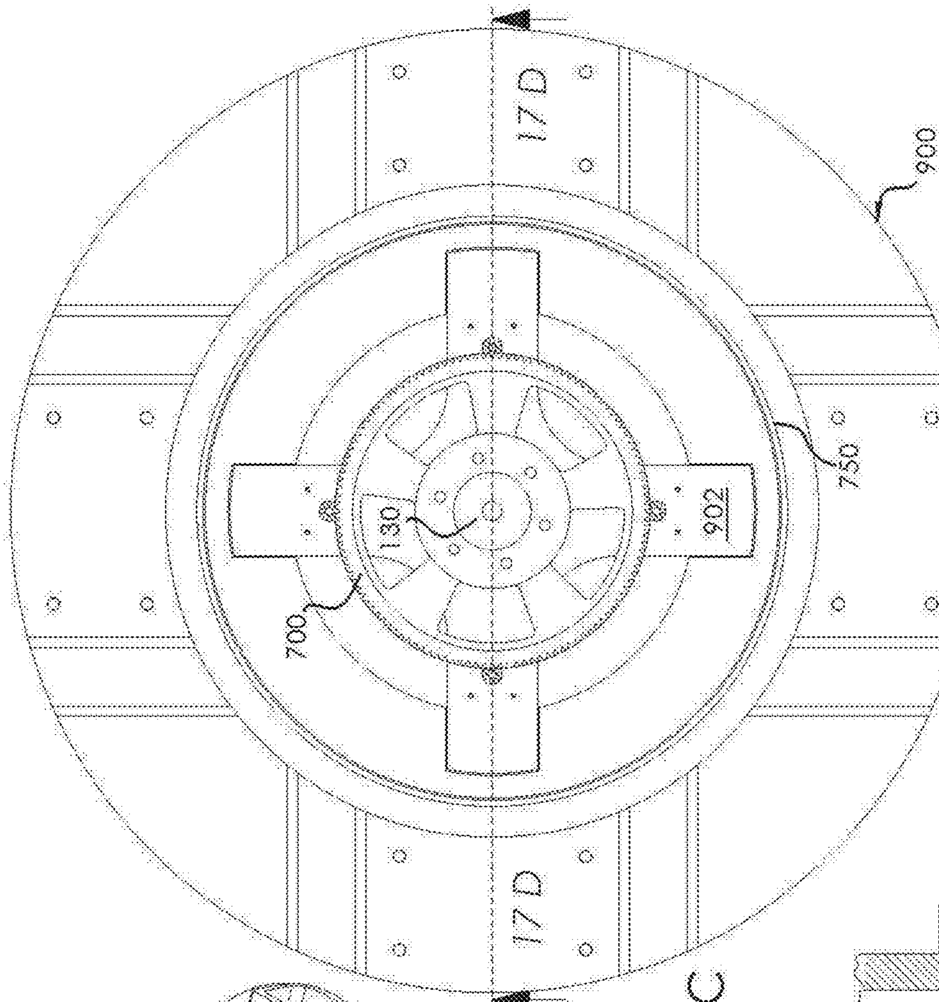
Figure 17:
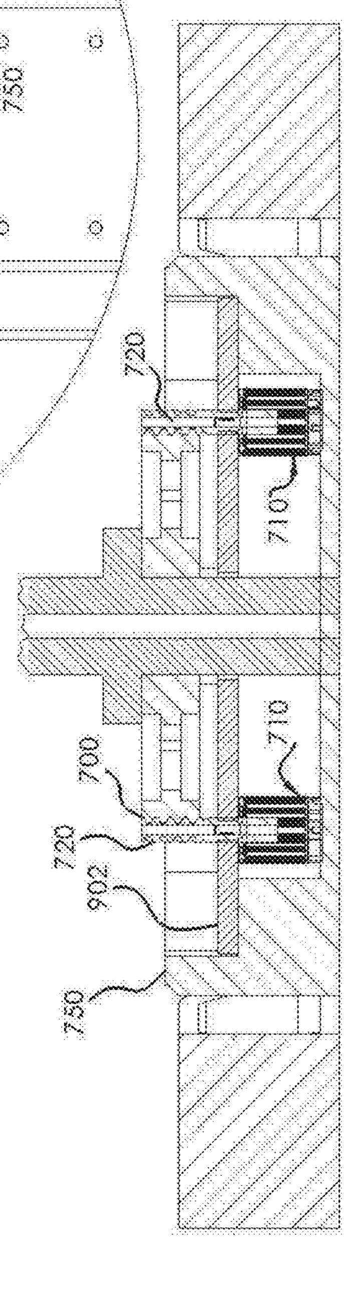

In an embodiment, the hub carrier 130 and the KFECS 100 remain oriented directly toward the oncoming fluid flow while in its working mode via a hub orientation control system that may include one or more fluid direction and speed sensors 810 and one or more computer-controlled hub orientation control motors ("hub orientation control motors") 710 having drive gears engaged with the orientation gear 700 attached to the hub carrier 130 (see FIG. 17A).

The articulation of each ECP 10 about the longitudinal axis (plate articulation axis) of its respective shaft 140 (and thus the ECP's orientation) is independently, fully and continuously controlled by an articulation control system that, in various embodiments, is located within the respective hub 120 or 180. Each ECP 10 is also synchronized with its respective hub's revolutions about the hub carrier 130, such that each ECP 10 can be oriented by the articulation control system for energy conversion while such ECP 10 is moving in the direction of the fluid flow, and then articulated to be oriented by the articulation control system for minimum drag while such ECP 10 is blocked from the fluid flow or moving against the fluid flow.

Such a KFECS 100 converts kinetic fluid energy to positive mechanical energy when a fluid flow acts upon an ECP 10 that is (i) not parallel to the fluid flow, including without limitation perpendicular to it, and (ii) positioned and/or moving in the direction of the fluid flow, thereby causing the fluid pressure against the ECP 10 to rise. Such ECP 10 causes its respective hub 120 or hub 180, as the case may be, to rotate about the longitudinal axis of the hub carrier 130. Positive mechanical energy is transferred to the hub 120 and hub 180 during any period in which the angle of attack of one or more of its respective ECPs 10 is not parallel to the fluid flow and moving in the direction of the fluid flow referred to herein as "working mode."

In an embodiment, the articulation control system is configured so that when the fluid flow to an ECP 10 is blocked by a following, adjacent ECP 10, or an ECP 10 reaches the 180° position about the hub carrier 130, where the ECP 10 transitions from moving with the fluid flow to moving against the fluid flow, the ECP 10 will be articulated by the articulation control system described in Sections 2 and 9 herein about its respective shaft 140 axis from its energy converting working orientation (e.g., the ECP 10 surface is not parallel to and may be perpendicular to the fluid flow, or not parallel, and possibly perpendicular to, the plane of rotation of the hub) to its parallel to the flow "slipstream" orientation (or parallel to the plane of rotation of the hub), independently of all other ECPs 10, whereby the ECP 10 is oriented to generate minimal drag as it rotates about the longitudinal axis of the hub carrier 130 in a direction against the fluid flow.

Different numbers of (i) hubs 120 and 180 can be configured per hub carrier 130, and (ii) different numbers of ECPs 10 can be configured per hub 120 and 180, based upon the designer's choice for satisfying performance and installation requirements, including without limitation the desired aspect ratio (height to width) of the KFECS 100, its mechanical energy output and overall size. The embodiment shown in FIG. 1A comprises a configuration with five ECPs

10 per each of two hubs 120 and 180. In such configuration, the axis of each ECP 10 (defined by shaft 140) is spaced at 72° intervals around the respective hub's 120 and 180 perimeter. By way of example, if a six-ECP 10 embodiment was configured, the axis of each ECP 10 would be spaced at 60° intervals around the respective hub's 120 and 180 perimeter(s) such that the axis of each ECP 10 would be evenly spaced around such perimeter.

Referring now to FIG. 1B and still referring FIG. 1A, regardless of the number of ECPs 10 or hubs 120 and 180 configured within the KFECS 100, in the context of the present disclosure, 0° relative to the oncoming fluid flow for the KFECS 100 is based upon the orientation of the hub carrier 130 to the oncoming fluid flow. For simplicity, FIG. 1B shows only the counterclockwise rotating hub 180.

When a hub 180 is rotating in a counterclockwise rotation, as a first ECP 10 in this embodiment (i.e., a five-ECP hub) moves in a counterclockwise rotation about the longitudinal axis of the hub carrier 130, after it passes the 0° position it will be traveling in the direction of the fluid flow. As the first ECP 10 passes the 0° position, the articulation control system will orient the ECP so as to maximize surface exposure to the oncoming fluid by the time the ECP 10 reaches an angular position of about 355° (measuring backwards from 360°) and will begin to convert kinetic fluid energy to mechanical energy. As the ECP 10 approaches the 180° position transitioning from moving with the flow to moving against the flow, the ECP 10 is then articulated by the articulation control system, as described in Sections 2 and 9, to its slipstream orientation where the ECP 10 will be parallel to the fluid flow. Once the ECP 10 passes the 180° position, it will remain in its parallel to the flow (slipstream) orientation while it rotates against the oncoming fluid flow or until it otherwise reaches the angular position where it is configured to begin its controlled articulation to its perpendicular to the fluid flow (working) orientation.

Clockwise rotating hub 120, not shown in FIG. 1B, will articulate to maximum surface exposure at an angular position of about 5° and will articulate to minimum surface exposure after an angular position of about 127°.

2. Articulation Control System—Working Principle FIGS. 2A-2G

Referring now to FIG. 2A, the articulation and orientation of each ECP 10 is controlled at all times by components that may be enclosed within its respective hub 120 or hub 180. In an embodiment, orientation of each ECP 10 is positively controlled by a follower mechanism engaged with a cam surface that effects articulation of the ECP 10 to varying predetermined orientations, relative to the fluid flow, as the ECP 10 rotates about the longitudinal axis of the hub carrier 130. In another embodiment, orientation of each ECP 10 is positively controlled by computer-controlled motor that effects articulation of the ECP 10 to varying predetermined orientations, relative to the fluid flow, as the ECP 10 rotates about the longitudinal axis of the hub carrier 130. In another embodiment, orientation of each ECP 10 is positively controlled by computer-controlled magnetic array that effects articulation of the ECP 10 to varying predetermined orientations, relative to the fluid flow, as the ECP 10 rotates about the longitudinal axis of the hub carrier 130.

In the embodiment shown in FIG. 2A, a cam track assembly 250 includes an upper stationary section 251 and a lower moveable section 252 of lower hub 120 (in alternate configurations, the cam track assembly 250 comprises a single, integral unit as well as multi-track variations). The cam track assembly 250 is fixed to the hub carrier 130 so that it acts as a part of the hub carrier 130, immovable from it while the KFECS 100 is its working mode, and rotating with the hub carrier 130 when the hub carrier 130 is rotated by the hub orientation control system. As shown in FIG. 4, cam track assembly 250 of upper hub 180 is a mirror image of cam track assembly 250 of lower hub 120 and has a lower stationary section 251 and an upper movable section 252.

Referring now to FIGS. 2B and 2C and still referring to FIG. 2A, the cam track assembly 250 includes a continuous track 255 disposed around its circumference that includes upper track portion or section 260 and a lower track portion or section 270 with an angled spline portion 261 forming a transition section connecting the upper and lower track portions on one side of the cam track assembly 250 (see FIG. 2B) and an angled spline portion 262 forming a transition section connecting the upper and lower track portions on an opposite side of the cam track assembly 250 (see FIG. 2D). A follower assembly 254 is operatively engaged with the continuous track 255. One follower assembly 254 is operably linked to the energy conversion plate shaft 140 of each ECP 10. As the ECP 10 and shaft 140 rotate with the associated hub 120 or 180 about the cam track assembly 250, the follower assembly 254 traverses the continuous track 255 resulting in corresponding orientations of the ECP 10 as the ECP 10 completes a revolution about the longitudinal axis of the hub carrier 130.

Figure 2F:
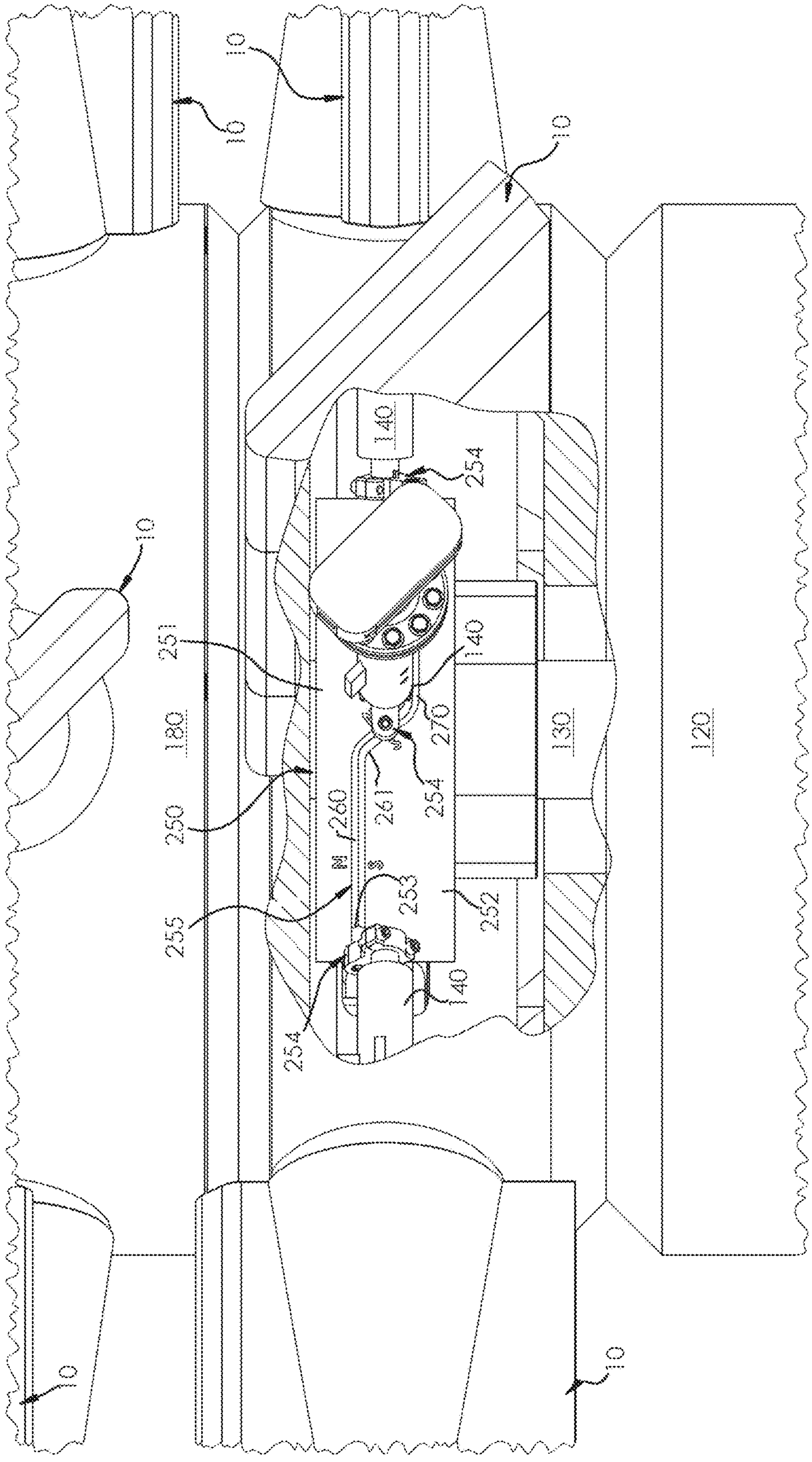
Figure 2G:
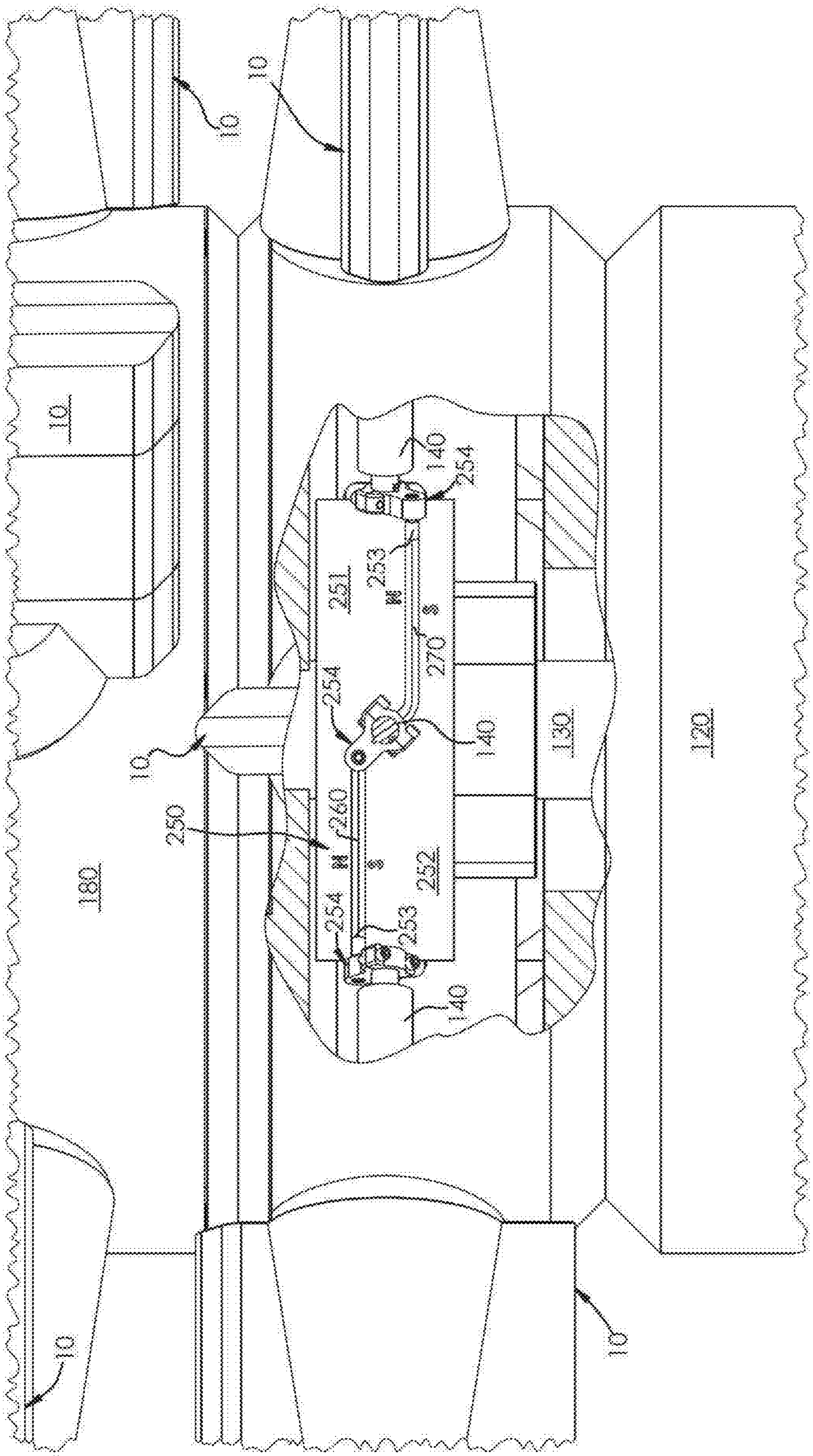

For example, as shown in FIGS. 2E, 2F, 2G, when the follower assembly 254 is disposed within the upper track portion 260, the corresponding ECP 10 is disposed in its working orientation perpendicular to the direction of fluid flow, and when the follower assembly 254 is disposed within the lower track portion 270, the corresponding ECP 10 is disposed in its slipstream orientation parallel to the direction of fluid flow. As the follower assembly 254 traverses the spline portion 261 from the lower track portion 270 to the upper track portion 260 (FIG. 2F), the corresponding ECP 10 transitions from its slipstream orientation parallel to the direction of fluid flow to its working orientation perpendicular to the direction of fluid flow. As the follower assembly 254 traverses the spline portion 262 on an opposite side of the cam track assembly 250 from the upper track portion 260 to the lower track portion 270, the corresponding ECP 10 transitions from its working orientation perpendicular to the direction of fluid flow, to its slipstream orientation parallel to the direction of fluid flow.

Features of an embodiment of the follower assembly 254 are shown in FIG. 8B. Follower assembly 254 includes a connecting rod 145 connected to and extending radially from the shaft 140 of the ECP 10. Follower head 253 is connected to the end of a shaft 256 mounted to the connecting rod 145 at a radial distance from the shaft 140. Shaft 256 may be rotationally mounted, defining an axis of rotation that is generally parallel to an articulation axis defined by the shaft 140.

In an alternate configuration, the ECP 10 is in its slipstream orientation when the follower assembly is in the upper track portion and is in its working orientation when the follower assembly is in the lower track assembly, depending on how the follower assembly is operatively attached to the shaft 140 of the ECP 10.

The follower assembly 254 may include a linkage fixedly attached to the shaft 140 with a follower head 253 at a free end of the linkage disposed within the track 255 of the cam track assembly 250. In an embodiment, the follower head 253 is spherical in shape and the track has circular transverse cross-sectional shape generally conforming to, but having a larger diameter than, the follower head 253.

In an embodiment, the upper section 251 and the lower section 252 are magnetically charged with opposite poles facing each other, and together comprise a magnetic track. The upper and lower sections can be magnetically charged by any suitable means, such as machining the upper and lower sections from permanent magnetic materials, embedding magnetic materials within nonmagnetic sections 251 and 252, or by application of electromagnetism. In this embodiment, the spherical follower head 253 is also magnetically charged and travels within the magnetic track whereby like poles of the follower head 253 are oriented nearest its like pole in the magnetic track, thereby resulting in the follower head 253 levitating within the magnetic track and forming a magnetic bearing.

3. Counter-Rotating Hub—Working Principle—FIG. 3

Referring now to FIG. 3A and still referring to FIG. 1A, each hub 120 and 180 may be operably coupled to one or more counter-rotating hubs 120 and 180 thereby enabling the transfer of mechanical energy between them and/or through them to one or more operably coupled power take-off devices, such as clutch/gearbox/electrical generator or pump assemblies 620. One hub 120 to hub 180 counter-rotating coupling method is achieved via a counter-rotating transmission 240 which enables the transfer of mechanical energy between them and/or through them to one or more operably coupled power take-off devices, such as clutch/gearbox/electrical generator or pump assemblies 620.

In an embodiment, transmission 240 comprises a ring gear 200 attached or otherwise operatively coupled to hub 120 and a ring gear 230 attached or otherwise operatively coupled to hub 180 (see Section 3 and FIG. 3A). Transmission 240 further comprises radially oriented pinions 220 that are rotatably mounted to a pinion carrier 210, which is fixed to the hub carrier 130. This arrangement results in the center of the axis of each pinion 220 remaining at all times in the same angular position relative to the hub carrier 130. Consequently, because the center of the axis of each pinion 220 is fixed at an angular position with respect to the hub carrier 130, rotational movement of either hub 120 and 180 about the longitudinal axis of the hub carrier 130 results in its operably linked respective ring gear 200 and ring gear 230 rotating about the longitudinal axis of the hub carrier 130. Rotational movement of either ring gear 200 or ring gear 230 will cause the opposing ring gear to rotate in the opposite direction. Movement of either ring 200 or ring gear 230 will cause the operably coupled pinions 220 to rotate about their respective axes thereby causing an opposite rotation of the adjacent ring gear and operably coupled hub.

The transmission 240 will operate irrespective of the orientation of the longitudinal axis the hub carrier 130, including without limitation, horizontal and vertical. However, when used in a KFECS 100 with a hub carrier 130 that has a vertical axis orientation, all gear surfaces can be immersed in a reservoir suitable for holding liquid lubricant, while not requiring any seals about rotating shafts or between components located under the liquid lubricant level.

4. Articulation Override System Working Principle—FIG. 4

Referring now to FIG. 4, and still referring to FIG. 1A, a computer-controlled ECP 10 articulation override system ("AOS") provides a means to automatically override the primary articulation control of all ECPs 10 to protect the KFECS 100 from fluid flow that exceeds preset limits and/or to stop the KFECS 100 for maintenance or other purposes. When activated, the AOS articulates all ECPs 10 to, and/or retains them in, a slipstream orientation (AOS Active Mode) until the AOS determines it is safe to return ECP 10 articulation control to the Primary Articulation Control System.

While the KFECS 100 is in its working mode, the AOS is in its standby mode (AOS Standby Mode) whereby the AOS continuously monitors sensors for any AOS active mode triggering event. When the AOS detects such triggering event, the AOS changes its status to active mode (AOS Active Mode). Such triggering events include without limitation the computer's receipt of a signal indicating (i) the fluid flow speed exceeds the KFECS's 100 design specification, (ii) an error condition is detected by one or more sensors within the KFECS 100 where such error condition require the hub 120 and 180 rotations to cease, (iii) maintenance of, or relating to, the KFECS 100 is required or requested by the AOS or a maintenance crew, or (iv) any other specified condition is met. All AOS components, other than external kinetic fluid energy direction and speed sensors 810, may be enclosed within the counter-rotating hubs 120 and 180, hub carrier 130 or other areas of the KFECS 100 and do not come in contact with the fluid flow.

An embodiment of the AOS includes moveable and lockable rings (see Section 10 and FIG. 15A) including a primary ring 560, secondary ring 570 and tertiary override ring 580 contained within hub 120 and hub 180 which remain in their retracted positions during normal operations whereby they are not subjected to any wear. The shaft 140 of each ECP 10 includes a cam 590. When the AOS active mode is triggered, the primary ring 560, secondary ring 570 and tertiary override ring 580 move in axial directions with respect to the hub carrier 130 and cause any cam 590 operably linked to an ECP 10 that is not in the AOS Slipstream Mode position to move into, and/or remain in, such position. Simultaneously, the stationary section 251 and moveable section 252 of the cam track assembly 250 separate to permit each follower assembly 254 to travel to (or remain in) its slipstream position, irrespective of the angular position about the longitudinal axis of the hub carrier 130 the follower assembly 254 is moving through or at which it is stopped. The ECPs 10 remain in their slipstream orientations and, optionally, each hub 120 and hub 180 remains stopped until the AOS resumes its standby mode.

Exemplary embodiments of an articulation control system are described below. All such embodiments are compatible with the AOS to achieve its functions of articulating the ECPs 10 to, and/or retaining them in, a slipstream orientation (AOS Active Mode) until the AOS determines it is safe return the ECP 10 articulation control to the Primary Articulation Control System. The AOS controls any embodiment of ECP, including, without limitation, nesting ECP 20 as described in Section 13.3. The detailed operations of the AOS are described in Section 10.

5. Energy Conversion and Flow—FIG. 5A

Referring now to FIG. 5A, mechanical energy flow through the KFECS 100 while in its working mode is depicted with dashed arrows. While the KFECS 100 is in its working mode, kinetic fluid pressure upon any ECP 10 that is not parallel to the oncoming fluid flow is converted into mechanical energy by the resulting rotation of the corresponding hub 120. The energy conversion begins when kinetic fluid energy converted from any ECP 10 is transferred as a distributed load over the ECP 10, and then transferred into the operably linked shaft 140, both of which act together as a lever thereby applying a torque to the associated hub 120 to rotate the hub. The mechanical energy of the rotating hub is transferred out of the hub 120 into an operably coupled device, such as a clutch/gearbox/electrical generator/pump assembly 620.

Still referring to FIG. 5A, when an adjacent counter-rotating hub 180 is included in a KFECS 100, kinetic fluid energy is converted into mechanical energy from any ECP plate 10 that is not parallel to the oncoming fluid flow by the resulting rotation of the corresponding hub 120. The mechanical energy is converted as a distributed load (pressure) across the ECP 10 and is transferred through its respective operably linked shaft 140, both of which act together as a lever thereby applying a torque to the counter-rotating hub 180, and causing the hub 180 to rotate. The mechanical energy is transferred out of the counter-rotating hub 180 through the transmission 240, and as described in more detail below in Section 7, into a operably coupled counter-rotating hub 120. The combined mechanical energy from both hubs 120 and 180 is transferred to any operably coupled device, such as a clutch/gearbox/electrical generator/pump assembly 620, for example, by means of bevel gear 600 and pinion gears 610, as described in more detail in Section 12.3.

6. Hub Assembly Detail—FIG. 6A

Figure 6:
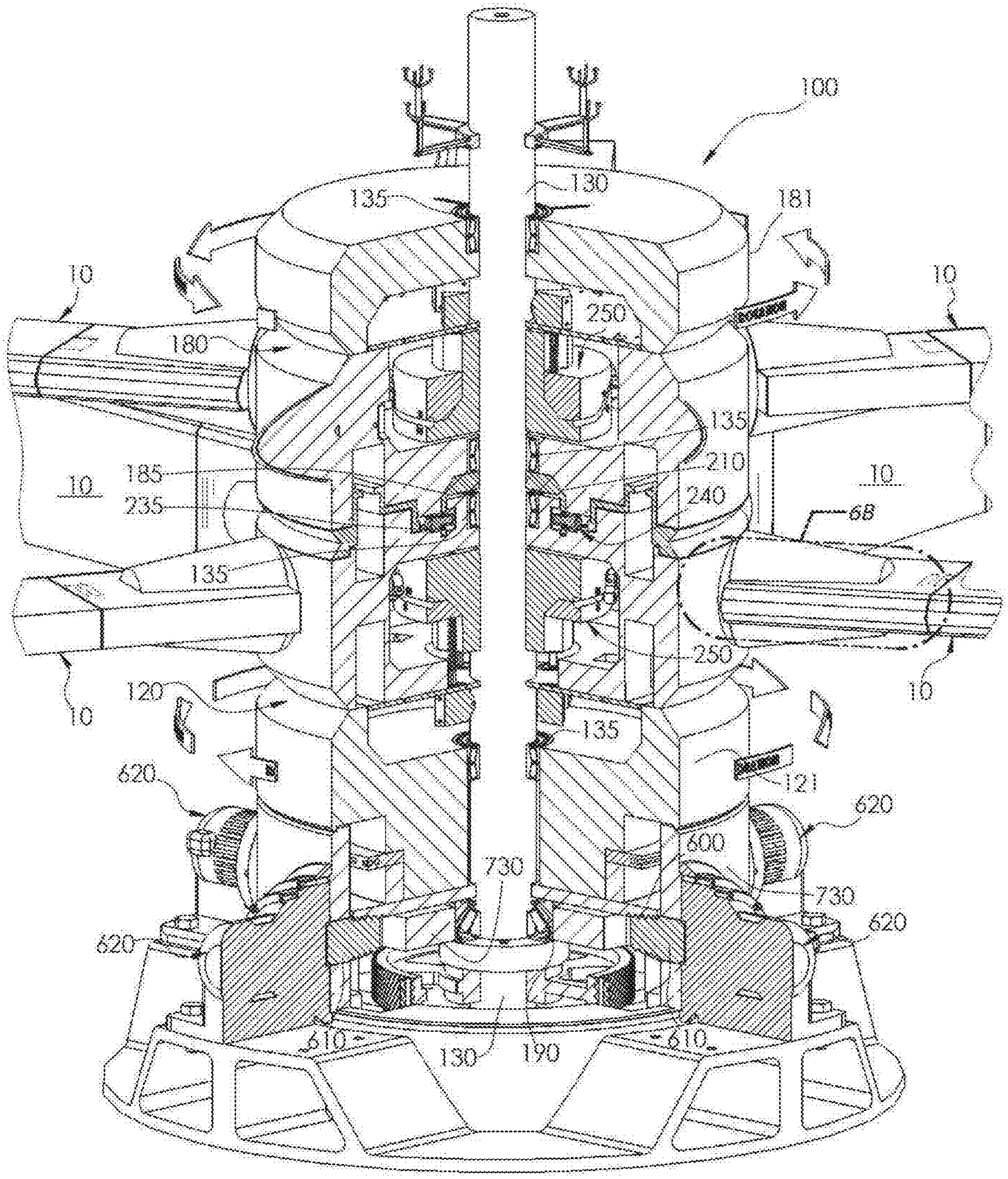
FIG. 6A is an isometric view of a vertical axis embodiment of the KFECS with (i) a ¼ section removed to reveal the hub components and features used to transfer mechanical power to one or more clutch/gearbox/electrical generator/pump assemblies or adjacent hub.
FIG. 6B is a cross-sectional magnified view of a hub extension (Detail 6B depicted on FIG. 6A) revealing an energy conversion plate ("ECP") shaft and its operably supporting bearings.
FIG. 6C is a cross-sectional and partial isometric view of the ECP shaft in its working orientation.
FIG. 6D is a cross-sectional and partial isometric view of the ECP shaft in its slipstream orientation.

Referring to FIG. 6A, the hub 120 and hub 180 and hub carrier 130 design may be scalable to include internal space to accommodate all of the bearings and primary articulation controls and related components necessary for the conversion of kinetic fluid energy to mechanical energy (collectively "Hub and Hub Carrier Components"). The Hub and Hub Carrier Components may include (i) multiple hub carrier bearings 135 between hubs 120 and 180 and hub carrier 130 that permit the respective hub 120 and hub 180 to rotate around the longitudinal axis of the hub carrier 130, (see hub carrier longitudinal axis 131 on FIG. 1A) (ii) thrust bearings 190 for supporting the weight of the respective hub 120 or hub 180 when the hub carrier's 130 longitudinal axis is mounted vertically (the illustrated embodiment includes one thrust bearing 190 however, alternate embodiments may contain several), (iii) one or more ECP shaft bearings 175 supporting shaft 140 (see FIG. 6B) which enable ECP 10 articulation within, and operable coupling to, the respective hub 120 and hub 180, and which may comprise self-aligning bearing systems, such as, for example, bearing systems available from SKF Group, (iv) integral seal-less counter-rotating transmission well recess 235 formed in a top surface of lower hub 120 (see also FIG. 7B) which houses the transmission 240 comprising the ring gears 200 and 230 and the pinions 220, (v) pinion carrier relief 185, (vi) primary articulation control components, of multiple embodiments as described in Section 10, including for example, a cam track assembly 250, (vii) computer-monitored sensors used to monitor hub 120 and hub 180 and clutch/gearbox/brake housing 730 related components. Computer-monitored sensors may include, without limitation, proximity, temperature and fluid level sensors for monitoring and/or detecting, (a) ECP shaft 140 articulation position, (b) ECP shaft 140 angular position about the longitudinal axis of the hub carrier 130, (c) counter-rotating operable coupling 240 fluid level, and (d) status and/or operating condition of the hub 120 and hub 180. Hub status and operating conditions may include but are not limited to (1) bearing conditions, (2) speed of revolutions about the longitudinal axis of the hub carrier 130, (3) KFECS 100 internal temperatures, (4) clearances between perimeter plate 215 and the hub 120 and hub 180, (5) clearances within the transmission 240, (6) transmission 240 rotations per minute, (7) bevel gear 600 and (8) operably coupled clutch/gearbox/electrical generator and/or pump assembly 620. An embodiment of hub 120 includes an attached hub end 121 with recesses that accommodate hub carrier bearings 135, AOS components further described in Section 10, and brake components further described in Section 12.2. An embodiment of hub 180 includes an attached hub extension 181 with recesses that accommodate hub carrier bearings 135 and AOS components further described in Section 10. An embodiment of hub 120 and hub 180 may include components which support operable counter-rotating coupling assemblies, similar to those described in Section 7, on each end of hub 120 and hub 180 thus enabling additional hubs to be added to the KFECS 100 and thereby permitting an expanded range of KFECS 100 aspect ratios to serve a designer's choice.

Figure 6B:
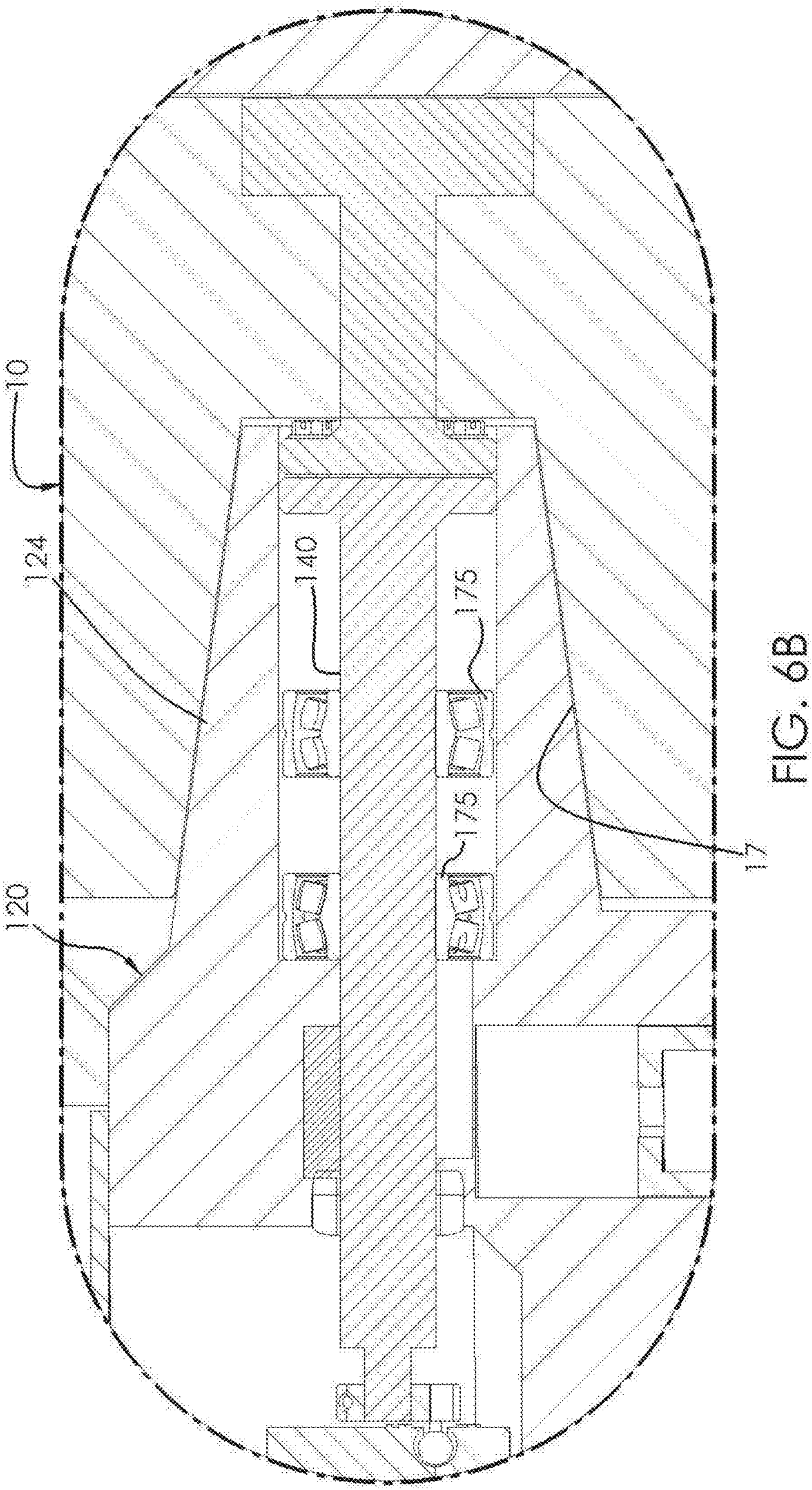

Referring now to FIG. 6B and still referring to FIG. 6A, hub 120 and hub 180 have integral hub extensions 124 that house bearings 175 supporting shaft 140. Hub extension 124 may be received within a conforming recess 17 formed in the end of the ECP 10 or nesting ECP 20 as described in Section 13.3.

Figure 6C:
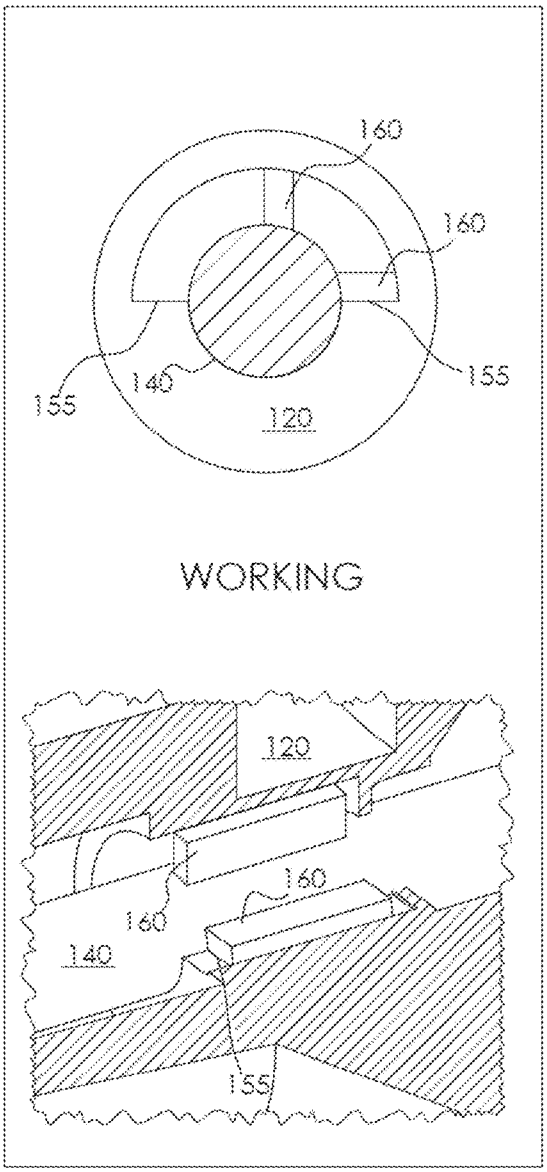
Figure 6D:
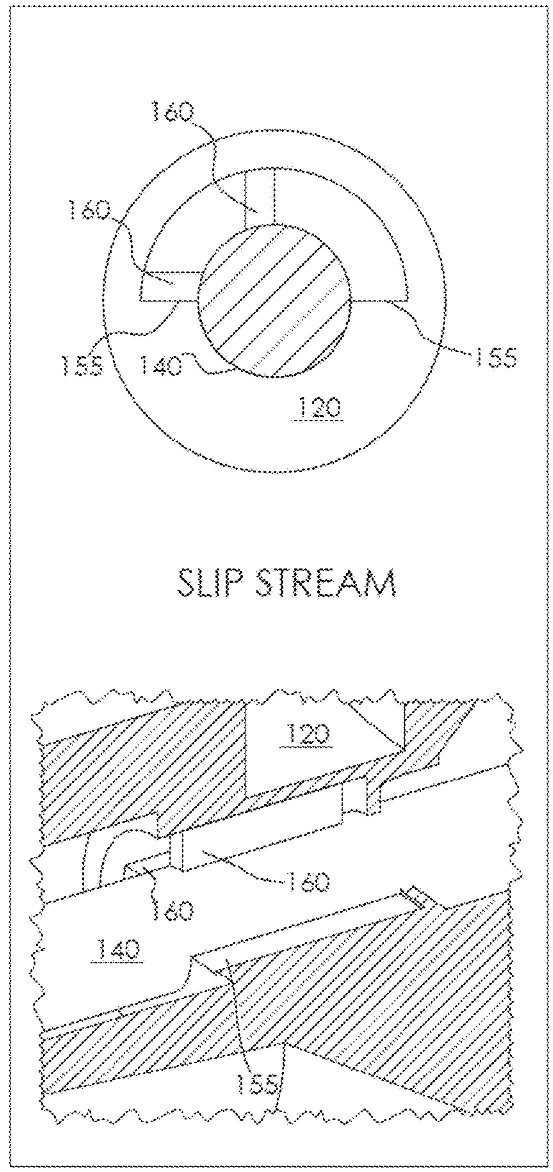

Referring now to FIGS. 6C and 6D, and still referring FIG. 6B, each shaft 140 may include two stops 160 extending radially from the shaft 140 from angularly-spaced positions and which contact corresponding shoulders 155 formed internally to the hub 120 (or hub 180) at the limit of the shaft's 140 articulation from its working rotational position to its slipstream rotational position. Shoulders 155 and stops 160 also act as a failsafe method of preventing the shaft 140 from rotating past its designed maximum limits of rotation about the longitudinal axis of the shaft 140.

7. Counter-Rotating Transmission—FIGS. 7A, 7B

Figure 7A:
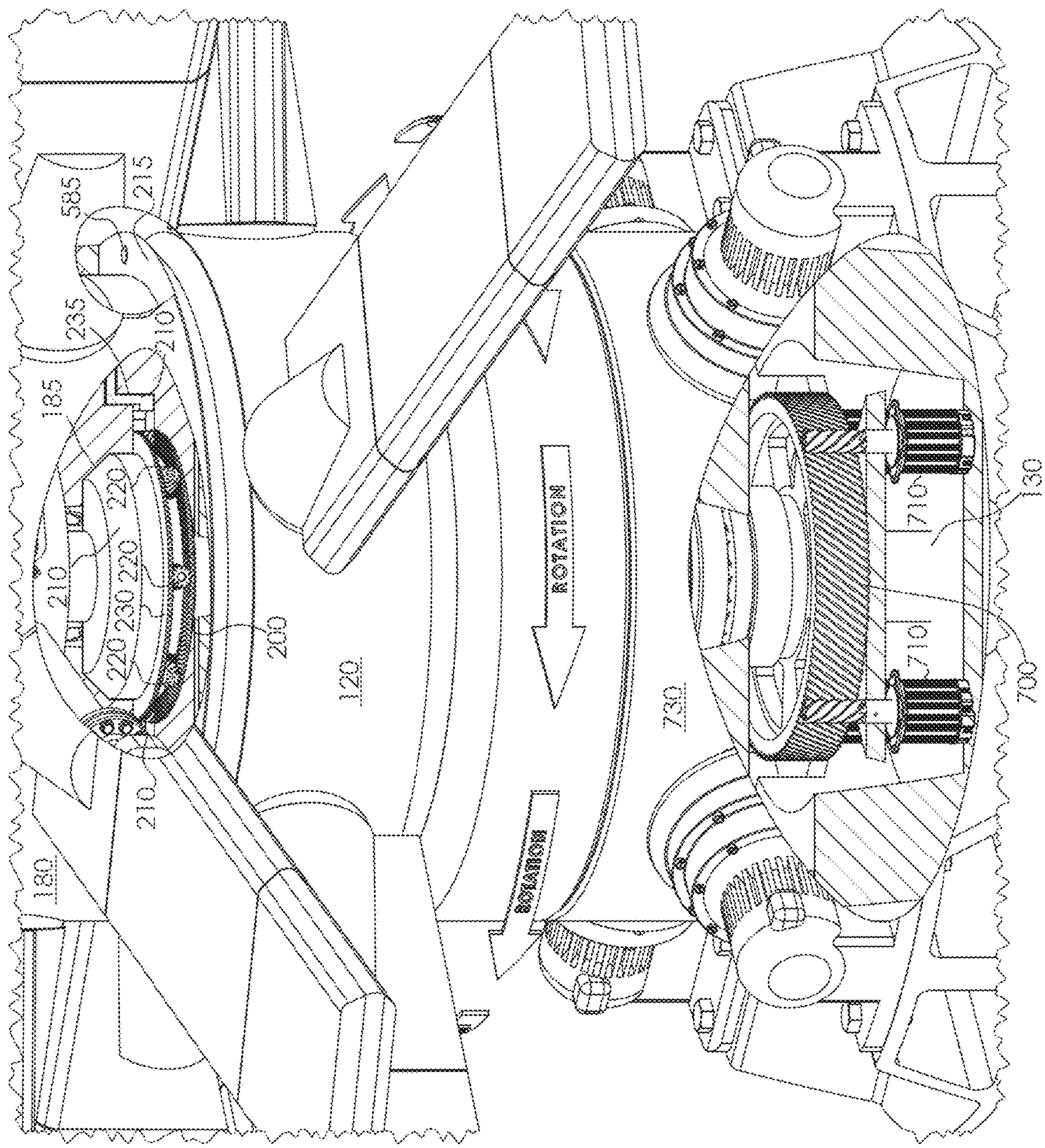
FIG. 7A is a partial isometric view of two counter-rotating hub assemblies with (i) a broken-out section revealing a counter-rotating transmission and a portion of a perimeter plate that is fixedly linked to the hub carrier, and (ii) a second broken-out section revealing an isometric view of components within a hub orientation motor housing used to orient the KFECS toward the fluid flow or any other direction.
Figure 7B:
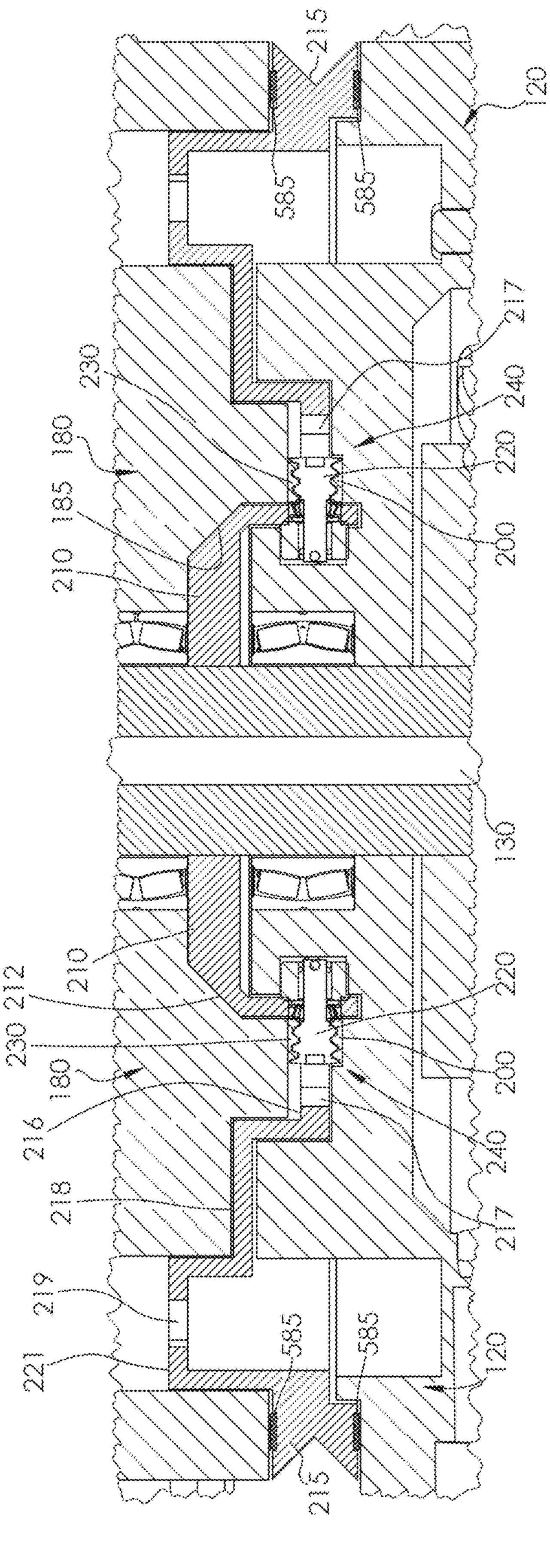
FIG. 7B is a cross-sectional view of the hub carrier, counter rotating transmission's pinion carrier, perimeter plate, and hub to perimeter plate proximity sensors.
Figure 7:
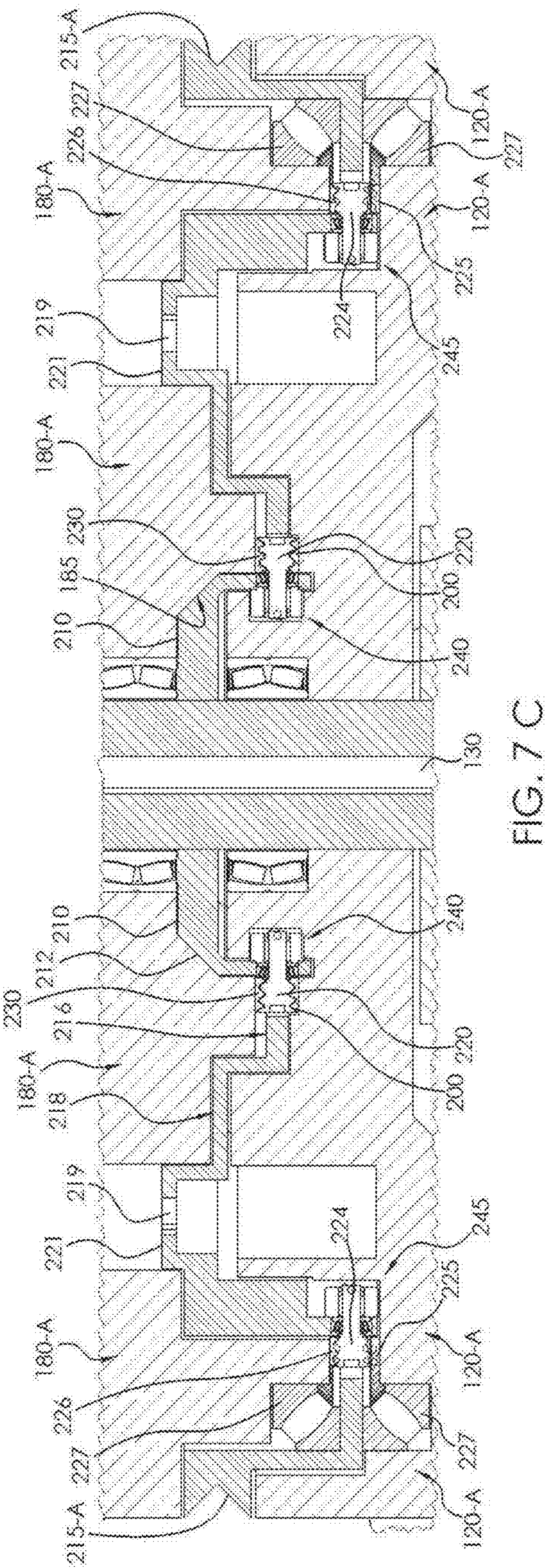
FIG. 7C is a cross-sectional view of the hub carrier, and an alternate embodiment of the perimeter plate which embodies up to two counter-rotating transmissions and optional perimeter thrust bearings.

Referring to FIGS. 7A, 7B and still referring to FIGS. 1A and 3A, hub 180 contains similar components found in hub 120 but rotates in the opposite direction due to the transmission 240, i.e., the ring gears 200 and 230 and the pinions 220. The pinions 220 are rotatably mounted to the pinion carrier 210, which is fixed to the hub carrier 130 such that the pinions 220 act as an extension of the hub carrier 130 and move with it when it is rotated about its longitudinal axis by the hub orientation control system. Ring gear 230 is attached or otherwise coupled to hub 180. Consequently, because the center of the axis of each pinion 220 is effectively linked to an angular position of the hub carrier 130, rotational movement of either hub 120 and 180 about the longitudinal axis of the hub carrier 130 results in its respective ring gear 200 and ring gear 230 rotating about the longitudinal axis of the hub carrier 130. Rotational movement of either ring gear 200 or ring gear 230 will cause the opposing ring gear to rotate in the opposite direction. Movement of either ring gear 200 or ring gear 230 will cause the operably coupled pinions 220 to rotate about their respective axes thereby causing an opposite rotation of the adjacent ring gear and operably coupled hub. Consequently, mechanical energy is transferred between hub 180 and ring gear 230, through the pinions 220, into ring gear 200 and hub 120.

The hub 180 has a conical pinion carrier relief 185 formed therein that accepts the pinion carrier 210 with sufficient clearance to rotate around the pinion carrier 210 without contacting it. The transmission well recess 235 housing the transmission 240 may be filled with a lubricating fluid, thereby permitting the transfer of mechanical energy between two counter-rotating hubs without the need for any fluid seals for rotating components or components located below the fluid level when the longitudinal axis of the hub carrier 130 is oriented vertically, and consequently, all ECP 10 control shafts 140 can be articulated without the need for lubricant seals related to the ring gear and pinion assembly.

Proximity sensors 585 located on a perimeter plate 215 of the pinion carrier 210 can be used to determine KFECS 100 operations, including without limitation, the distance between hubs and potential wear of hub carrier bearings 135. Exemplary proximity sensors 585 include digital inductive, 2-wire amplified, digital CMOS laser, photo-electric, pattern matching and optical. Hub carrier bearing 135 wear can be detected when one or more proximity sensors 585 detect a distance between the perimeter plate 215 and its adjacent hub 120 or hub 180 that is out of a pre-determined tolerance.

8. Independent Energy Conversion Plate Articulation—Working Mode—FIG. 8A

Referring now to FIG. 8A and still referring to FIG. 1A, the follower assembly 254, which is operably connected to the shaft 140 of each ECP 10, or nesting ECP 20 described in Section 13.3, is rotated about the shaft axis 140, e.g., by 90 degrees, by the spline portions 261, 262 of the continuous track 255 of the cam track assembly 250 as the respective follower head 253 travels through the splines. Beginning at a given angular position about the longitudinal axis of the hub carrier 130 relative to the oncoming fluid flow, in one embodiment, where the 0° position is located nearest the oncoming fluid and the hub 120 is rotating clockwise about the longitudinal axis of the hub carrier 130, the ECP 10 angle of incidence, relative to the oncoming fluid flow, begins as parallel to the oncoming fluid flow (slipstream orientation, or 0° angle of attack) while at the 355° position. As the follower head 253 travels through the splines, the follower assembly 254 rotates the associated ECP 10 from its slipstream orientation to its full articulation orientation of 90° perpendicular to the fluid flow (90° angle of attack). In this embodiment, the entire 90° articulation is completed by the 5° angular position. The articulation control independently articulates each ECP 10 such that its articulation is wholly independent of, unrelated to, and unconstrained by, any aspect of any other ECP 10. The articulation of each ECP 10 may be controlled by any of the embodiments described in Section 9.

8.1. ECP Articulation Offsets

Referring now to FIG. 8A, FIG. 2B, FIG. 9A-FIG. 9B and still referring to FIG. 1A, the articulations of the ECPs 10 of the counter-rotating hubs 120 and 180 are synchronized whereby the ECPs of the two hubs cannot collide with each other. The synchronizations are accomplished and controlled by the cam track assembly 250, or other articulation control embodiment, within each hub 120 or hub 180. This is demonstrated in FIGS. 8E-G and 8H-J where, for illustrative purposes, an ECP 10 on the lower hub has been renumbered as ECP 8 and shown as transparent, and ECP 10 on the upper hub has been renumbered as ECP 9 and shown as transparent to avoid obscuring the detail of the cam track assembly behind it.

As shown in FIG. 8E, ECP 8 of a lower hub, disposed in a horizontal, slipstream orientation, moves clockwise with its follower control assembly 254 guided in the lower track 270, and ECP 9 of an upper hub disposed in a horizontal, slipstream orientation moves counterclockwise toward the ECP 8 with its follower control assembly 254 guided in the upper track 260. Each ECP 8 and 9 has rotated about the respective cam track assembly 250 to the same angular position (0° in FIG. 8E) as the respective follower assembly begins to traverse the spline sections 261 of the upper and lower track assemblies. As shown in FIG. 8F, as the follower assemblies of the ECPs 8 and 9 traverse the spline sections 261 of the respective upper and lower cam track assemblies 250, the ECPs 8 and 9 synchronously articulate clockwise about their respective axes of rotation at angular positions that are offset with respect to each other. That is, as an example, the follower assembly of ECP 8 traverses spline section 261 from lower track section 270 to upper track section 260 between 0° and 5° angular position with respect to the lower cam track assembly 250. Conversely, the follower assembly of ECP 9 traverses spline section 261 from upper track section 260 to lower track section 270 between 0° and 355° angular position with respect to the upper cam track assembly 250. Accordingly, each ECP 8 and 9 has moved “past” the other in its rotation about the respective track assembly 250 while being articulated about its axis of rotation through the spline section 261. As shown in FIG. 8G, by the time the ECPs 8 and 9 reach their vertical, working orientations, lower ECP 8 is at 5° angular position with respect to the lower cam track assembly 250 and moving clockwise away from ECP 9, and upper ECP 9 is at 355° angular position with respect to the upper cam track assembly 250 and moving counterclockwise away from the lower ECP 8. Thus, the ECPs 8 and 9 do not contact each other during the articulation from the horizontal, slipstream orientation to the vertical, working orientation.

As shown in FIG. 8H, ECP 8 of the lower hub, disposed in the vertical, working orientation, is moving clockwise toward ECP 9 with its follower control assembly 254 guided in the upper track 260, and ECP 9 of the upper hub disposed in the vertical, working orientation is moving counterclockwise toward the ECP 8 with its follower control assembly 254 guided in the lower track section 270. Lower ECP 8 has rotated clockwise about the lower cam track assembly 250 to a position short of a full half rotation of 180° (e.g., 150°) as the ECP 8 enters the spline section 262 connecting upper track section 260 with lower track section 270. Upper ECP 9 has rotated counterclockwise about the upper cam track assembly 250 to a position short of a full half rotation of 180° (e.g., 210°) as the ECP 9 enters the spline section 262 connecting lower track section 270 with upper track section 260. As shown in FIG. 8I, as the follower assemblies of the ECPs 8 and 9 traverse the spline sections 262 of the respective upper and lower cam track assemblies 250, the ECPs 8 and 9 synchronously articulate counterclockwise about their respective axes of rotation at angular positions that are offset with respect to each other. That is, as an example, the follower assembly of ECP 8 traverses spline section 262 from upper track section 260 to lower track section 270 between 150° and 170° angular position with respect to the lower cam track assembly 250. Conversely, the follower assembly of ECP 9 traverses spline section 262 from lower track section 270 to upper track section 260 between 210° and 190° angular position with respect to the upper cam track assembly 250. Accordingly, each ECP 8 and 9 has not yet “met” the other in its rotation about the respective cam track assembly 250 while being articulated about its axis of rotation through the spline section 262. As shown in FIG. 8J, by the time the ECPs 8 and 9 reach their horizontal, slipstream orientations, lower ECP 8 and upper ECP 9 are at the same angular position (180°). Thus, the ECPs 8 and 9 do not contact each other during the articulation from the vertical, working orientation to the horizontal, slipstream orientation.

Referring now to FIG. 1A, FIG. 8C, FIG. 8D and FIG. 9A and FIG. 9B, the offsets of where the upper and lower ECP 10 or ECP 20 (see Section 13.3) articulations begin and end, relative to its adjacent ECP 10 on hub 120 and hub 180, are within a designer’s choice for satisfying performance and installation requirements. The change in offset is accomplished, with respect to a cam track assembly 250, by altering where each such assembly is attached to the hub carrier 130 relative to the cam track assembly 250 in the adjacent hub 120 or hub 180. The change in offset is accomplished in embodiments using the magnetic array articulation or motorized articulation, described in Sections 9.3 and Section 9.6 respectively, by the computer. Increasing an articulation offset permits using ECPs 20 with aspect ratios that allow increased nesting capabilities as described in Section 13.3 and permits using ECPs 10 and ECPs 20 with differing materials properties. For example, stiffer materials require less offset because the respective ECP 10 or nesting ECP 20 will have less flex while in its working orientation and consequently can have a reduced offset, thereby converting more energy without colliding with the adjacent counter-rotating ECP 10 or nesting ECP 20 due to flexing.

The angle of the spline and angular extent over which it is applied are design parameters which can be set. For example, in the illustrated embodiment, on the back side (i.e., down flow side) of the hub 120 or 180 at which the ECPs 10 are substantially blocked from the fluid flow, the spline 262 of the cam track assembly 250 may be set at a relatively shallow angle, as there is no particular benefit to a rapid articulation of the ECP 10 and so as to minimize twisting moment applied to the follower assembly 254 and the ECP shaft 140. On the other hand, on the front side (i.e., inflow side) of the hub 120 or 180 at which the ECPs 10 are exposed to maximum fluid flow, spline angle 261 may be set at a steeper angle to effect a rapid articulation of the ECP into its power generating orientation.

ECPs 10 could likewise be transitioned to their working position prior to 0°, and in fact, it has been determined mathematically that ECPs 10 produce more overall power through an entire 360° rotation if the articulation from slipstream mode to working mode begins at approximately 355° and has completed its transition to working mode by 5°. In this example, although the ECP 10 starts to encounter drag from 355° due to its working surface starting to transition while moving against the flow from 355°-0° (half of its transition), the inventor has determined that the positive power from 0°-5° more than offsets the negative power from 355°-0°.

As each ECP rotates about its respective hub, its shaft 140 remains at a substantially fixed axial position with respect to the hub axis of rotation centered between the upper track section 260 and the lower track section 270. While the follower head 253 of the follower assembly 254 of each ECP is traversing the upper track section 260 or the lower track section 270, the radial distance between the hub axis of rotation and the position on the connecting rod 145 at which the shaft 256 is inserted or otherwise attached or coupled to the connecting rod 145 remains unchanged. Due to the offset of the follower ahead 253 with respect to the axis of rotation of shaft 140, however, as the follower head 253 traverses the transition section 261 or transition section 262 while shaft 140 remains centered between the upper track section 260 and the lower track section 270, the radial distance between the hub axis of rotation and the connecting rod 145 will change. In one example, the radial distance will increase until it reaches the midpoint of the transition section of the upper and lower track, and then it moves back in toward the hub axis as it nears the end of the transition section. To accommodate that radial variation, the shaft 256 and follower head 253 may be configured to be movable in an axial direction (relative to shaft 256) with respect to the connecting rod 145, thereby varying the distance between the follower head 253 and the connecting rod 145, while the radial distance between the track 255 and the hub axis of rotation remains constant through the transition areas 261, 262. Alternatively, to accommodate that radial variation, the shaft 256 and follower head 253 may be fixed with respect to the connecting rod 145, while the radial distance between the continuous track 255 and the hub axis of rotation varies through the transition areas 261, 262.

Other articulation control systems described in this disclosure may also include comparable provisions for accommodating variation in the radial positioning of a follower assembly with respect to the hub axis of rotation as the follower assembly traverses a transition section of a follower orientation control feature. These provisions may include alternate embodiments of connecting rod 145, similar to connecting rod 146 (see FIGS. 12E and 15I) that include bearings within an alternate embodiment of connecting rod 145.

It should be appreciated that the articulation offsets and related synchronization described herein functions the same irrespective of if a KFECS 100 embodiment of nesting ECPs 20 as described in Section 13.3 are used in lieu of sets of ECP 10.

9. Primary Articulation Control—Multiple Embodiments

Still referring to FIG. 1A, ECP 10 articulation control may be accomplished by numerous methodologies. In each of the following articulation control embodiments that use a follower assembly 254 (see FIGS. 8A and 8B) the torsion moment that such articulation control can support can be increased by increasing the length of the follower assembly 254 or the follower assembly's 254 functional equivalent.

It should be appreciated that primary articulation control embodiments described herein functions the same irrespective of if a KFECS 100 embodiment of nesting ECPs 20 as described in Section 13.3 are used in lieu of sets of ECP 10.

Figure 9:
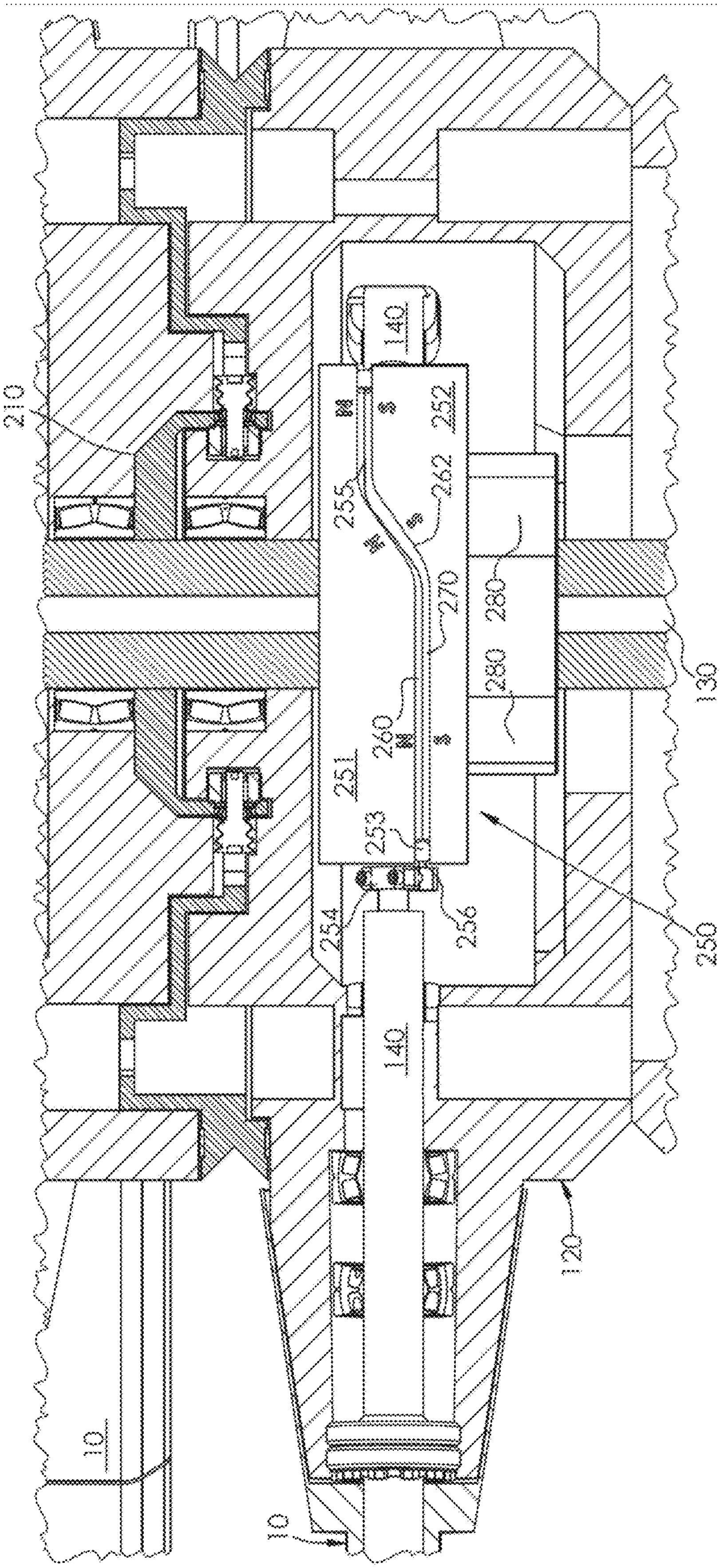
FIG. 9A is a front cross-sectional view of the cam track assembly located within a hub with a follower assembly within the track and an ECP shaft to which the follower assembly is attached, wherein the cam track is magnetic.
FIG. 9B is a cross-sectional, magnified view of a portion of the magnetic cam track assembly of FIG. 9A with a front view of a magnetic follower head levitating within the magnetic track, the follower linkage, and the ECP shaft.
Figure 9:
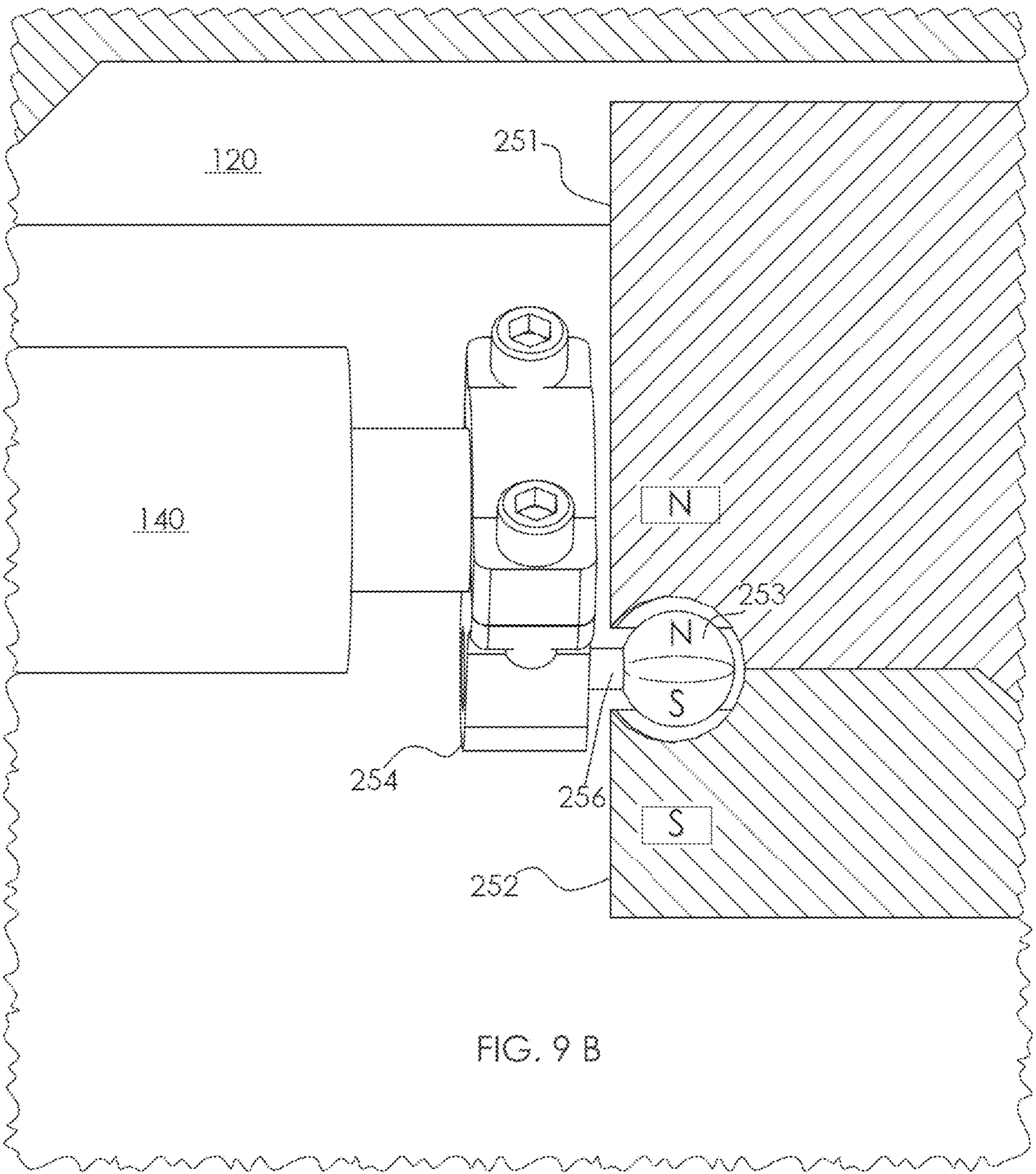

9.1 Interior Magnetic Cam Track Assembly—FIGS. 9A and 9B

Referring now to FIGS. 9A and 9B, and still referring to FIG. 1A, and as described above, one embodiment of ECP 10 articulation control is achieved via a magnetic spherical split cam track assembly 250 comprised of a stationary magnetic track section 251, and moveable magnetic track section 252, each with opposite magnetic poles nearest its respective spherical track half, with a spherical magnetic follower head 253 within the track 255, for each operably coupled shaft 140. The spherical magnetic follower head 253 is arranged such that its magnetic poles are repelled by the magnetism of each track section 251 and 252. This arrangement of magnetic components results in the spherical magnetic follower head 253 levitating within the magnetic spherical cam track assembly 250 thereby creating a magnetic bearing.

The spherical magnetic follower head 253 is operably coupled to, e.g., mounted on a shaft 256, which may be a sacrificial shaft as described below, of the follower assembly 254, which is operably linked to a shaft 140 of an ECP 10. The geometry of the continuous track 255 controls the position of each ECP 10 relative to the fluid flow throughout the ECP's 10 entire 360° rotation about the longitudinal axis of the hub carrier 130.

Referring now to FIG. 8A and FIG. 8C, and still referring to FIG. 9A, FIG. 9B, and FIG. 1A, the geometry of the track 255 may be configured to control the start, end, and duration of each ECP 10 articulation, with the minimum duration between the start and end point of each such articulation limited only by the diameter of the spherical magnetic follower head 253 relative to the angle of the steepest splines 261 and 262 through which the spherical magnetic follower head 253 travels. The radius of the follower cannot be larger than the radius of the spline. To exaggerate, and illustrate, the concept, if the radius of the entire cam track assembly is 1 foot, and the radius of the follower was 1 inch, the radius of the spline would be less than the path of travel required by the 1-inch follower. Consequently, the follower would collide with the track. This can be further described as $$C=S/(\cos((90\text{-Theta})/2)),$$

where

C is the circumference of the magnetic spherical cam track assembly 250,

S is the diameter of the spherical magnetic follower head 253, and

Theta is the angle of the spline 261 and 262.

In this embodiment, as the spherical magnetic follower head 253 travels through the track 255 around the magnetic cam track assembly 250, (i) while traveling through the upper track 260 it causes the operably coupled ECP 10 to remain in an orientation perpendicular to the fluid flow (working position), (II) while traveling through a spline it causes the operably coupled ECP 10 to articulate 90°, and (iii) while traveling through the lower track section 270 it causes the related ECP 10 to remain in an orientation parallel to the fluid flow (slipstream).

It should be appreciated the magnetic levitation method described herein will function regardless of which track section has a particular pole, North or South, nearest the track 255, provided the spherical magnetic follower head 253 is assembled within the magnetic cam track assembly 250 with its poles facing like poles of the magnetic cam track assembly 250, and each track section 251 and 252 has an opposing magnetic pole nearest the its respective track 255 half.

It should be further appreciated that the greater the circumference of the magnetic cam track assembly 250, and follower head 253 and/or the greater length of the connecting rod 145 embodied, or alternate embodiments of these components, including without limitation as described in Sections 9.2 and 9.4, the greater the twisting moment the respective follower head can support.

It should be further appreciated that the words "upper" and "lower" are used herein and throughout Section 9 to orient the reader to the related drawings contained herein but do not limit the relative positions in which the hub carrier 130 and magnetic cam track assembly 250 are configured within the KFECS 100 or relative to the ground, or bottom of body of liquid, as the case may be.

Figure 10:
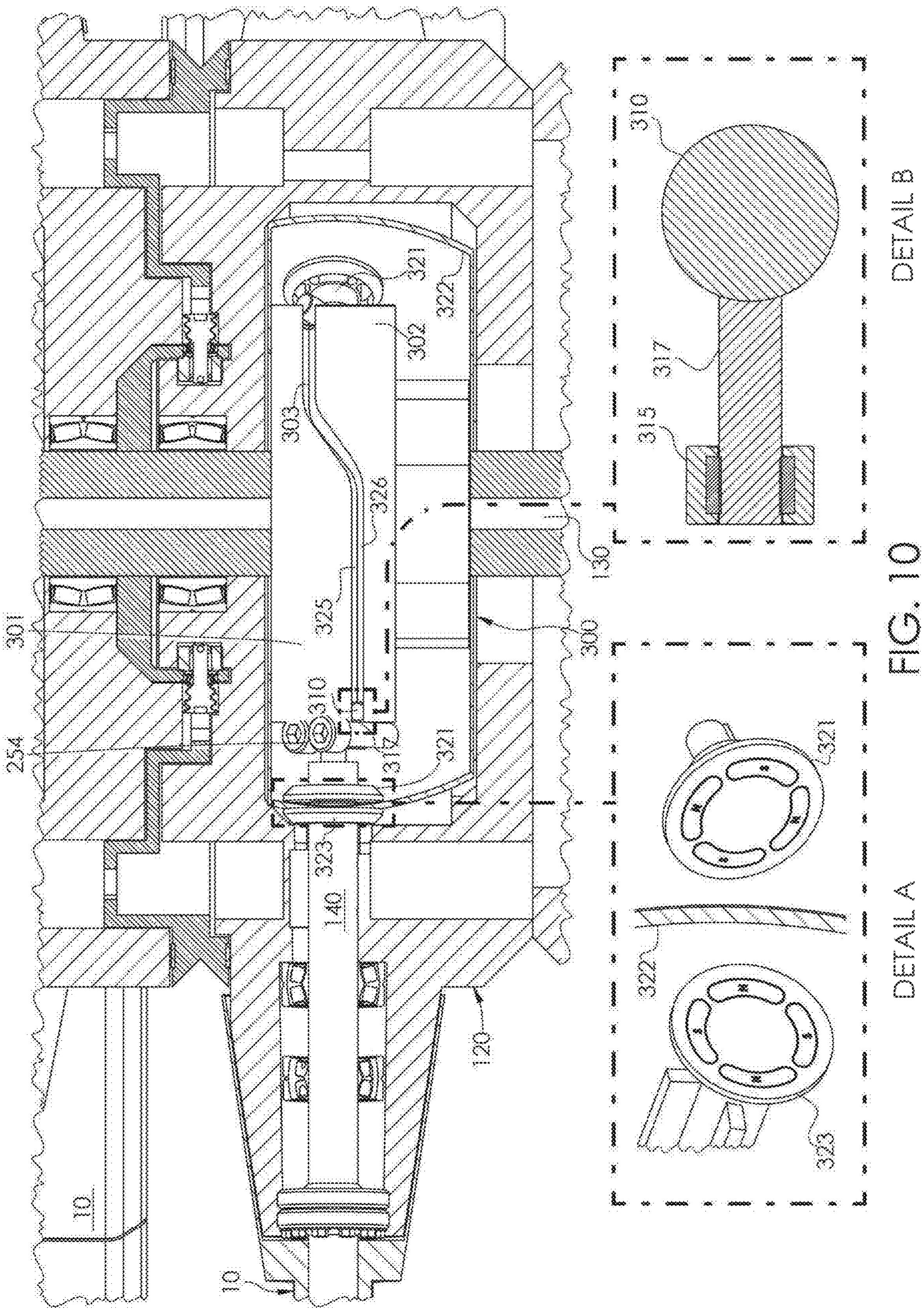
FIG. 10 is front view of a cam track assembly disposed within a lubricant filled membrane with a portion of the membrane removed to reveal components within the membrane, and a isometric view (Detail A) of a magnetic coupling and an magnified cross-sectional detail view (Detail B) of the follower assembly.
Figures 11A, 11B, 11C, 11D:
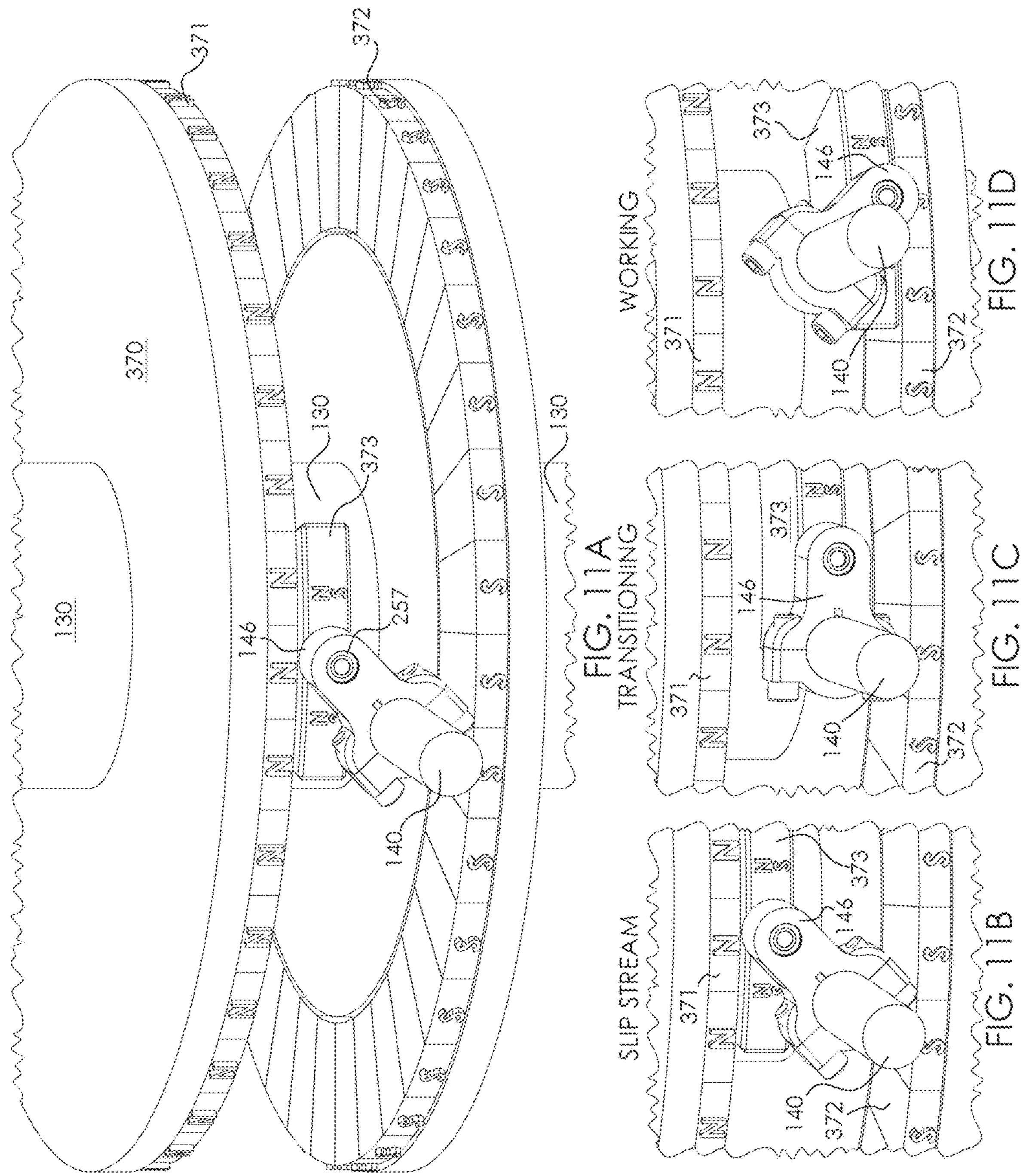
FIG. 11A is an isometric view an embodiment of independent energy conversion plate articulation via a computer-controlled electromagnetic array assembly.
FIG. 11B is partial isometric view of the electromagnetic assembly controlling the ECP's working mode.
FIG. 11C is partial isometric view of the electromagnetic assembly controlling the ECP's transition from working mode to slipstream mode.
FIG. 11D is partial isometric view of the electromagnetic assembly controlling the ECP's slipstream mode.

9.2 Interior Lubricant-Filled Cam Track Assembly—FIG. 10

Referring now to FIG. 10 and still referring to FIG. 1A, another embodiment of ECP 10 articulation control is achieved via an internal liquid-lubricant filled cam track assembly 300 comprised of an stationary section 301 and moveable section 302. In this embodiment, the track assembly 300 is split along the centerline of a track 303 having an upper track 325 and a lower track 326. The liquid-lubricant filled cam track assembly 300 includes membrane 322 that defines an interior chamber suitable for containing liquid lubricant.

A spherical bearing travels in a circular track 303 and is operably linked to a shaft 317 rotationally supported in a bearing 315. The bearing 315 is operably coupled to an inner magnetic coupling 321 which glides over an interior surface of the membrane 322, but does not contact it, during normal operations. An outer magnetic coupling 323 glides over the exterior of the membrane 322, but does not contact it during normal operations, and is operably coupled to its associated inner magnetic coupling 321 via magnetic attraction of sufficient magnetic force, through the membrane 322 to permit the transfer of torque necessary to articulate the associated ECP 10. It should be appreciated that this arrangement permits the transfer of torque through the magnetic field in a seal-less configuration. It should also be appreciated that the perimeter plate 215 may comprise computer monitored sensors, as further described in Sections 9.5 and 11, that would detect a leak in the membrane 322 thereby resulting in one or more computer-controlled operations, including without limitation, triggering the AOS. The outer magnetic coupling 323 is operably linked via a shaft 317, which may be a sacrificial shaft as described below, to a shaft 140 of the associated an ECP 10.

Track 303 has a circular transverse cross-section to receive the spherical bearing 310. The geometry of the track 303 controls the position of each ECP 10 relative to the fluid flow throughout its entire 360° rotation about the longitudinal axis of the hub carrier 130. The track 303 geometry may be configured to control the start and end of each articulation, with the start, end and duration of each articulation limited only by the diameter of the spherical bearing 310 relative to the steepest angle of the splines 261 and 262 (see FIGS. 2B and 2D) through which the spherical bearing 310 travels. This can be further described as:

$$C=S/(\cos((90\text{-Theta})/2)),$$

where

C is the circumference of the internal liquid-lubricant filled cam track assembly 300, S is the diameter of the spherical bearing 310, and Theta is the angle of the spline 261 and 262.

In this embodiment, as the bearing 310 moves through the track 303 around the cam track assembly 300, (i) while traveling through the upper track 325 it causes the operably coupled energy conversion plate 10 to be articulated perpendicular to the fluid flow, and (ii) while traveling through the lower track section 326 causes the associated energy conversion plate 10 to rotate to an orientation parallel to the fluid flow.

9.3 Magnetic Array Assembly—FIGS. 11A-11D

Figure 8:
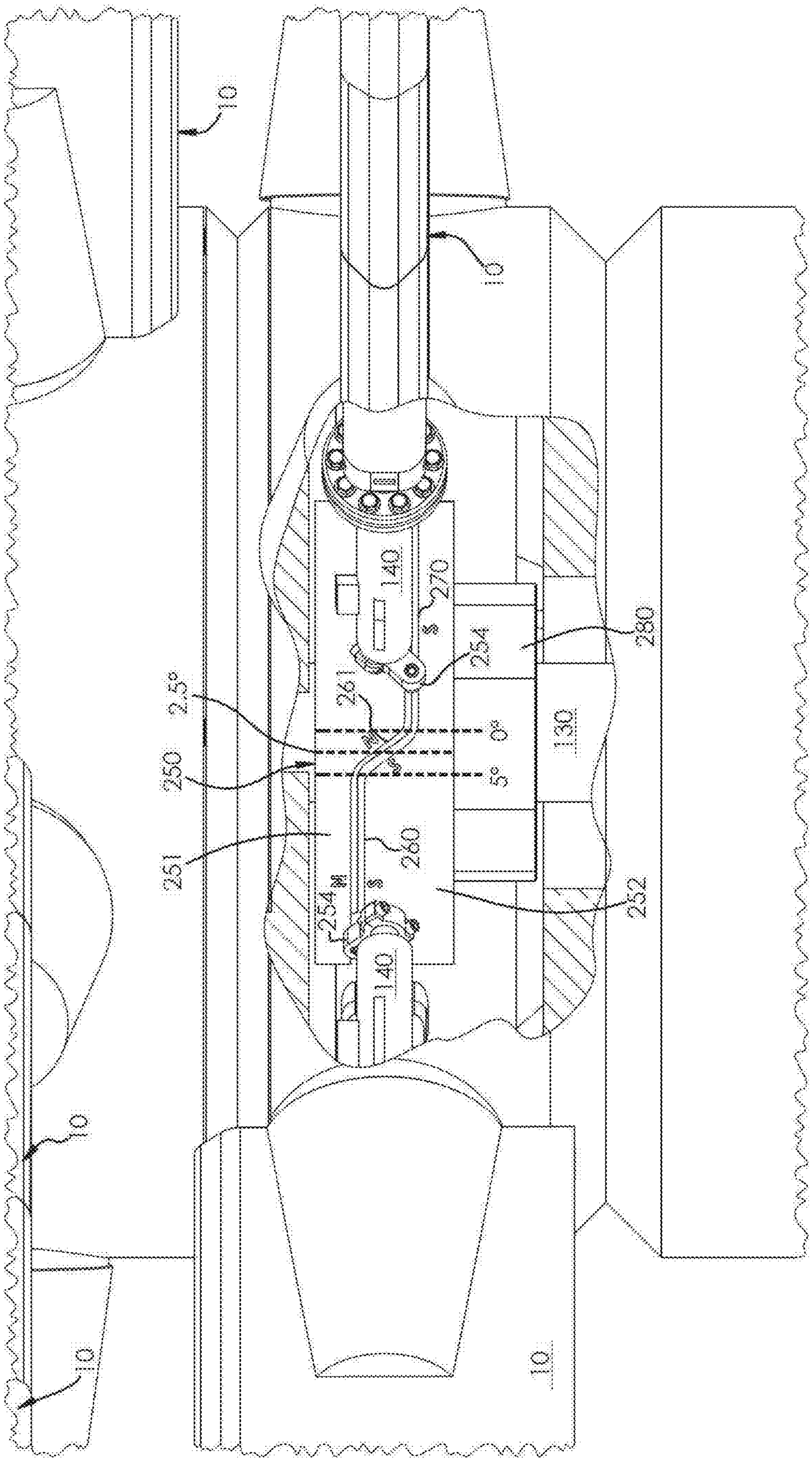
FIG. 8A is a partial front view of two counter-rotating hub assemblies with a broken-out section of a hub, revolving in a clockwise rotation about the longitudinal axis of the hub carrier, and revealing the front of the cam track assembly. Angular positions are shown where the ECP articulation control for a clockwise-rotating hub begins its transition from a slipstream orientation, at the 0° position, and completes its articulation to its perpendicular to the fluid flow orientation at the 5° position.
FIG. 8B is an isometric view of a follower assembly comprised of a connecting rod, connecting rod bearings, sacrificial shaft and spherical magnet.
FIG. 8C is a front view (i.e., facing the oncoming fluid flow) of the hub carrier with two cam track assemblies that show the respective angular offsets of each cam track assembly relative to the other track assembly.
FIG. 8D is a rear view (i.e., facing away from the oncoming fluid flow) of the hub carrier with two cam track assemblies that show the respective angular offsets of each cam track assembly relative to the other cam track assembly.
FIG. 8E-8G are front views (i.e., facing the oncoming fluid flow) which illustrate the progressive articulations of the ECPs of a counter rotating pair of hubs as the ECPs articulate from their slipstream orientations to their working orientations.
FIG. 8H-8J are rear views (i.e., facing away from the oncoming fluid flow) which illustrate the progressive articulations of an ECPs of a counter rotating pair of hubs as the ECPs articulate from their working orientations to their slipstream orientations.
Figure 8:
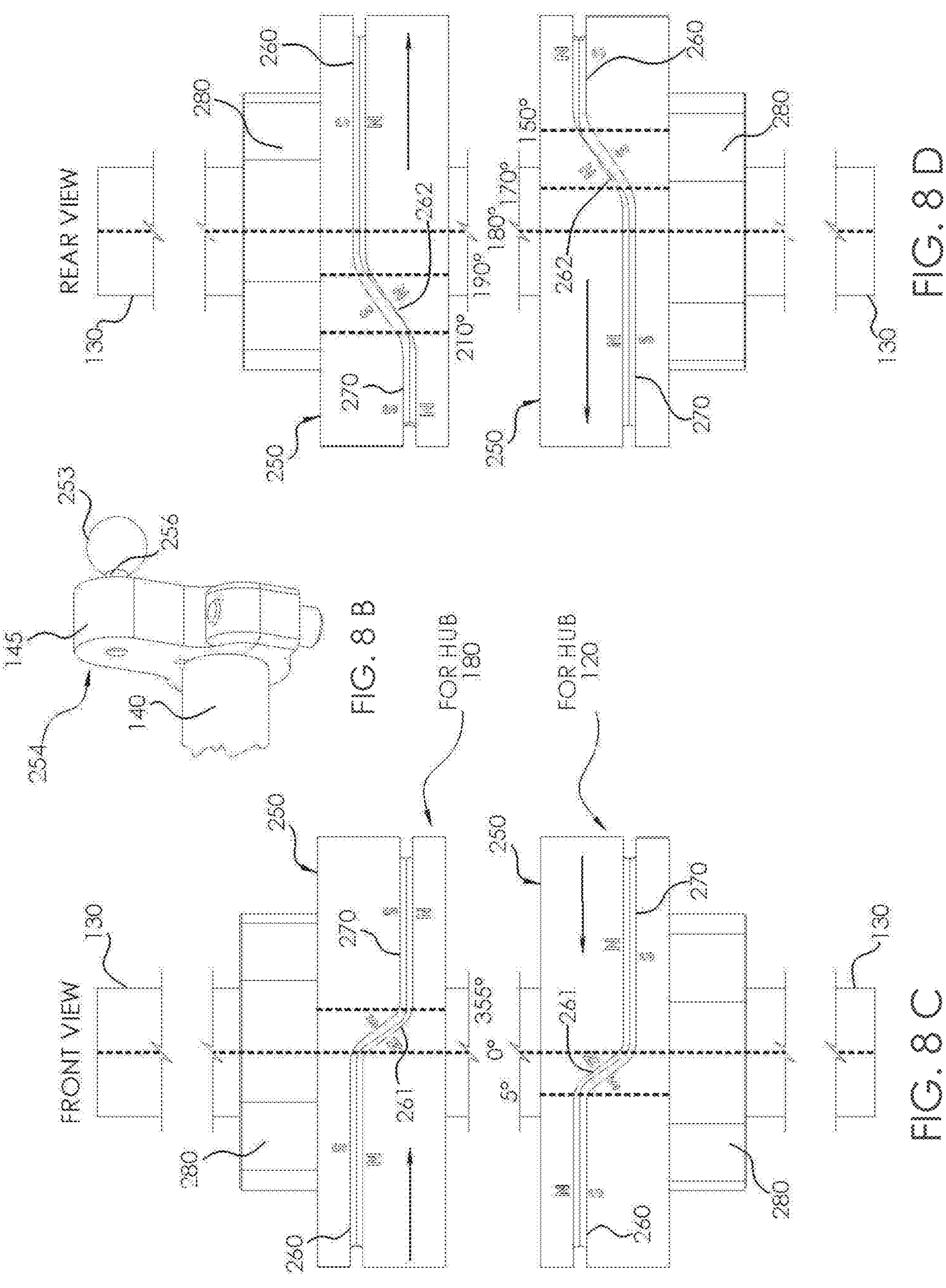
Figure 8:
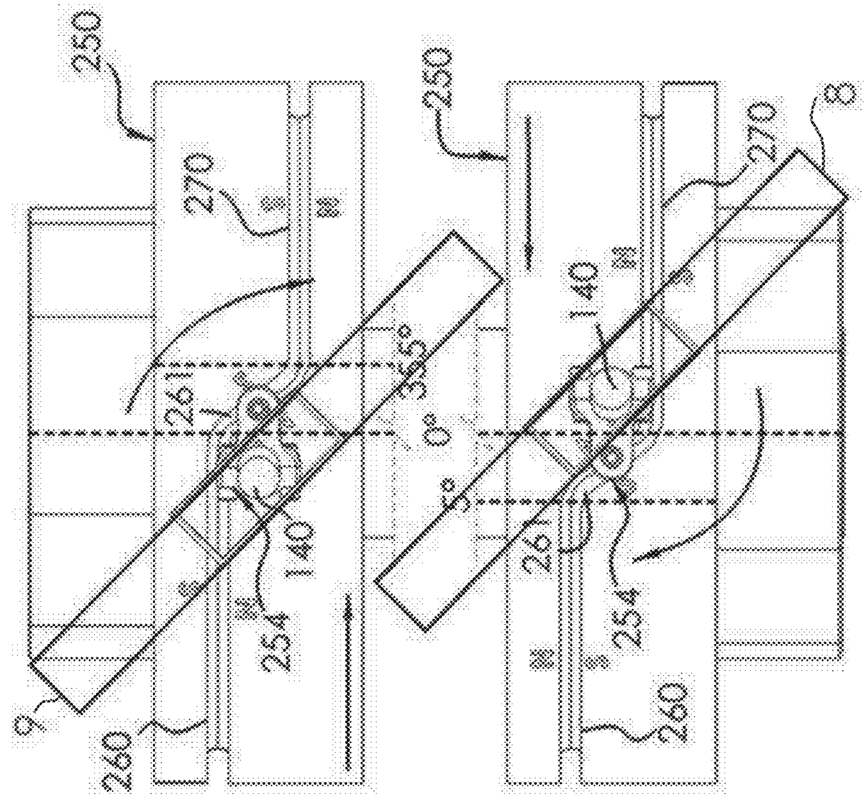
Figure 8:
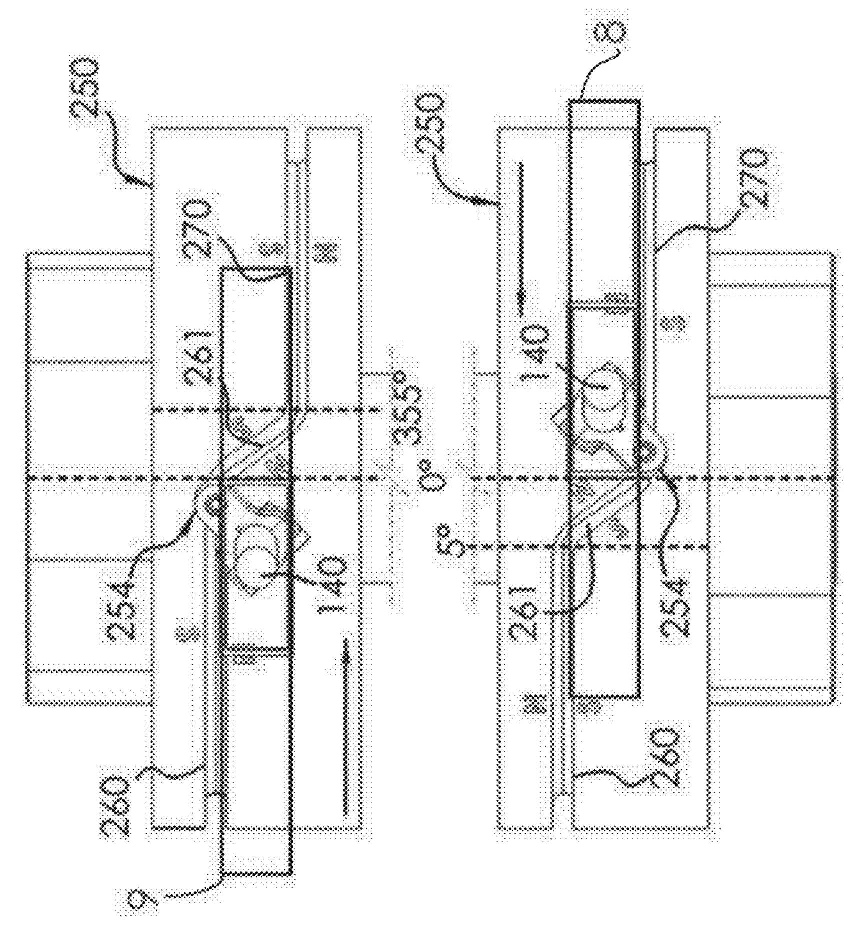
Figure 8:
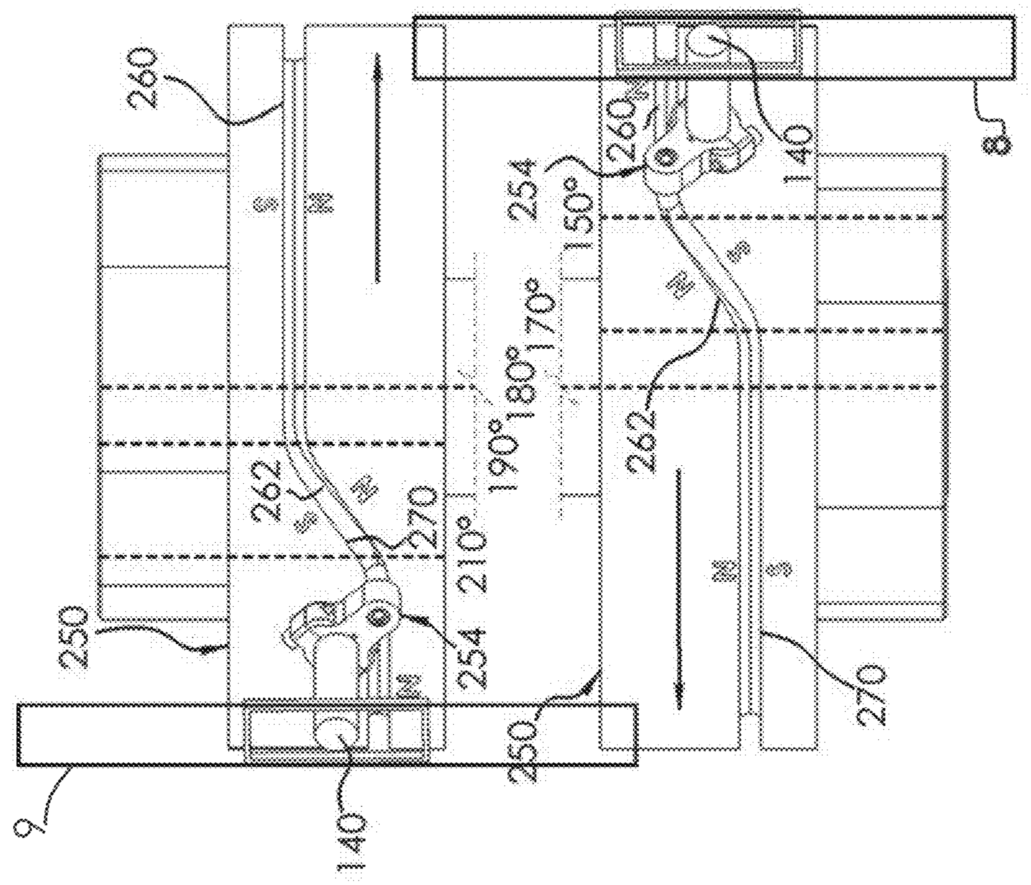
Figure 8:
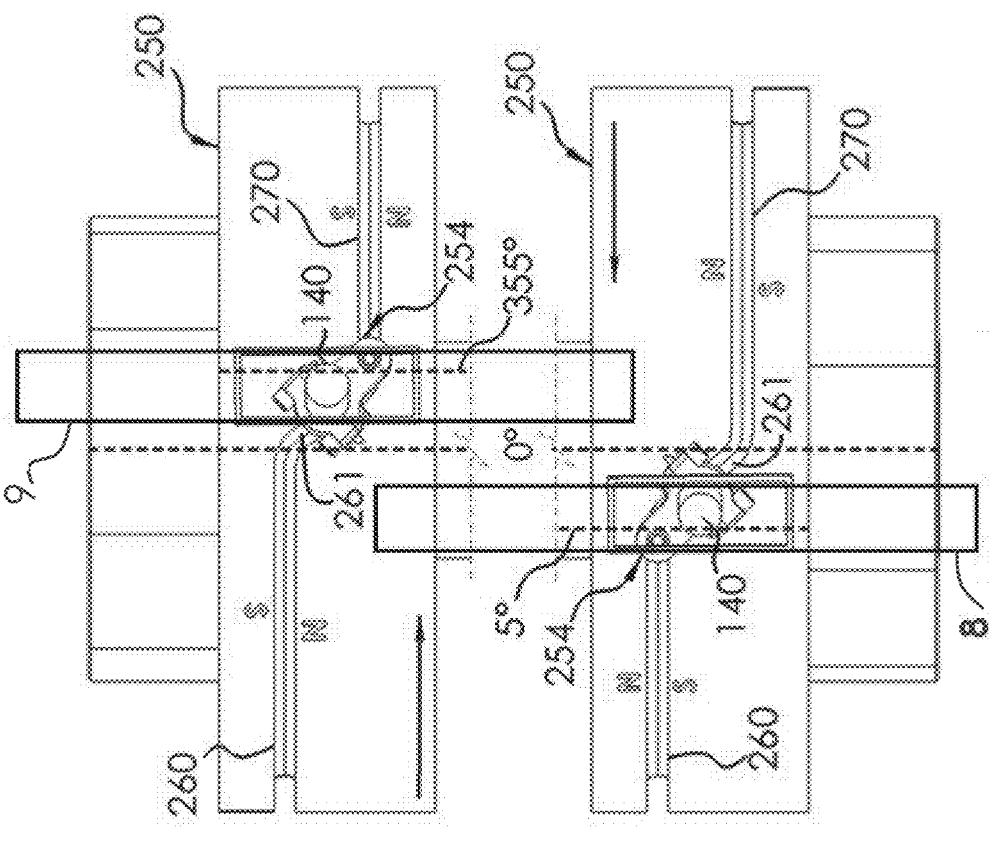
Figure 8:
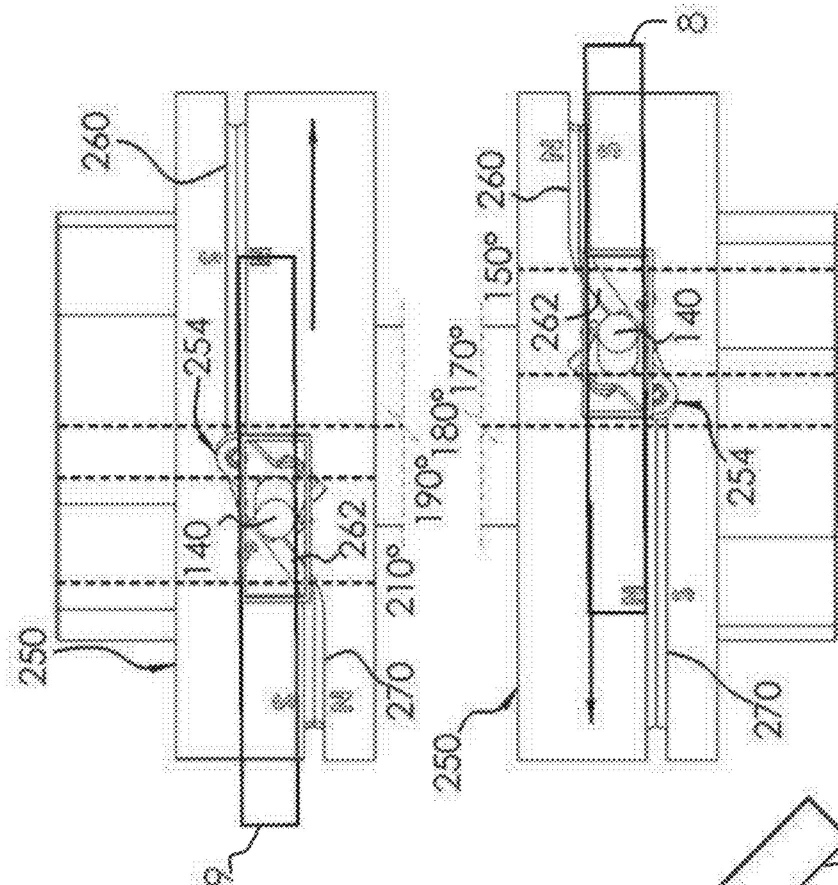
Figure 8:
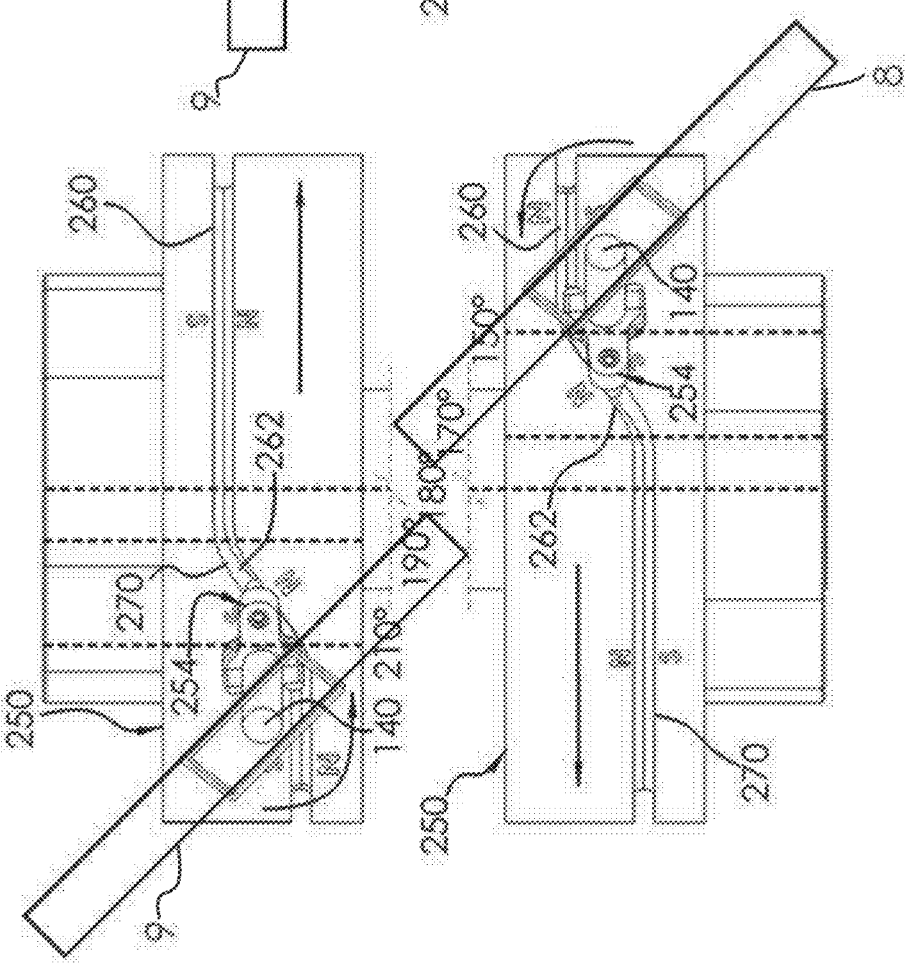

Referring now to FIG. 11A-FIG. 11D and to FIG. 8, another embodiment of ECP 10 articulation control is achieved via a magnetic array assembly 370 which is installed in the same location as, and in lieu of, any type of cam track assembly, including a magnetic cam track assembly 250. The magnetic array assembly 370 is comprised of two opposing computer-controlled electromagnetic arrays 371 and 372. A magnetized follower 373 is operably linked to the shaft 140, of each ECP 10. Each magnetic array 371 and 372 has an opposing computer-controlled variable electromotive force, with the follower 373 also being magnetically charged, with its North pole side facing the North array 371 and its South Pole facing the South array 372. The computer, not shown, can be located within the KFECS 100 or attached remotely to it by a wired or wireless connection. The computer, using inputs from one or more fluid direction and speed sensors 810 (see FIG. 1A) causes the electromagnetic force to be increased on segments of one array 371 and decreased on segments of the opposing array 372 sequentially in the direction of rotation as desired as the magnetized follower 373 passes through the arrays, thereby causing the magnetized follower 373 to change its position relative to the array assembly 370, and consequently, articulate the shaft 140 and associated plate 10, relative to the fluid flow throughout its entire 360° rotation about the longitudinal axis of the hub carrier 130. That is, by increasing the relative attraction between magnetized follower 373 and upper array 371, the follower moves closer to the upper array—analogous to the magnetized follower assembly being in an upper track of the embodiments described above. By increasing the relative attraction between the lower array 372 and the follower 373, the follower moves closer to the lower array 372—analogous to the magnetized follower assembly being in a lower track of the embodiments described above. This arrangement results in the magnetized follower levitating within the magnetic array field that exists between the upper array 371, and the lower array 372 and comprising a magnetic bearing within a computer-controlled and infinitely variable path about the magnetic array assembly 370. This computer-controlled articulation embodiment permits the KFECS 100 to remain constantly optimally oriented toward the fluid flow by changing the beginning, duration and end-point of each ECP 10 articulation thereby eliminating the need for hub orientation control motors 710 and related components (see FIG. 1A Enlarged view).

It should be appreciated that magnetic array assembly 370, during AOS slipstream mode, does not require any sacrificial parts due to mechanical failure, for example a failed split track operation as described in Section 10.4. Consequently, shaft 257 (see FIG. 11A) is not sacrificial.

Figure 12A:
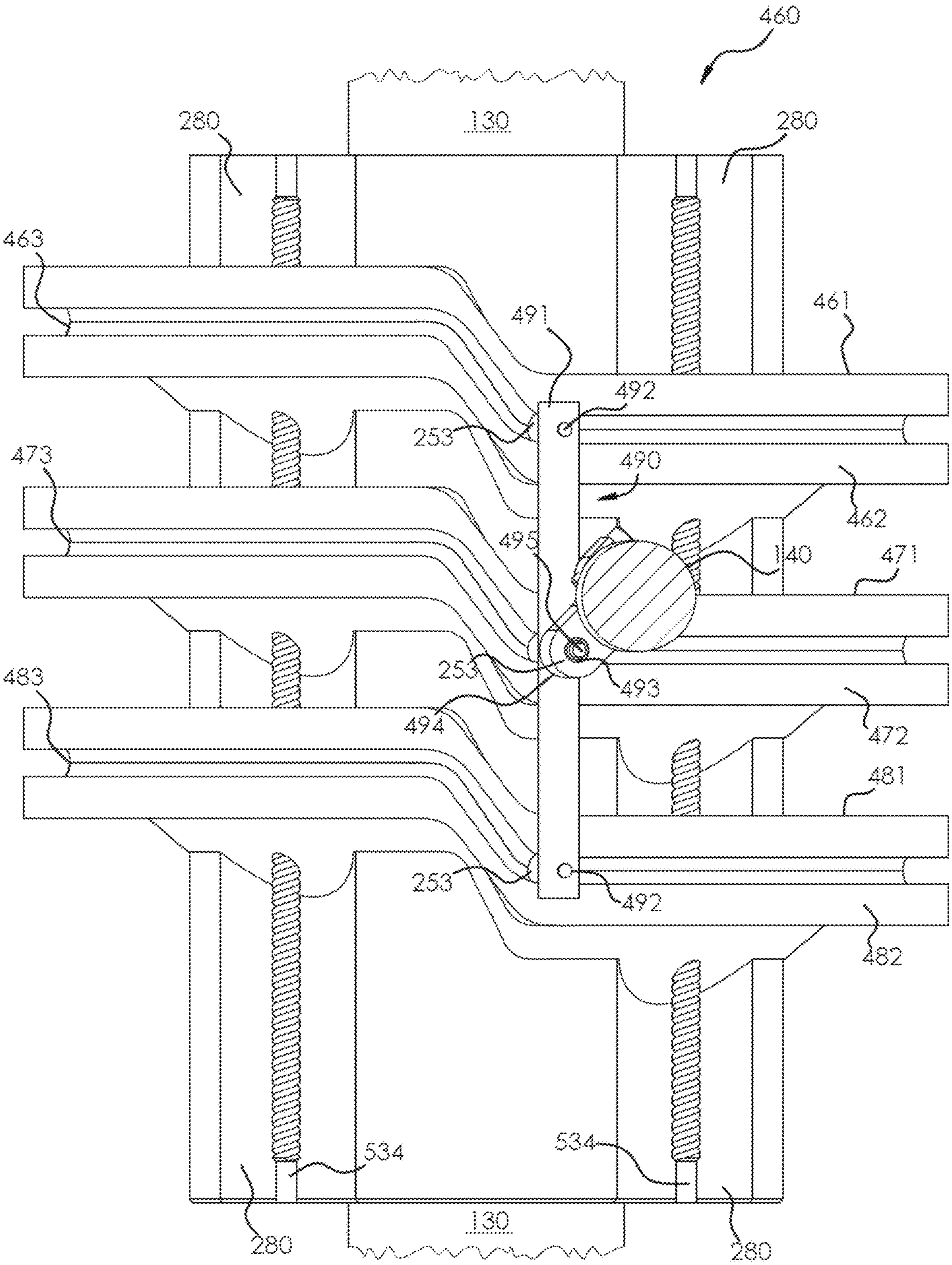
FIG. 12A is a front view of the ball screw and track portions of a triple cam track assembly, in its closed position, with a cross-sectional view of a triple follower
Figure 12:
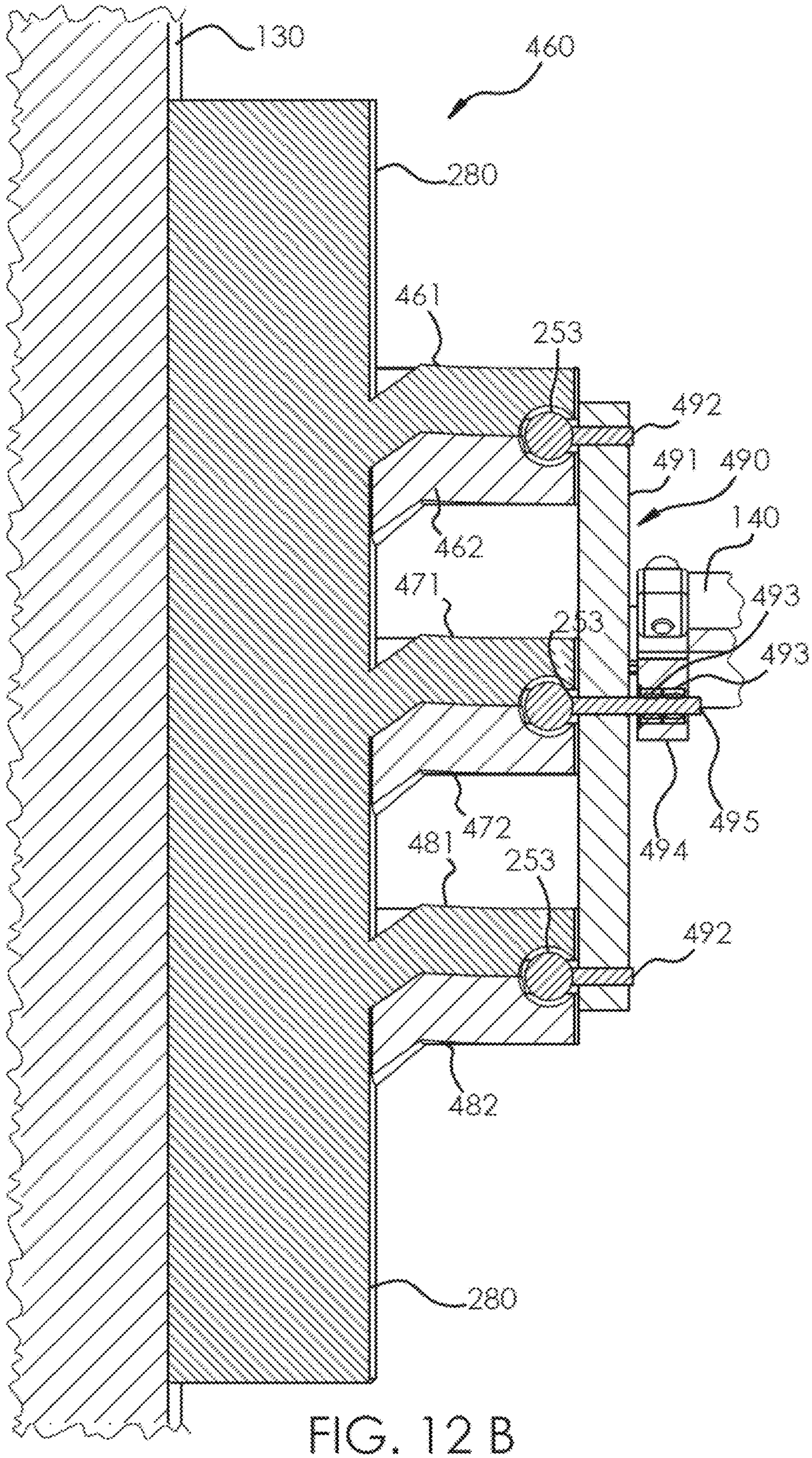
FIG. 12B is a cropped cross-sectional view of the ball screw and track portions of the triple split track assembly, in its closed position, with the triple follower assembly in its working orientation.
FIG. 12C is a front view of the ball screw and track portions of the triple cam track assembly in its open position with the triple follower assembly in its slipstream orientation.
FIG. 12D is a cropped cross-sectional view of the ball screw and track portions of the triple cam track assembly in its open position with the triple follower assembly in its slipstream orientation.
FIG. 12E is a front view of a triple follower assembly, used in a triple cam track, in its slipstream orientation.

9.4 Triple Cam Track Assembly—FIG. 12A

Referring now to FIGS. 12A-12E, alternative embodiments of a cam track assembly include a triple cam track assembly 460. Cam track assembly 460 may be implemented as a magnetic cam track assembly, similar to magnetic cam track assembly 250 (see FIG. 9A) or a liquid lubricant filled cam track assembly 300 (see FIG. 10). This embodiment is comprised of three continuous tracks assemblies that control the articulation of the ECP shafts 140, an upper track assembly 463, a center track assembly 473, and a lower track assembly 483—each with a lower track, and upper track, and two spline sections connecting the respective upper and lower tracks. In various embodiments, upper track assembly 463 comprises a fixed track section 461 and a movable track section 462, center track assembly 473 comprises a fixed track section 471 and a movable track section 472, and lower track assembly 483 comprises a fixed track section 481 and a movable track section 482

A triple follower assembly 490 is comprised of a linkage 491, shafts 492, follower heads 253, one or more bearings 493 (see also FIG. 15I), connecting rod 494 and shaft 495, which may be a sacrificial shaft, as described below. The combination of the three track assemblies 463, 473 and 483 and a triple follower assembly 490 coupled to the tracks 463, 473, 483 triples the torsion moment that the triple cam track assembly 460 supports as compared to single-track assemblies by tripling the surface area of the follower heads 253 or spherical bearings 310 (see FIG. 10). The designer may increase or decrease the moment that a particular track assembly supports by reducing or increasing the number of tracks, e.g. a double or quadruple cam track assembly, while using the same fundamental design principles incorporated in the triple cam track assembly 460 and related triple follower assembly 490.

In various embodiments, the triple cam track assembly 460 is fixedly linked to the hub carrier 130. The ECP shaft 140, the triple follower assembly 490, and the center track assembly 473 are configured and arranged so that the axis of each ECP shaft 140 is equidistant from the upper track and lower track of the center track assembly 473 (i.e., the axis of each ECP shaft 140 bisects center track assembly 473). The triple follower assembly 490 includes three follower heads 253 (or three spherical bearings 310 if the triple cam track assembly is configured as a liquid-lubricant filled cam track assembly (see FIG. 10), each follower head 253 being disposed within one of the upper track assembly 463, the center track assembly 473, and the lower track assembly 483. Furthermore, to prevent the triple follower assembly 490 from binding during rotation of the ECP shaft 140 about the hub, the triple follower assembly 490 is configured so that the follower heads 253 are all located at the same circumferential position within their respective tracks 463, 473, 483 as the ECP shaft 140 rotates about the hub, so that the follower heads 253 simultaneously enter and exit the splines of the respective tracks 463, 473, 483.

The coplanar alignment is an essential element of the geometry necessary for proper operation of the triple follower assembly 490 and prevents it from binding within the respective tracks 463, 473 and 483.

Figure 12C:
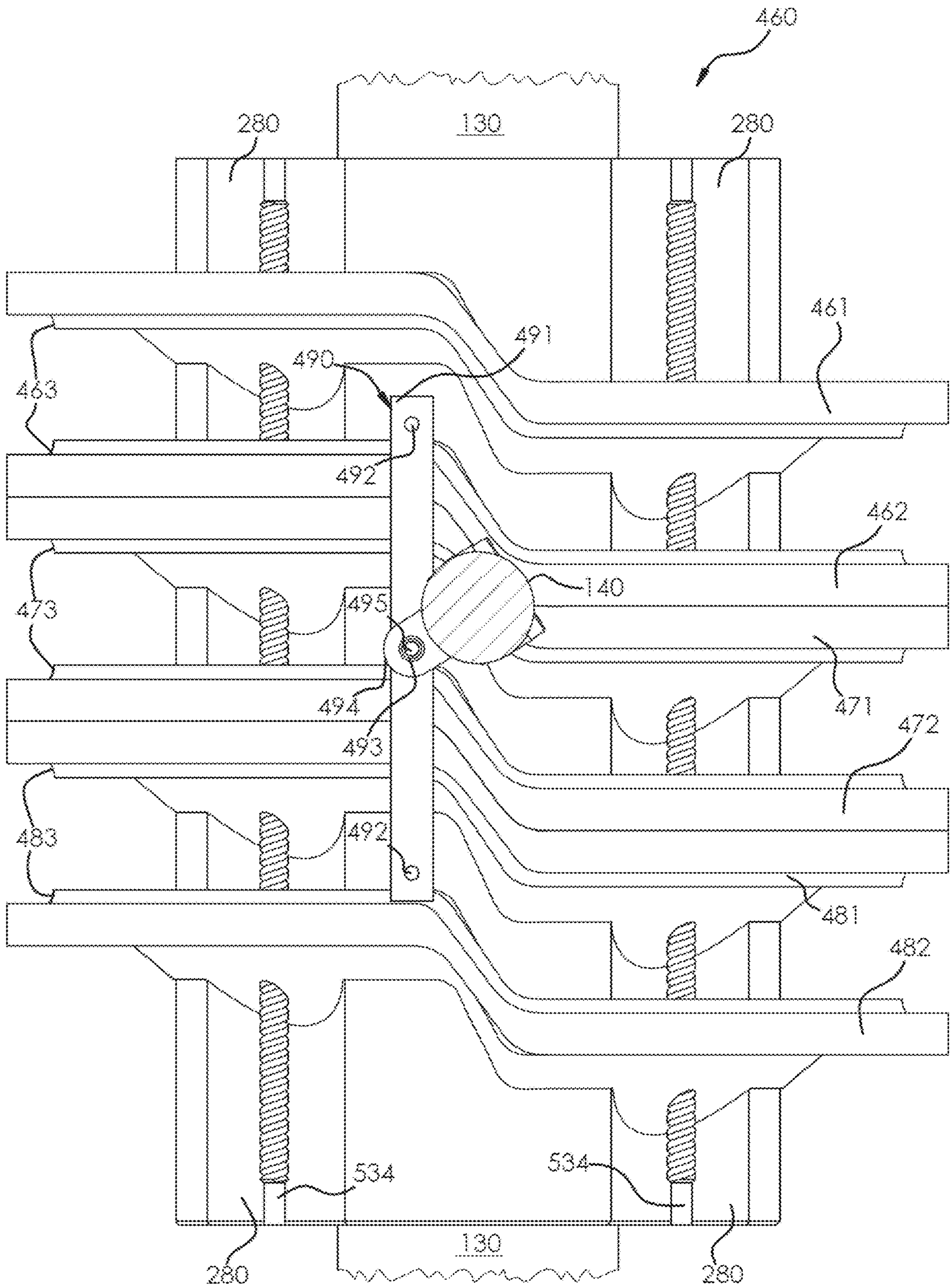
Figure 12:
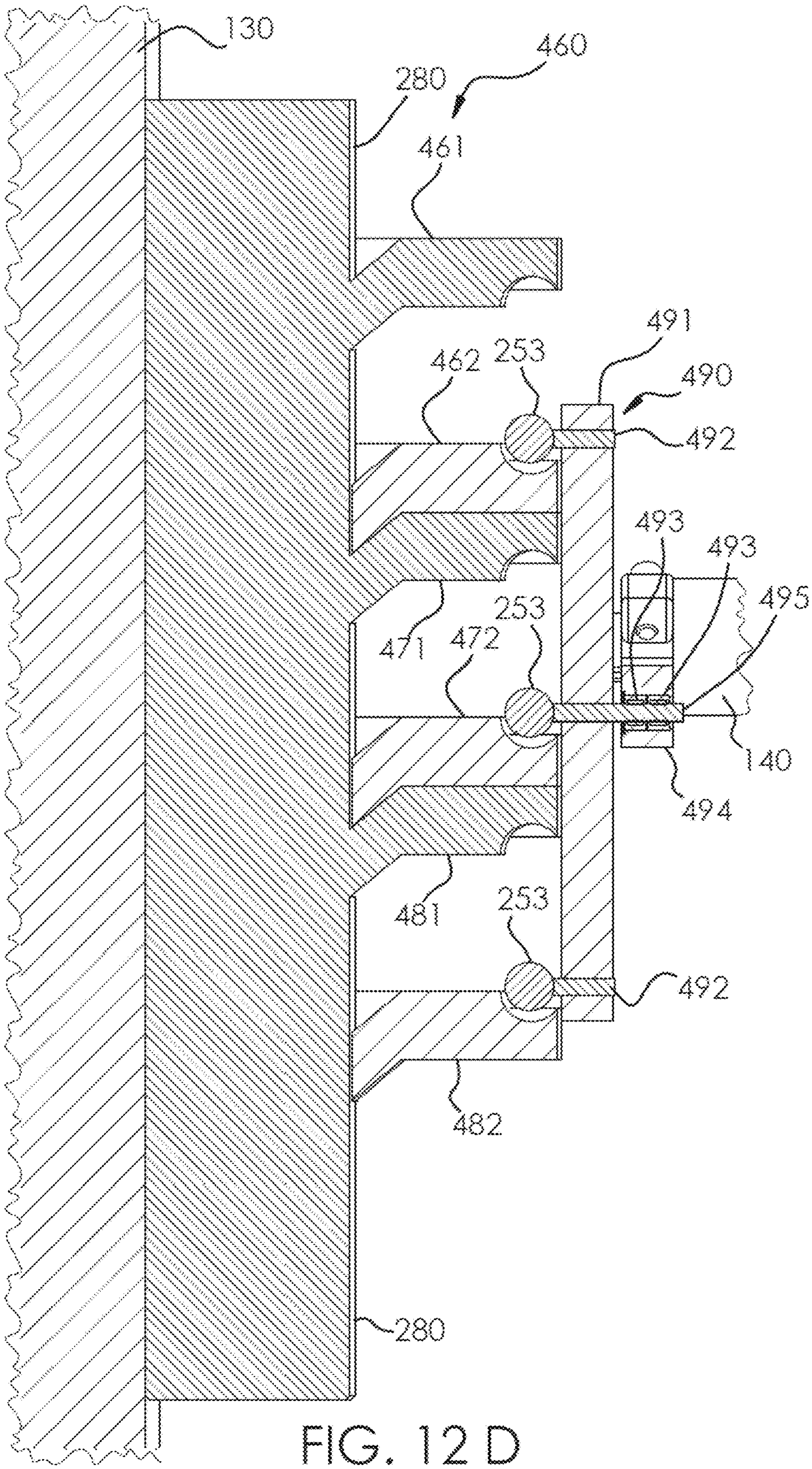
Figure 12E:
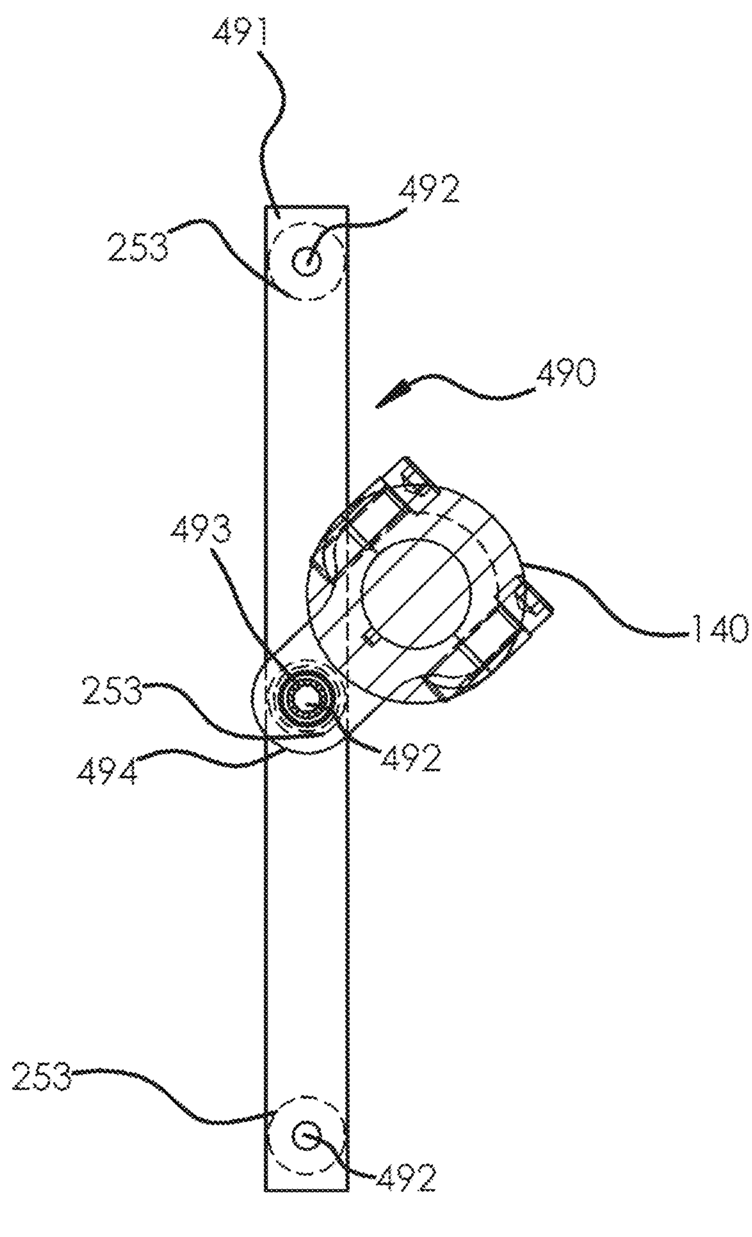

The triple cam track assembly 460, like the magnetic cam track assembly 250 and lubricant filled cam track assembly 300, uses the splined hub 280 when it moves from its closed position, shown in FIGS. 12A and 12B, to its open position shown in FIGS. 12C and 12D.

9.5 Hub Carrier and Perimeter Plate Detail FIG. 13A

Figure 5:
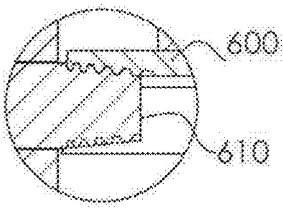
FIG. 5A is a cross-sectional view of a vertical axis embodiment of the KFECS which depicts the flow of mechanical energy through the energy conversion system with detailed magnified cross-sectional views of (i) an operably coupled bevel gear and clutch/gearbox/electrical generator/pump assembly pinion gear (FIG. 5B) and, (ii) the transmission's ring gears to pinion relationship (FIG. 5C).
Figure 5:
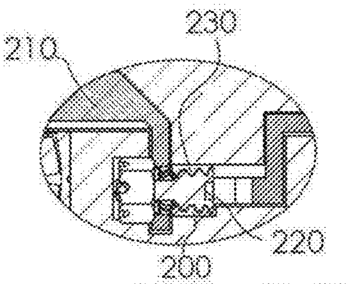
Figure 5:
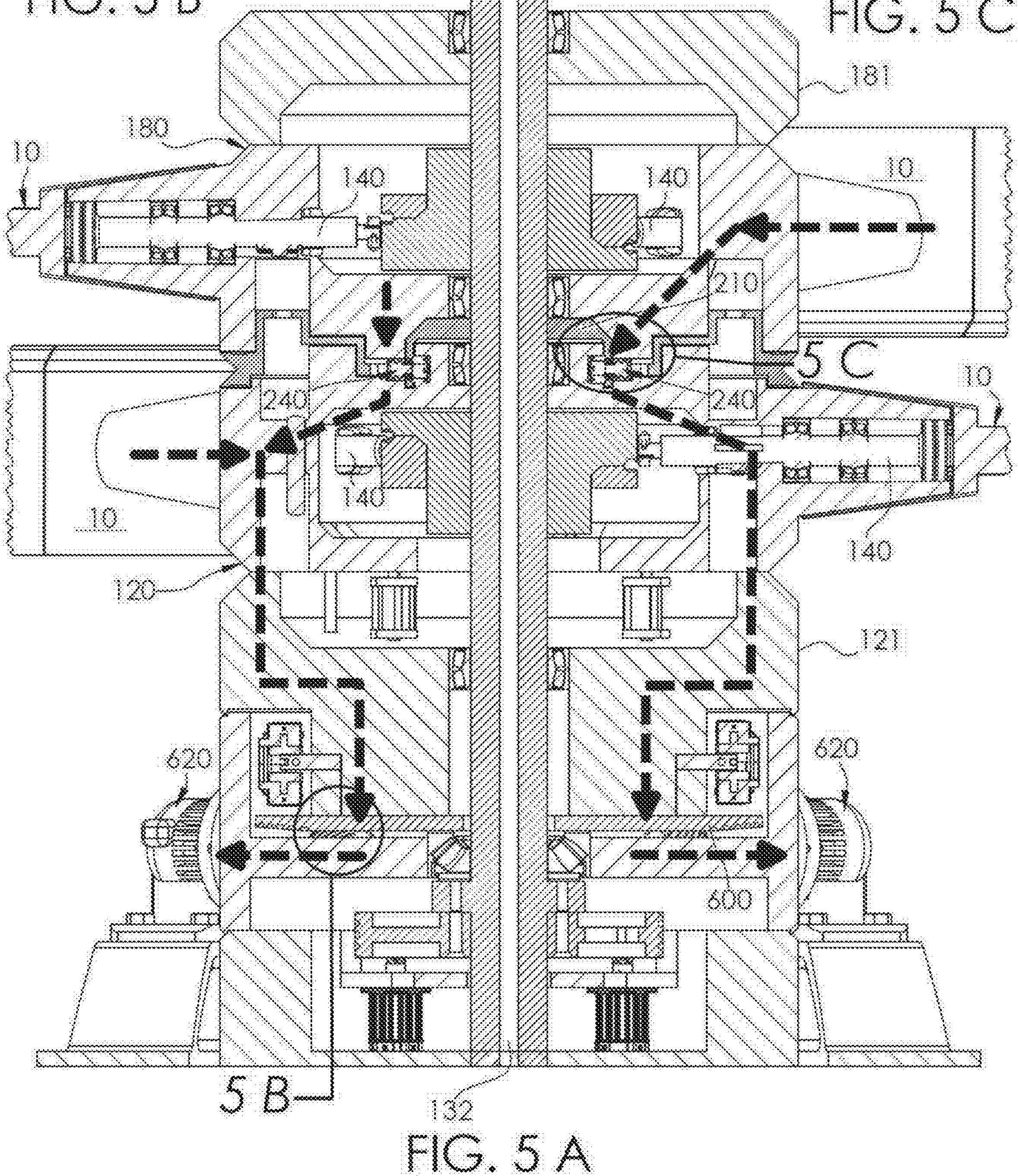

Referring now to FIG. 13A, FIG. 13B, and FIG. 5, the hub carrier 130 of the KFECS 100 operates as a superstructure component. The hub carrier 130 may include an integral chase 132 that can be used for routing any type of electrical cable, hose or pipe for transporting mixed fluids, gases, such as pneumatic or hydraulic lines (collectively "Transport System") or similar components (collectively "Transport System") through the entirety of the KFECS 100, and routing such Transport System through the counter-rotating hubs 120 and 180 without the need for rotatable couplings.

The perimeter plate 215 is fixed to the pinion carrier 210 (connected to each other or a single, integral component) which is fixed to the hub carrier 130. Consequently, any Transport System that runs through the hub carrier chase 132 may branch off through the perimeter plate 215 to serve numerous systems, including without limitation, electronic sensors, motor, vacuum, and pressure lines. Additionally, rotatable electrical couplings, including without limitation brush slip rings may be configured between the perimeter plate 215 and the adjacent hubs 120 and 180 thereby permitting the transfer of high voltage routed from the hub chase 132 to each ECP shaft 140 that serves a respective ECP 10 or 20. This provides a means of energizing heating elements within the ECPs that could be controlled by computer, as described in Section 9.6, to reduce potential icing of the ECPs 10 and 20 during icing conditions that sometimes occur. A KFECS 100 embodiment with more than two hubs 120 and 180 may include an additional perimeter plate 215, and related transmission as described in Section 7, between each additional hub.

Referring now to FIG. 13B, Transport Systems may be routed over numerous physical routes between the hub carrier chase 132 and the circumference of the perimeter plate 215. Several such physical routes are shown with a dashed line.

As shown in FIGS. 13A and 13B, the perimeter plate 215 and fixedly linked pinion carrier 210 have numerous features integral to the counter-rotation transmission described in Section 7 and the AOS described in Section 10. Pinion shaft receiver bores 211 are formed at angularly spaced positions about an outer wall of the pinon carrier 210 and receive the shafts of the pinions 220. Perimeter plate 215 includes an annular support flange 216 at its inner periphery at which the perimeter plate 215 connects to the pinion carrier 210. Pinion openings 217 are formed in the annular support flange at angularly spaced positions corresponding to the positions of the pinion shaft receiver bores 211 and receive the pinions 220. An annular hub receiver ring 218, bordering the annular support flange 216 nests with hub 120 below the perimeter plate 215 and nests with hub 180 above the perimeter plate 215. Annular support flange 216 is axially recessed with respect to the annular hub receiver ring 218 and the pinion carrier 210, thereby forming an annular trough that nests within the transmission well recess 235. The annular trough formed by flange 216 and the transmission recess 235 of the adjacent hub form a reservoir that can contain a liquid lubricant within which the pinions 220 positioned within the openings 217 are immersed. The reservoir does not require seals for retaining the liquid lubricant within the reservoir when the hub is operated in configuration in which the hub carrier 130 is oriented substantially vertically. An annular rib 221 projects axially above annular hub receiver rib 218 and the outer perimeter of the perimeter plate 215 and defines a recess beneath it which accepts a secondary ring 570 of an articulation override system as described in Section 10. Tertiary ring lifter slots 219 formed in the annular rib 221 permit movement of a tertiary ring of the articulation override system as described in Section 10. Proximity sensors 585 may be located on both sides of the perimeter plate in the locations shown, however, the locations and numbers of proximity sensors are not intended to be limiting an are shown as described as an embodiment. The words "below" and "above" as used herein are not intended to be limiting and are merely used to orient the reader to the drawing.

9.5.1 Perimeter Plate—Multi-function Alternate embodiment

Referring now to FIGS. 13C and 13D, an alternate embodiment of a perimeter plate 215-A includes all of the features and functionality embodied within perimeter plate 215 and further includes attachment points and/or supporting areas for (i) a second and/or additional counter-rotating transmission 245 (see FIGS. 3B and 7C), and (ii) a thrust bearing 227 extending circumferentially about the perimeter plate 215-A near its outer perimeter.

Perimeter plate 215-A includes outer pinion openings 222 formed in an annular support flange 228 at angularly spaced positions about the perimeter plate 215-A. A pinion shaft receiver bore 223 is aligned with each outer pinion opening 222. Each shaft receiver bore 223 receives a shaft of an outer pinion 224 having a gear head that is disposed in an associated outer pinion opening 222.

Perimeter plate 215-A is configured to be used with alternate embodiments of hub 120 (120-A) and hub 180 (180-A), whereby the counter rotating hubs 120-A and 180-A are rotationally coupled by the outer pinions 224, optionally in combination with pinions 220 (inner pinions) of transmission 240.

Figure 3B:
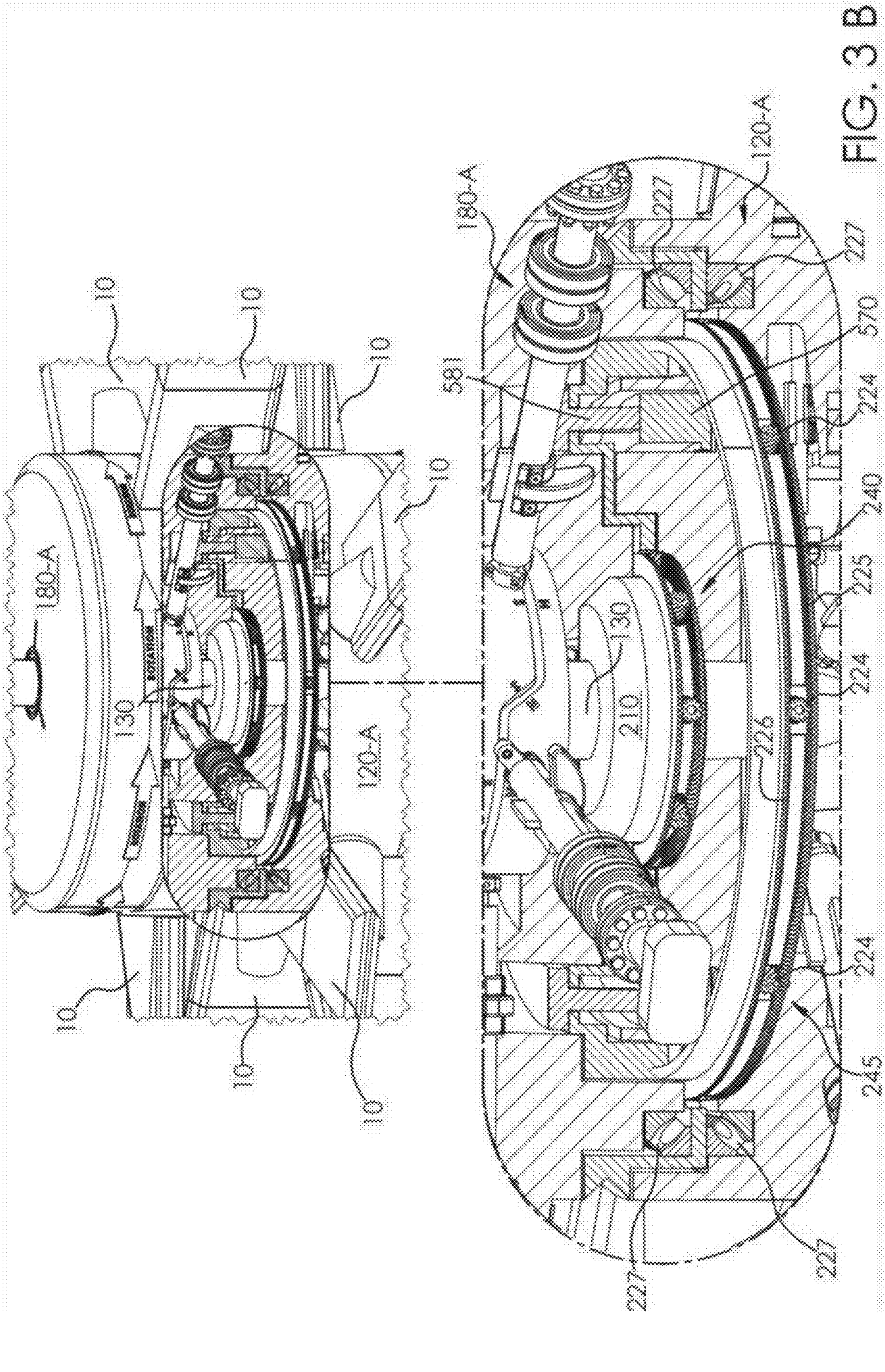

In an embodiment, transmission 245 comprises a ring gear 225 attached or otherwise operatively coupled to hub 120-A (to the top of hub 120-A as shown in FIGS. 3B and 7C) and a ring gear 226 attached or otherwise operatively coupled to hub 180-A (to the bottom of hub 180-A as shown in FIGS. 3B and 7C). The radially oriented outer pinions 224 rotatably mounted within the receiver bores 223 of the perimeter plate 215-A are disposed between the outer ring gears 225, 226. This arrangement results in the center of the axis of each outer pinion 224 remaining at all times in the same angular position relative to the hub carrier 130. Consequently, because the center of the axis of each outer pinion 224 is fixed at an angular position with respect to the hub carrier 130, rotational movement of either hub 120-A or 180-A about the longitudinal axis of the hub carrier 130 results in its operably linked respective outer ring gear 225 or outer ring gear 226 rotating about the longitudinal axis of the hub carrier 130. Rotational movement of either outer ring gear 225 or outer ring gear 226 will cause the opposing ring gear to rotate in the opposite direction via the coupling of the outer pinions 224. In addition, if an (inner) transmission 240 is also used, movement of either ring gear 200 or ring gear 230 of transmission 240 will cause the operably coupled pinions 220 (inner pinions) to rotate about their respective axes thereby causing an opposite rotation of the adjacent ring gear and operably coupled hub.

Two thrust bearings 227, referred to herein as perimeter hub bearings, may be provided and located against the perimeter plate 215-A, with one thrust bearing 227 positioned between the top of the perimeter plate 215-A and the bottom of top hub 180-A, and another thrust bearing 227 positioned between the bottom of the perimeter plate 215-A and the top of bottom hub 120-A (see FIG. 7C).

As shown in FIG. 13E, an alternate embodiment of brake housing 730, (730-A) includes a brake housing thrust bearing 731 disposed circumferentially within an annular groove or channel formed in the top of the brake housing 730-A between the brake housing 730-A and an alternate embodiment of the hub end 121-A.

The brake housing thrust bearing 731 permits rotation of the hub end 121-A and the hubs 120-A and 180-A with respect to the brake housing 730-A about the hub carrier 130. Brake housing thrust bearing 731 at the outer radial periphery of the of the brake housing 730-A and hub end 121-A also transfers lateral and vertical loads acting upon the hubs 120-A and 180-A through the hub end 121-A to the brake housing 730-A. Because the brake housing thrust bearing 730-A is located at the outer radial periphery of the of the brake housing 730-A and hub end 121-A, it is able to withstand a greater lateral moment than only the hub carrier bearings 135 positioned between the hub end 121-A and the hub carrier 130.

Similarly, perimeter hub bearings 227 positioned on opposite sides of the perimeter plate 215-A between the hubs 180-A, 120-A and at the outer radial periphery of the of the perimeter plate 215-A and hubs 180-A, 120-A, transfers lateral and vertical loads acting upon the hubs 120-A and 180-A through the hubs and to the hub end 121-A. Because the perimeter hub bearings 227 are at the outer radial periphery of the of the perimeter plate 215-A and hubs 180-A, 120-A, they are able to withstand a greater lateral moment than only the hub carrier bearings 135 positioned between the hubs 120-A, 180-A and the hub carrier 130.

Thus, the hubs 120-A, 180-A, hub end 121-A, and hub carrier 130, and all components operably or fixedly linked to the hub carrier 130, are able to withstand greater vertical and lateral loads than could be withstood without brake housing thrust bearing 731 disposed between the brake housing 730-A and the hub end 121-A.

In addition, because the perimeter plate 215-A and counter-rotating transmission 245 provides support points near the radially outer peripheries of the perimeter plate and hubs 120-A and 180-A (i.e., radially outer support points provided by outer pinions 224 and ring gears 225 and 226), whereas transmission 240 (see FIG. 3B) only provides support points located near the radial center of the perimeter plate 215 and hubs 120 and 180 (i.e., radially inner support points provided by pinions 220 and ring gears 200 and 230), transmission 245 can transfer greater lateral torque than transmission 240 and would be subject to less stress than transmission 240. Transmission 240 and transmission 245 can be used alone or in combination. That is, transmission 240 can be provided between one pair of counter rotating hubs 120-A, 180-A and transmission 245 can be provided between the same pair of counter rotating hubs 120-A, 180-A.

Unless otherwise noted or evident from the context, one or more of hubs 120-A, 180-A, perimeter plate 215-A, hub end 121-A, and/or brake housing 730-A could be substituted for one or more of hubs 120, 180, perimeter plate 215, hub end 121, and brake housing 730, as applicable, in any descriptions in this disclosure.

Figure 14:
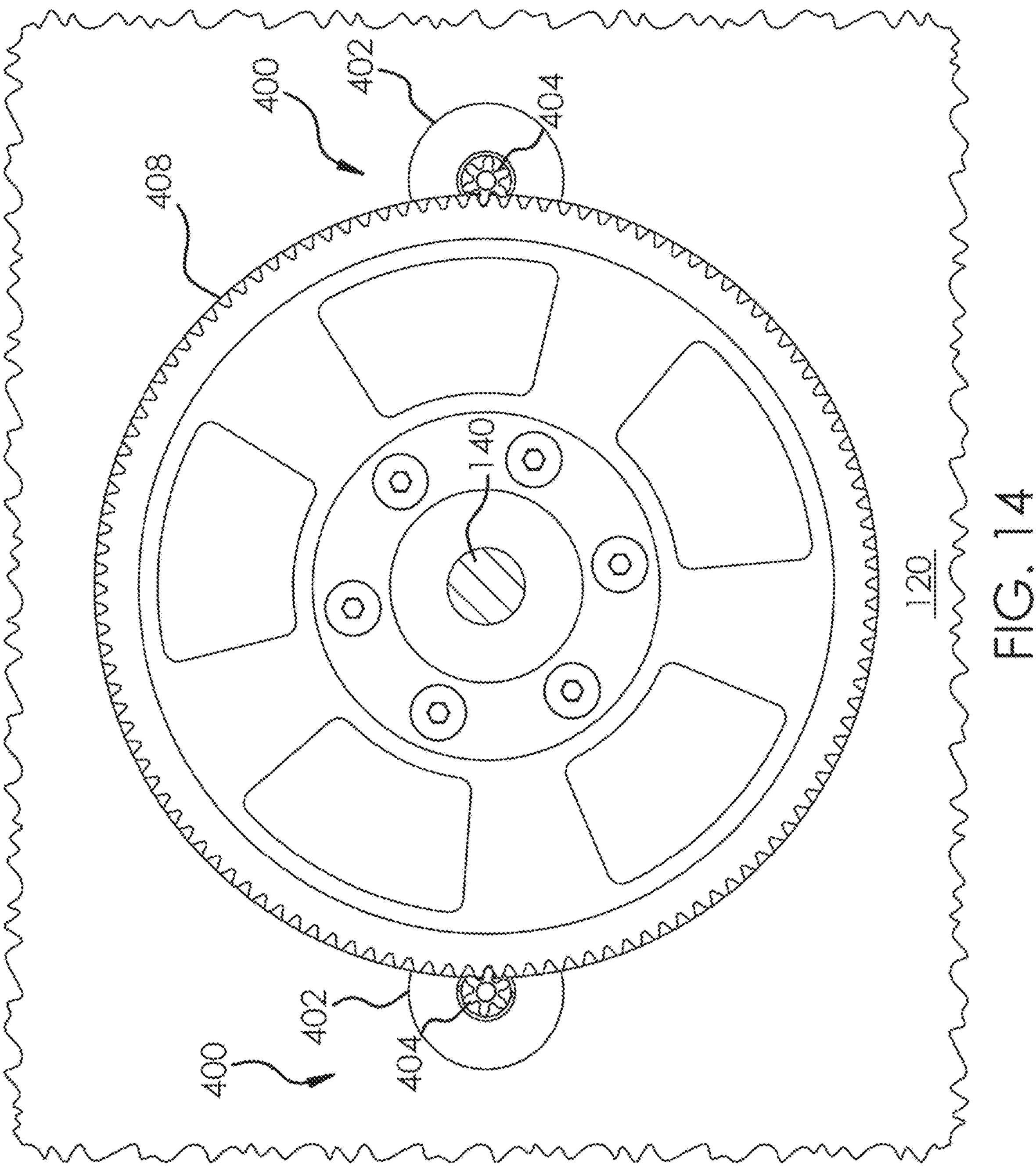
FIG. 14 is partial cross-sectional view, transverse to an axis of an ECP shaft, of articulation motors mounted to the interior perimeter of the hub and engaged with a ring gear attached to the ECP shaft.

9.6 Perimeter Motor Driven Assembly—FIG. 14

Referring now to FIG. 14 and to FIG. 1A, another embodiment of ECP 10 articulation control is achieved via one or more computer-controlled motors 400 and operably coupled ring gear 408. In this embodiment, the ring gear 408 is operably coupled (e.g. fixedly and coaxially attached to) an ECP shaft 140 of an ECP 10 and is part of a computer controlled articulation control assembly 400, comprising at least one motor 402, which rotates a pinion 404, which is operably coupled to and rotates the ring gear 408 that is fixedly attached to an ECP shaft 140. The perimeter plate 215 is operably connected to, and remains aligned with, the hub carrier 130 at all times, acts as an extension of it, and moves with it when it is rotated about its longitudinal axis by hub orientation control system. All power and computer control signals related to the operation of any articulation motor assembly 400 may be transmitted through the hub carrier chase 132 and routed from the hub carrier chase 132 through the perimeter plate 215 and thereafter transferred and/or transmitted into the hubs 120 and 180 by rotatable couplings between the perimeter plate 215 and the hubs 120 and 180. The computer, not shown, can be located within KFECS 100 or attached remotely to it by a wired or wireless connection. The computer, using inputs from one or more fluid direction and speed sensors 810, causes the motorized pinions 404 to articulate the associated ECP shaft 140 and each operably linked ECP 10, to its optimal position relative to the fluid flow throughout its entire 360° rotation about the longitudinal axis of the hub carrier 130. This computer-controlled articulation embodiment permits the KFECS 100 to remain constantly optimally oriented toward the fluid flow by changing the beginning, duration and end-point of each ECP 10 articulation thereby eliminating the need for hub orientation control motors 710 and related components.

10. Articulation Override System—Standby Mode—FIG. 15A.

Figure 15A:
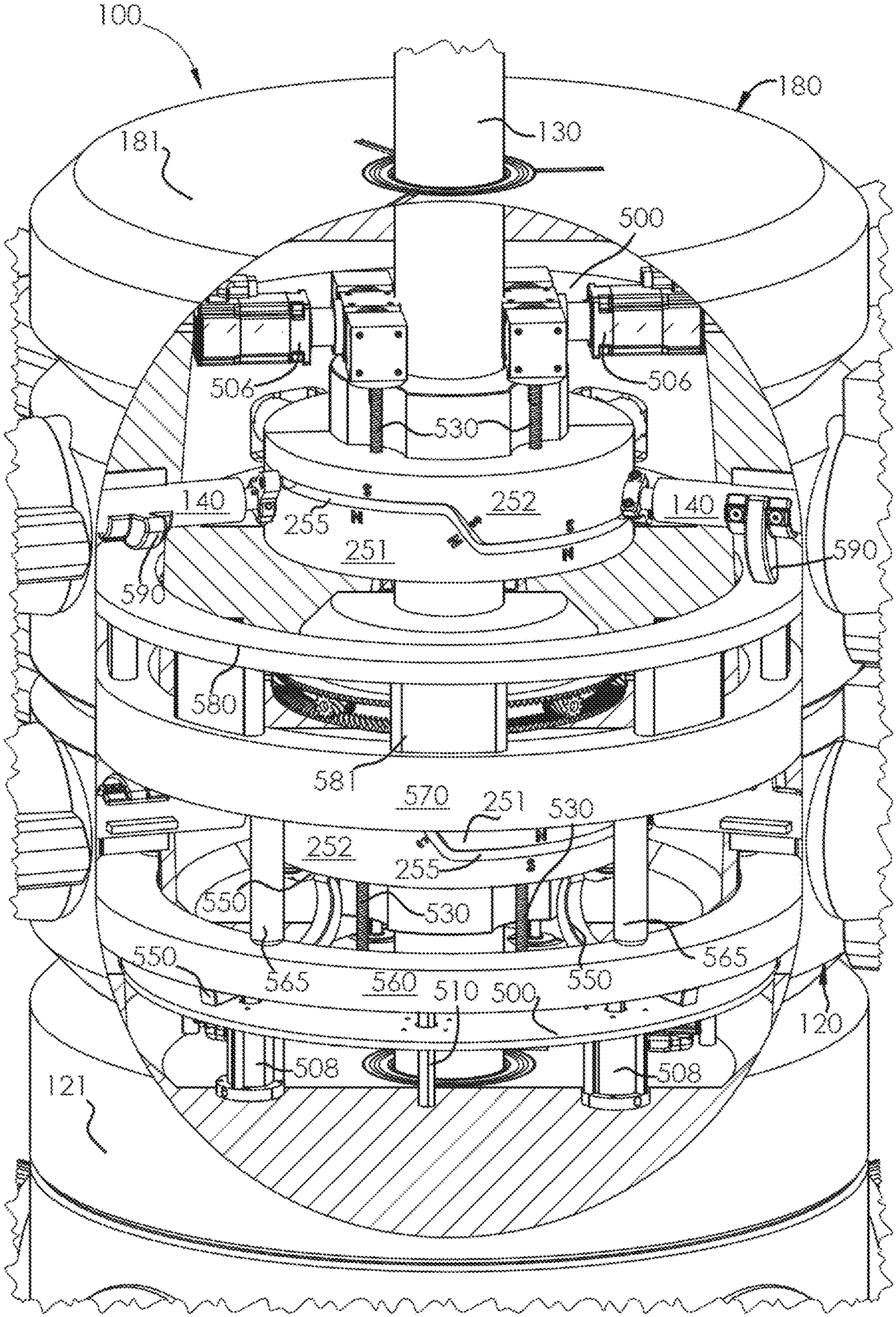
FIG. 15A is a cropped isometric view of vertical axis embodiment of the KFECS with a broken-out section revealing (i) redundant failsafe systems, while in their stand-by mode, that, when activated, cause all ECPs to rotate into and/or remain in a slipstream orientation, and (ii) two magnetic cam track assemblies in their working mode configurations.

Referring now to FIG. 15A, and still referring to FIG. 1A, the KFECS 100 in some embodiments includes a computer-controlled articulation override system ("AOS") configured to rotate all ECPs 10, or ECPs 20 as described in Section 13, to their slipstream orientation (active mode) irrespective of their orientation to the oncoming fluid flow or their angular position about the longitudinal axis of the hub carrier 130. The AOS may be include redundant actuator groups, such as, for example, pyrotechnic, pneumatic, hydraulic and electronic solenoid actuators, any one of which, when activated, cause all ECPs 10 to be rotated to their slipstream orientation all as more fully described in Section 10.3. Such redundant actuators may comprise piston actuators that can be actuated by multiple means, including without limitation, an electrical device, explosive device (pressure cartridge), a pneumatic device, a spring-loaded device, mechanical primer-initiated device (gas generator), a linear detonation transfer line (SMDC, FCDC, ETL, RDC), or a laser actuated ordnance device (laser-initiated squib or detonator).

One of the sections 251, 252 of the magnetic cam track assembly 250, for example, the moveable track section 252, is designed to move with respect to the other stationary track section 251 when directed by the AOS to go into AOS active mode to thereby decouple the follower assembly 254 and ECP 10 from the magnetic cam track assembly 250.

As shown in FIGS. 15B-15E, in the illustrated embodiment, moveable cam track section 252 is the lower track section of the cam track assembly 250 of lower hub 120 and is the upper track section of the cam track assembly 250 of the upper hub 180. During AOS active mode, the movable track section 252 of the lower hub 120 engages with rocker arms 550 configured to engage a primary override ring 560. As the moveable cam track section 252 separates from the stationary section 251 of the lower hub 120 (moving axially downwardly in the illustrated embodiment), the moveable cam track section 252 actuates the rocker arms 550, which in turn engage and move the primary override ring 560 in an axial direction (upward in the illustrated example). As the primary override ring 560 moves axially, it contacts actuator cams 590 of the ECP shafts 140 of the lower hub 120, thereby moving or maintaining each ECP 10 of the lower hub 120 in a slipstream orientation. The primary override ring 560 is also coupled to a secondary override ring 570, for example, by means of axially-oriented lifters 565 extending between the primary override ring 560 and the secondary override ring 570. Thus, axial movement of the primary override ring 560 is transferred into a corresponding axial movement of the secondary override ring 570. A tertiary override ring 580 includes integral lifters 581 which operably couple to the secondary override ring 570. Thus, the axial movement of the secondary override ring 570 is transferred into a corresponding axial movement of the tertiary ring 580. As the tertiary override ring 580 moves axially, it contacts actuator cams 590 of the ECP shafts 140 of the upper hub 180, thereby moving or maintaining each ECP of the upper hub 180 in a slipstream orientation.

In an embodiment, none of the operably coupled AOS components move or are subjected to any mechanical wear at any time other than when the AOS switches into active mode. In an embodiment, all operably coupled parts that come in contact with an actuator cam 590 or any other movable AOS components are constructed of materials with inherent low friction properties designed to slide without lubricant, such as Delrin®, or low friction coatings, such as Tungsten Disulfide. In an embodiment, the AOS is designed to rotate all ECPs 10 to their slipstream orientation in less time than is required for a hub 120 or 180 to make one revolution about the longitudinal axis of the hub carrier 130.

During normal KFECS 100 operations, the AOS remains in a standby mode whereby linear actuators, such as motorized ball-screw assemblies 530 (which may be computer controlled, as described in further detail below), apply pressure to the moveable cam track section 252 in the direction of the stationary cam track section 251 causing both sections to act as a single contiguous track 255. Similarly, in embodiments with a triple cam track assembly 460, motorized ball screw assemblies 534 apply pressure to the movable track sections 462, 472 and 482 causing all three sections, in combination with their associated fixed track section 461, 471, and 481, respectively, to act as contiguous tracks 463, 473 and 483, respectively.

It should be appreciated that it is the designer's choice as to the lifter style that may be used, lifters 565 or 581, in alternate embodiments of the (i) AOS, (ii) perimeter plate 215 or 215-A (see Section 9.5), and (iii) hubs 120 and 180 as adequate space exists in all components that may be operably coupled to either lifters 565 or 581.

10.1 Active Mode—Primary System—FIG. 15A-FIG. 15F

Referring now to FIG. 15A-FIG. 15F, FIG. 12C, and FIG. 12D and still referring to FIG. 1A, the AOS when activated is designed to rotate all energy conversion plates 10 to their slipstream orientations irrespective of their orientation to the oncoming fluid flow or their angular location about the longitudinal axis of the hub carrier 130. The AOS primary activation system is comprised of the electromechanical actuator system 505 which, when activated as shown, cause all ECPs 10 to be rotated to their slipstream position. In an embodiment, the computer-controlled electromechanical actuator system 505 does so by means of one or more computer controlled motors 506, which rotate operably coupled dual right-angle gearboxes 518, which rotate operably coupled right angle gear boxes 520, which rotate operably coupled linear actuators attached to the moveable track section 252, such as ball-screw assemblies 530, causing the cam track assembly 250 to separate at the centerline of the continuous track 255 thereby providing clearance for the follower head 253 of the follower assembly 254 to move to its slipstream orientation irrespective of its angular position (i.e., to decouple the follower head 253 and follower assembly 254 from the continuous track 255). For a magnetic track assembly, the linear actuators, e.g., ball screw assemblies 530, must be able to overcome the magnetic attraction between sections 251, 252. In the illustrated embodiment, moveable cam track section 252 of the lower hub 120 is operably coupled to the one or more rocker arms 550 and, as the moveable cam track section 252 separates from stationary track section 251, moving axially with respect to the hub carrier, the movable track simultaneously actuates the rocker arms, which causes the operably coupled primary override ring 560 to move toward and operably couple with the primary lifters 565, which move toward, and operably couple with, the secondary override ring 570, which operably couples with, and moves toward the lifters 581 of tertiary override ring 580. As the secondary override ring 570 moves toward the energy conversion plate control shafts 140, the primary override ring 560 engages each actuator cam 590 in the hub 120 that is not in the slipstream orientation. Simultaneously, as the tertiary override ring 580 moves toward its end of travel, all actuator cams 590 in the hub 180 that it engages rotate the associated energy conversion plate shaft 140 and ECP 10 to its slipstream orientation.

The mechanical movement of the moveable magnetic cam track section 252, and the parts to which it is operably coupled, are conceptually identical in function to the splitting movement of the liquid-lubricant filled cam track assembly 300, and triple cam track assembly 460, irrespective of whether or not the triple cam track assembly is used in a magnetic embodiment or liquid lubricant embodiment.

Figure 15B:
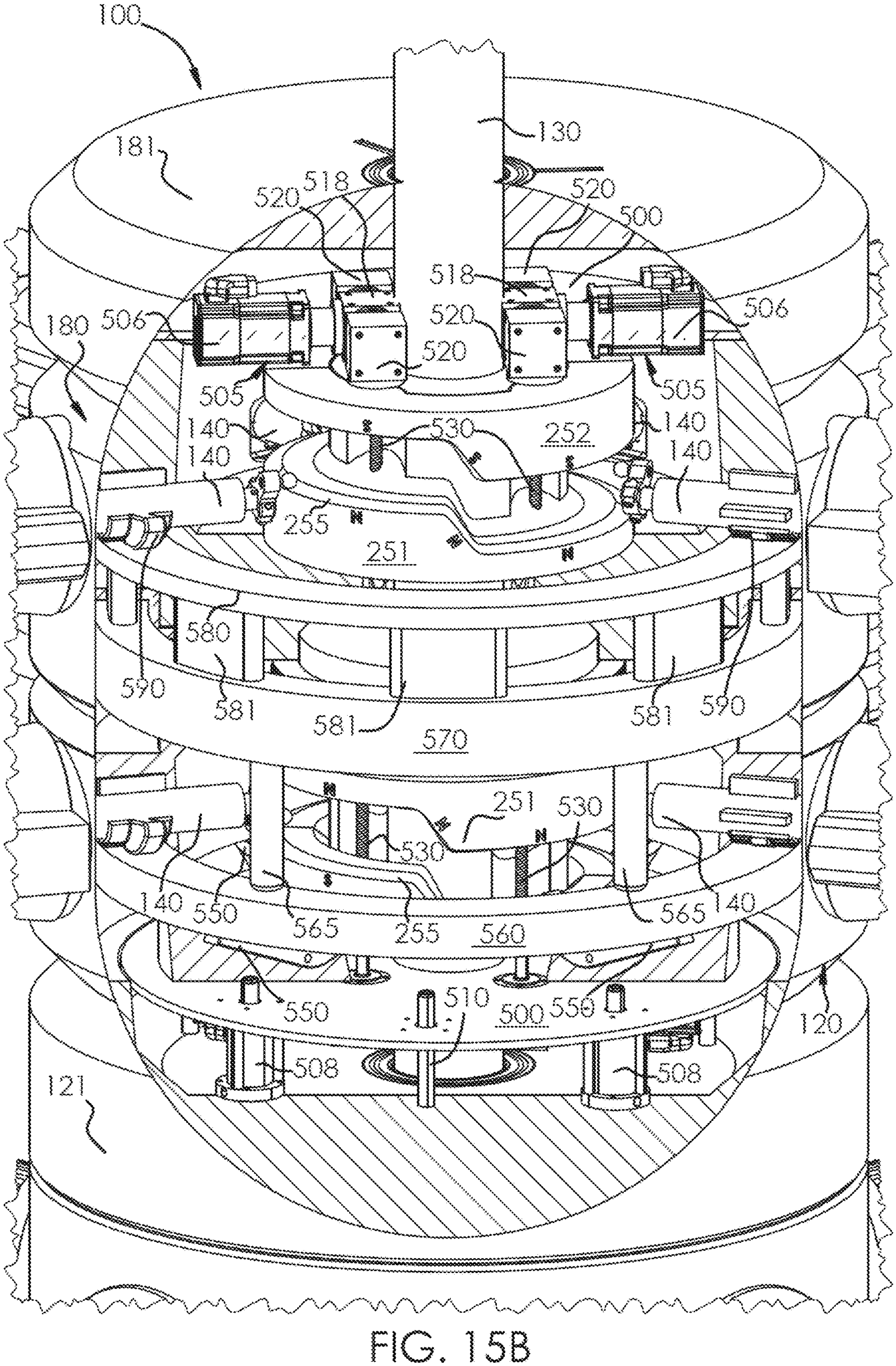
FIG. 15B is a cropped isometric view of the vertical axis embodiment of the KFECS hub assembly with a broken-out section revealing two magnetic cam track assemblies in their slipstream mode configurations.
Figure 15:
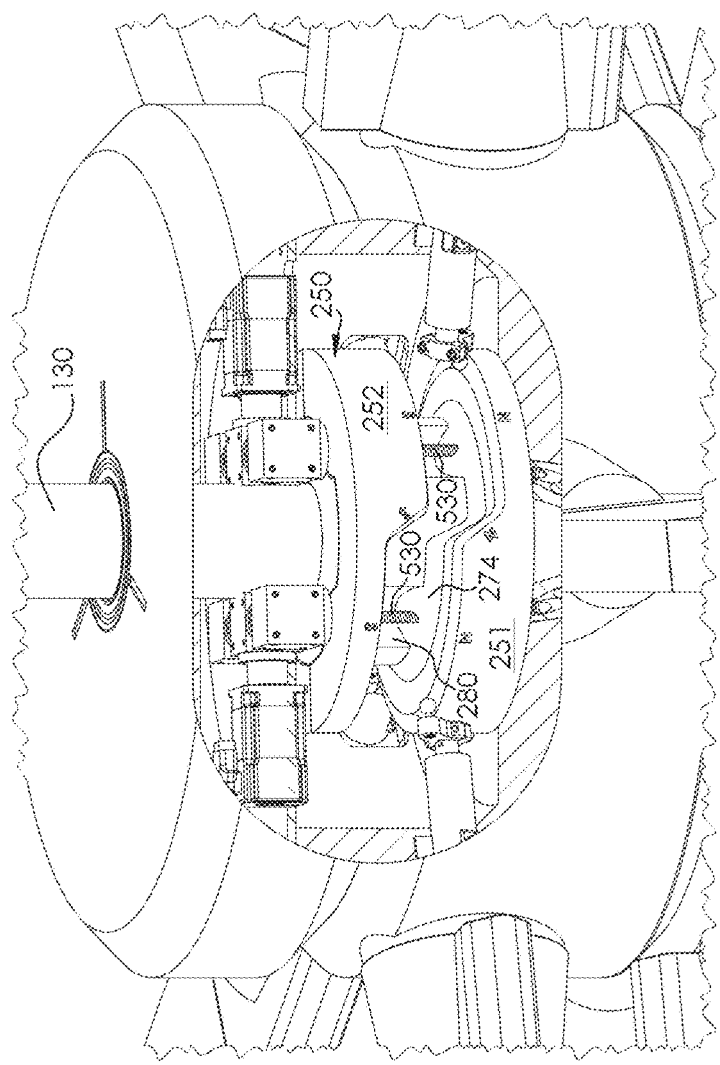
FIG. 15C is a partial isometric view of the vertical axis embodiment of the KFECS hub assembly with a broken-out section revealing a magnetic cam track assembly in its slipstream mode configuration.
FIG. 15D is a front view of the cam track assembly in its slipstream mode configuration.
FIG. 15E is a cross-sectional view of the cam track assembly in the direction 15E showing conical mating surfaces of a self-aligning track section mating embodiment.
FIG. 15F is an isometric view of an embodiment of the KFECS upper hub with a broken-out section revealing (i) a cam track assembly that was opened by a fail-safe backup AOS operation with resulting uncoupled follower heads, and (ii) redundant AOS failsafe actuators in their working positions.
FIG. 15G is a partial, side, cross-sectional view of an uncoupled follower head with a broken sacrificial shaft as a result of the operation of a fail-safe backup AOS operation.
FIG. 15H is a partial, side, cross-sectional view of an uncoupled spherical bearing with a broken sacrificial shaft as a result of the operation of a fail-safe backup AOS operation.
FIG. 15I is a partial, side, cross-sectional view of an uncoupled triple follower assembly with a broken sacrificial shaft as a result of the operation of a fail-safe backup AOS operation.
FIG. 15J is a front view of an uncoupled articulation motor pinion with a broken sacrificial shear pin as a result of the operation of a fail-safe backup AOS operation.
Figure 15:
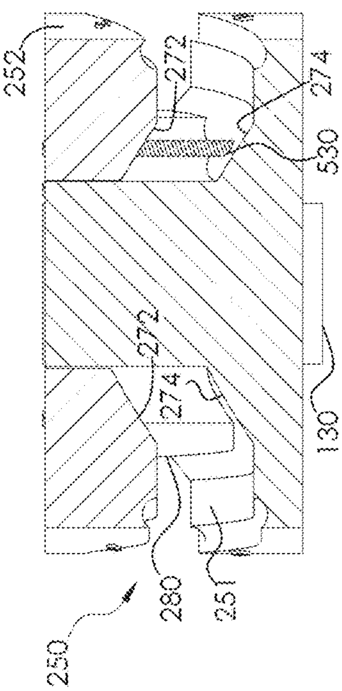
Figure 15:
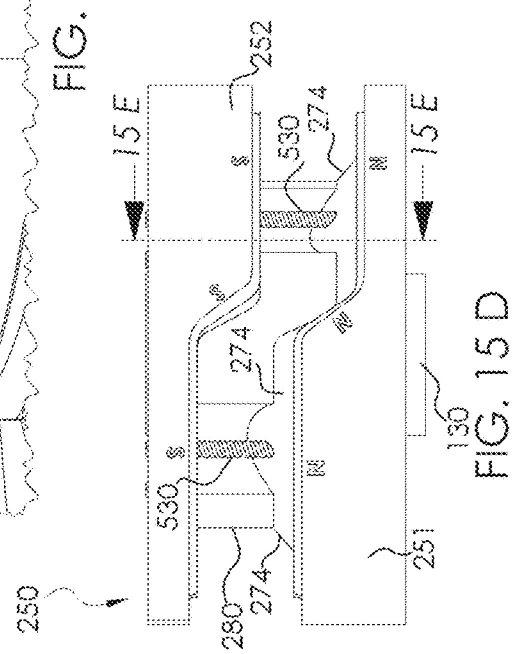

10.2 Self-Aligning Track Hub Assembly—FIG. 15B

Referring now to FIG. 15B-FIG. 15E and still referring to FIG. 15A, in various embodiments that include a track assembly fixed to the hub carrier 130, such as magnetic cam track assembly 250, lubricant filled cam track assembly 300, or triple cam track assembly 460, such assemblies are operably coupled to a splined hub 280 which is fixedly attached to the hub carrier 130. In various embodiments, each split track assembly, irrespective of type, includes a male conical mating surface 274 on one of the track sections (fixed or movable) and a female conical mating surface 272 on the other track section (movable or fixed) that faces and mates with surface 274. When the motorized ball-screws 530, or other linear actuators, move the track section with the female conical mating surface 272 toward the male conical mating surface 274, the cam track sections will self-align, relying in part upon the mating male and female frustoconical surfaces of the splined hub 280 for its continually aligned path of travel, thereby assuring a uniformly mated and aligned split track assembly, e.g., magnetic cam track assembly 250 lubricant filled cam track assembly 300, or triple cam track assembly 460 as the case may be.

Figure 15F:
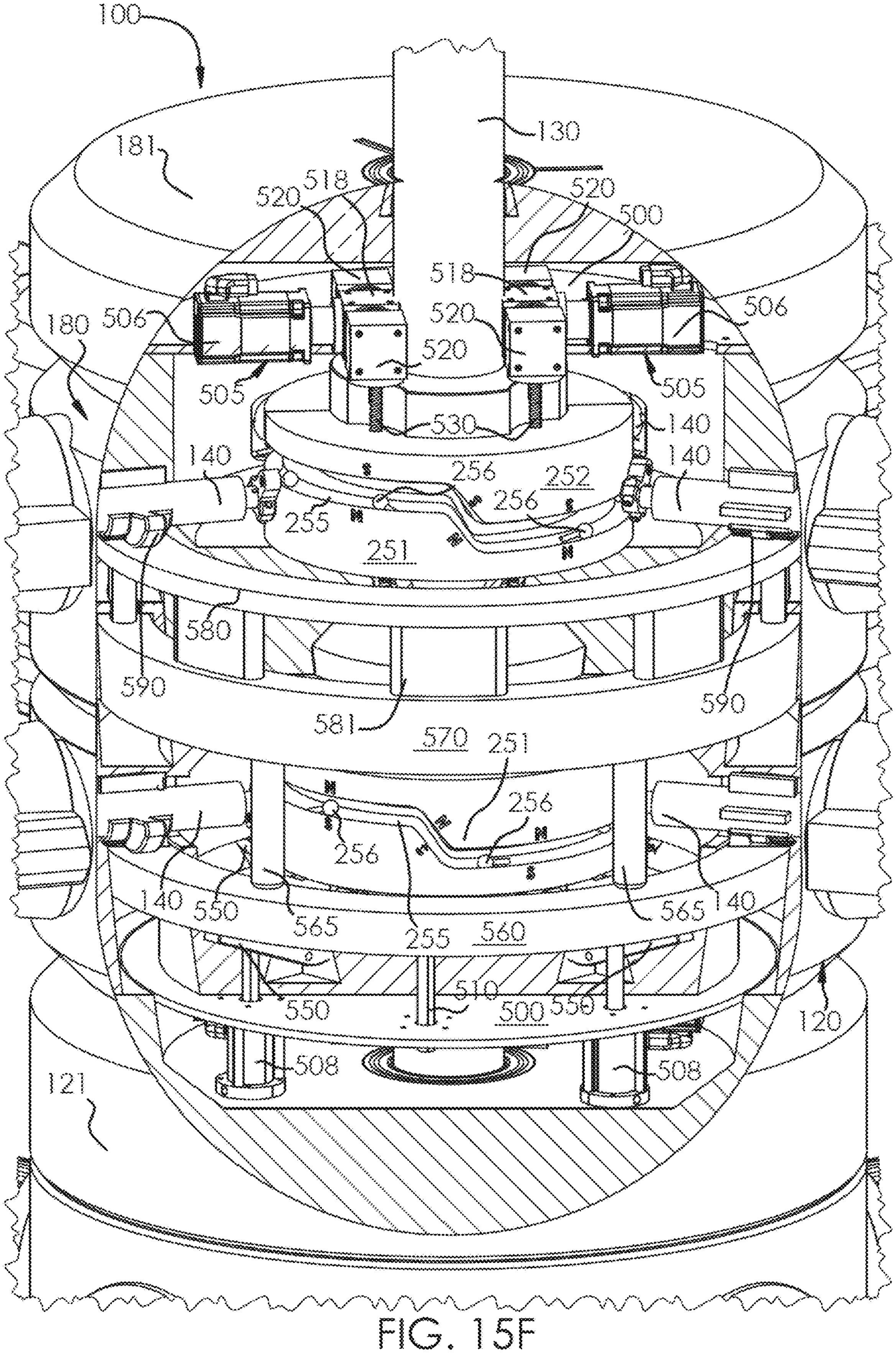
Figure 15:
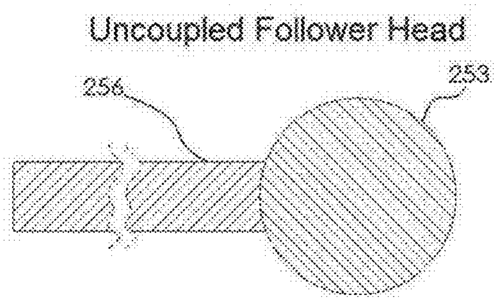
Figure 15:
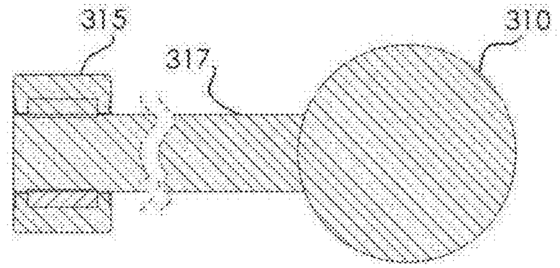
Figure 15:
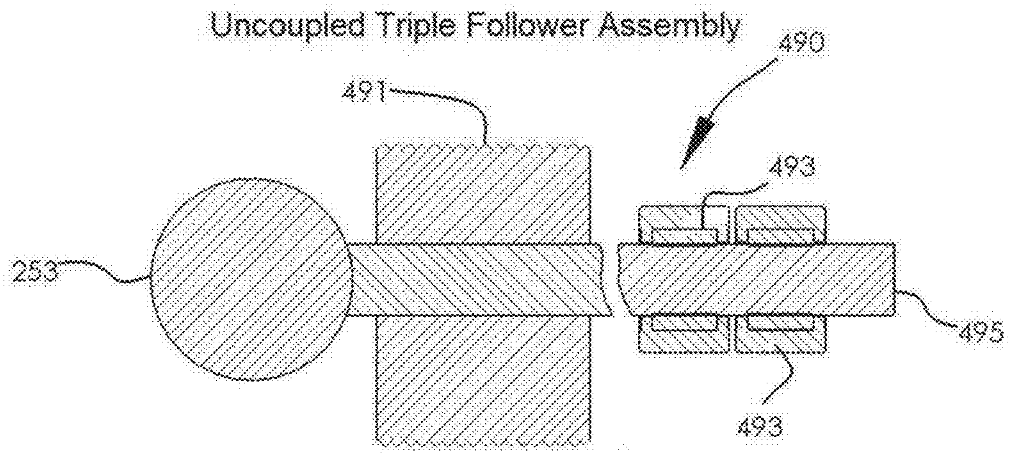
Figure 15:
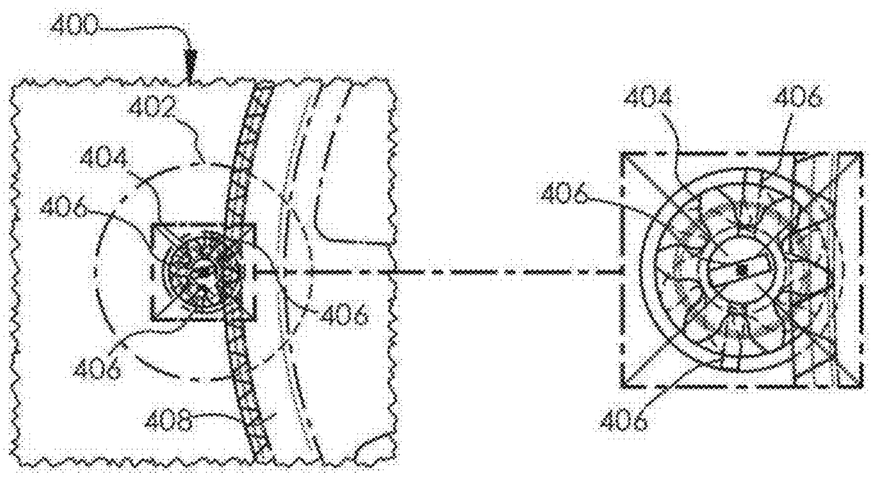

10.3 Redundant Active Modes 1-3—FIG. 15F

Referring now to FIG. 15F and still referring to and FIG. 15A, in an embodiment when one or more computer-controlled sensors, for example, a proximity sensor, detect an incomplete AOS operation, e.g. partial or failed cam track separation, one or more backup systems comprised of redundant actuator groups may be activated whereby all ECPs 10 will be rotated to their slipstream orientations. Rotation of the ECPs will occur irrespective of the ECP's 10 angular position about the longitudinal axis of the hub carrier 130 and regardless of articulation control system embodiment, including without limitation (i) magnetic cam track assembly 250, (ii) lubricated cam track assembly 300, (iii) triple cam track assembly 460 or (iv) ring and pinion positions, with respect to articulation via motorized articulation control assembly 400.

Each actuator group may be supported on an actuator plate 500, which may comprise a circular plate arranged coaxially with, oriented radially to, and rotationally fixed to the hub carrier 130. Accordingly, the actuator plate 500 may act as an extension of the hub carrier and move with the hub carrier when the hub carrier is rotated about its longitudinal axis by hub orientation control system. Actuator groups may be comprised of multiple actuator types, including without limitation, pneumatic 508, pyrotechnic 510, hydraulic and electronic solenoid actuators, each capable of extending an integral actuator element, such as a piston, when activated.

When activated, each actuator of a backup actuator group, such as one comprising pneumatic actuators 508 and/or pyrotechnic actuators 510, will simultaneously extend its respective actuator piston toward the primary articulation control ring 560, and function as a backup to, and replacement for, the rocker arms 550 that failed to operate or fully operate as a result of a failed split-track operation. In an embodiment, the extent of axial movement of the primary articulation control ring 560 caused by the actuator group is equal or substantially equal to the movement of primary articulation control ring 560 caused by rocker arms 500, and primary articulation control ring 560 thereafter actuates secondary articulation control ring 570 and the tertiary control ring 580, as described above. Consequently, during any redundant AOS mode one or more sacrificial parts will break or become de-coupled as further described in Section 10.4.

It should be appreciated that the AOS functions described herein operate on any ECP 10 type, including without limitation, nesting-ECPs 20 as described in Section 13.3.

10.4 Sacrificial Parts FIGS. 15D-15J

Referring now to FIGS. 15D-15J, FIG. 9A, FIG. 9B, FIG. 10, FIG. 12A and FIG. 14, when any redundant AOS mode is activated (e.g., due to failure of the sections of the cam track assembly to fully separate and thereby decouple the ECP shaft 140 articulation control system), sacrificial components of the articulation control system will systematically fail to decouple the articulation control system from the ECP shaft 140. The redundant backup actuator systems are designed to prevent catastrophic damage to the KFECS 100 from one or more ECPs 10, or any other ECP embodiments, including but not limited to all ECPs 20 as described in Section 13, being in an orientation that exceeds design specifications, for example, exceeding the fluid speed for which a particular KFECS 100 is rated. One or more redundant backup actuator systems may be triggered when the AOS detects a failed ball screw assembly 505 operation or motorized articulation control assembly 400 failure. The redundant backup actuator systems incorporate follower assemblies having sacrificial shafts 256 for an embodiment with a track follower assembly 254, such as magnetic cam track assembly 250 (or sacrificial shaft 495 for triple cam track 460 (see FIG. 12D and FIG. 15I) or sacrificial shafts 317 for an embodiment with a lubricant filled cam track assembly 300 (see FIG. 10). For a motor-driven articulation 400, a sacrificial shear pin 406 connects each pinion 404 to the shaft of its corresponding motor 402 (see FIG. 15J). In the event of a failed cam track separation operation, as a redundant backup system causes the primary articulation control ring 560 to move through its length of travel, any sacrificial shaft 256, sacrificial shaft 317 or sacrificial shaft 495 that is not in its slipstream orientation will be sacrificed and broken to decouple the associated follower assembly from the track and permit all ECPs 10 to be articulated into their slipstream orientations. The sacrificial parts allow all cams 590 to be moved into, or remain in, their slipstream positions irrespective of the failed cam track separation operation. In an embodiment with motorized articulation control, in the event of a failed motorized articulation to a slipstream orientation, the shear pin 406 will be sacrificed and broken to decouple each ring gear 408 and associated ECP shaft 140 from the motor(s) 402, thereby allowing all ECPs 10 to be moved to or remain in, their slipstream orientation irrespective of the orientation of the motorized ECP shaft 140 orientation.

11. Computer Controlled Functions and Sub-Systems FIG. 16.

Figure 16:
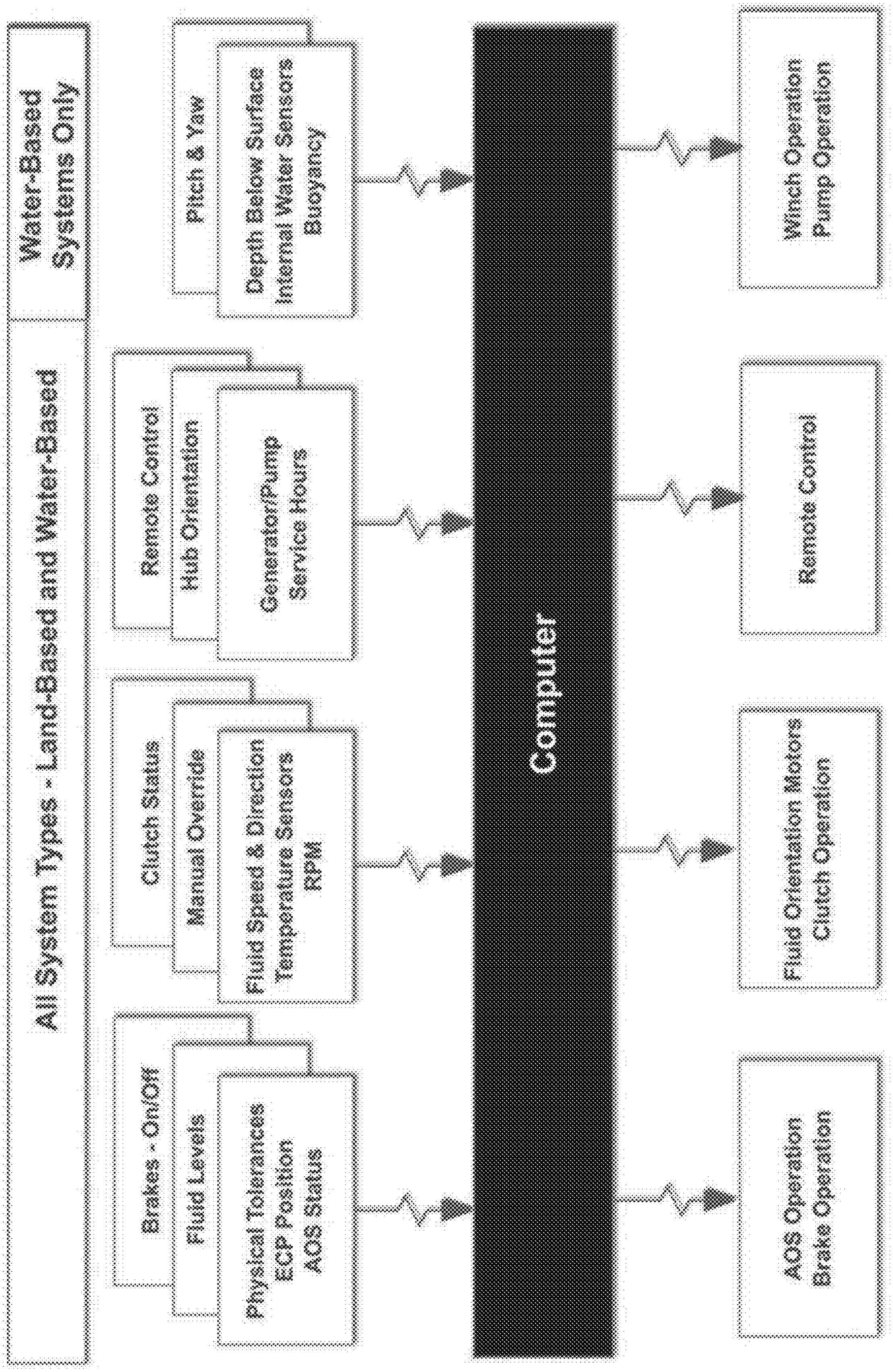
FIG. 16 is schematic of computerized functions' inputs from the KFECS and remote operations, and computer outputs that control the AOS, clutches, brakes, hub orientation motors and water-based KFECS buoyancy and depth operations.

Referring now to FIG. 16, in various embodiments, the KFECS 100 embodies redundant failsafe systems, which may be monitored and controlled by an onboard or remote computer and which may be protected by one or more uninterruptible power supplies. In a computer-controlled failsafe system, a computer may receive inputs from sensors that monitor conditions internal and external to the KFECS 100. Sensor-monitored conditions include, but are not limited to, fluid speed and direction, internal clearances between mechanical components, temperatures internal and external to the KFECS 100, revolutions per minute of any rotating shaft, fluid levels, lubricant levels, brake states (brakes on or off), and clutch/gearbox/electrical generator/pump assembly service hours.

Using inputs from the sensors, the computer controls numerous KFECS 100 functions, irrespective if it is a land-based KFECS 100 or water-based KFECS 100, including without limitation, the KFECS's 100 orientation to the fluid flow, the ECP's working and slipstream orientations during AOS operations and motorized articulation control, braking operations of the KFECS 100, and equalizing the time that each clutch/gearbox/electrical generator/pump assembly is engaged and converting mechanical energy to electricity, a compressed gas, or pressurized fluid.

In various embodiments, computer monitored conditions and operations that are exclusive to KFECS 100 water-based installations include but are not limited the KFECS' 100 yaw, pitch, and depth relative to the water surface. Using these inputs, the computer controls numerous functions, as further described below.

12. Orientation Control and Conversion Unit—FIG. 17A-FIG. 17D 12.1 Hub Orientation Control Referring now to FIG. 17A-FIG. 17D, in an embodiment, a hub orientation control system comprises one or more computer-controlled hub orientation control motors 710 engaged with the orientation gear 700 coaxially mounted to the hub carrier 130 and supported by a superstructure 900 located at or near the ground, or ground-based structure, as the case may be, for a vertical axis land-based KFECS 100.

Exemplary hub orientation motor locations on other KFECS 100 embodiments are shown in FIG. 22A-FIG. 22D, FIG. 23C, FIG. 23D and FIG. 24A. As shown in FIG. 17A, FIG. 17B and FIG. 17D, hub orientation control motors 710 may be mounted to or carried by a plate 902 within a hub orientation motor housing 750, or a functional equivalent, which is supported by the superstructure 900, or a functional equivalent, including without limitation a (i) turn table style base assembly 908 (see FIGS. 22A and 22C), (ii) superstructure 960 (see FIGS. 23C and 23D) and (iii) superstructure 972 (see FIGS. 24A and 24B).

The computer receives input from any number of sensors and sources, including without limitation a fluid direction and speed sensor 810 (see FIG. 1A), and causes the hub orientation control motors 710 to turn associated pinions 720, which turn the orientation gear 700, or other gears in other embodiments described in Section 14, thereby rotating the KFECS 100 to its optimal orientation relative to the oncoming fluid flow, or any other position, as directed by the computer. Suitable flow direction and speed indicator sensors are known in the art.

12.2 Brakes—FIG. 17A

Still referring to FIG. 17A, one or more computer-controlled brake assemblies 760 are mounted within a clutch/gearbox/brake housing 730 supported by the superstructure 900 and, when actuated, are operably coupled with one or more brake discs 770. The brake assemblies 760, may comprise calipers that, when actuated, create resistance between their respective pads and the brake disc 770, which is connected or otherwise operably linked to the hub 120, or hub 180 in some embodiments, thereby stopping the rotations of all hubs 120 and hub 180 about the longitudinal axis of the hub carrier 130.

12.3 Mechanical Energy Transfer to Gearbox/Electrical Generator/Pump Assemblies—FIG. 5A Referring to FIGS. 5A-5C and FIG. 6A, mechanical energy is transferred from the hub 120, to the operably linked bevel gear 600 (coupled, e.g., to hub end 121), to the operably coupled pinion gear 610, to the operably linked clutch/gearbox/electrical generator/pump assembly 620. Other embodiments of the KFECS 100 may transfer mechanical energy to the one or more respective operably linked clutch/gearbox/electrical generator/pump assembly 620 using additional components. For example, referring now to FIG. 22A and FIG. 22 B, a land-based KFECS 100 with the longitudinal axis of the hub carrier 130 that is approximately parallel to the land, or land-based structure upon which it fixedly attached, one or more ring gears 602 and hub extensions 122 (see FIG. 22A) are used to transfer mechanical energy from the hub 120 and/or hub 180 and their respective extensions, for example hub end 121, to one or more operably coupled pinions 621 and operably linked clutch/gearbox/electrical generator/pump assemblies 620.

Figure 22:
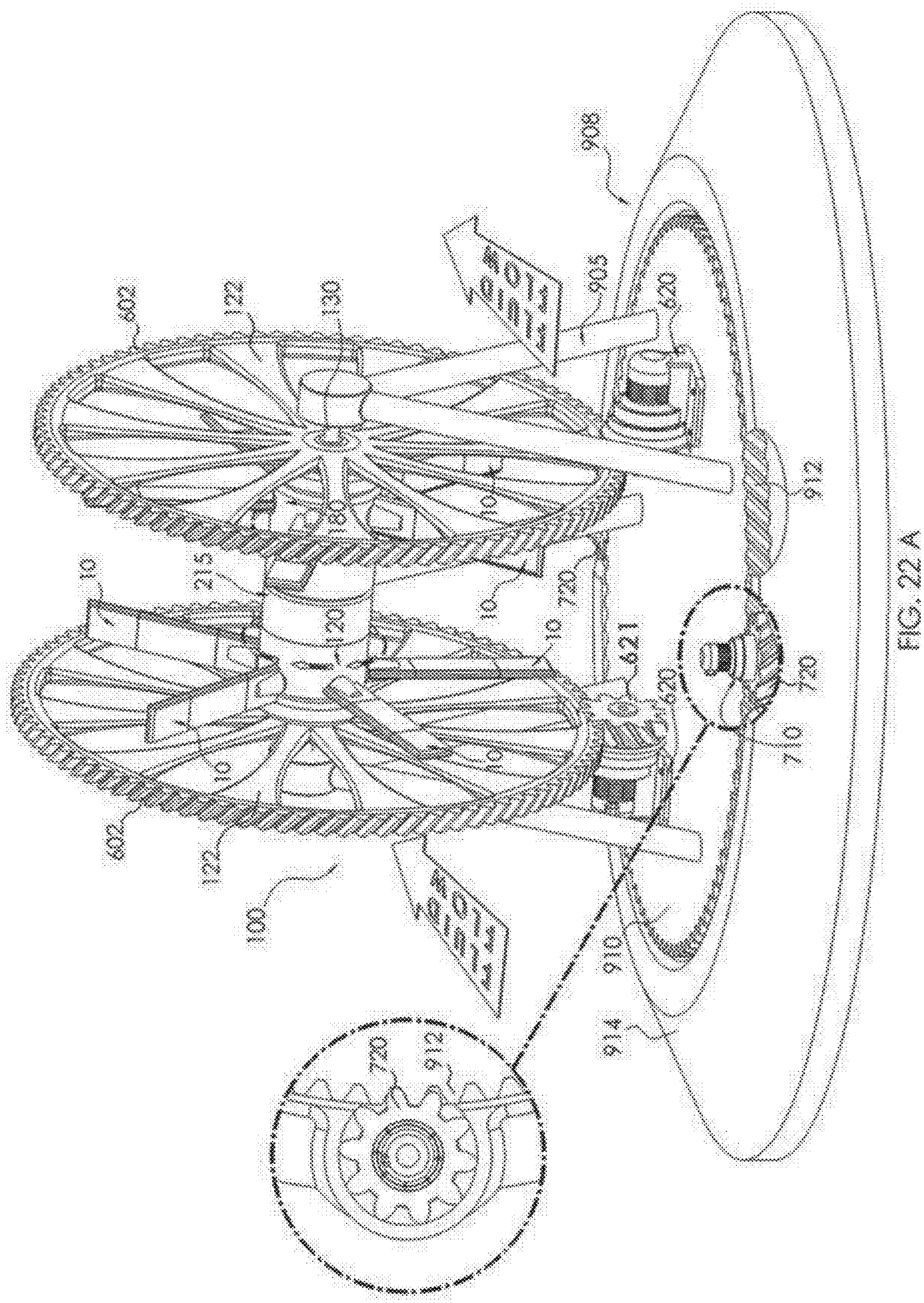
FIG. 22A is an isometric view of a KFECS superstructure used for a land-based application with the longitudinal axis of the hub carrier parallel to the land, or land-based structure, upon which it is operably supported.
FIG. 22B is a front view of a KFECS superstructure used for a land-based application with the longitudinal axis of the hub carrier parallel to the land, or land-based structure, upon which it is operably supported.
FIG. 22C is an isometric view of an alternate embodiment of a KFECS superstructure, for a land-based application with the longitudinal axis of the hub carrier parallel to the land, or land-based structure, upon which it is operably supported.
FIG. 22D is a front view of the KFECS superstructure of FIG. 22C.
Figure 22:
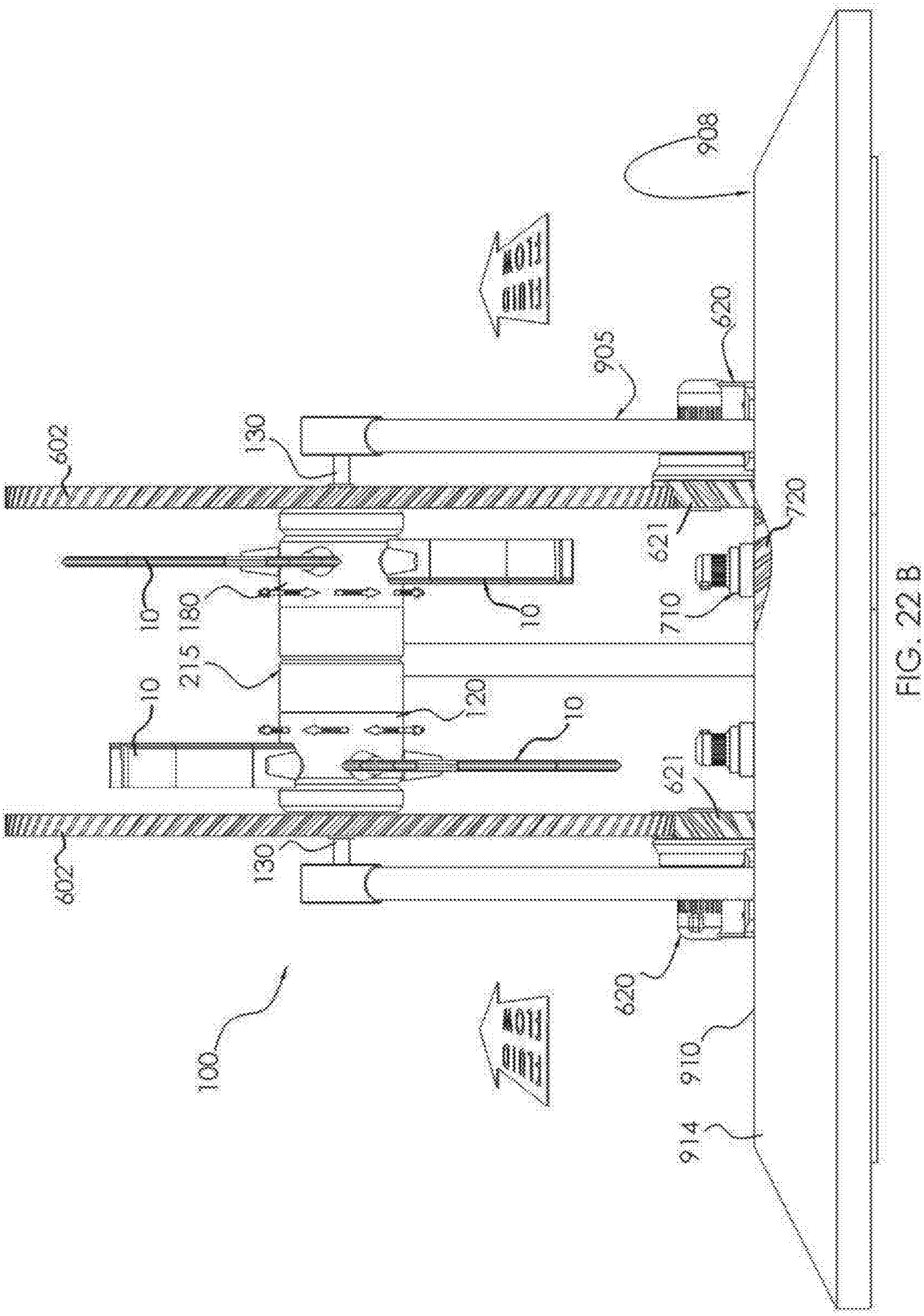
Figure 22:
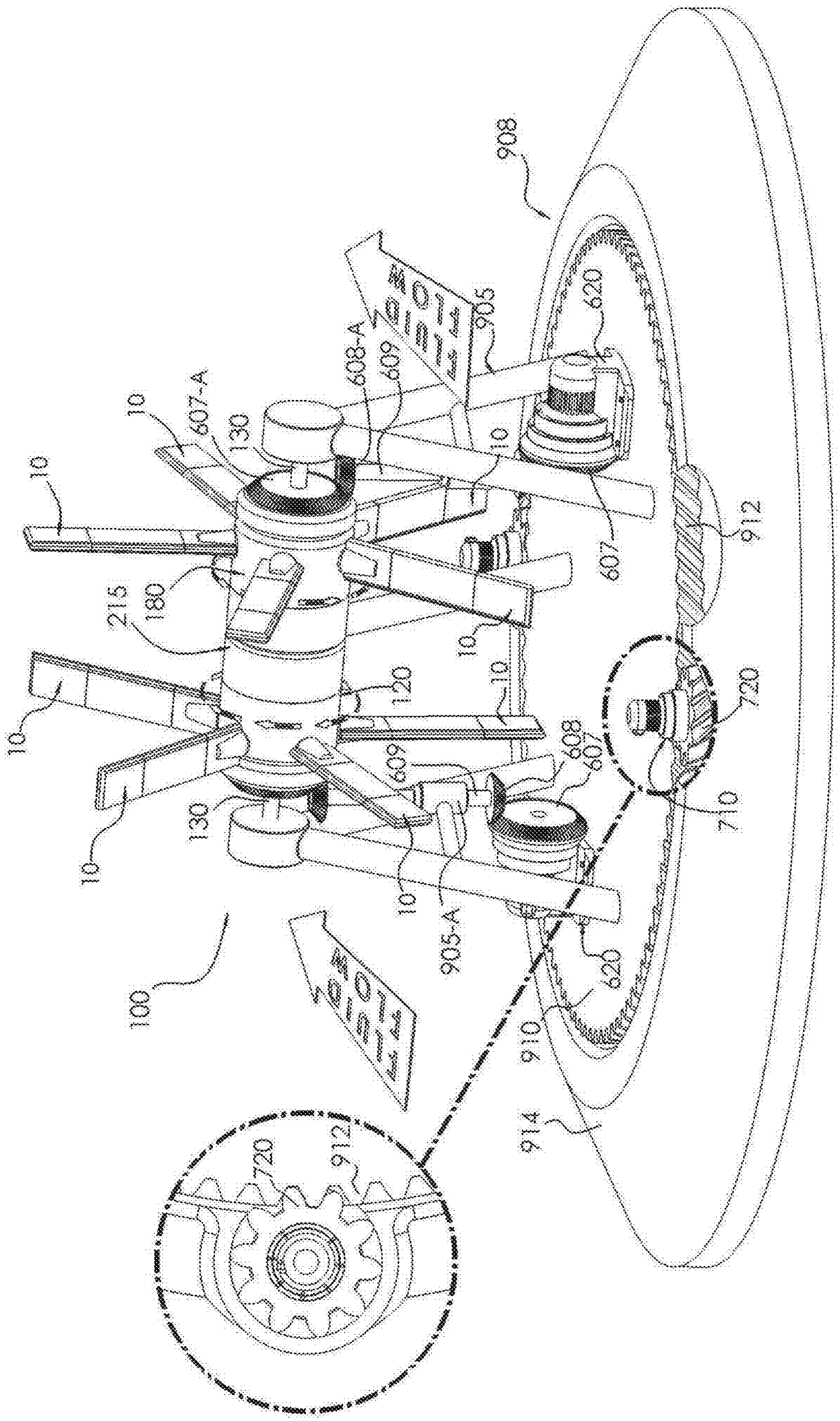
Figure 22:
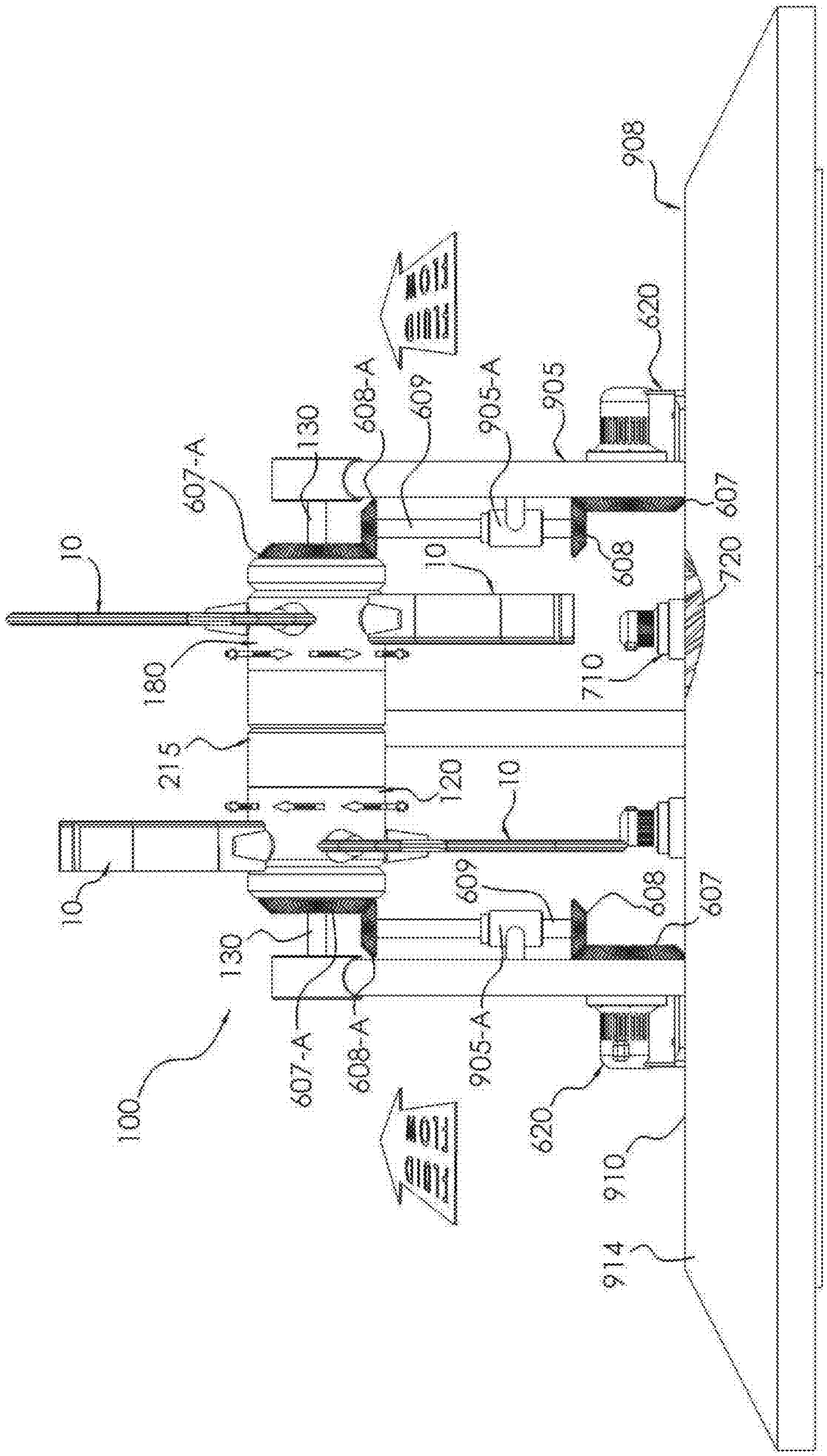
Figure 23:
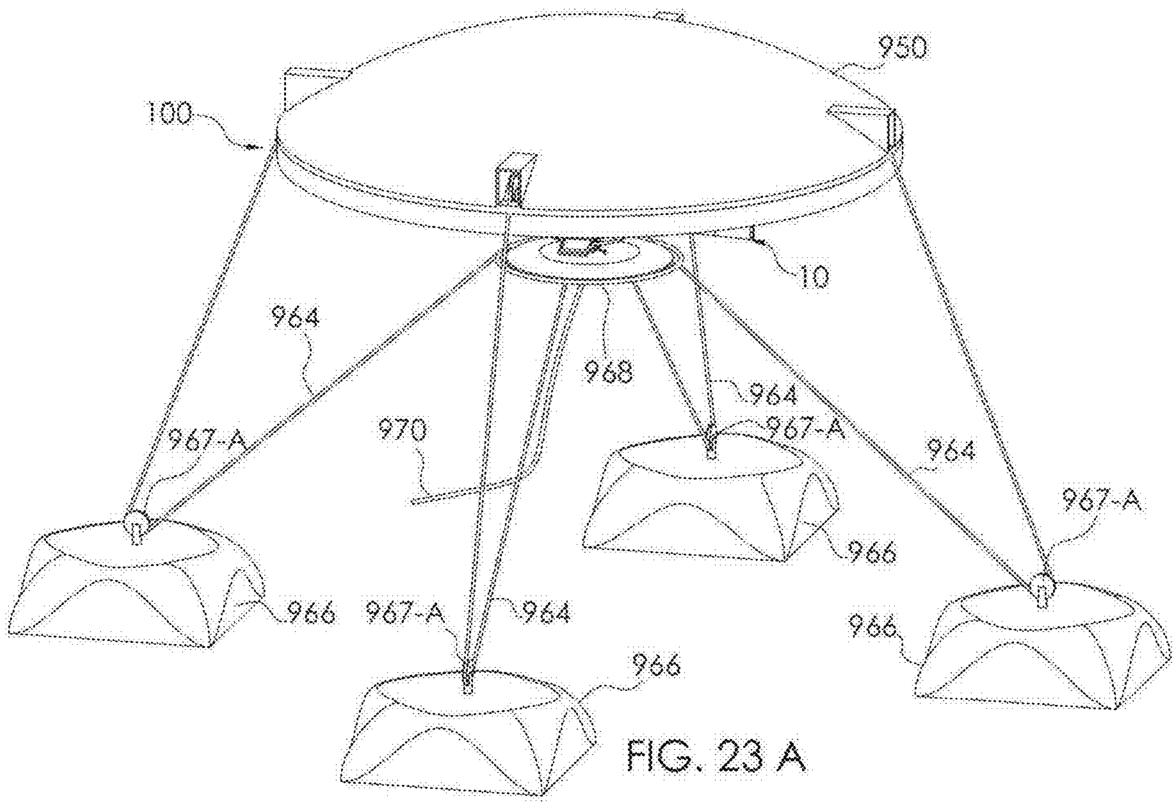
FIG. 23A is a top isometric view of an embodiment of a KFECS superstructure used for a water-based application with the longitudinal axis of the hub carrier oriented perpendicularly to the surface of the water within which the KFECS is tethered to the underwater bottom.
FIG. 23B is a bottom isometric view of an embodiment of a KFECS superstructure of FIG. 23A.
FIG. 23C is an isometric view, partially in cross-section, of an embodiment of a KFECS superstructure used for a water-based application with the longitudinal axis of the hub carrier oriented perpendicularly to the surface of the water within which the KFECS is tethered to the underwater bottom.
FIG. 23D is a cropped side view, partially in cross-section, of a KFECS superstructure used for a water-based application with the longitudinal axis of the hub carrier oriented perpendicularly to the water's surface, revealing the drive components operatively coupled to the clutch/gearbox/electrical generator and/or pump assemblies.
Figure 23:
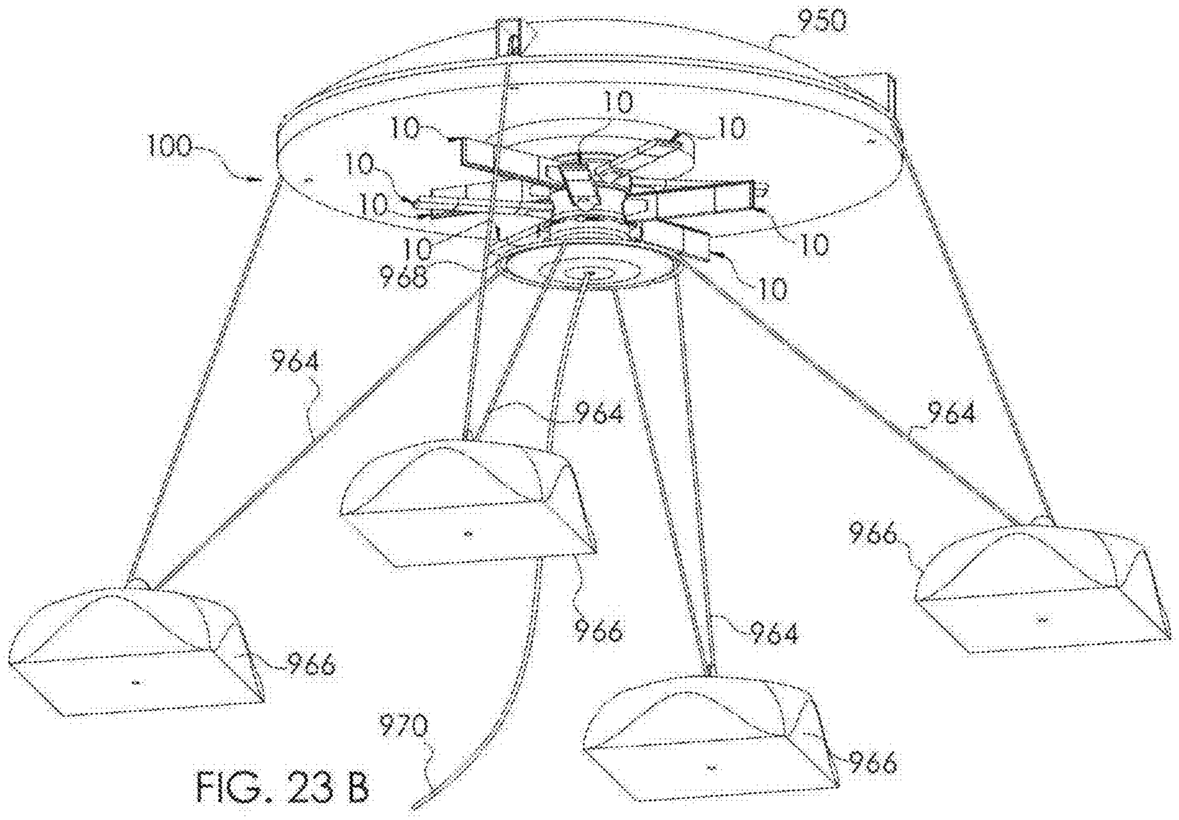
Figure 23:
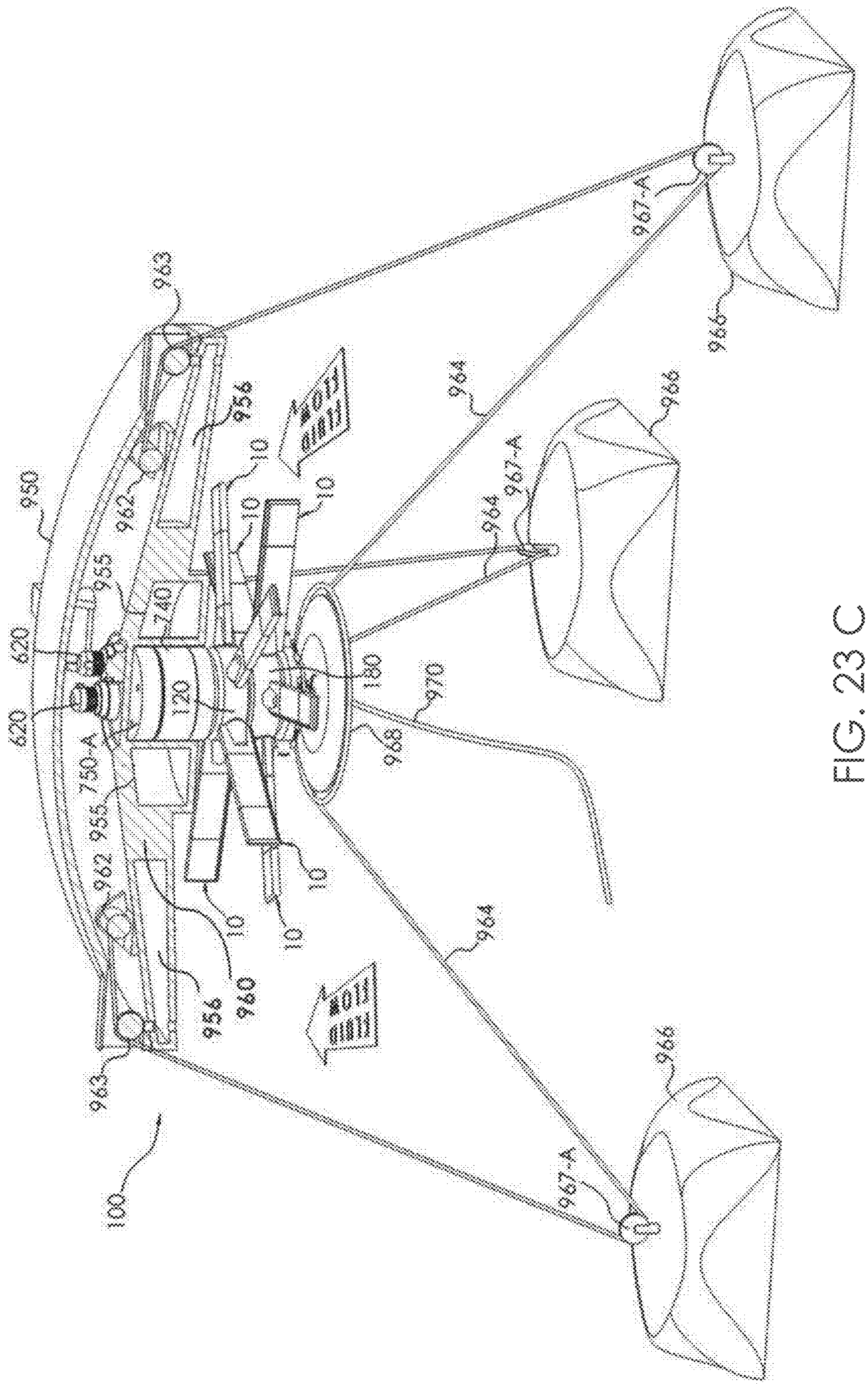
Figure 23:
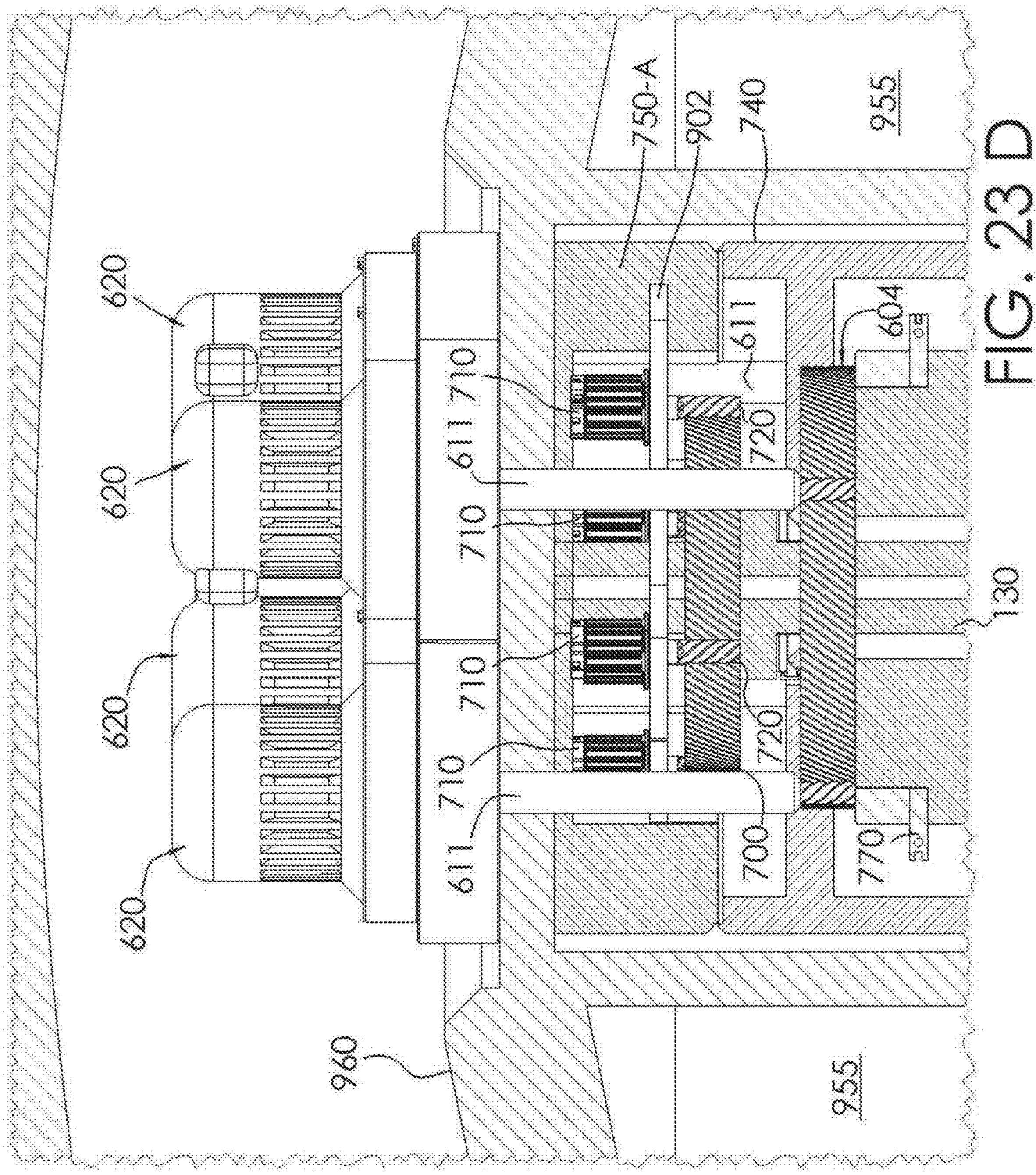

Referring now to FIG. 22 C and FIG. 22D, another embodiment for a land-based KFECS 100 with the longitudinal axis of the hub carrier 130 that is approximately parallel to the land, or land-based structure upon which it fixedly attached, provides for the transfer of mechanical energy from hubs 120 and 180 to clutch/gearbox/electrical generator/pump assemblies 620 through one or more operably coupled driveshaft and gear sets as described in Section 14.2.

FIG. 23C shows a water-based KFECS 100 with a longitudinal axis of the hub carrier 130 (see also 131 on FIG. 1A) that is transverse to (e.g., generally perpendicular to) the surface of the water in which the KFECS 100 is tethered to the bottom or otherwise submerged below the surface of the body of water, and which includes a gearbox/brake housing 740. As shown in FIG. 23D, gearbox/brake housing 740 enables the clutch/gearbox/electrical generator/pump assembly 620 to be oriented with its longitudinal axis co-planer to the vertical axis of the hub carrier 130 (vertical position), whereby it can more easily located above the water surface, all as more fully described in Section 14.3.

Figure 24:
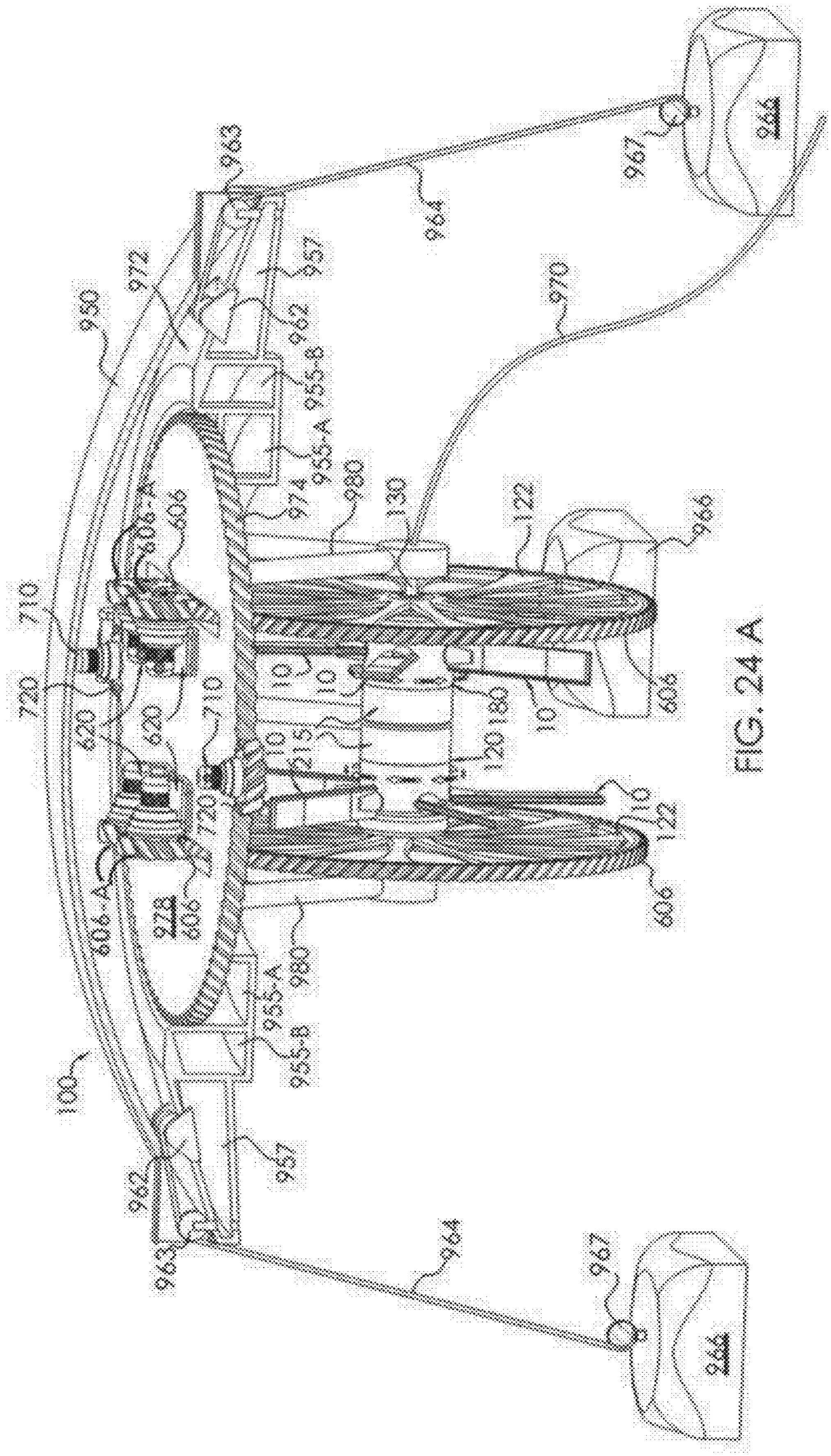
FIG. 24A is an isometric view of a KFECS superstructure used for a water-based application with the longitudinal axis of the hub carrier is parallel to the water's surface within which the KFECS is tethered to the underwater bottom.
FIG. 24B is a front view of a KFECS superstructure used for a water-based application with the longitudinal axis of the hub carrier is parallel to the water's surface within which the KFECS is tethered to the underwater bottom.
Figure 24:
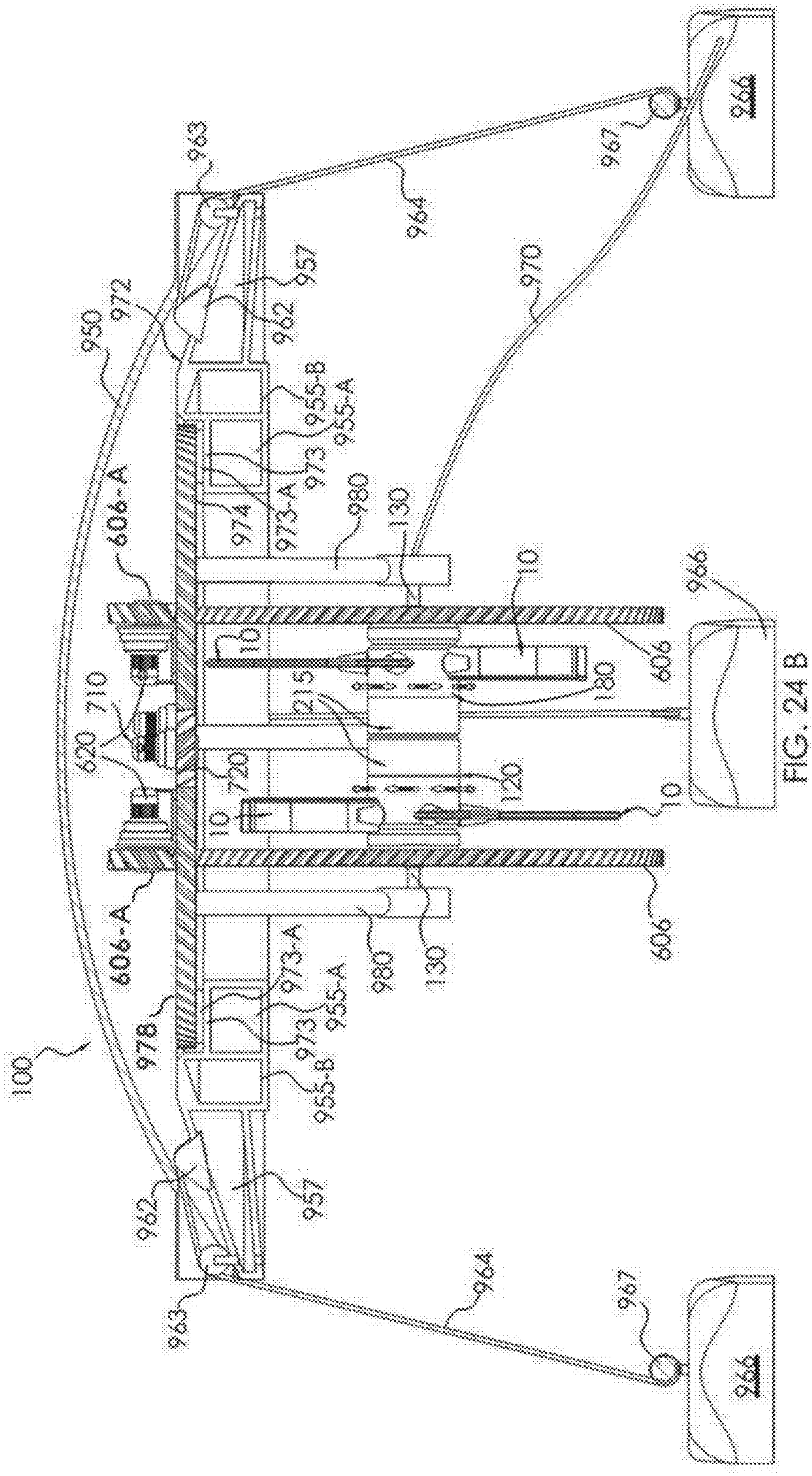

FIG. 24A shows a water-based KFECS 100 with the longitudinal axis of the hub carrier 130 that is approximately parallel to surface of the water in which the KFECS 100 is tethered to the bottom or otherwise submerged beneath the surface of the body of water. One or more hub extensions 122 supporting ring gears 606 that are rotationally coupled to the hubs 120 and 180 are used to transfer mechanical energy from hub 120 and/or hub 180 to one or more operably coupled clutch/gearbox/electrical generator/pump assemblies 620, all as more fully described in Section 14.4.

13. Energy Conversion Plates—FIG. 18A-FIG. 18F and FIG. 19A-FIG. 19F 13.1. General Referring now to FIG. 18A-18F, FIG. 19A-19F and still referring to FIG. 1A, the ECP 10 and nesting ECP 20 include leading edges that are designed to reduce drag coefficient for all leading surfaces that are oriented toward oncoming fluid flow. The term "leading" means the forward most edge of an ECP 10 and nesting ECP 20 that is nearest to, or first to encounter, an oncoming fluid flow. All leading edges, irrespective of the embodiment, may be tapered or beveled. Each ECP 10 has a leading edge 14, a trailing edge 18, and opposed, planar surfaces 19-A and 19-B (see FIGS. 18A, B, D-F), extending between the leading and trailing edges 14, 18, and which planer surface 19-A defines the fluid impingement surface when the ECP 10 is in its working mode orientation. Each ECP 20 has a leading edge 24, a trailing edge 29, and opposed, planar surfaces 33 and 34 (see FIGS. 19A, 19C-19F), extending between the leading and trailing edges 24, 29, and which planer surface 33 defines the fluid impingement surface when the ECP 20 is in its working mode orientation.

In the embodiments shown, each ECP 10 leading horizontal (X coordinate) edge 14, and the leading vertical (Y coordinate) edge 15 may be tapered or beveled. Similarly, each ECP 20 leading horizontal (X coordinate) edge 24, and the leading vertical (Y coordinate) edge 29 may be tapered or beveled. Each ECP 10 and nesting ECP 20 may also be comprised of one or more sections, each connected to its adjacent section(s). The non-nesting ECP 10 may include an inboard section 11, an extension section 12, and an outboard section 13, each of which, may include on or more integral air chambers 16, that when used in a water-based KFECS 100 may be used to obtain a neutral buoyancy for the ECP 10, thereby reducing the radial load on the ECP 10 and operably coupled and fixedly linked components. All ECP sections, when assembled, act as a single ECP 10 or nesting ECP 20 as described in Section 13.3. The design of the ECP 10 and nesting ECP 20, including without limitation, its aspect ratio (width to height), number of sections used to comprise it, and surface finish, are within a designer's choice for satisfying performance and installation requirements. It should be appreciated that the aspect ratios are only constrained by the overall size of the KFECS 100, the dimensions of its hubs 120 and 180, and material's properties. It should also be appreciated that any ECP 10 referenced within Sections 1-12 could be replaced by a nesting ECP 20.

13.2. Non-Nesting Energy Conversion Plate—FIG. 18A and FIG. 18D

Figures 18A, 18B, 18C:
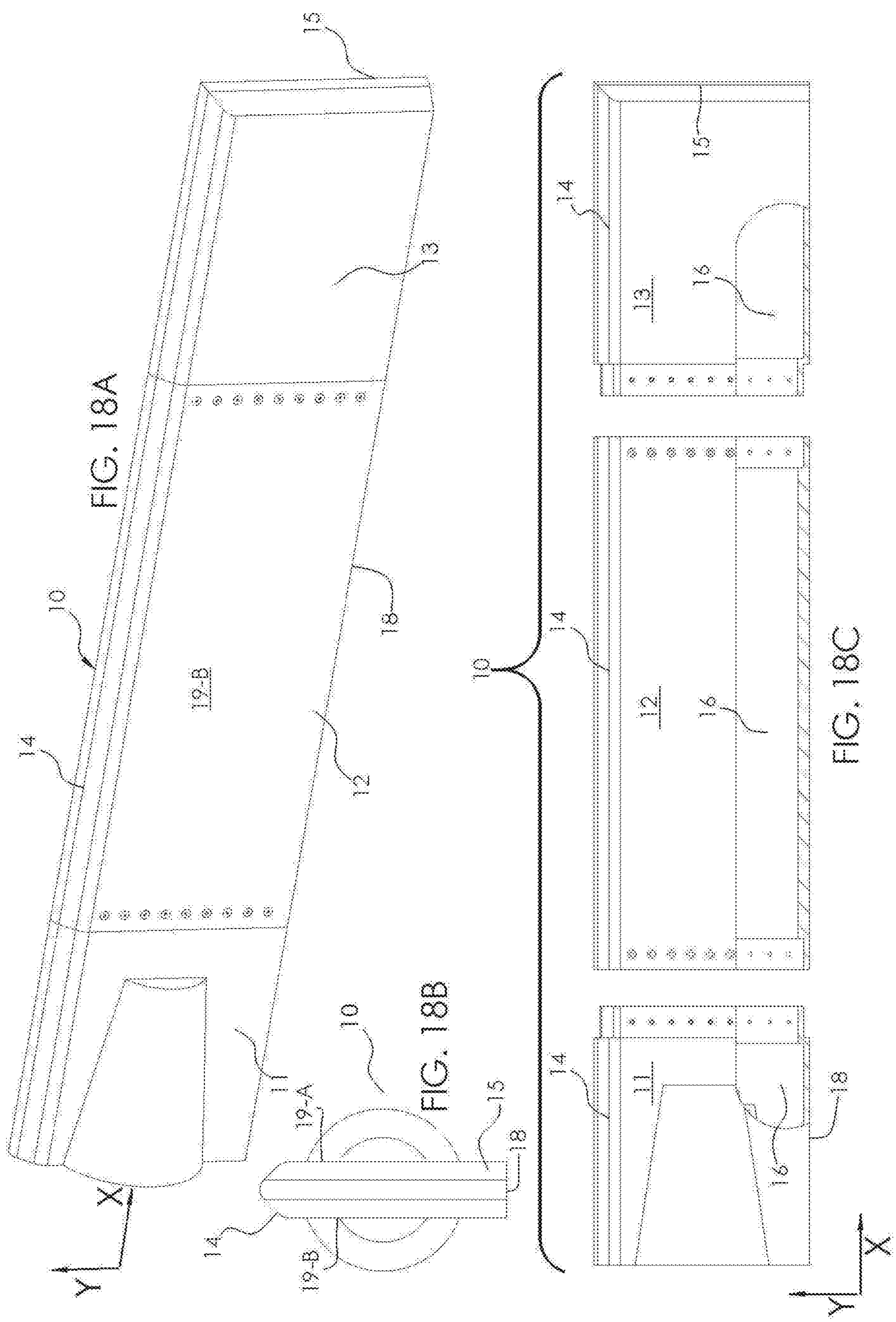
FIG. 18A is an isometric view of the rear side a non-nesting ECP in a working orientation.
FIG. 18B is an end view of a non-nesting ECP in a working orientation.
FIG. 18C is an exploded side view of a non-nesting ECP in a working orientation with a broken away section revealing optional internal buoyancy chambers.
Figure 18D:
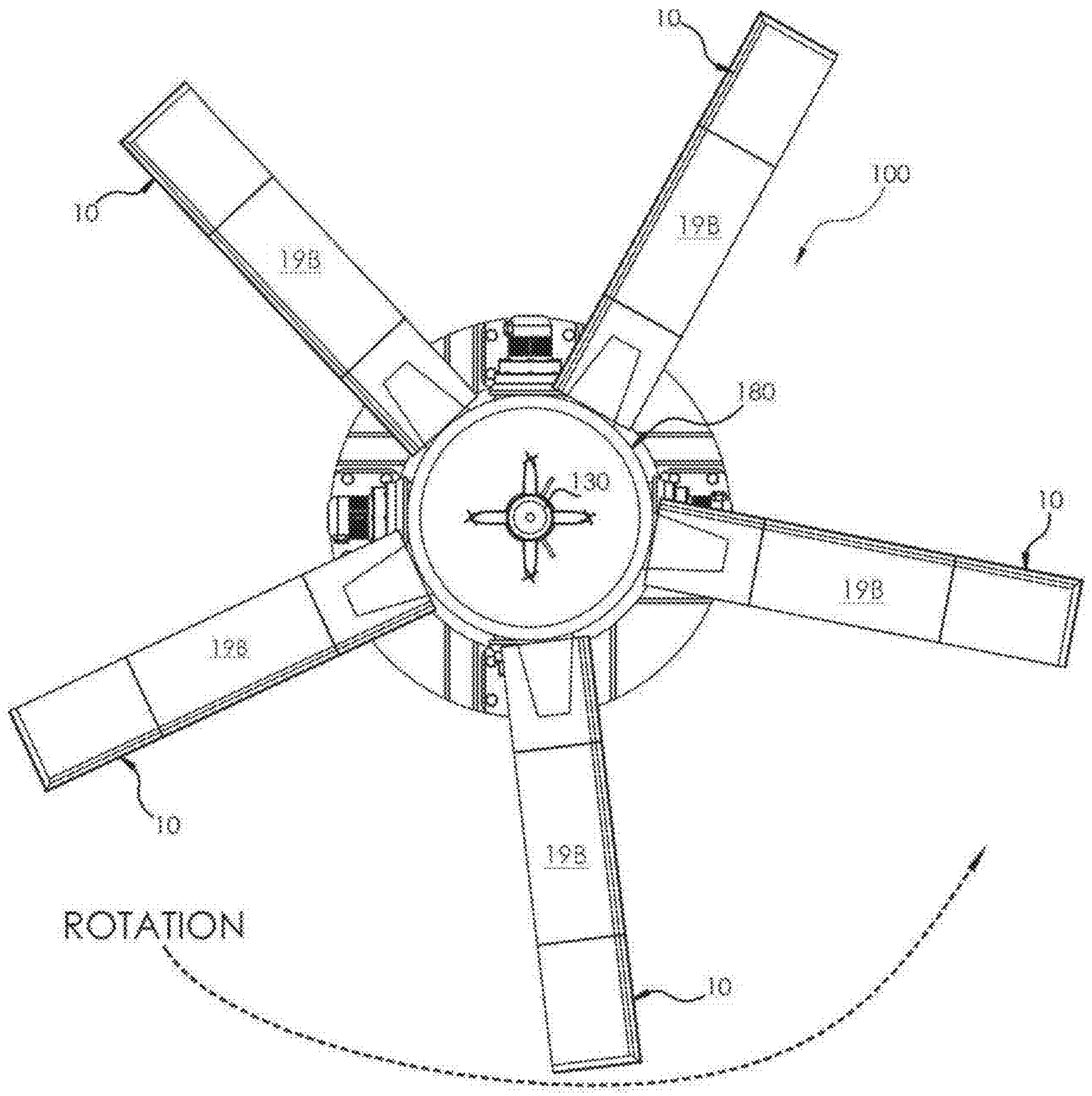
FIG. 18D is a top plan view of a single hub with 5 ECPs, each with a rectangular configuration, with each ECP simultaneously in its slipstream orientation.
Figure 18E:
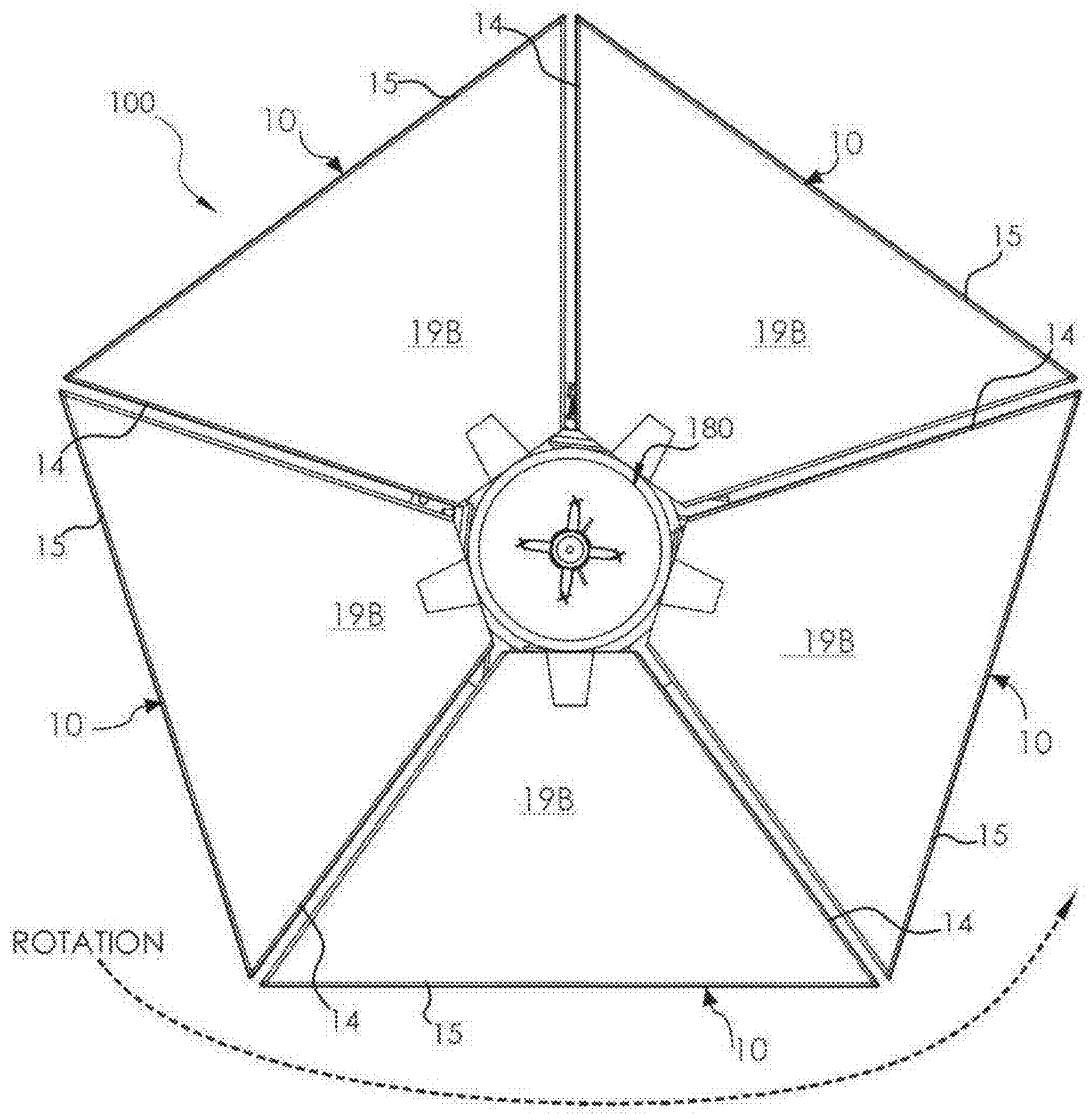
FIG. 18E is a top plan view of a single hub with 5 ECPs, each with a trapezoidal configuration, with each ECP simultaneously in its slipstream orientation.
Figure 18F:
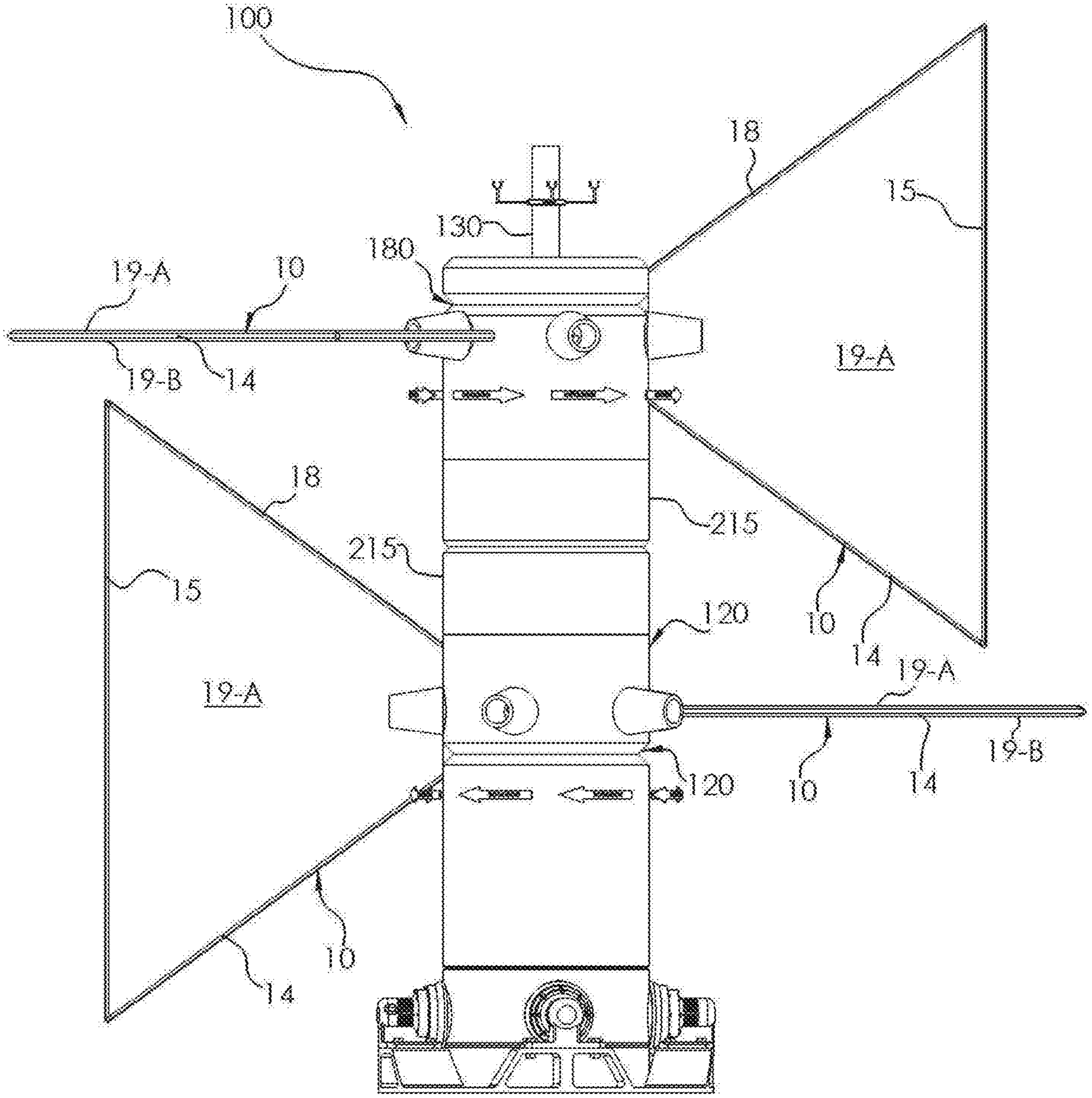
FIG. 18F is a front view of a KFECS embodiment with elongated hubs that accommodate non-nesting ECPs that, while in their working mode, extend past their respective hub's swept area into the adjacent hub's swept area, and an elongated perimeter plate that can accommodate additional superstructure and cowling attaching area.

Still referring to FIG. 18A and FIG. 18D, in one embodiment of a hub 180 comprising multiple ECPs, when all ECPs 10 are simultaneously in a position parallel to the fluid flow (slipstream) as shown, do not contact nor overlap any adjacent ECP 10.

13.3. Nesting Energy Conversion Plate—FIGS. 19A-19D

Figures 19A, 19B, 19C, 19D:
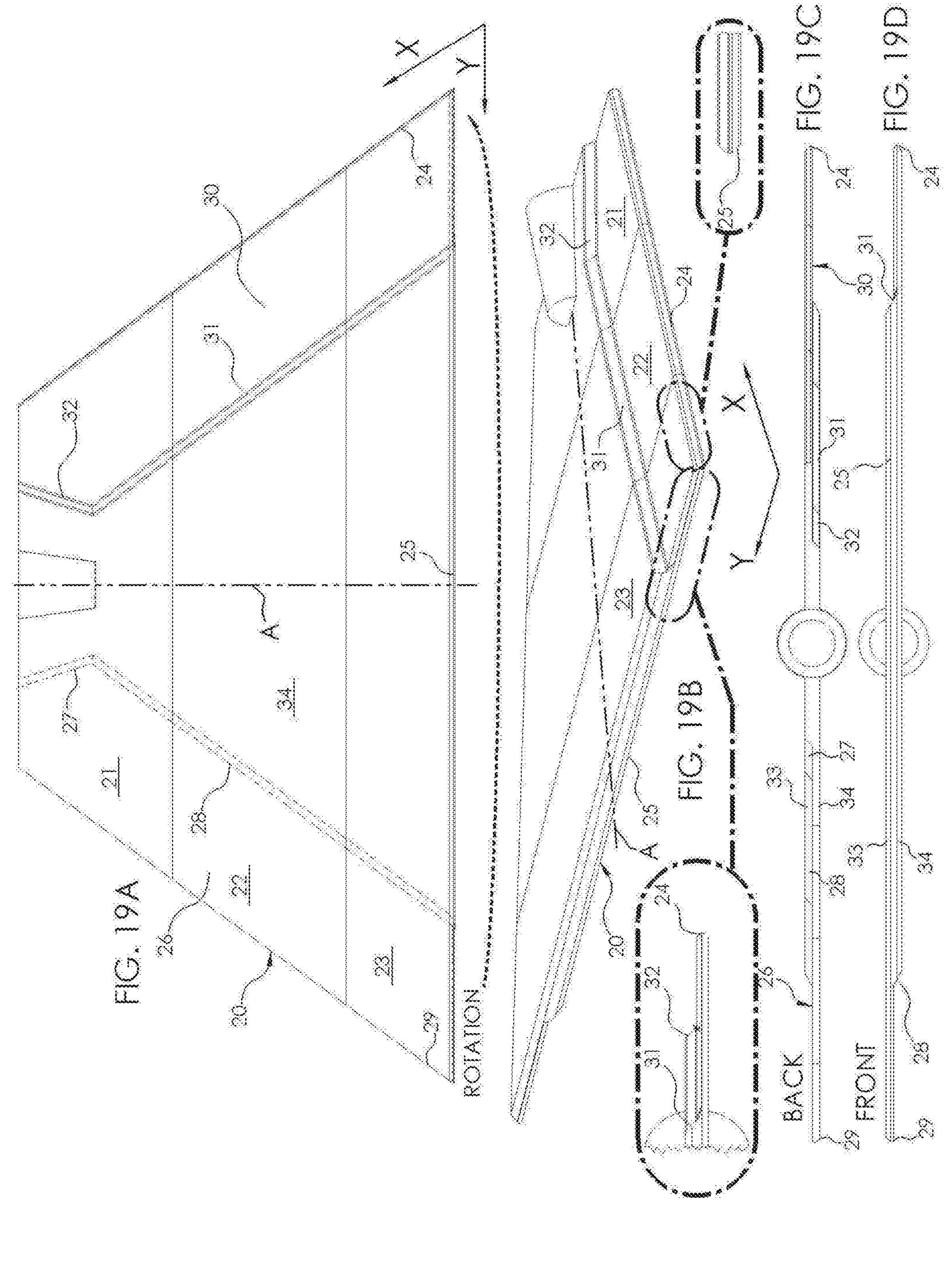
FIG. 19A is a top view of rear side of a nested ECP in its slipstream orientation.
FIG. 19B is an isometric view of the rear side of a nested ECP in its slipstream orientation, with enlarged leading edge details, in its slipstream orientation.
FIG. 19C is a back-side view of a nested ECP in its slipstream orientation.
FIG. 19D is a front-side view of a nested ECP in its slipstream orientation.
Figure 19E:
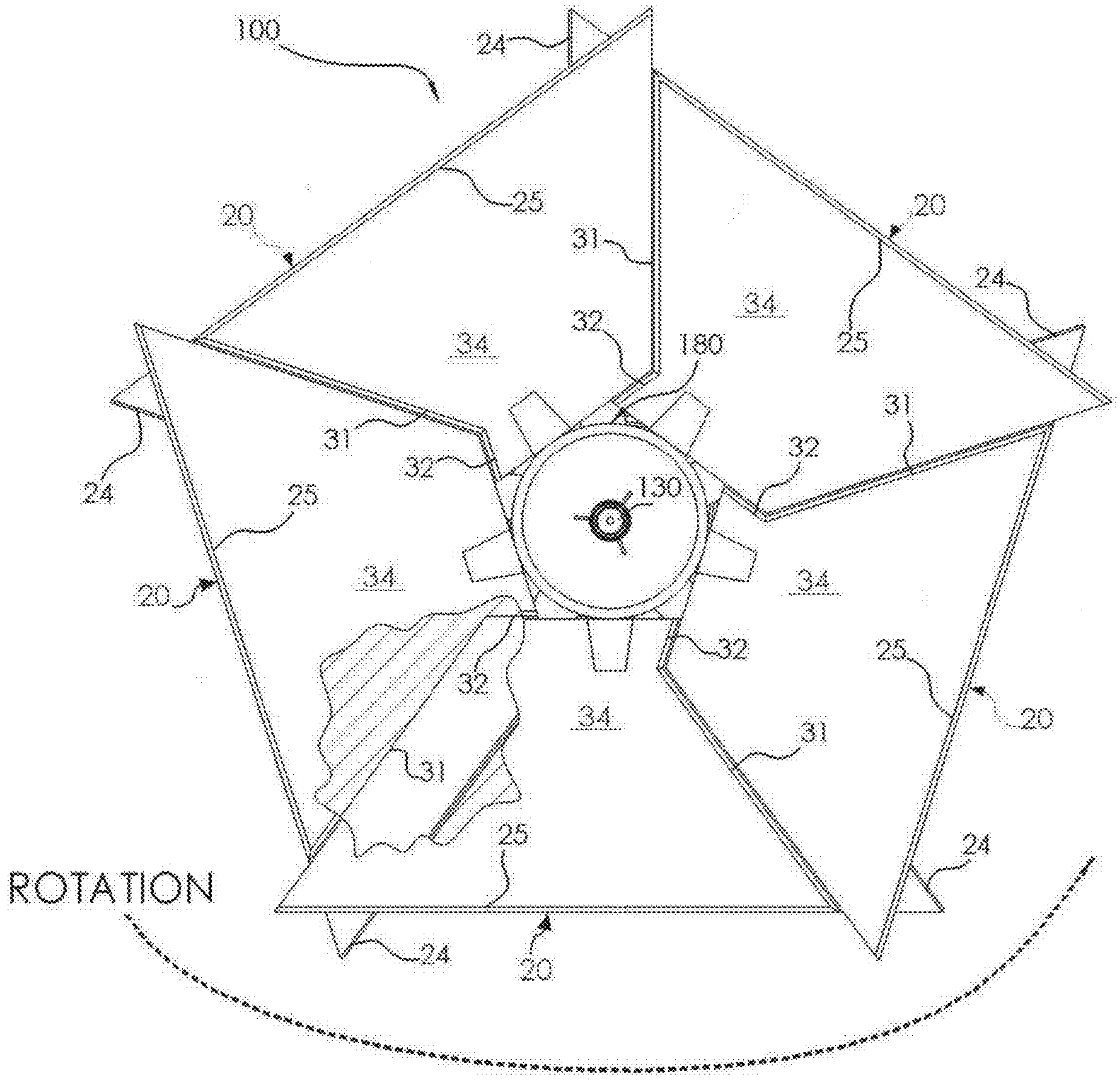
FIG. 19E is a top plan view of a single hub with five nesting ECPs depicting each ECP overlapping the adjacent ECP while all ECPs are in their slipstream orientation.

FIG. 19A-FIG. 19D shows one embodiment of a nesting ECP 20. Each nesting ECP 20 includes a leading edge pocket 30 (section of reduced plate thickness) extending along the leading edge 24 and a trailing edge pocket 26 (section of reduced plate thickness) extending along the trailing edge 29 and disposed on the opposite side of the ECP from the leading edge pocket 30. As shown in FIG. 19E, ECPs 20 are configured so that when all ECPs 20 of hub 180 are simultaneously in a position parallel to the fluid flow (slipstream), the leading edge pocket 30 of each nesting ECP 20 nests with the trailing edge pocket 26 of the following nesting ECP 20 (relative to the direction of hub rotation). Trailing edge pocket 26 includes edges 27 and 28 that are contoured to nest with the leading edges 31 and 32 of an adjacent nesting ECP 20. This embodiment enables the surface area of the nesting ECP 20 to be increased over the surface area of non-nesting ECPs. The size of the nesting ECP 20 is limited only by the distance between the axis of articulation "A" of the nesting ECP 20 and the axis of articulation "A" of the adjacent nesting ECP 20. The nesting ECP 20 has leading edges 24, 25, 31 and 32, to reduce drag coefficient while the nesting ECP 20 is rotated through various orientations of its slipstream position. Each ECP 20 may be assembled of any number of operably linked subassemblies, for example the three ECP subassemblies 21, 22 and 23 (see FIG. 19A-19B) that, when operably linked, may comprise an entire ECP 20. The ECP 20 assemblage may be similar in all respects to that of an ECP 10 (see FIG. 18C).

Figure 19F:
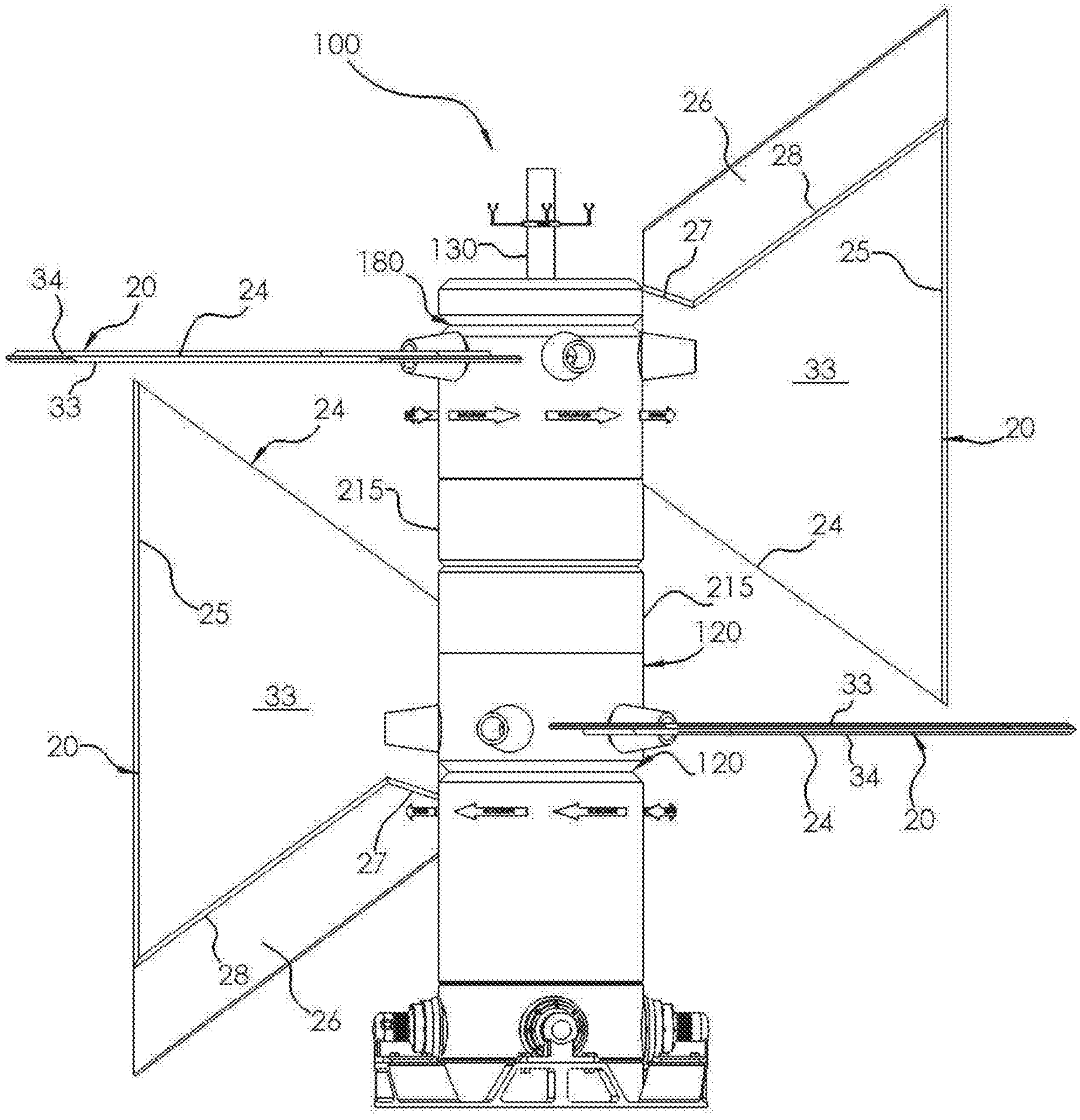
FIG. 19F is a front view of a KFECS embodiment with elongated hubs that accommodate nesting ECPs that, while in their working mode, extend past their respective hub's swept area into the adjacent hub's swept area, and an elongated perimeter plate that can accommodate additional superstructure and/or cowling attaching area.

Referring now to FIG. 19E and still referring to FIG. 19A-FIG. 19D, leading edge nesting pockets 30 and trailing edge nesting pockets 26 permit all ECPs 20 to simultaneously be in their slipstream position as seen in FIG. 19E. FIG. 19F shows only two counter-rotating ECPs 20—one per hub 120 and 180—although each hub may have one, two, three, four, five, or more ECPs 20.

Referring now to FIG. 19F and still referring to FIG. 19A-FIG. 19D, an embodiment of the KFECS 100 that supports nesting ECPs 20 includes elongated hub extensions 215 coupled to hubs 120 and 180, all of which provide working area (sufficient clearance) for ECPs 20 with a larger surface area.

13.4. Energy Conversion Plate—Surface Detail FIG. 20A-FIG. 20B

Figure 20B:
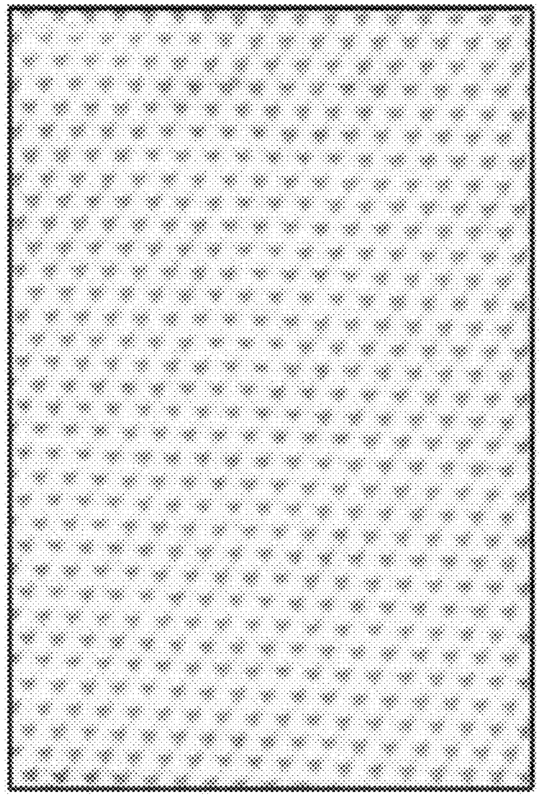
FIG. 20B is a partial isometric view of an inverted dimpled ECP surface.
Figure 20A:
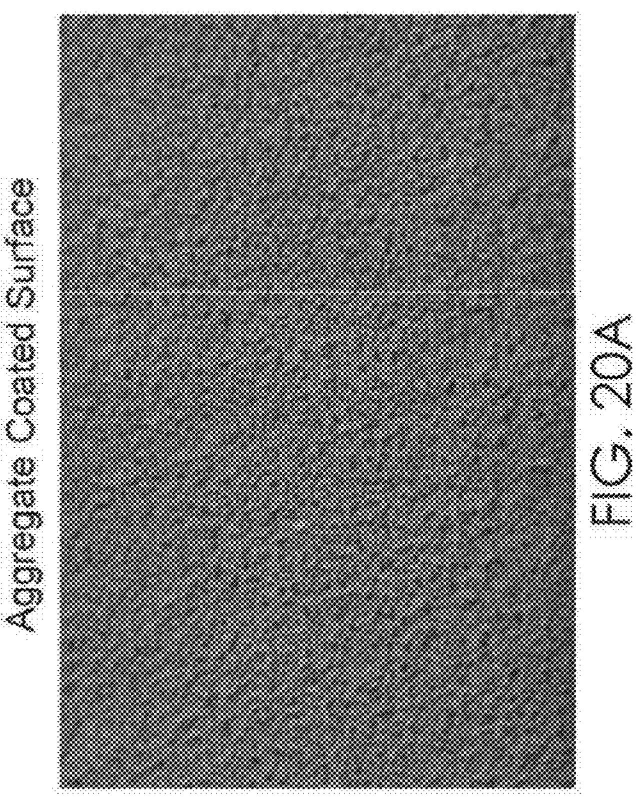
FIG. 20A is a partial top view of an aggregate coated ECP surface.

Referring now to FIG. 20A, the surface of non-nesting ECP 10 (see FIG. 18A-FIG. 18D) and nesting ECP 20 (see FIG. 19A-FIG. 19D) may be textured, or dimpled (see FIG. 20A-20B, or any combination thereof, to increase its drag coefficient on any of its surface area used to convert kinetic fluid energy to mechanical energy, and consequently increase the KFECS's 100 total amount of fluid energy converted to mechanical energy. Any surface area may also have a surface finish designed to minimize drag coefficient as the surface moves against the fluid flow. Such surfaces include, but are not limited to leading edges 14, 15, 24, 25, 31 and 32, which may beveled or otherwise shaped to minimize fluid dynamic drag.

13.5. Energy Conversion Plates—Ancillary Features

Figure 18:
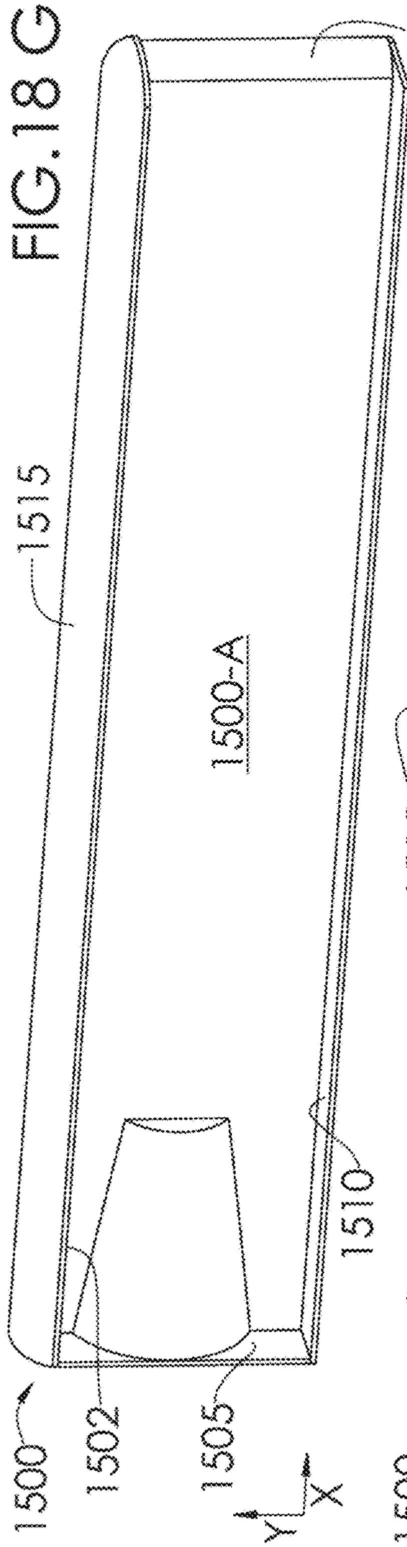
FIG. 18 G is an isometric view of the front side a lipped ECP in a working orientation.
Figure 18:
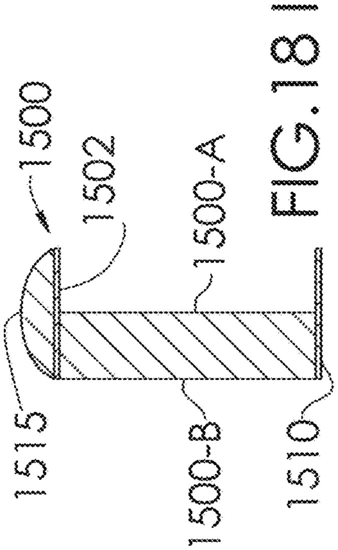
Figure 18:
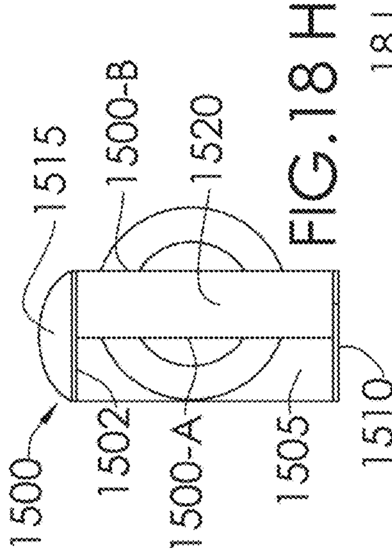
Figure 18:
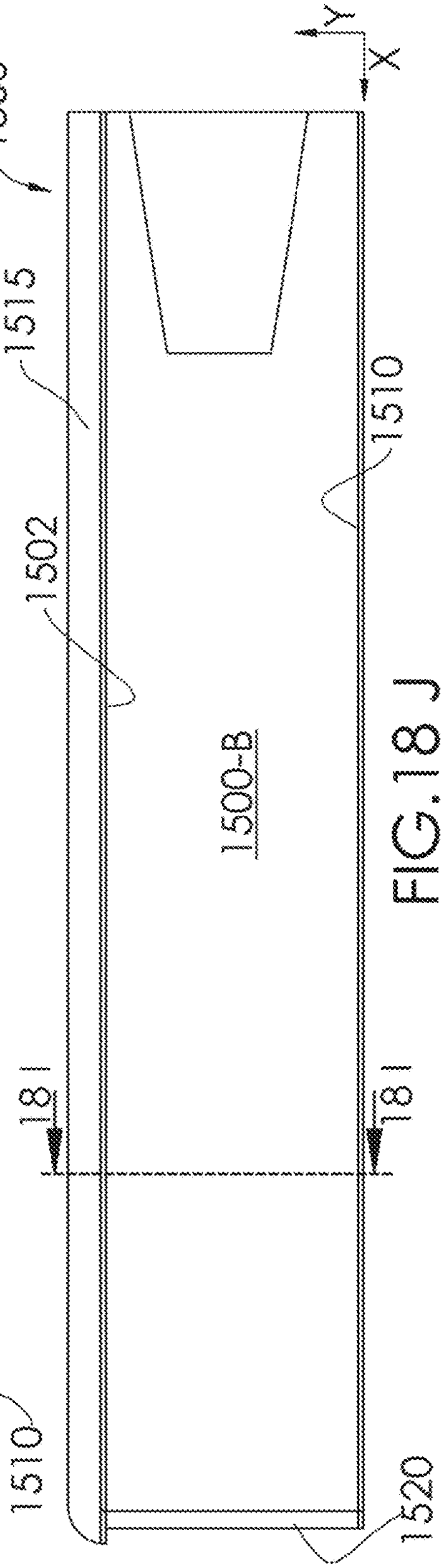

Referring now to FIGS. 18 G-18 I, a lipped ECP 1500 includes one or more of an upper, or leading edge, lip 1502, an inboard end lip 1505, and a bottom, or trailing edge, lip 1510. Each lip 1502, 1505, 1510 extends transversely from the fluid impingement surface 19-A (see Section 13.1) toward the oncoming flow, when the ECP is in working mode. That is, each lip 1502, 1505, 1510 is not coplanar with the fluid impingement surface and, in various embodiments, may be perpendicular to the fluid impingement surface or oriented at an acute or obtuse angle with respect to the fluid impingement surface. Lips 1502, 1505, 1510 may be oriented at the same angle or different angles with respect to the fluid impingement surface. Each ECP has opposed surfaces (one of which defines the fluid impingement surface 1500-A), a leading edge, and a trailing edge and one or more of the lips 1500, 1505, 1510 extends transversely from one of the opposed surfaces (i.e., the surface defining the fluid impingement surface 1500-A). In some embodiments the one or more lips 1500, 1505, and 1510 extend transversely from a peripheral edge of the fluid impingement surface. In an embodiment, upper lip 1500, inboard end lip 1505, and lower lip 1510 each have a surface that is perpendicular to the fluid impingement surface 1500-A. Upper lip 1502 may have a rounded top edge surface 1515 to form a rounded leading edge when the ECP 1500 is in its slipstream orientation. One or more of lips 1502, 1505, 1510 may be incorporated onto any ECP of any KEFCs described herein, such as ECP 10 or ECP 20. Such lips 1500, 1505 and 1510 to (i) reduce the amount of fluid flowing over upper, lower, and inboard edges of the fluid impingement surface, causing more fluid to move toward and over the outboard tip end of the lipped ECP 1500, and (ii) cause a region of maximum pressure differential between the fluid impingement surface and the surface opposite to move toward the outboard tip end of the lipped ECP, thereby increasing the positive torque generated by the lipped ECP 1500. Any lip 1500, 1505 1510 may be configured with an alternate embodiment of a leading edge 1515 or 1520, such as angled, rounded, beveled, tapered, slotted, bored, vented, ducted or any combination thereof.

It should be appreciated that performance improvements attributable to the lip 1500, 1505 1510 may be in other implementations of pressure plates, such as paddle wheels for propelling watercraft, oars, mixers, skin diving, scuba diving and swimming fins, oars and mixers.

14. Superstructure Embodiments—General—FIG. 21

Figure 21:
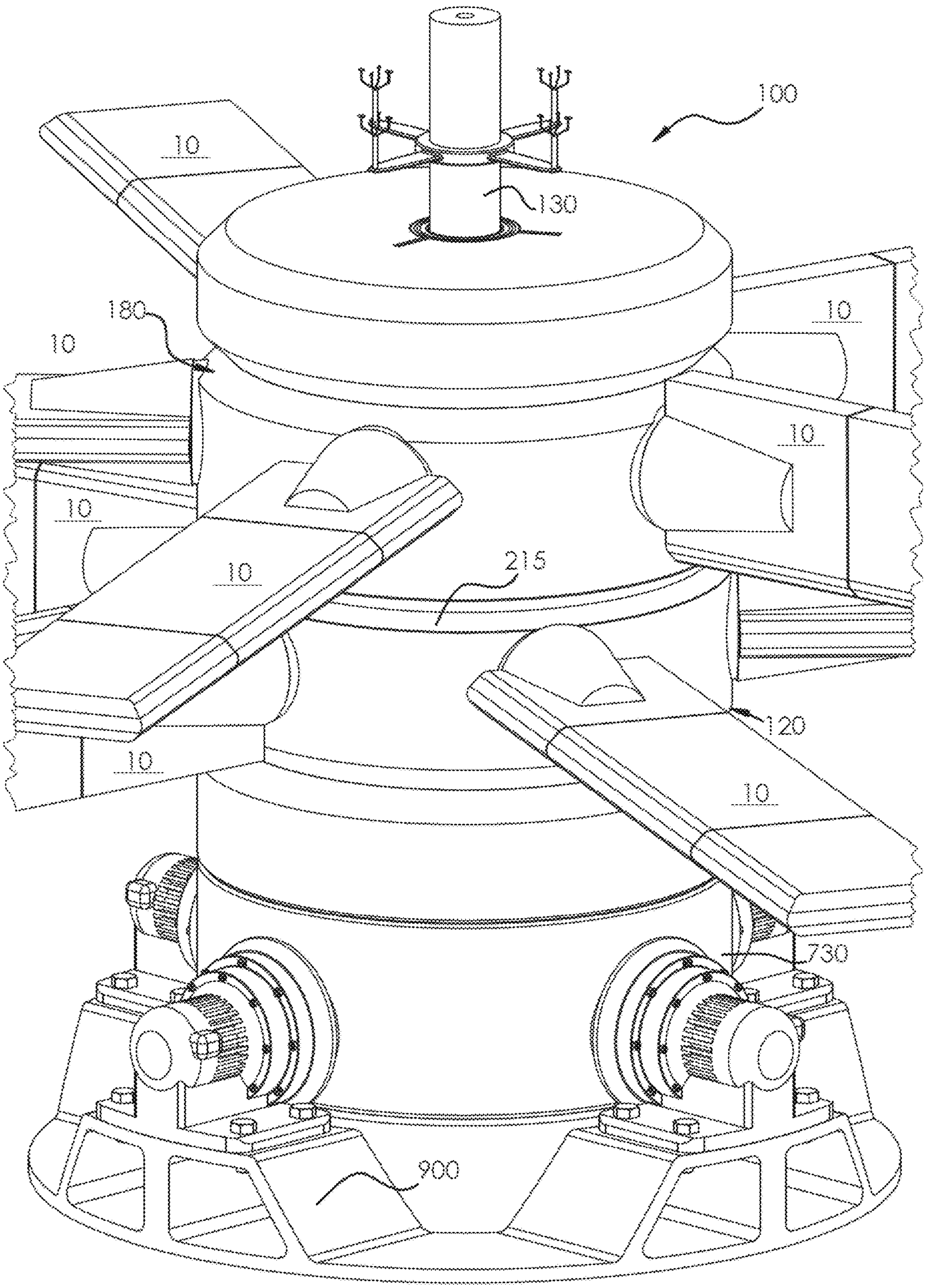
FIG. 21 is an isometric view of a KFECS superstructure used for a land-based application with the longitudinal axis of the hub carrier perpendicular to the land, or land-based structure, upon which it is operably supported.

Referring now to FIG. 21, and FIG. 1A, and FIG. 1B, the hub carrier 130 serves as the central structural component in all embodiments of the KFECS 100. That is, in various embodiments, the hub carrier 130 may function as an alignment axis that coaxially aligns the hub(s) and other components, and all components that are radially oriented are radially oriented with respect to the hub carrier.

The hub carrier 130 can be supported and/or stabilized at its ends and/or at one or more positions intermediate to the ends, for example at the perimeter plate 215. The hub carrier 130, together with the overall design of the KFECS 100, permits the KFECS 100 to be mounted with the longitudinal axis 131 of the hub carrier 130 (see FIG. 1A) in any orientation, including but not limited to, horizontal, vertical and diagonal.

In various embodiments, irrespective of the non-nesting ECP 10 or nesting ECP 20 embodiment used, all ECP types may be in their slipstream orientation between 130° and 210° (see FIG. 8J). Consequently, superstructure components can be connected to the perimeter plate 215 at and near the 180° position without being in the path of an ECP 10 or nesting ECP 20 in its working position when the KFECS 100 is operably connected to a turn-table style base, thereby enabling the superstructure to be connected to the perimeter plate 215 at the point nearest the maximum moment exerted upon hub carrier 130 (the point furthest from the oncoming fluid flow). In other words, the system will be exposed to a load, perpendicular to the hub carrier, from the fluid pressure. In some embodiments, the entirety of the lateral load would be on the hub carrier. However, because the ECPs articulate to their slipstream position as they approach and leave the 180° position, an additional superstructure component including without limitation a structural tube, beam or cable, could be fixed between the base and the perimeter plate at or near the 180° without colliding with the plates, thereby reducing the moment on the hub carrier.

It should be appreciated that in various embodiments it is the designer's choice as to when an ECP 10 or nesting ECP 20 may be in its slipstream, transition, or working orientation to the flow throughout the ECP's 360° rotation about the longitudinal axis 131 of the hub carrier 130 as further described in Section 9.

14.1. Superstructure—Land-Based Vertical—FIG. 21

Still referring to FIG. 21, where the KFECS 100 is used to convert wind energy to mechanical energy, one embodiment is as shown with the longitudinal axis of the hub carrier 130 oriented perpendicular to the land or land-based structure upon which it is located. In this orientation, the KFECS 100 may be entirely supported by the hub carrier 130 and operably coupled base 900 when the base 900 is operably linked to the ground or a ground-based structure such as a building.

14.2. Superstructure—Land-Based Horizontal—FIGS. 22A-22D

Referring now to FIGS. 1A, 22A, 22B, where the KFECS 100 is used to convert wind energy to mechanical energy, one embodiment is as shown with the longitudinal axis of the hub carrier 130 oriented parallel to the ground or a ground-based structure. In this orientation, the KFECS 100 may be entirely supported by a superstructure 905 supporting the hub carrier 130 and perimeter plate 215 and supported on a turntable-style base assembly 908. One or more clutch/gearbox/electrical generator/pump assemblies 620 may be supported on a turntable mounting plate 910 and are operably coupled by a pinion 621 to a ring gear 602, which is supported on hub extension spokes 122, and which is (i) operably coupled to the hub carrier 130, and (ii) fixedly linked to respective hub 120 or hub 180.

The orientation of the turntable style base assembly 908 may be varied by one or more hub orientation control motors 710 which are operably linked to a turntable-style base assembly 908 and are also operably coupled to the turntable ring gear 912 by a operably coupled pinion 720. The turntable-style base assembly 908 is also operably linked to the ground or ground-based structure. This configuration enables the computer-controlled hub orientation motors 710 to cause the KFECS 100 to be continuously optimally oriented relative to the oncoming fluid flow, or any other computer-controlled direction, based upon the inputs received by one or more fluid direction and speed sensors 810 or any other computer input.

In an embodiment electricity, high pressure fluid and/or high pressure gaseous mixture converted by, or compressed by, as the case may be, the clutch/gearbox/electrical generator/pump assembly(ies) 620 do not require rotatable coupling as the computer controlled hub orientation control motors 710 are configured so that KFECS 100 is never rotated about the center point of the turn-table style base assembly 908 by more than a 360° rotation in either a clockwise or counterclockwise movement. If necessary to accommodate KFECS 100 reorientation due to fluid flow direction change, the AOS may be temporarily activated to avoid an overspeed condition while the KFECS 100 is being reoriented to the changed fluid flow direction.

Referring now to FIGS. 1A, 22C, 22D, where the KFECS 100 is used to convert wind energy to mechanical energy, in one embodiment the longitudinal axis of the hub carrier 130 (i.e., the axis of rotation of the hubs 120, 180) is oriented parallel to the ground or a ground-based structure. In this orientation, the KFECS 100 may be entirely supported by a superstructure 905 supporting the hub carrier 130 and perimeter plate 215 and supported on a turntable-style base assembly 908. One or more clutch/gearbox/electrical generator/pump assemblies 620 may be supported on a turntable mounting plate 910. Each assembly 620 includes a bevel gear 607. A bevel gear 607-A is operably linked to, and rotatable with, the hub 120 and/or hub 180. A transmission comprising a drive shaft 609, an upper bevel gear 608-A connected to one end of drive shaft 609 and coupled to bevel gear 607-A, and a lower bevel gear 608 connected to an opposite end of drive shaft 609 and coupled to bevel gear 607 transmits rotation of the hubs 120, 180 to rotation of the assembly 620. A superstructure mount 905-A may be provided to stabilize the drive shaft 609.

The orientation of the turntable mounting plate 910 may be varied by one or more hub orientation control motors 710. Hub orientation control motors 710 are mounted to the turntable-style base assembly 908 and are also operably coupled to a turntable ring gear 912 surrounding turntable mounting plate 910 by a operably coupled pinion 720. The turntable-style base assembly 908 may be mounted or otherwise supported by the ground or ground-based structure. This configuration enables the hub orientation control motors 710 to cause the KFECS 100 to be continuously optimally oriented relative to the oncoming fluid flow, or any other desired direction. Hub orientation control motors 710 may be computer controlled in accordance with a control algorithm and computer-monitored sensor inputs, including, for example, one or more fluid direction and speed sensors 810 or any other sensor or computer input.

In an embodiment, electricity, high pressure fluid and/or high pressure gaseous mixture converted by, or compressed by, as the case may be, the clutch/gearbox/electrical generator/pump assembly(ies) 620 do not require rotatable coupling to external electric or fluid transmission components as the hub orientation control motors 710 are configured so that KFECS 100 is never rotated about the center point of the turn-table style base assembly by more than a 360° rotation in either a clockwise or counterclockwise movement. If necessary to accommodate KFECS 100 reorientation due to fluid flow direction change, the AOS may be temporarily activated to avoid an overspeed condition while the KFECS 100 is being reoriented to the changed fluid flow direction.

14.3. Superstructure—Water-Based Vertical—FIGS. 23A-23D

Referring now to FIGS. 23A-23D, and FIG. 1A, where the KFECS 100 is used to convert kinetic water energy to mechanical energy, one embodiment is as shown with the longitudinal axis of the hub carrier 130 oriented relatively perpendicular to the surface of the body of water in which it is located. In this embodiment, the KFECS 100 can be entirely supported by a superstructure 960 which may comprise baffles 955 and 956 containing air or other buoyant material) and operably linked and protective cover 950. Gearbox/winch assemblies 962 and pulleys 963 are operably linked to superstructure 960. Each gearbox/winch assembly 962 may be computer controlled and is also operably linked to a respective cable 964, which is operably coupled to pulley 967-A, which is operably linked to a respective ballast 966 and the cable 964 is operably linked to a hub carrier stabilizer plate 968, which is operably coupled to the hub carrier 130 where the hub carrier 130 extends past hub carrier 180 (see FIG. 1A). The gearbox/winch assemblies 962 control the tension of each respective operably linked cable 964. The gearbox/winch assemblies 962 consequently can control (i) the X and Y orientation of the KFECS 100 relative to a plumb position and (ii) the depth of the KFECS 100 relative to the water surface by increasing or decreasing the amount cable 964 contained within any or all gearbox/winch assemblies 962. The gearbox/winch assemblies 962 enable releasing sufficient cable 964 to permit the KFECS 100 to raise in the water to a point that the KFECS's 100 gearbox/brake assembly 740 is above water surface, or optionally, to permit raising and/or removing the KFECS 100 out of the water by conventional lifting equipment.

The gearbox/winch assemblies, 962, pulleys 963, cables 964, pulleys, 967-A, ballasts 966, and components fixedly and/or operably linked or operably coupled thereto comprise an example of a deep water mounting system, capable of being computer controlled, with a depth limited only by the (i) gearbox/winch assemblies' 962 capacity to store cables 964, (ii) length and physical characteristics of cables 964, and (iii) space between the cover 950 and the superstructure 960 (see FIGS. 23A and 23C).

Referring now to FIG. 23C and FIG. 23D, one or more clutch/gearbox/electrical generator/pump assemblies 620 are also (i) operably linked to the superstructure 960 and (ii) operably coupled, for example, via a pinion and shaft 611, to a gear 604 which is operably coupled to the hub 120 (as is bevel gear 600 as described in Section 5.

The superstructure 960 is also operably linked to the fluid orientation motor housing 750-A, which is operably linked to plate 902, which is operably linked to hub orientation control motors 710, which are operably coupled to pinions 720, which are operably coupled to the linked to the plate 902, which is operable linked to and are also operably coupled to the orientation gear 700, which is operably linked to the hub carrier 130. This configuration enables the hub orientation control motors 710 to cause the KFECS 100 to be continuously optimally positioned relative to the oncoming fluid flow, or any other computer-controlled direction, based upon the inputs received by one or more fluid direction and speed sensors 810 or any other computer input.

The brake disc 770 (see FIG. 23-D) and braking system that may stop the rotations of the hubs 120 and 180 about the longitudinal axis of carrier 130 are further described in Section 12.2.

Electricity, high pressure fluid and/or high pressure gaseous mixture converted by, or compressed by, as the case may be, the clutch/gearbox/electrical generator/pump assembly(ies) 620 (See FIG. 23D) flows through the hub carrier 130 and operably linked umbilical cord 970 (see FIG. 23C) to their respective destination, including but not limited to a land-based connection points such as an electrical grid, hydraulic pump(s) and/or compressed air tank(s) (not shown). The hub carrier 130 design, including the hub carrier chase 132 (see FIG. 5A) enables the connection of electric harness, fiber optic cable, electric transmission cable, hydraulic, pneumatic or other similar systems to connect from the clutch/gearbox/electrical generator/pump assembly(ies) 620 and from within the clutch/gearbox/brake housing to the umbilical cord 970 without the need for any rotary couplings.

14.4. Superstructure—Water-Based Horizontal—FIGS. 24A, 24B

Referring now to FIGS. 1A, 24A and 24B, where the KFECS 100 is used to convert kinetic water energy to mechanical energy, one embodiment is as shown with the longitudinal axis of the hub carrier 130 oriented relatively parallel to the surface of the body of water in which it is located. In this embodiment, the KFECS 100 includes a protective cover 950, and can be entirely supported by the superstructure 972 (which may comprise baffles 955-A, 955-B and 957 containing air or other buoyant material). The superstructure 972 is operably linked to the hub carrier superstructure 980, which is operably linked to the (i) hub carrier 130 and (ii) generator mounting plate 978.

The superstructure 972 is also operably linked to (i) gearbox/winch assemblies 962, which may be computer controlled, and pulleys 963. Each gearbox/winch assembly 962 is also operably coupled to each respective pulley 963, by a respective cable 964, which is operably linked to ballast mounting attachment 967, such as a pulley as shown, which is operably linked to a respective ballast 966.

The computer controlled gearbox/winch assemblies 962 control the tension of each respective operably linked cable 964. The computer controlled gearbox/winch assemblies 962 consequently can control (i) the X and Y orientation of the KFECS 100 relative to a plumb position and (ii) the depth of the KFECS 100 relative to the water surface by selectively increasing or decreasing the amount cable 964 contained within any or all gearbox/winch assemblies 962. The computer controlled gearbox/winch assemblies 962 enable releasing sufficient cable 964 to permit the KFECS 100 to raise in the water to a point that the superstructure 972 of the KFECS 100 is at or above the water surface, or optionally, to permit raising and/or removing the KFECS 100 out of the water by conventional lifting equipment.

The plurality of the KFECS 100 gearbox/winch assemblies, 962, cables 964, ballasts 966 and components fixedly and/or operably linked or operably coupled thereto, comprise another embodiment of a deep water mounting system with a depth limited only by the gearbox/winch assemblies' 962 capacity to store cables 964, the length and physical characteristics of cables 964, and the space between the cover 950 and the superstructure 972.

One or more hub orientation control motors 710 are operably linked to the superstructure 972 and are also linked to a pinion 720, which is operably coupled to turntable ring gear 974, which is operably linked to generator mounting plate 978. The generator mounting plate 978, is located upon a low friction perimeter bearing 973-A (see FIG. 24B), extending circumferentially about flange 973 which is formed within superstructure 972. This configuration enables the computer-controlled hub orientation motors 710 to cause the KFECS 100 to be continuously optimally oriented relative to the oncoming fluid flow, or any other computer-controlled direction, based upon the inputs received by one or more fluid direction and speed sensors 810 (see FIG. 1A) or any other computer input.

Mechanical energy is transferred from hub 120 and hub 180 via one or more hub extension spokes 122 which are operably linked to a ring gear 606, which is operably linked to pinion 606-A, which are operably coupled with one or more clutch/gearbox/electrical generator/pump assemblies 620.

Electricity, high pressure fluid and/or high pressure gaseous mixture converted by, or compressed by, as the case may be, the clutch/gearbox/electrical generator/pump assembly(ies) 620 flows through the hub carrier 130 and operably linked umbilical cord 970 to their respective destination, including but not limited to land-based connection points such as an electrical grid, hydraulic pump(s) and/or compressed air tank(s) (not shown). The hub carrier 130 design, including the hub carrier chase 132 (see FIG. 5A) enables the connection of electric harness, fiber optic cable, electric transmission cable, hydraulic, pneumatic or other similar systems to connect from the clutch/gearbox/electrical generator/pump assembly(ies) 620 and from within the clutch/gearbox/brake housing to the umbilical cord 970 without the need for any rotary couplings.

15. Cowling

Referring now to FIGS. 25A-25D, and FIG. 1A, the KFECS 100 (i.e., land-based or water-based) may be configured with a cowling 1000 to improve the characteristics of fluid flow that contacts the ECPs 10 or lipped ECPs 1500, or 20 when using nesting ECPs, including without limitation by acting as a concentrator, and to isolate aspects of the KFECS 100 from exposure to the elements in which it is located, including without limitation, water, debris or wildlife. Cowling 1000 may include a top wall 1110, a base 1005, a front wall 1012, side wall 1014, and rear wall 1016 extending from a peripheral edge of the top wall 1110 to the base 1005. The cowling 1000 may be fixedly connected to (i) the hub carrier 130 via a connection boss 1150 and (ii) either embodiment of the perimeter plate 215 or 215-A (see FIGS. 13A and 13C), thereby causing the cowling 1000 to at all times to remain optimally oriented to the fluid flow (or any other controllable orientation) as the cowling 1000 will rotate with the hub carrier 130 when reoriented by the hub orientation control system. Alternatively, the cowling 1000 may be mounted so as to be rotatable with respect to the hub carrier as described in Section 15.1.

The cowling 1000 may include a lower intake port 1010 and an upper intake port 1020 formed in the front wall 1012 and aligned with the respective ECPs 10, or 20 (when using nesting ECPs), of the upper and lower hubs 120-A, 180-A (see FIG. 13E) when the ECPS 10, or 20 are primarily in their working mode behind the intake ports. Conversely, the front wall 1012 of the cowling 1000 is closed on the side of each hub 120-A and 180-B opposite the side of the working ECPs 10 or 20 and largely blocks the oncoming fluid flow from contacting an ECP 10 or 20 while in its respective slipstream mode. The cowling may also include a lower hub exhaust port 1015 and an upper hub exhaust port 1025 formed in the rear wall 1016 in positions opposite their respective intake ports 1010 and 1020. The intake ports 1010 and 1020, and exhaust ports 1015 and 1025 may also be shaped to increase the flow that reaches the working ECPs 10 or 20. The base 1005 of cowling 1000 may include (i) ventilation louvers 1120 located on the side of the hub optimally oriented to the fluid flow (or other controllable orientation) to permit incoming ventilation to the clutch/gearbox/generator assemblies 620, (ii) exhaust louvers 1130 on an opposite side (FIG. 25B) to further ventilate the clutch/generator/gearbox assemblies 620, and (iii) sufficient area for multiple penetrations, for numerous purposes, including but not limited to access panels and doors.

Referring now to FIGS. 25E-25F and still referring to 25A-25D, and FIG. 1A, cowling 1000 may include a separator plate 1070 that may be fixedly linked via a boss 1100 to (i) either embodiment of the perimeter plate 215, or 215-A, and/or (II) the front wall 1012, side walls 1014, and rear wall 1016 of the cowling 1000 so that separator plate 1070 (i.e., separator plate 1070 may be employed without the front wall 1012, side walls 1014, and rear wall 1016 of the cowling 1000) always remains optimally oriented to the oncoming fluid flow (or other controllable orientation) and prevent any ECPs 10 or 20 from coming in contact with separator plate 1070. Alternatively, the separator plate 1070 may be mounted so as to be rotatable with respect to the hub carrier as described in Section 15.1.

The separator plate 1070 may be located between any two counter-rotating hub assemblies, for example hubs 120 and 180, and extends from intake port 1010 to exhaust port 1015 and from intake port 1020 to exhaust port 1025. The separator plate 1070 improves the characteristics of the oncoming fluid flow that contacts the counter-rotating ECPs 10 or 20 in part by preventing the fluid flow that contacts ECPs 10 or 20 attached to hub 120 from disturbing the flow that contacts ECPs 10 or 20 attached to hub 180, and vice versa (e.g., separator plate 1070 prevents the turbulence from one hub interfering with the axially adjacent hub).

Figure 25:
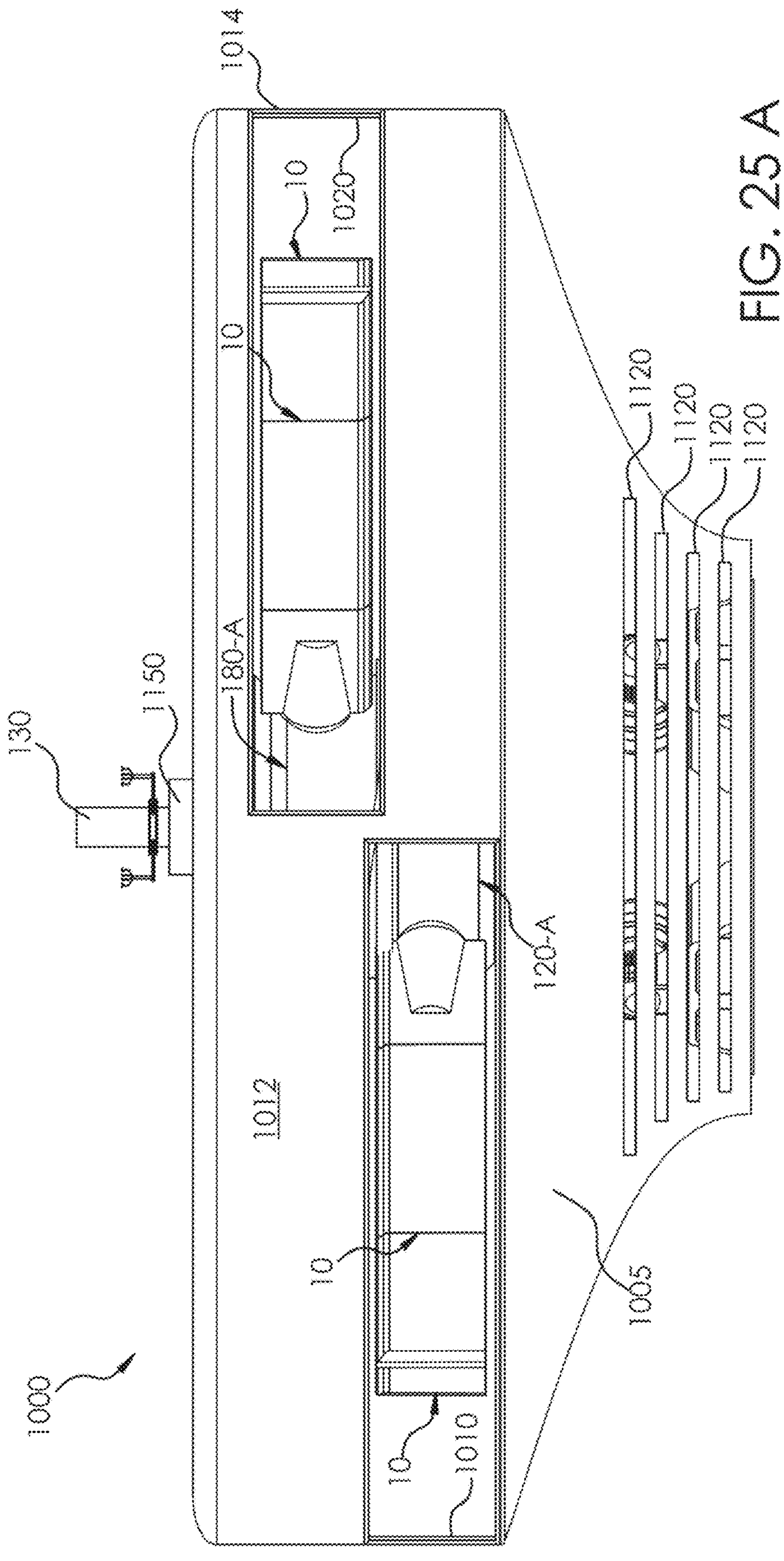
FIG. 25A is a front view of a cowling surrounding the hubs of a KFECS when used in a land-based, vertical axis application.
FIG. 25B is a rear view of the cowling and KFECS.
FIG. 25C is a front isometric view of the cowling that shows intake ports, hub carrier attachment and a hub separator plate.
FIG. 25D is a rear isometric view of the cowling.
FIG. 25E is a plan view of the cowling with a top plate and the top of the cowling omitted to expose a hub separator plate located within the cowling.
FIG. 25F is a front cross-sectional view of one configuration of the cowling that shows plates that can be used above, below and between the ECPs of two counter rotating hubs.
FIG. 25G is a front view of a KFECS embodiment with separator plates installed above and below each ECP as they approach the splines nearest the oncoming flow.
FIG. 25H is a front view of a KFECS embodiment with separator plates installed above and below each ECP as they transition through the splines nearest the oncoming flow.
FIG. 25I is a top view of a top separator plate with a hub carrier attachment boss.
FIG. 25J is an isometric view of a top separator plate.
FIG. 25K is a front view of a top separator plate.
FIG. 25L is a top view of a bottom separator plate.
FIG. 25M is an isometric front view of the underside of a bottom separator plate with a brake housing attachment boss.
FIG. 25N is a is a rear view of a bottom separator plate with a brake housing attachment boss.
FIG. 25O is a right side view of a KFECS embodiment with separator plates installed above and below each ECP with center to bottom separator plate connectors.
FIG. 25P is a left side view of a KFECS embodiment with separator plates installed above and below each ECP with center to bottom separator plate connectors.
FIG. 25Q is a cropped cross-sectional view of a rotatable top separator plate with non-magnetic perimeter bearings with (i) an enlarged view of the integral bearing race section of the motor mounting plate, and (ii) and enlarged view of the bevel gear and pinion gear mesh.
FIG. 25R is a cropped cross-sectional view of a rotatable top separator plate with magnet plate style bearings.
FIG. 25S a front view of a KFECS with an alternate embodiment of separator plates installed above and below each ECP that includes additional structural supports attached to the hub carrier.
Figure 25:
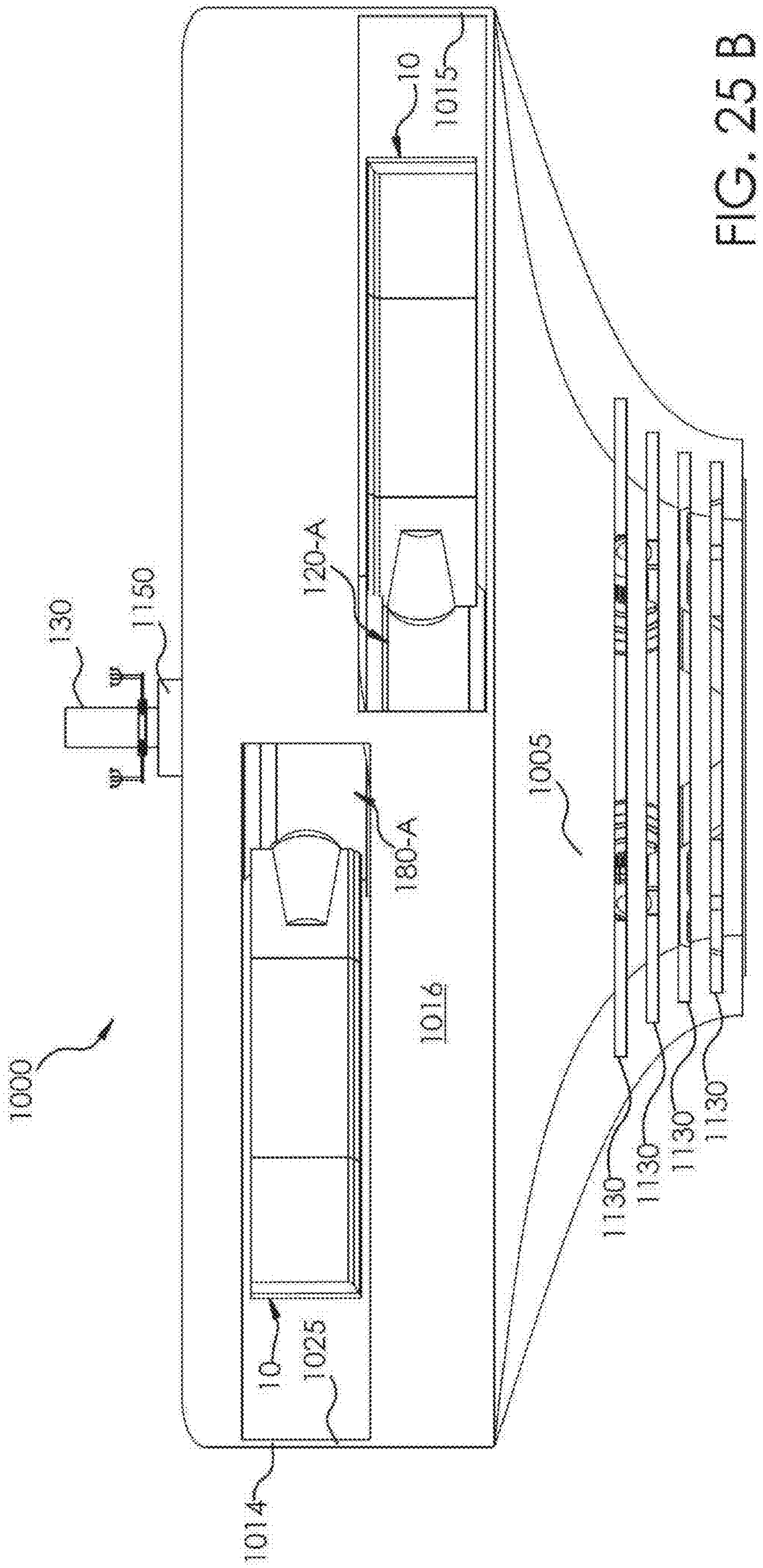
Figure 25:
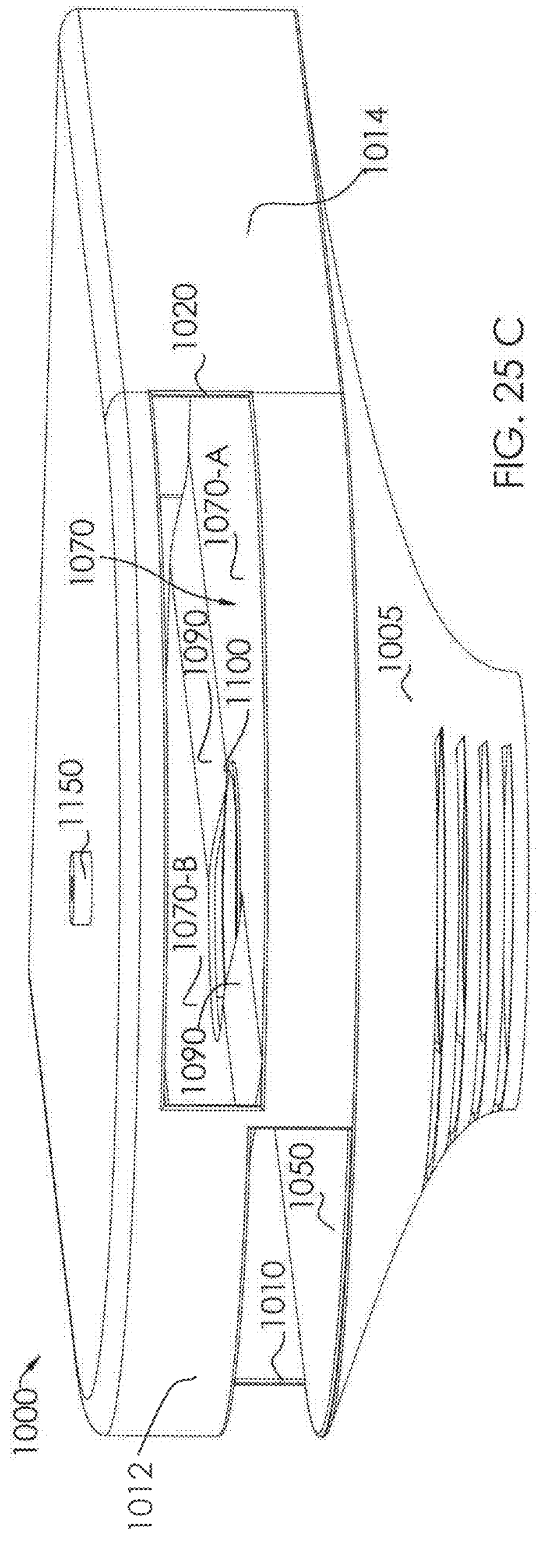
Figure 25:
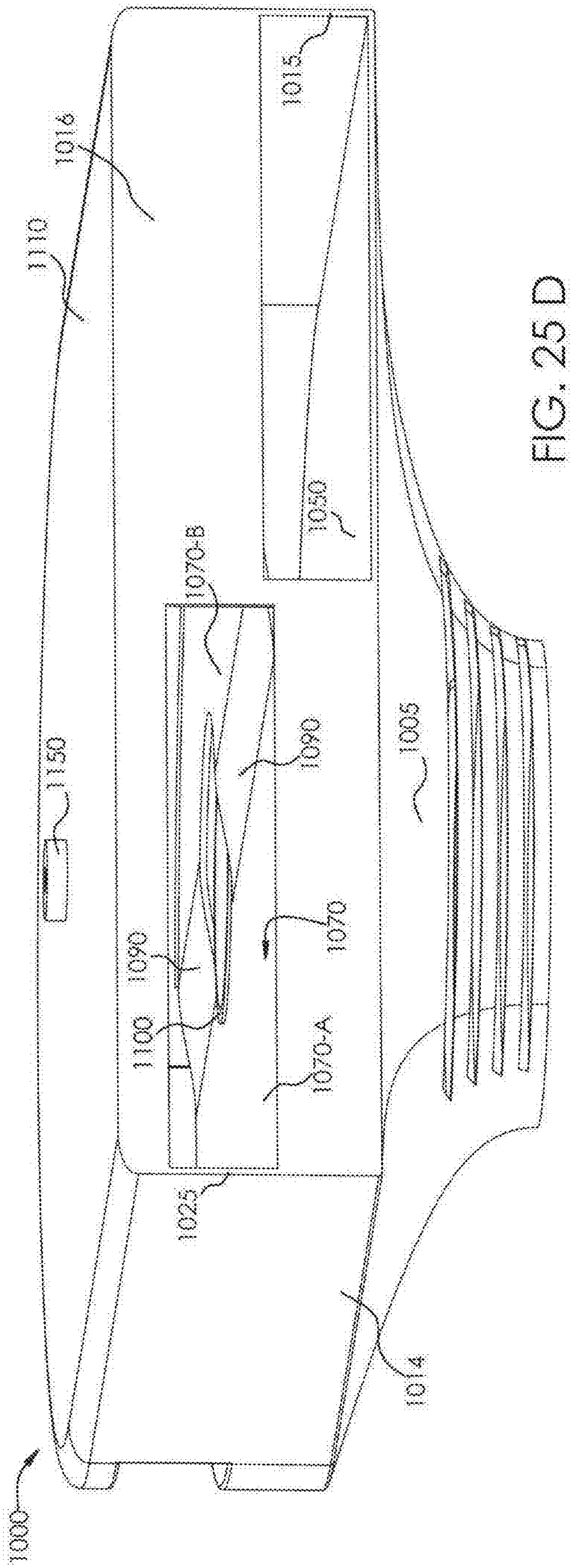
Figure 25:
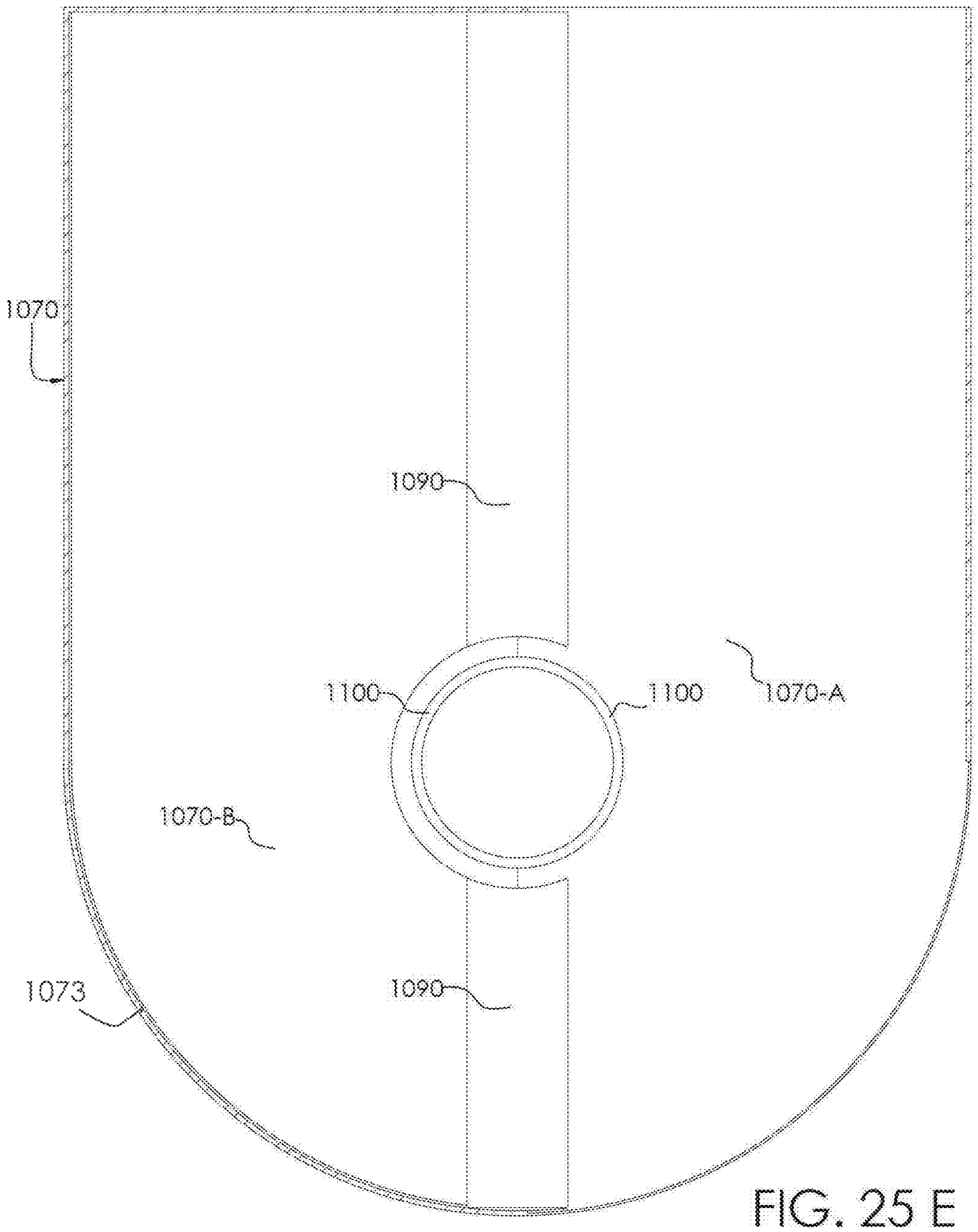
Figure 25:
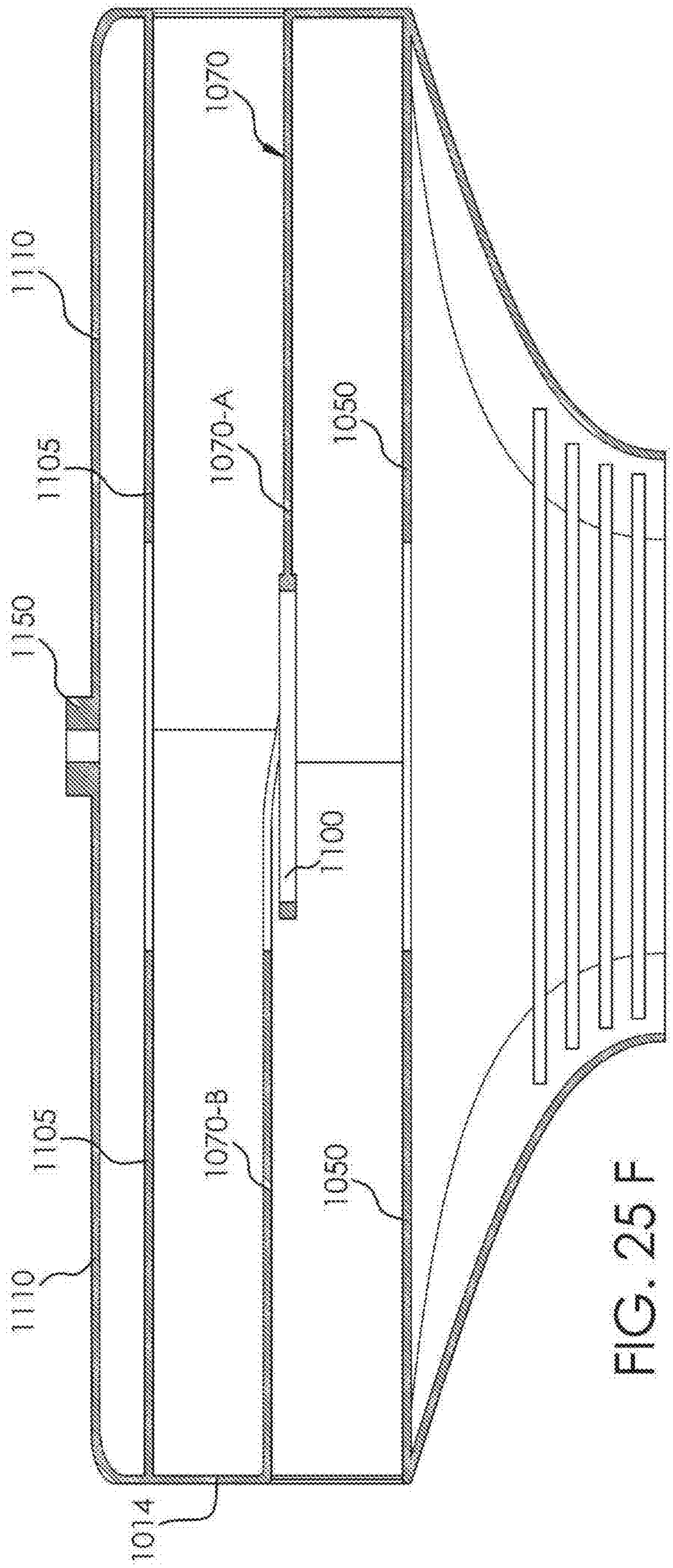
Figure 25:
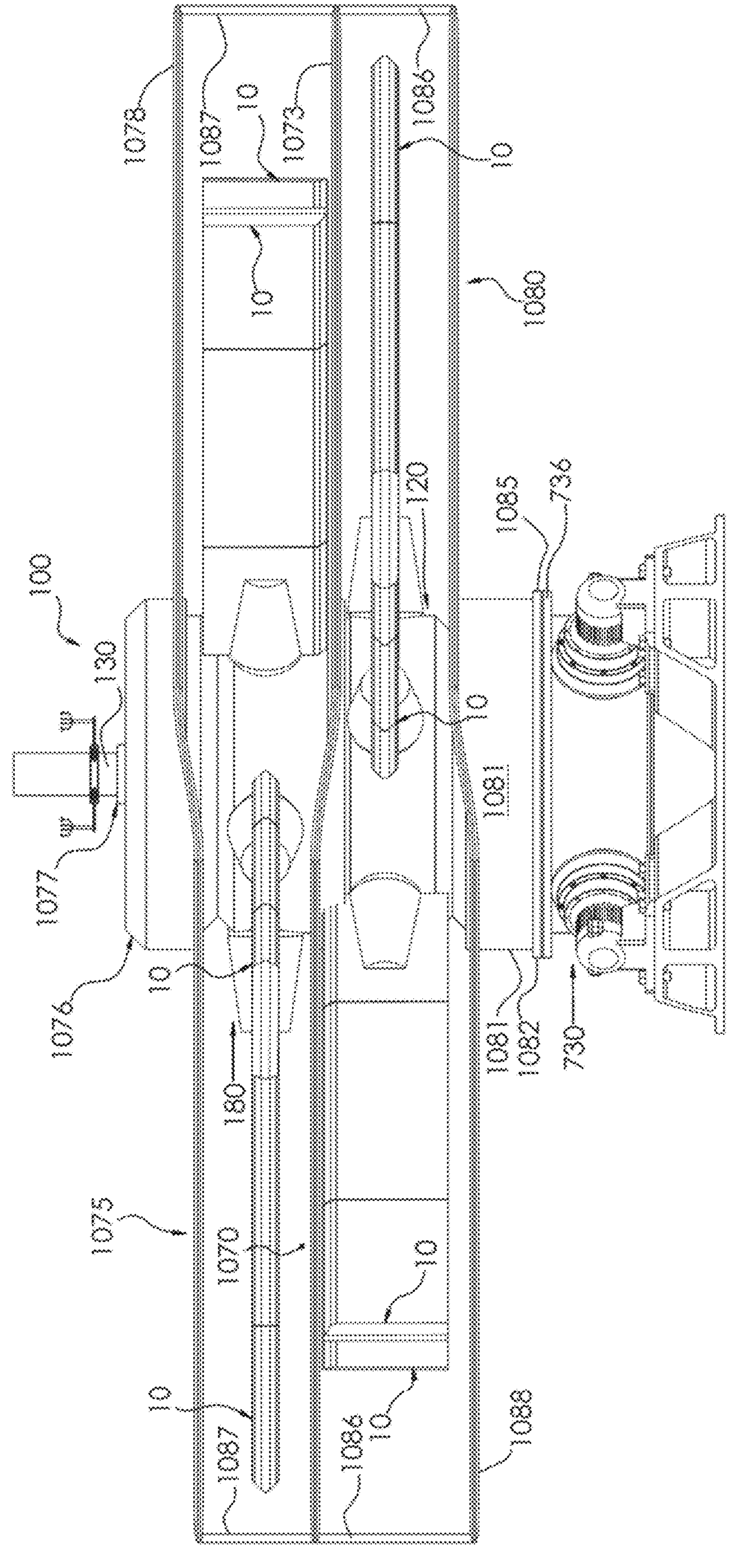
Figure 25:
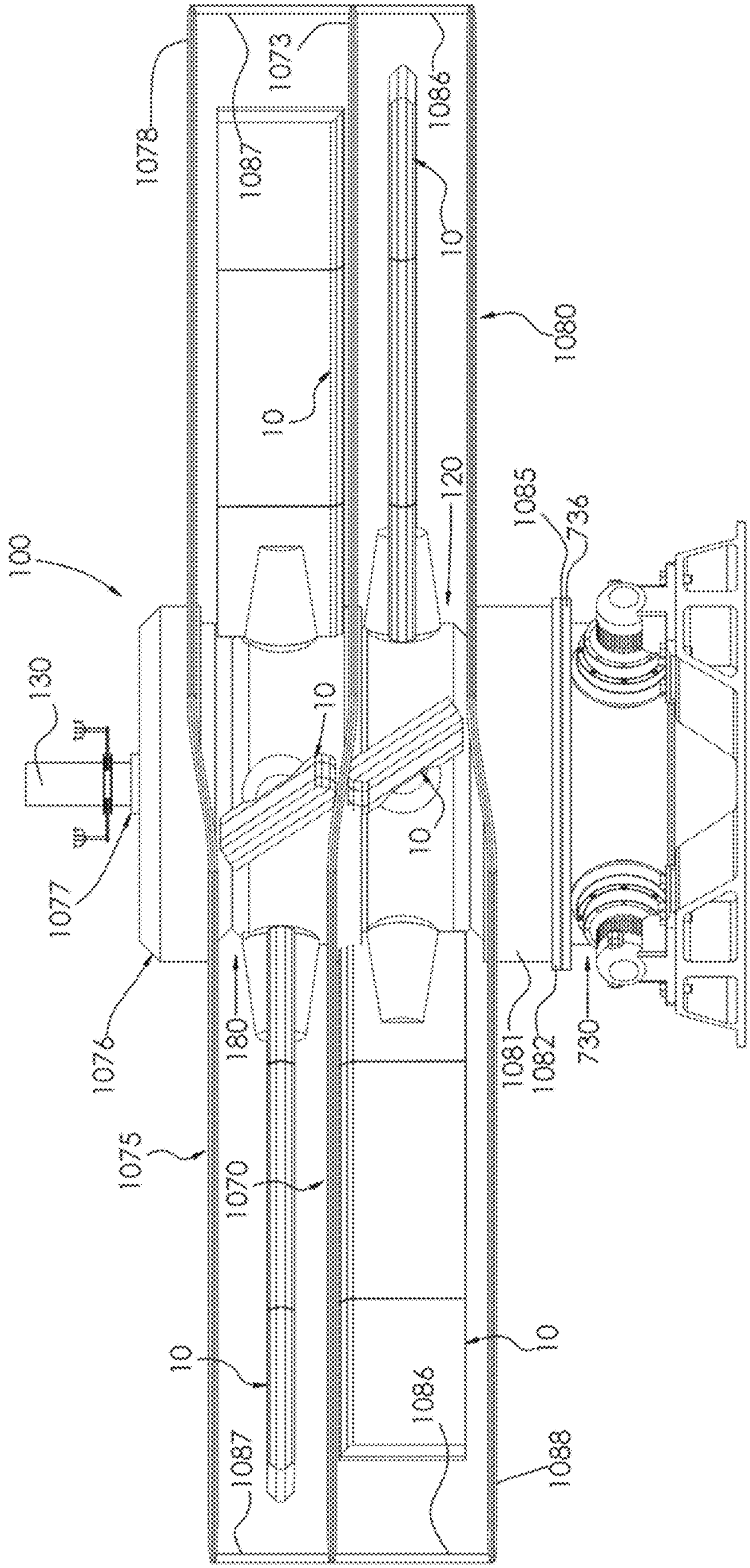
Figure 25:
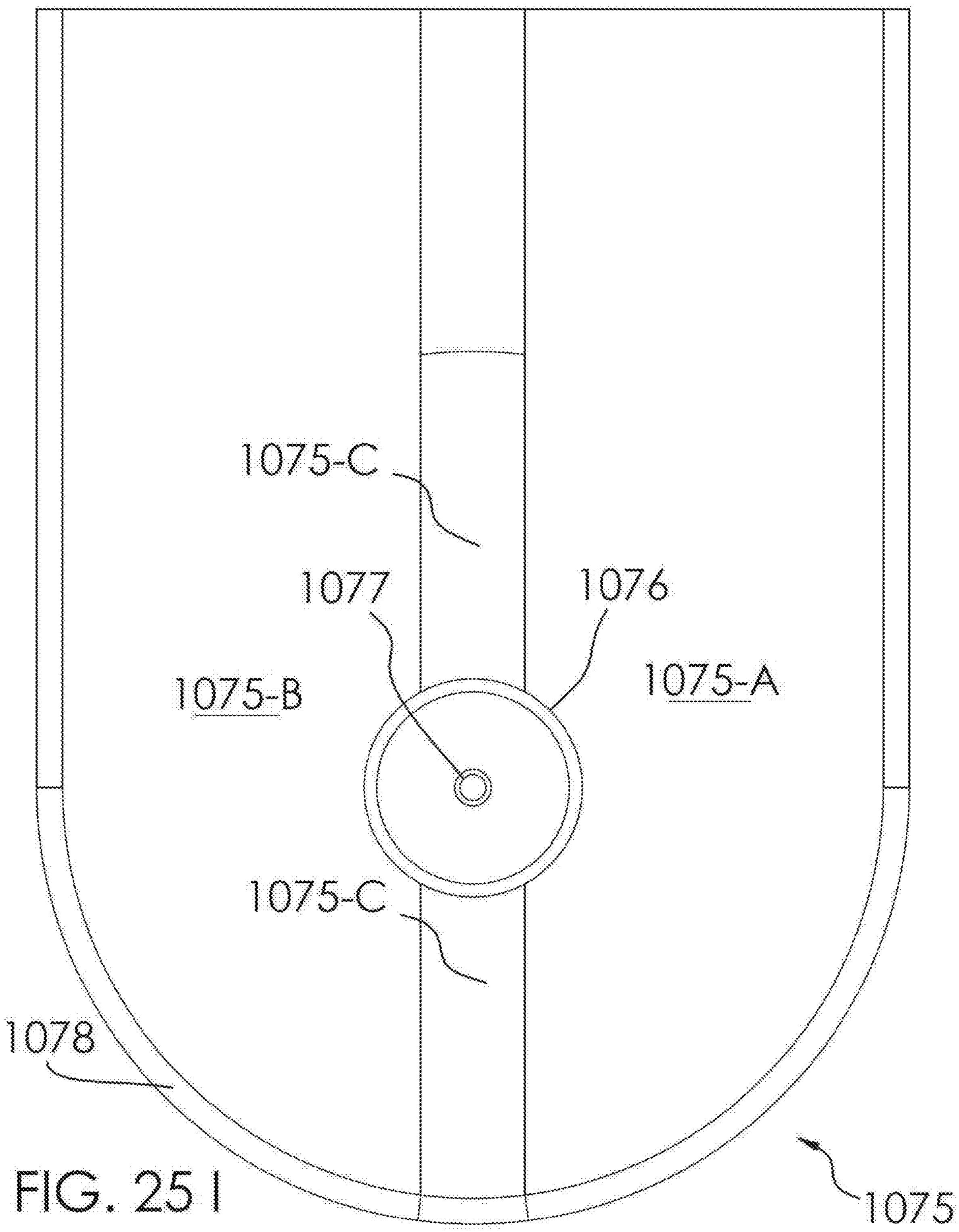
Figure 25:
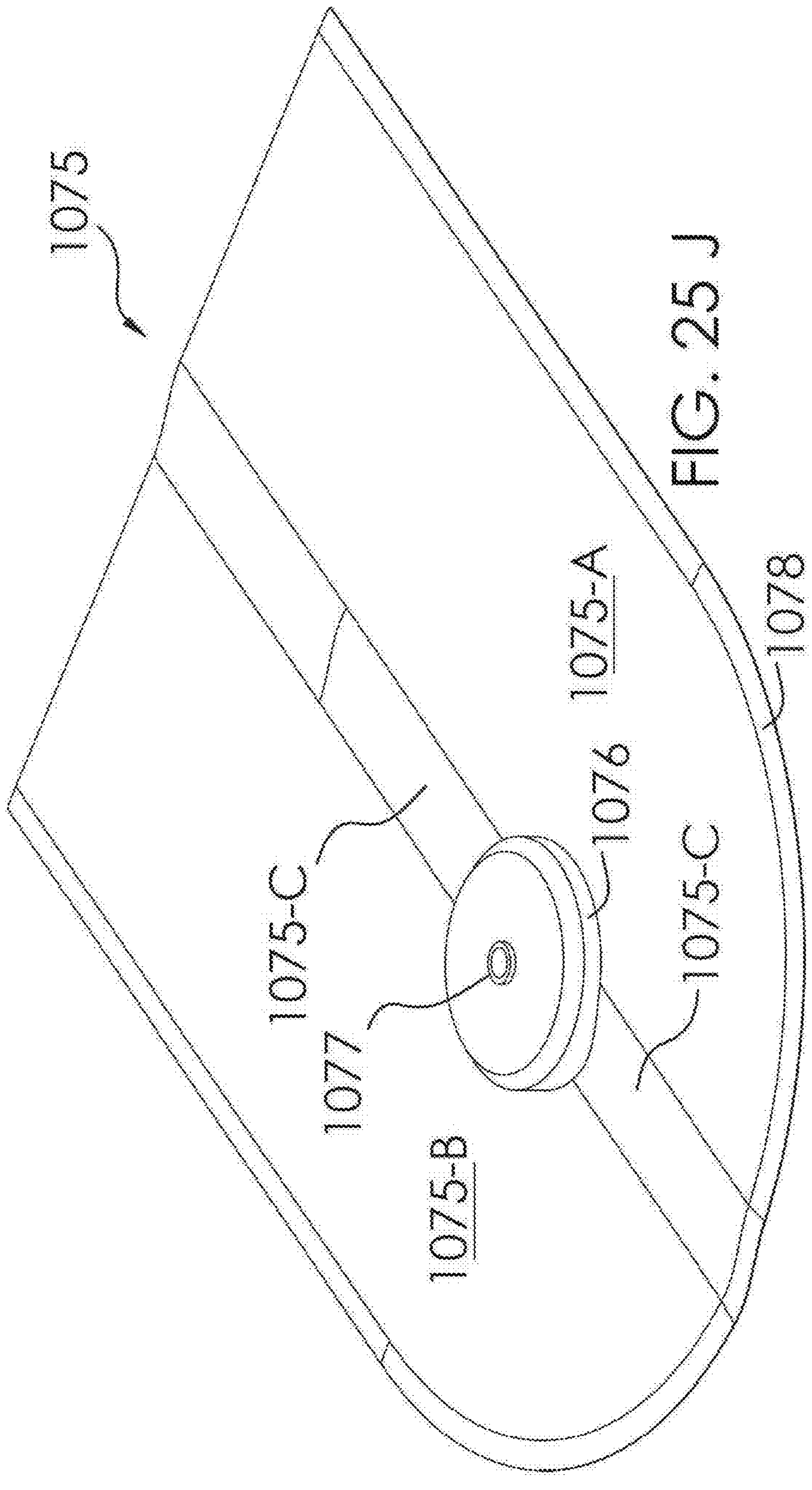
Figure 25:
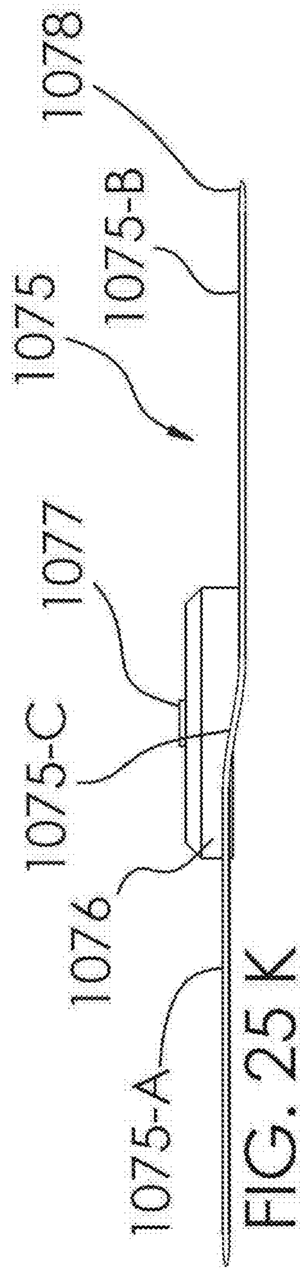
Figure 25:
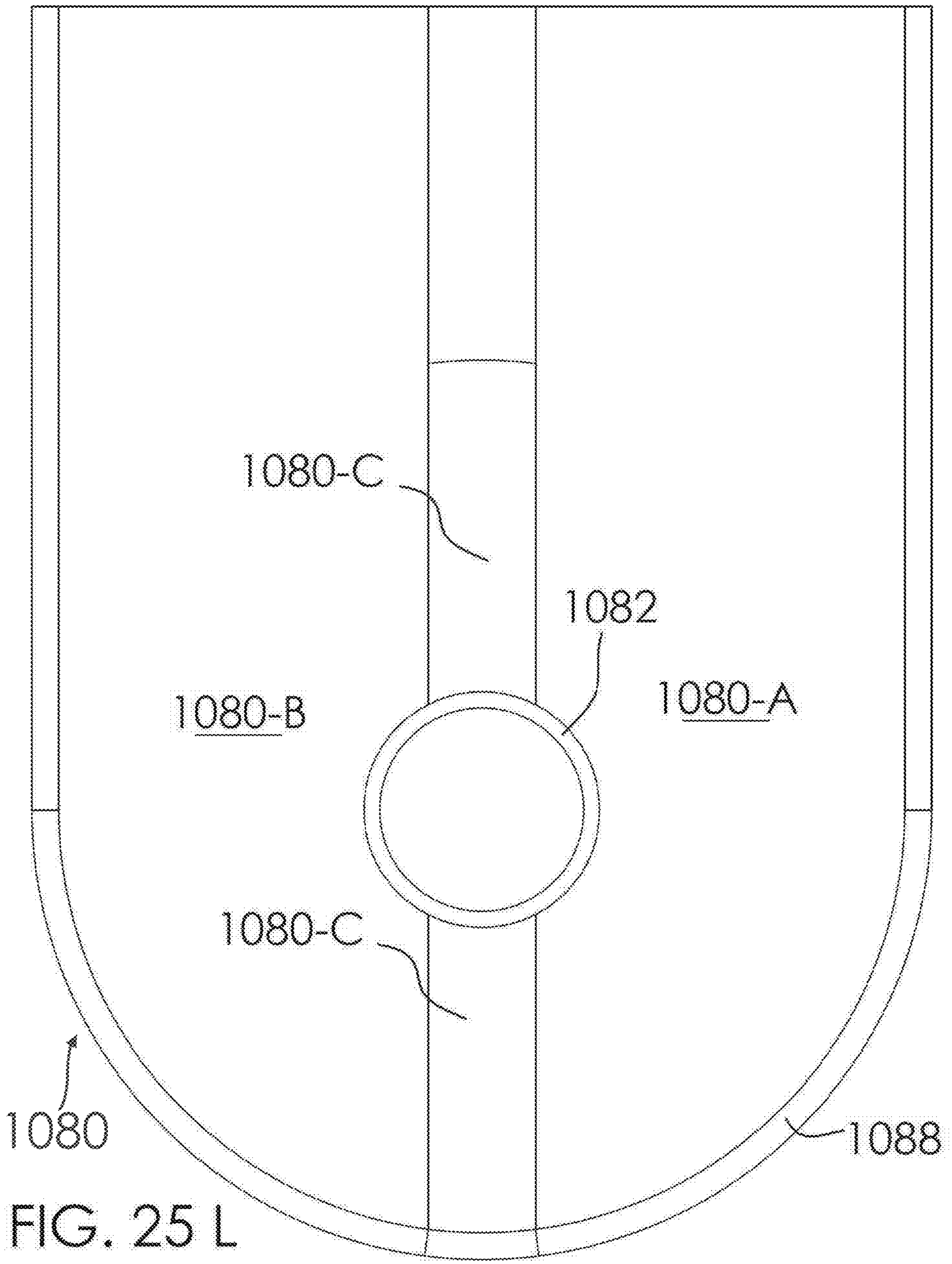
Figure 25:
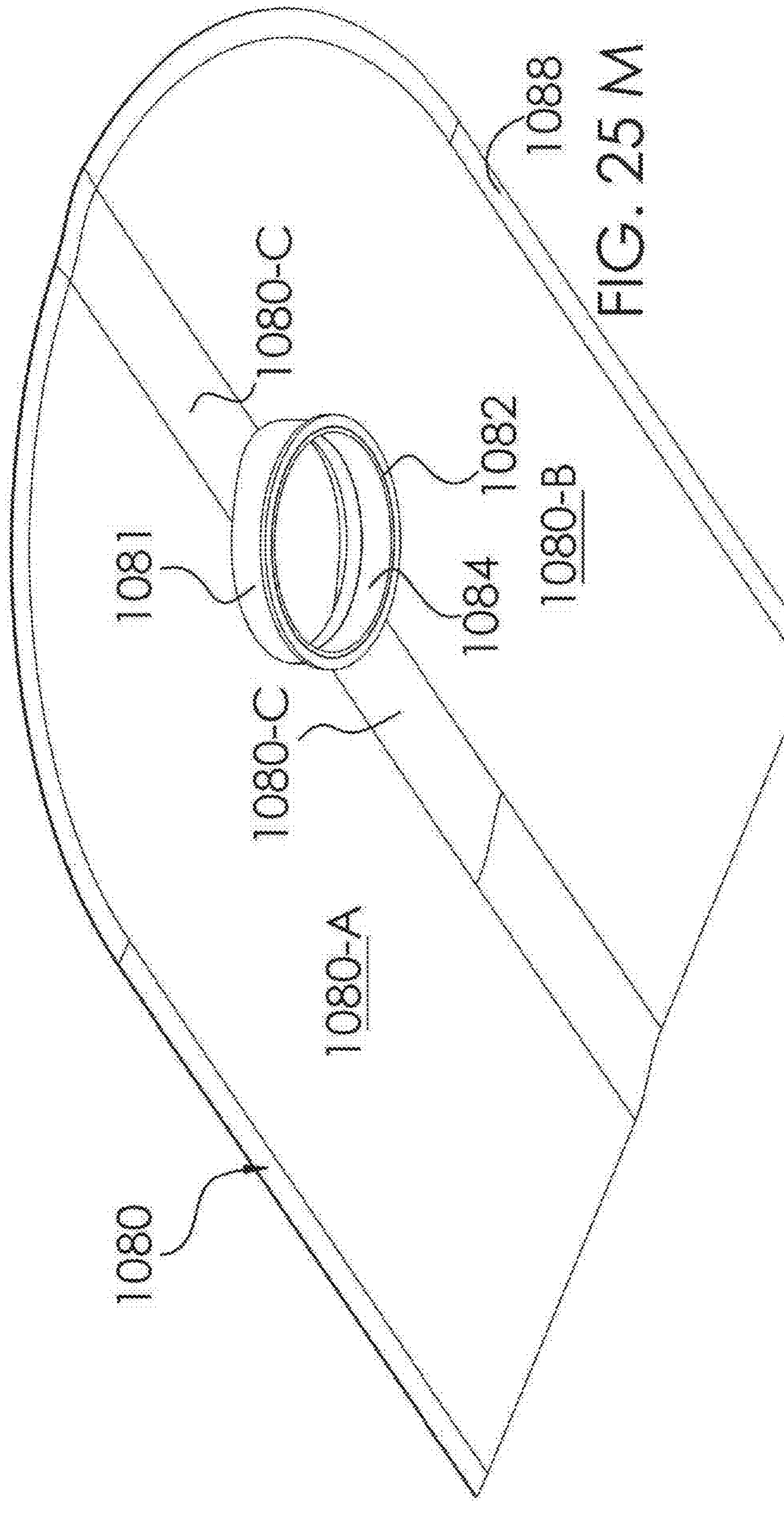
Figure 25:
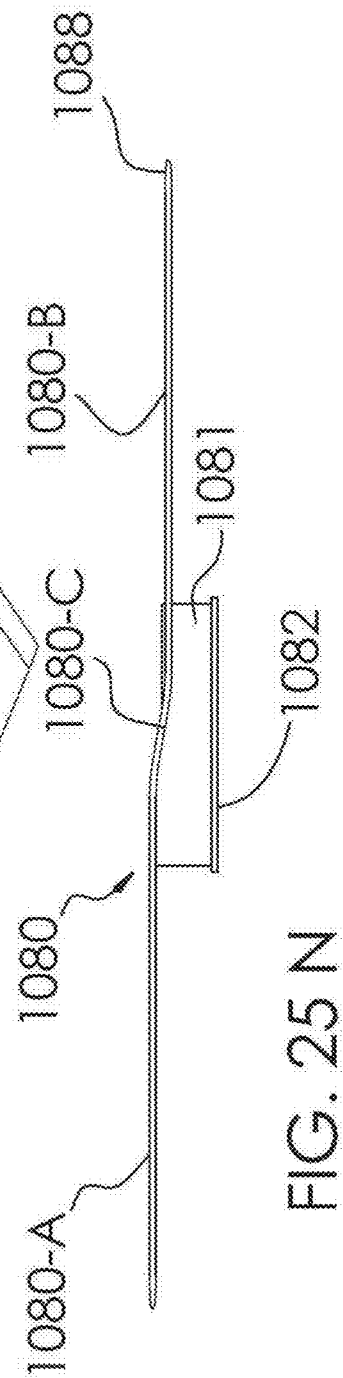
Figure 25:
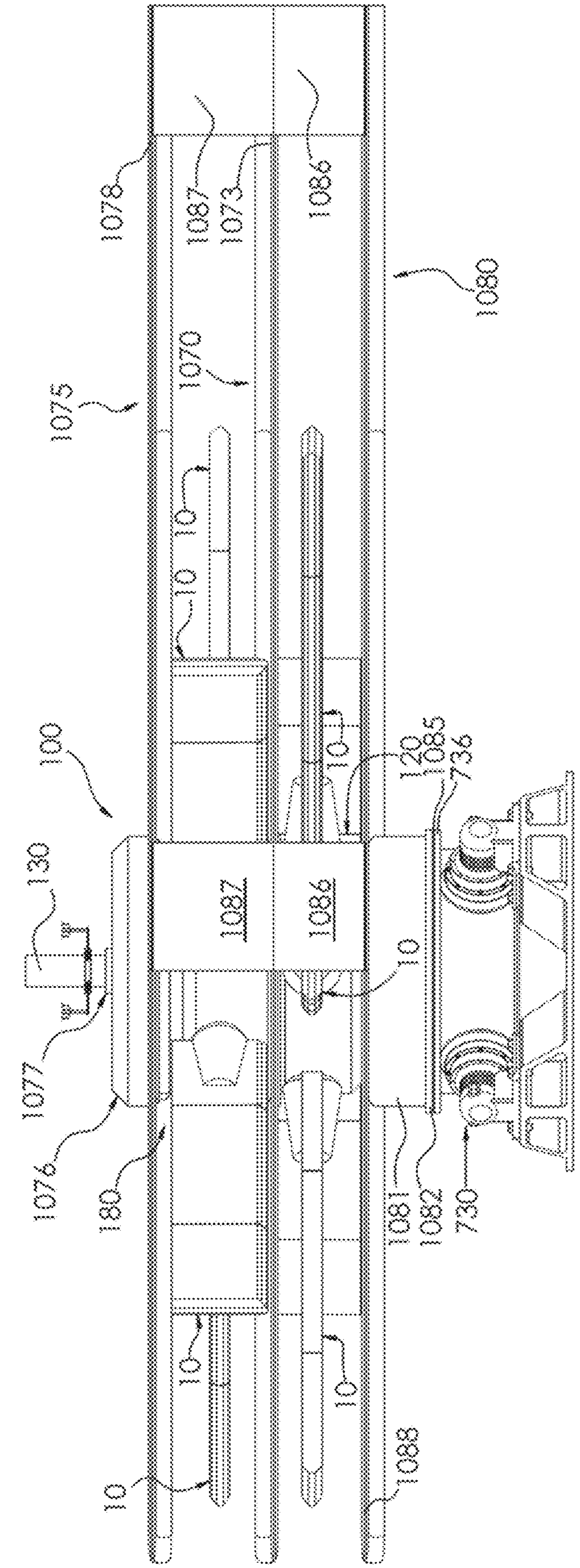
Figure 25:
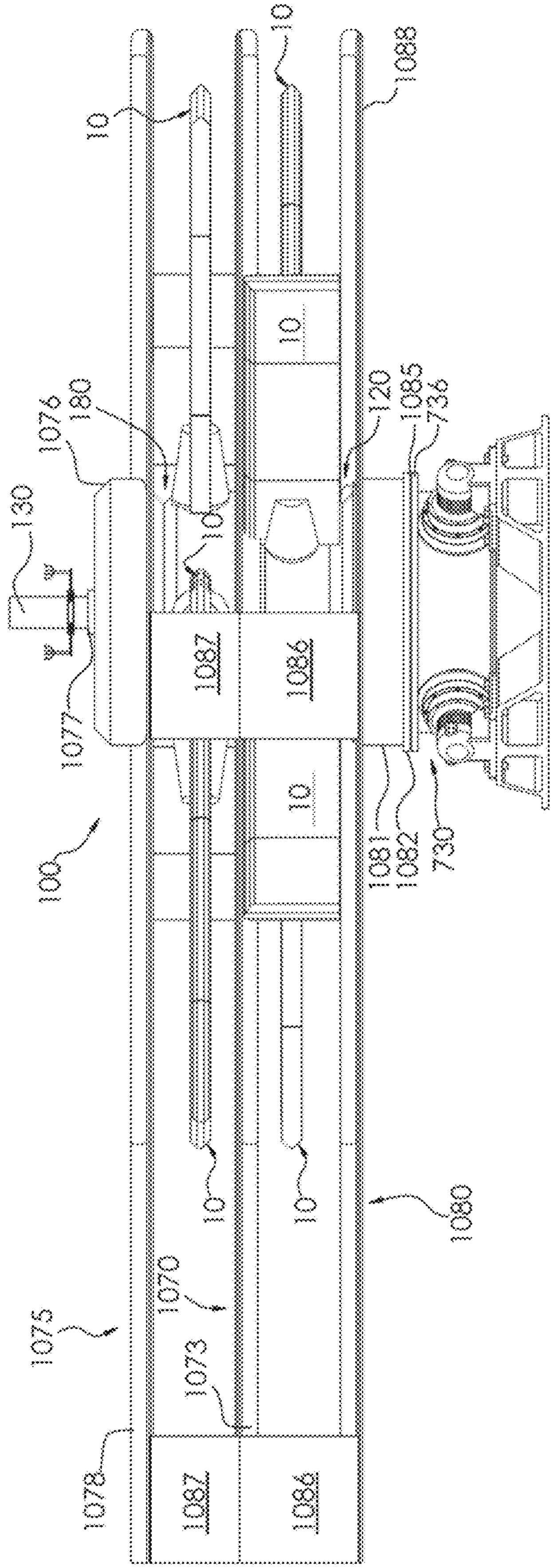
Figure 25:
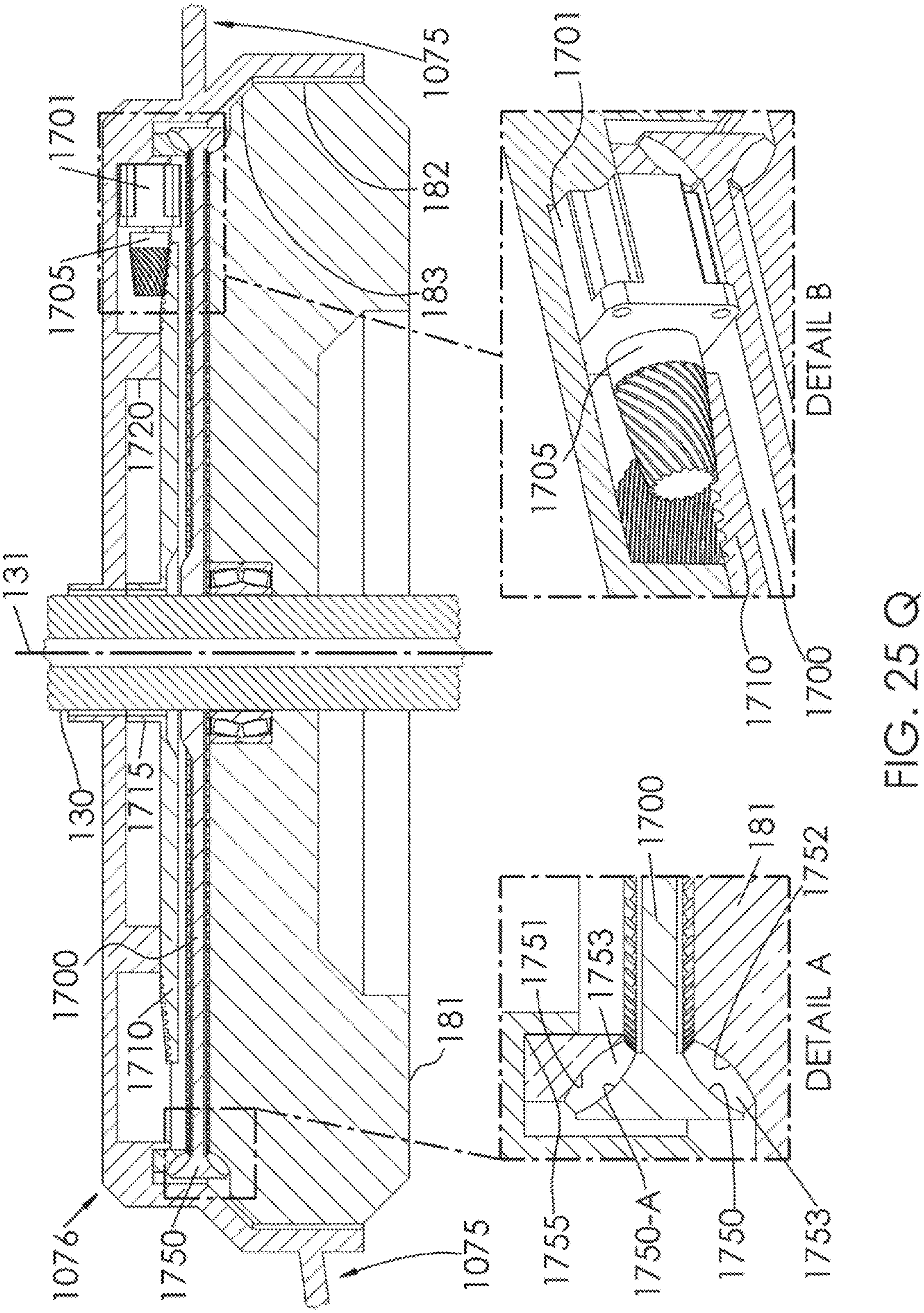
Figure 25:
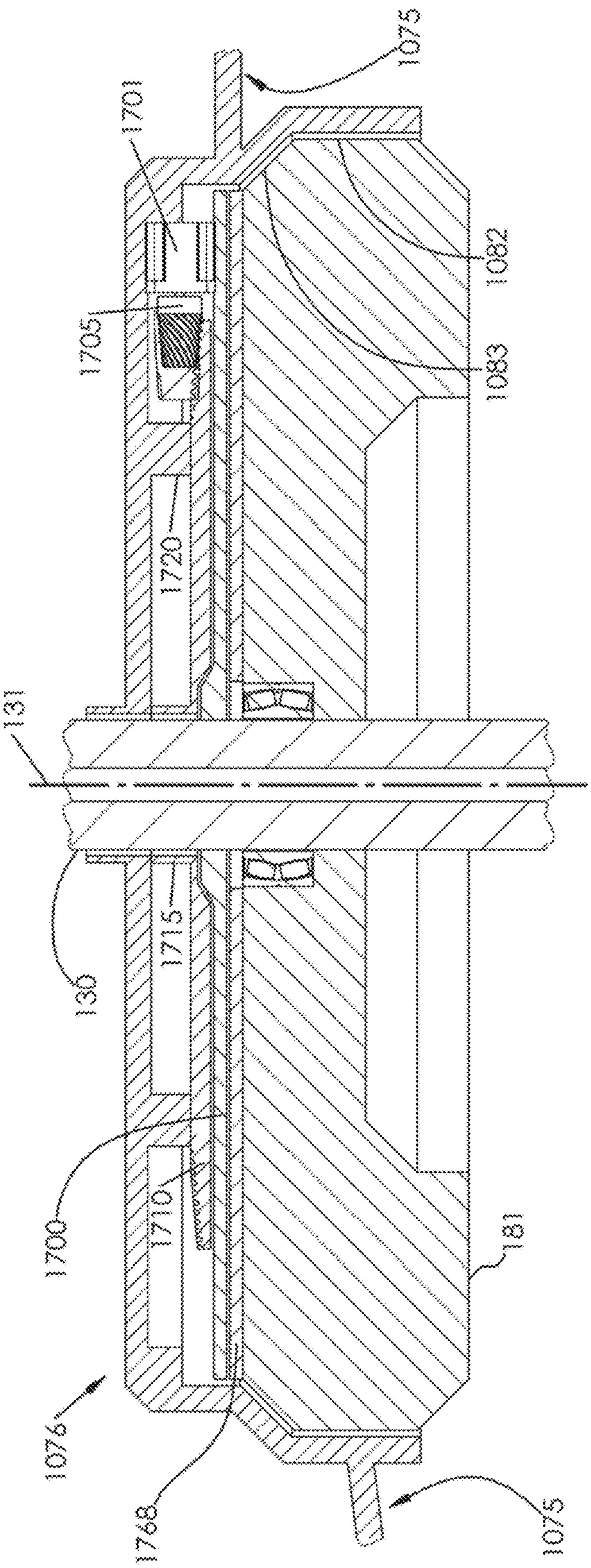
Figure 25:
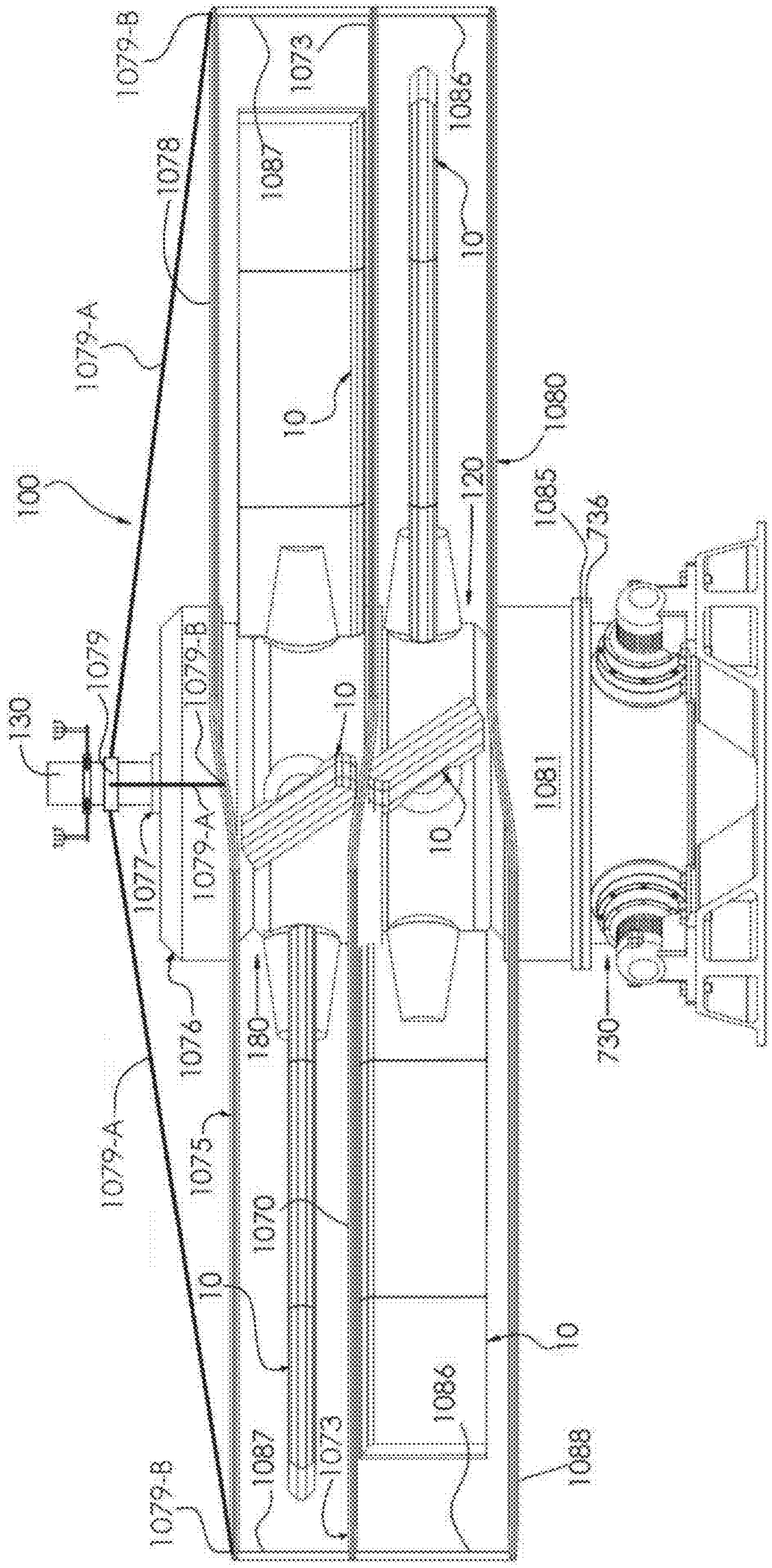

Referring now to FIG. 25 F. the cowling 1000 may also include a top plate 1105 located near the top wall 1110 of the cowling 1000 and bottom plate 1050 that is located near the ECP 10 or 20 that rotates past it (above and below, respectively). The separator plate 1070, top plate 1105, bottom plate 1050, and cowling 1000 each have the additional benefit of increasing the dynamic pressure differential the ECPs 10 or 20 (i.e., increasing pressure on the front of the ECP 10 or 20 and/or decreasing pressure on the back of the ECP 10 or 20) while in their working mode positions (e.g., by concentrating flow impinging on the working ECPs 10 or 20) and lowering the dynamic pressure on the ECPs 10 or 20 while in their slipstream mode positions (by blocking flow from impinging on the ECPs 10 or 20 while in their slipstream orientations). The cowling 1000 may also include external collectors at the intake ports 1010 and 1020 areas where the fluid flow enters them it thereby further increasing the dynamic pressure on the ECPs 10 or 20, and consequently increasing the total horsepower and related energy conversion output of the KFECS 100.

It should be appreciated that the cowling 1000 provides sufficient area to support embodiments that could block the fluid flow from intake ports 1010 and 1020, and exhaust ports 1025 and 1015, thereby supporting another embodiment of overspeed protection or maintenance purposes whereby it is desirable to control, restrict or block the fluid flow from contacting ECPs 10 or 20.

Separator plate 1070 may be disposed at different axial positions (relative to the hub axis of rotation) for adjacent hubs to accommodate the width of the respective ECPs 10 or 20 while in their working modes. For example, as shown in FIG. 25A, the top edge of left intake port 1010 (which corresponds to the bottom surface of separator plate 1070 extending from the intake port 1010) is above the bottom edge of right intake port 1020 (which corresponds to the top surface of separator plate 1070 extending from the intake port 1020). Thus, the separator plate 1070 on the right-hand side (1070-A) of the cowling 1000) in FIG. 25A will be at a different axial location than the separator plate 1070 on the left-hand (1070-B) side of the cowling 1000. Separator plate 1070 may include a transition area 1090 between the right-hand and left-hand sides of the separator plate. In an embodiment, the angle of the transition area may generally conform to the path of the upper edge of the lower hub ECP or the lower edge of the upper hub ECP, as applicable, as the respective ECP transitions from its working orientation perpendicular to the oncoming flow to its slipstream orientation parallel to the oncoming flow.

15.1 Separator Plates—Alternate Arrangement

Referring now to FIGS. 25G-P and still referring to FIGS. 25C-25F and FIG. 1A, an alternate arrangement of separator plate 1070 described above and shown in FIGS. 25C-25F may be used in land-based or water-based applications of the KFECS 100, with or without one or more walls or components of a cowling, such as a top wall 1110, top plate 1105, base 1005, bottom plate 1050, front wall 1012, side wall 1014, and/or rear wall 1016 of cowling 1000. The alternate arrangements include one or more separator plates located above and/or below each hub 120, 180 in addition to, or instead of, separator plate 1070 located between adjacent hubs 120, 180.

In one arrangement, a top separator plate 1075 may be fixedly linked to hub carrier 130 above hub 180 via a cylindrical extension 1076 to boss 1077 so that separator plate 1075 remains operatively aligned and oriented with (i) the hub carrier and (ii) the hub 180 and ECPs 10 and 20 rotating beneath it. Even without one or more of top wall 1110, top plate 1105, base 1005, bottom plate 1050, front wall 1012, side wall 1014, and/or rear wall 1016 of cowling 1000, top separator plate 1075 may improve the characteristics of the oncoming fluid flow beneath it and largely restricts flow from slipping over the top of a working ECP 10 or 20 thereby increasing the dynamic pressure on the working ECPs of hub 180.

Top separator plate 1075 may be disposed at different axial positions (relative to the hub axis of rotation) for the adjacent top hub 180 to accommodate the width of the respective ECPs 10 or 20 while in their working modes. For example, as shown in FIGS. 25G, 25H, 25J, 25K, the right-hand side (1075-A) of top separator plate 1075—corresponding to the working side of the hub 180—will be at a different axial location than the left-hand side (1075-B) of top separator plate 1075—corresponding to the slipstream side of the hub 180. Separator plate 1075 may also include a transition area 1075-C between the right-hand side 1075-A and left-hand side 1075-B of the top separator plate 1075. In an embodiment, the angle of the transition area 1075-C may generally conform to the path of the upper edge of the ECPs of hub 180, as the respective ECP transitions from its working orientation perpendicular to the oncoming flow to its slipstream orientation parallel to the oncoming flow.

When top separator plate 1075 is used together with a separator plate 1070, independently of one or more of top wall 1110, top plate 1105, base 1005, bottom plate 1050, front wall 1012, side wall 1014, and/or rear wall 1016 of cowling 1000, the separator plates 1070 and 1075 may improve flow characteristics similarly to when used with a cowling 1000 and (i) may improve the characteristics of the oncoming fluid flow that contacts the counter-rotating ECPs 10 or 20 in part by preventing the fluid flow that contacts ECPs 10 or 20 attached to hub 120 from disturbing the flow that contacts ECPs 10 or 20 attached to hub 180, and vice versa (e.g., separator plate 1070 prevents the turbulence from one hub interfering with the axially adjacent hub), and (ii) may increase the dynamic pressure on the ECPs attached to hub 180 by, for example, concentrating flow impinging on the working ECPs 10 or 20 and confining the flow between the separator plates 1070, 1075, such that flow largely cannot slip over or under each working ECP of the hub 180. In this regard, the gaps between the top and bottom edges of each ECP 10, 20 of hub 180 and the separator plates 1075, 1070, respectively, while the ECP is in its working mode, is preferably as small as possible to minimize fluid slippage between the ECP and the separator plates while avoiding contact between the ECP and the separator plates. In addition, the lateral width of each separator plate 1070, 1075 may be larger than the diameter of the hub 180 (including the associated ECPs) to minimize cross-hub flow and turbulence (e.g., flow and turbulence from hub 180 affecting the flow of an adjacent hub).

A shown in FIGS. 25I-25K, top separator plate 1075 may have a leading edge transition 1078 at all or part of its peripheral edge. Such a leading edge transition may comprise a top and bottom edge chamfer as shown, a top or bottom edge chamfer, or an and edge bevel or fillet.

Similarly, as shown in FIGS. 25G and 25H, separator plate 1070 may have a leading edge transition 1073 at all or part of its peripheral edge. Such a leading edge transition may comprise a top and bottom edge chamfer as shown, a top or bottom edge chamfer, or an and edge bevel or fillet.

As shown in FIGS. 25G, 25H, 25L-25P, a bottom separator plate 1080 may be connected to the separator plate 1070 in a spaced-apart arrangement via connector plates 1086 (see FIGS. 25 G. and H) (e.g., two or more) extending between and connected at opposite ends to the separator plates 1070 and 1080. A top separator plate 1075 may be connected to the separator plate 1070 in a spaced-apart arrangement via connector plates 1087 (see FIGS. 25 G. and H) (e.g., two or more connector plates) extending between and connected at opposite ends to the separator plates 1070 and 1075. In one example, connector plates 1086 and 1087 are oriented so as to be aligned in their length to the orientation of the hub 120 (e.g., in the direction of oncoming flow or other controllable direction). Bottom separator plate 1080 may be rotatably coupled to the brake housing 730 below hub 120 via cylindrical extension 1081 with an internal bushing or bearing 1084 (see FIG. 25M), through which hub carrier 130 extends, and a bushing or bearing 1085 located between an annular, radial-extending separator flange 1082 at an end of cylindrical extension 1081 and an annular, radial-extending brake housing flange 736 attached to the brake housing 730. Thus, in this embodiment, bottom separator plate 1080 is fixed with respect to hub carrier 130 and remains operatively aligned and oriented with (i) the hub carrier 130 and (ii) the hub 120 and ECPs 10 and 20 rotating above it. Even without one or more of top wall 1110, top plate 1105, base 1005, bottom plate 1050, front wall 1012, side wall 1014, and/or rear wall 1016 of cowling 1000, bottom separator plate 1080 may improve the characteristics of the oncoming fluid flow above it and reduces the amount of flow flowing around the bottom edge of a working ECP 10 or 20, thereby increasing dynamic pressure on the working ECPs of hub 120.

Bottom separator plate 1080 may be disposed at different axial positions (relative to the hub axis of rotation) for the adjacent bottom hub 120 to accommodate the width of the respective ECPs 10 or 20 while in their working modes. For example, as shown in FIGS. 25G, 25H, 25M, 25N, the left-hand side (1080-B) of bottom separator plate 1080—corresponding to the working side of the hub 120—will be at a different axial location than the right-hand side (1080-A) of bottom separator plate 1080—corresponding to the slipstream side of the hub 120. Separator plate 1080 may also include a transition area 1080-C between the right-hand side 1080-A and left-hand side 1080-B of the bottom separator plate 1080. In an embodiment, the angle of the transition area 1080-C may generally conform to the path of the lower edge of the ECPs of hub 120, as the respective ECP transitions from its working orientation perpendicular to the oncoming flow to its slipstream orientation parallel to the oncoming flow.

The inventor has determined that when bottom separator plate 1080 is used together with a separator plate 1070, independently of one or more of top wall 1110, top plate 1105, base 1005, bottom plate 1050, front wall 1012, side wall 1014, and/or rear wall 1016 of cowling 1000, the separator plates 1070 and 1080 improve flow characteristics similarly to, and, in some instances, better than, when used with a cowling 1000. In one respect, separator plates 1070 and 1080 prevent the fluid flow that contacts ECPs 10 or 20 attached to hub 180 from disturbing the flow that contacts ECPs 10 or 20 attached to hub 120, and vice versa (e.g., separator plate 1070 prevents the turbulence from one hub interfering with the axially adjacent hub). Separator plates 1070, 1080 also increase the dynamic pressure on the ECPs attached to hub 120 by, for example, concentrating flow impinging on the working ECPs 10 or 20 and confining the flow between the separator plates 1070, 1080 such that flow largely cannot slip over or under each working ECP of the hub 120. In this regard, the gaps between the top and bottom edges of each ECP 10, 20 of hub 120 and the separator plates 1070, 1080, respectively, while the ECP is in its working mode, are preferably as small as possible to minimize fluid slippage between the ECP and the separator plates while avoiding contact between the ECP and the separator plates. In some instances, the (i) gap between separator plate 1070 and the working mode ECPs may be different than the gap between separator plate 1080 and the working mode ECPs and (ii) gap between separator plate 1070 and the working mode ECPs may be different than the gap between separator plate 1075 and the working mode ECPs, although in other instances the gaps may be same. In addition, the lateral width of each separator plate 1070, 1080 (front to back and/or side to side) may be larger than the diameter of the hub 120 (including the associated ECPs) to minimize cross-hub flow and turbulence (e.g., flow and turbulence from hub 120 affecting the flow of an adjacent hub) or otherwise increase KFECS performance.

A shown in FIGS. 25L-25N, bottom separator plate 1080 may have a leading edge transition 1088 at all or part of its peripheral edge. Such a leading edge transition may comprise a top and bottom edge chamfer as shown, a top or bottom edge chamfer, or an and edge bevel or fillet.

In one arrangement, separator plate 1070, 1075, and 1080 are fixed with respect to hub carrier 130 and rotate with the hub carrier 130 to orient the separator plates in any controlled orientation relative to the oncoming fluid flow and to prevents any ECPs 10 or 20 from coming in contact with the separator plates.

The shape of the separator plates 1070, 1075, 1080 as shown (i.e., with a semi-circular forward portion and a rectangular rear portion having a width matching the diameter of the semi-circular portion) is not limiting, and other shapes, such as circular, may be employed.

15.2 Separator Plates—Motorized with Roller Bearings

Referring now to FIGS. 25G, 25H and 25Q, an alternate arrangement of separator plate 1070 described above may be used in land-based or water-based applications of the KFECS 100. The alternate arrangement includes components that configure the separator plate 1070, and any components connected to it to be rotatable with respect to the hub carrier 130 and to rotate synchronously with motorized hub orientation embodiments described in Section 16 (collectively a "motorized separator plate assembly").

As shown in FIGS. 25Q and 25R, a motor 1701 is supported on a motor mounting plate 1700, which is fixed to hub carrier 130. Motor 1701 may be an electric stepper motor and may be computer controlled, for example, via inputs from fluid direction and speed sensors 810 (see FIG. 1A) and/or inputs from hub rotation motors and encoders (see Section 16). A pinion gear 1705 driven by motor 1701 is operatively engaged with a bevel gear 1710. Bevel gear 1710 may be fixedly linked to a boss 1720 which may be an integral or attached feature of a separator plate assembly 1076. Bevel gear 1710 may also include a collar 1715 supporting the bevel gear 1710 on the hub carrier 130, with a bushing or bearing (not shown) located between the inner diameter of collar 1715 and the outer diameter of hub carrier 130. The motor mounting plate 1700 may have integral dual bearing races 1750 (upper bearing race 1751 and lower bearing race 1752), and separator plate assembly 1076 may have a relief 1755 to support a bearing race 1751. Likewise, hub extension 181 may have an integral bearing race, or separate bearing race (not shown). Thus, when pinion gear 1705 rotates bevel gear 1710, the separator plate assembly 1076 rotates about the hub carrier axis 131. It should be noted that hub extension 181, motor mounting plate 1700, and bevel gear 1710, collar 1715 and hub carrier 130 may each be magnetized, by permanent magnets or electromagnetically, with like poles adjacent to each other (North pole surfaces adjacent to North pole surfaces, and South pole surfaces adjacent to South pole surfaces) thereby causing each to repel against the other and thereby further supporting the load of the separator plate assembly 1076, and to keep bevel gear 1710 in a proper radial position with respect to hub carrier 130 via collar 1715.

15.3 Separator Plates—Motorized with Magnetic Bearings

Referring now to FIG. 25 G, 25H, FIG. 25R and still referring to FIG. 25Q, an alternate embodiment of the motorized separator plate arrangement includes repelling permanent or electromagnetic magnetic plates and surfaces in lieu of roller or spherical bearings. In this embodiment, hub extension 181, including its outer diameter 182 and chamfered surface 183, motor mounting plate 1700, bevel gear 1710, collar 1715, hub carrier 130, optional magnetic plate 1768 (which may be used, for example, if hub extension 181 is not made from a ferrous material), separator plate assembly 1076 and the adjacent mating surfaces of hub extension 181 may each be magnetized with like poles adjacent to each other (North pole surfaces adjacent to North pole surfaces, and South pole surfaces adjacent to South pole surfaces) thereby causing each to repel against the other thereby further supporting the load of the separator plate assembly 1076, and to keep bevel gear 1710 in a proper radial position with respect to hub carrier 130 via collar 1715.

Referring now to FIG. 25S, all separator plate embodiments described in Sections 15.1-15.3, other than within cowling 1000, may include a vertical support structure comprising a rotatable coupling 1079 axially supported on hub carrier 130 at or near its top, as shown, and cables, rods or other tension-bearing supports ("structural supports") 1079-A fixed to the rotatable coupling 1079 at one end and connected to attachment points 1079-B on separator plate 1075 at the other end. Connection points 1079-B may be located near the outer-most edge of the separator plate 1075. The vertical support structure enables the structure comprising separator plates 1075, 1070, 1080 to be capable of supporting greater snow loads and its own weight thereby permitting a less robust construction of the separator plates 1075, 1070, 1080, which may reduce manufacturing cost as compared to a separator plate embodiment not including a vertical support structure, such as structural supports 1079-B.

Rotatable coupling 1079 is intended for use with a separator plate assembly on a KFECS 100 configured with any motorized track assembly (see Section 16) where the separator plate assembly is rotatably coupled to the hub carrier 130. Embodiments in which separator plate assemblies are not configured together with a rotatable track assembly, may be non-rotatably attached to hub carrier 130. For such a configuration, coupling 1079 would not be required to be rotatable with respect to hub carrier 130, but would be identical in all other respects to coupling 1079, e.g. its attachment method to hub carrier 130 attachment of structural supports 1079-A.

Referring now to FIGS. 25A and 25F if any motorized track assembly embodiment described in Section 16 were used with a separator plate that is not a motorized separator plate assembly as described herein, the ECPs would collide (i) with one or more of separator plates 1075, 1070 and 1080 (see FIG. 25H), depending upon which separator plates were included within the arrangement, or (ii) with cowling 1000, top plate 1105, separator plate 1070, and bottom plate 1050 (see FIG. 25F) depending upon which separator plates were included within the arrangement, the width of the ECPs, and the distance between the working ECP's leading edge, e.g. 14, and trailing edge, e.g. 18, and the separator plate above it, e.g. 1075 or top plate 1105, and below it, e.g. 1070 or bottom plate 1050. Accordingly, in some embodiments, powered rotation of the separator plate motorized separator plate assembly is synchronized with powered rotation of the rotatable track assembly.

15.4 Separator Plates—Motorized Cowling Embodiment

Referring now to FIG. 25A, FIG. 25F, FIG. 25 G, FIG. 25N, and FIGS. 25Q and 25R, it should be appreciated that any embodiment of a motorized separator plate assembly as described in Sections 15.2 and 15.3 may be adapted to cowling 1000 by replacing cowling top plate 1105 with separator plate 1075 and related motorized separator plate assembly (adaptation not shown) thus enabling cowling 1000 to rotate synchronously with motorized hub orientation embodiments described in Section 16.

Section 16—KFECS Orientation Control—Motorized Hub Orientation 16.1 General

In addition to the hub orientation control system described in Section 12.1, in various embodiments, the KFECS 100 includes redundant and/or alternate methods to orient the KFECS 100 to a desired orientation, e.g., an optimal orientation relative to the oncoming fluid flow or any other controlled position, including adjusting the location about the hub carrier 130 at which an ECP articulates to working mode. This function can be used to regulate the power conversion during periods of high fluid speed and low grid demand, or any other reason, for example, as controlled by a computer. These alternate orientation control embodiments include rotation of cam track assemblies 250 (see FIG. 6A) using motors that are internal components of cam track assemblies, as described in Sections 16.1 and 16.2, and external motors as described in Section 16.3.

Figure 26:
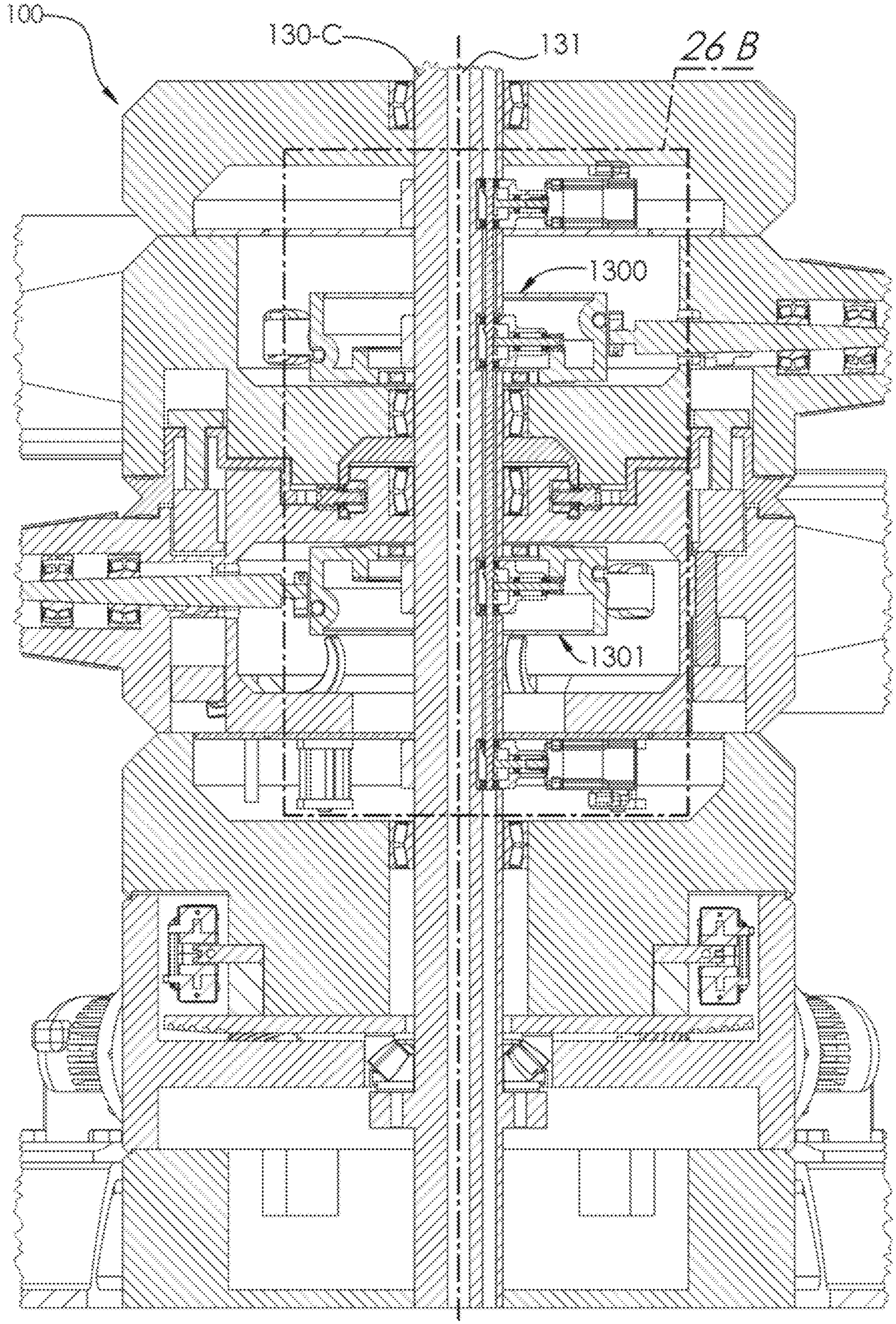
FIG. 26A is a cropped cross-sectional view of a KFECS embodiment with the location of two motorized rotatable splined hub assemblies.
FIG. 26B is a cross-sectional magnified view of two motorized rotatable hub assemblies (Detail 26B depicted on FIG. 26A) revealing a view of two motorized splined rotatable hub assemblies, orientation drive train components including orientation shaft, shaft gears, horizontal gear shaft assemblies and ring gears.
FIG. 26C is a cross-sectional magnified view of one motor and motorized rotatable splined hub assembly (Detail 26C depicted on FIG. 26B). revealing orientation drive train components including orientation shaft, bearings, shaft gears, horizontal gear shaft assemblies and ring gears.
Figure 26:
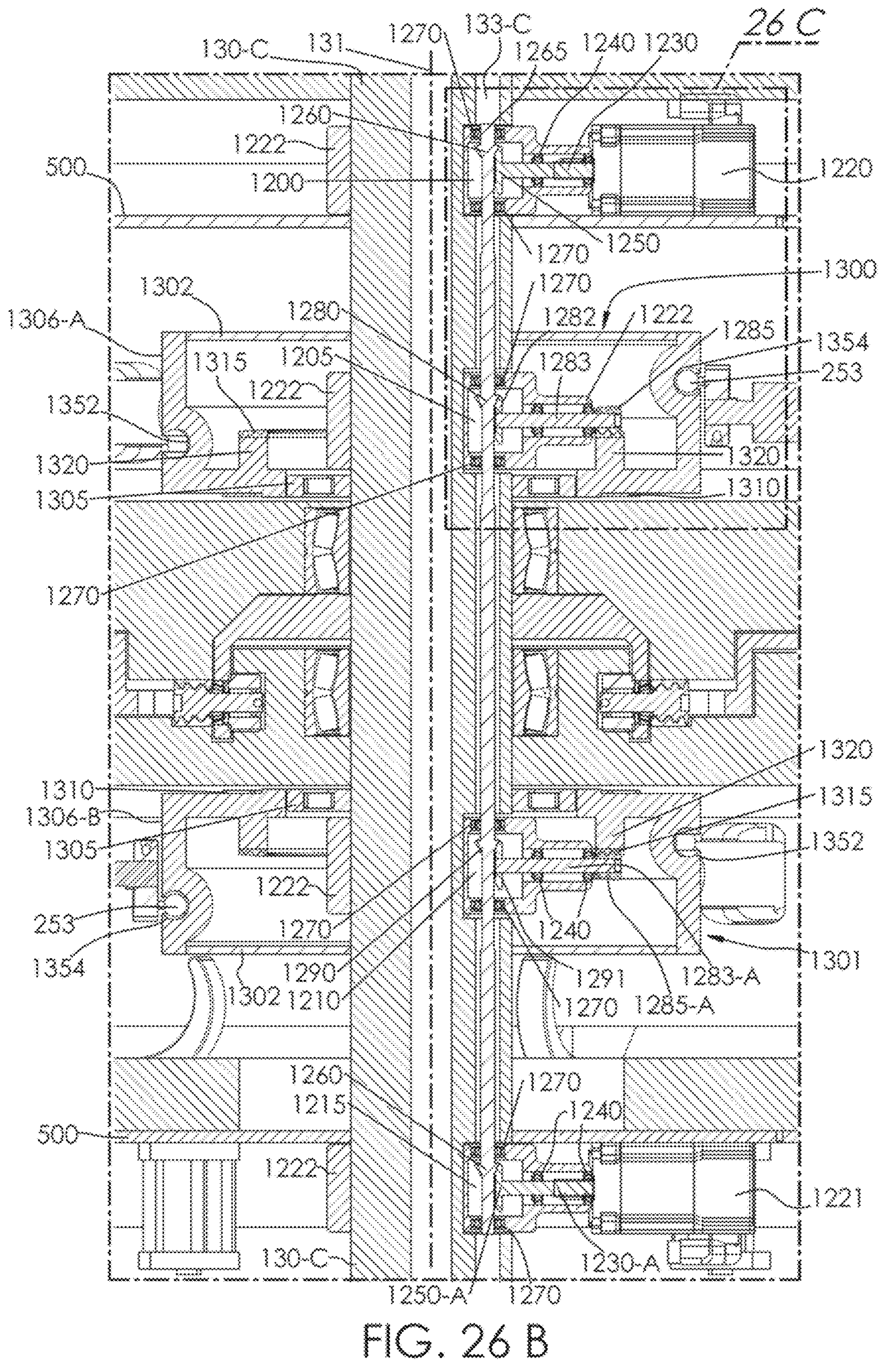
Figure 26:
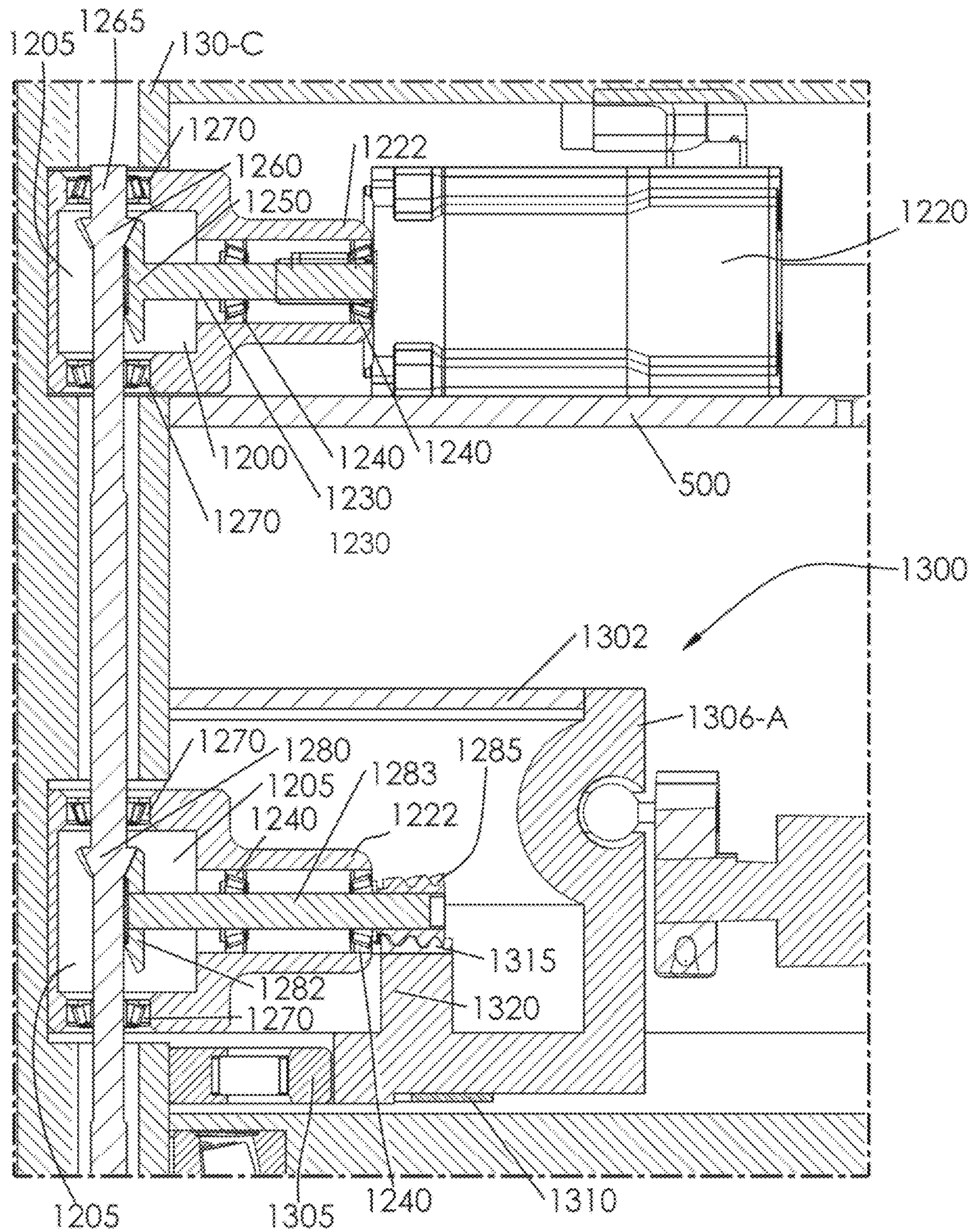
Figure 27:
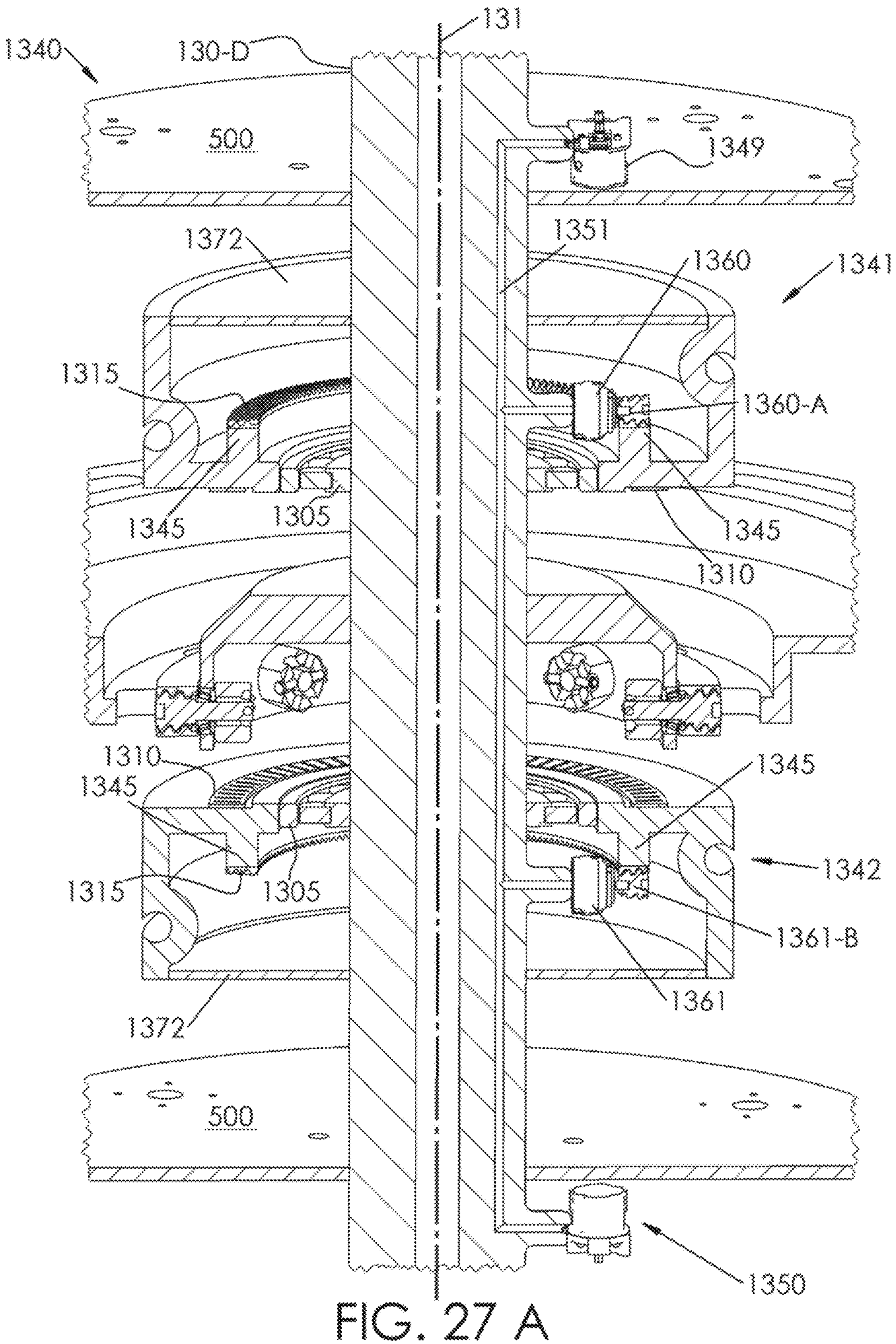
FIG. 27A is a cross-sectional view of an alternative embodiment of a rotatable splined hub assemblies including two hydraulic pumps, one of two fluid manifolds and two hydraulic powered rotatable hub assemblies.
FIG. 27B is a side view of an alternate embodiment of the hub carrier used with one or more hydraulically actuated rotatable hub assemblies, with inlet and outlet ports, pump mounting boss locations and a broken out section that reveals two hydraulic fluid lines that are bored through the hub carrier.
Figure 27:
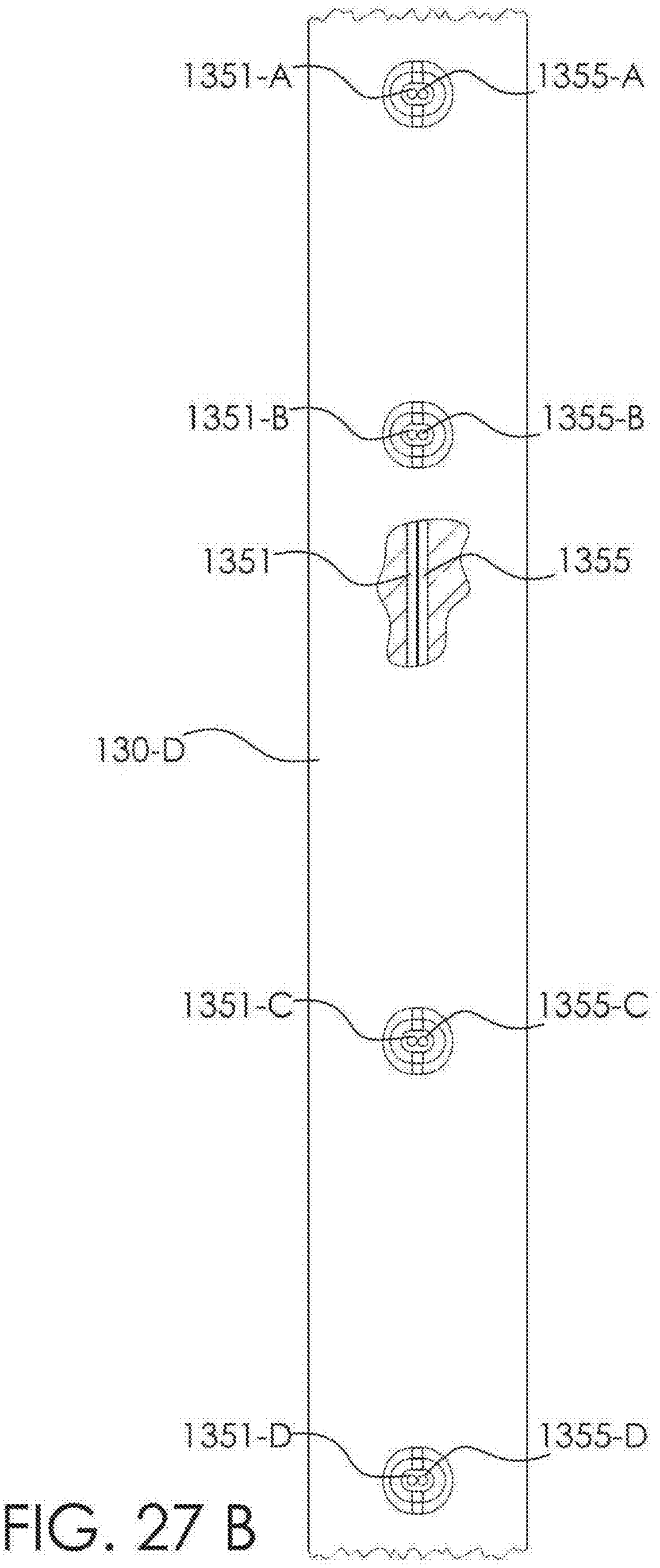

FIGS. 26A-C illustrate a motorized rotatable track assembly 1300, and FIGS. 27A-B illustrate a hydraulically-actuated rotatable track assembly 1340. Both motorized rotatable track assembly 1300 and the hydraulically-actuated rotatable track assembly 1340 (collectively "rotatable track assemblies") may achieve the same effect on the KFECS 100 with respect to (i) orienting the KFECS 100 to the optimum, or any other, orientation to the oncoming fluid flow or (ii) regulating the energy conversion of the KFECS 100, for example if used for conversion to electricity, during times of reduced electrical grid demand, (iii) the ability to be used with any hub orientation embodiment that is operably or fixedly linked to the hub carrier 130 including, without limitation, the (i) magnetic spherical cam track assembly 250, (ii) liquid-lubricant filled cam track assembly 300, and (iii) magnetic array assembly 370.

All track orientation control systems in this Section 16 may (i) be configured with split cam track assemblies as described in Section 2 and (ii) interface with the AOS System as described in Section 10. Consequently, all of the orientation control systems described in this Section 16 may operate with the AOS System and (i) operate a split cam track assembly as shown in Section 16.4, whereby ball screws 506-A rotate (see FIGS. 28A-C) to separate upper moveable hub section 252-A of the upper rotatable track assembly 280-B from lower, stationary hub section 251-A and separate the lower moveable hub section 252-A of the lower rotatable track assembly 280-C from the upper, stationary hub section 251-A. Accordingly, each moveable section 252-A, when actuated by ball screws 506-A, will move toward its respective motor mounting plate 500. Ball screw 506-A protrudes through the top of ball screw motor 505-A, thus not interfering with the split track assembly (see Section 9.1).

Each rotatable track assembly in this Section 16 operates by rotating a track—e.g., track 255 or 303, within which a follower coupled to each ECP moves to control the articulation of the ECP during rotation of the hub and, in an embodiment may embody any split-track or other articulation override embodiment described in Section 10.

Each rotatable track assembly in this Section 16 includes a track orientation control mechanism operatively coupled to one or more rotatable track assemblies and is configured to effect powered rotation of the rotatable track assembly to alter the rotational positions of the sections of the articulation control track about the hub axis of rotation.

Each rotatable track assembly in this Section 16 is or may be configured and/or operated to orient the KFECS 100 to the optimum fluid flow from an oncoming fluid flow direction as in FIGS. 27D-27E. However, each track assembly may also be configured and/or operated to reduce the amount of energy being converted, e.g., during periods of decreased electrical energy grid demand, periods of excessive fluid speeds, or manual intervention. The track assemblies enable such reductions in energy conversion by: (i) delaying the time that each ECP is articulated from slipstream mode to working mode as in FIG. 27F (defined as asynchronous track movement), (ii) rotating the KFECS out of an optimal orientation to the oncoming fluid flow, and (iii) employing any combination of the asynchronous movement or rotation of the KFECS out of the fluid flow. These energy conversion reduction methods enable the KFECS to continue to convert energy during periods of very high fluid speeds that may otherwise surpass the KFECS design specifications and convert energy at fluid speeds in excess of traditional wind and water powered energy conversion systems.

Figure 28:
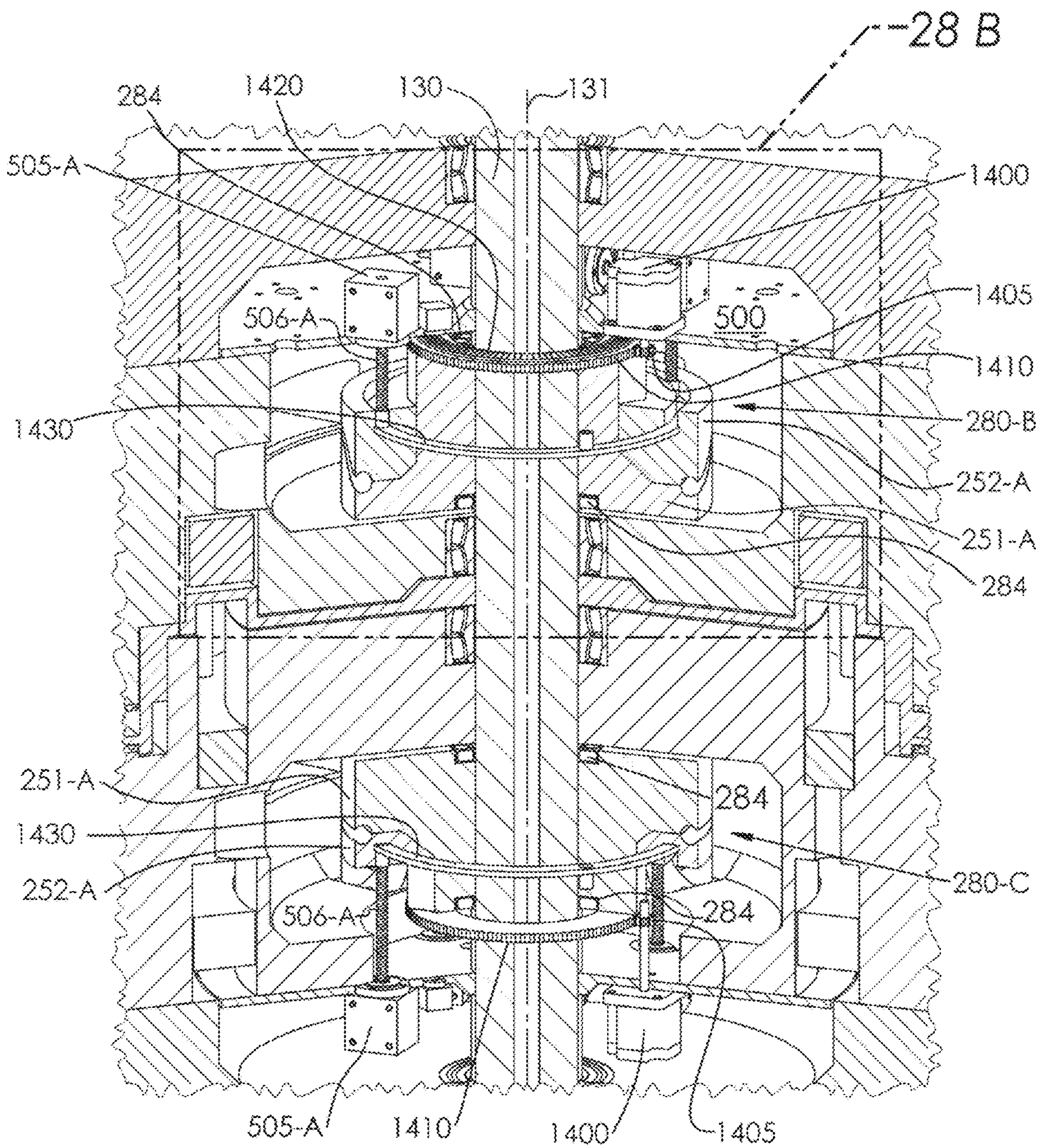
FIG. 28A is cropped isometric view of an alternative embodiment of rotatable hub assemblies with a 135° section removed to reveal external stepper motor, external ring gear and lifting ring of each split track assembly.
FIG. 28B is cropped isometric magnified view of an alternative embodiment of rotatable hub assemblies with a 135° section removed to reveal the upper external stepper motor, external ring gear and lifting ring of the upper split track assembly.
FIG. 28C is cropped isometric view of (i) the alternative embodiment of rotatable hub assemblies of FIG. 28B with a 135° section removed to reveal external stepper motor, external ring gear and lifting ring of each split track assembly in their open position, and (ii) a magnified view of a ball screw assembly in its open position.
FIG. 28D is a front view (i.e., facing the oncoming fluid flow from 0°) of motorized spline track assemblies in the position of optimized ECP articulation points, with 10° of separation between each ECP prior to each reaching in working mode articulation.
FIG. 28E is a front view (i.e., facing due North at 0°) of motorized spline track assemblies positioned optimally for when the fluid is coming from 330° (North-North West) with optimized ECP articulation points, with 10° of separation between each ECP prior to each reaching its working mode articulation.
FIG. 28F is a front view (i.e., facing the oncoming fluid flow from 0°) of motorized spline track assemblies which illustrate the position of ECP articulation points set for reduced performance, with 60° separation between each ECP prior to each reaching its working mode articulation.
Figure 28:
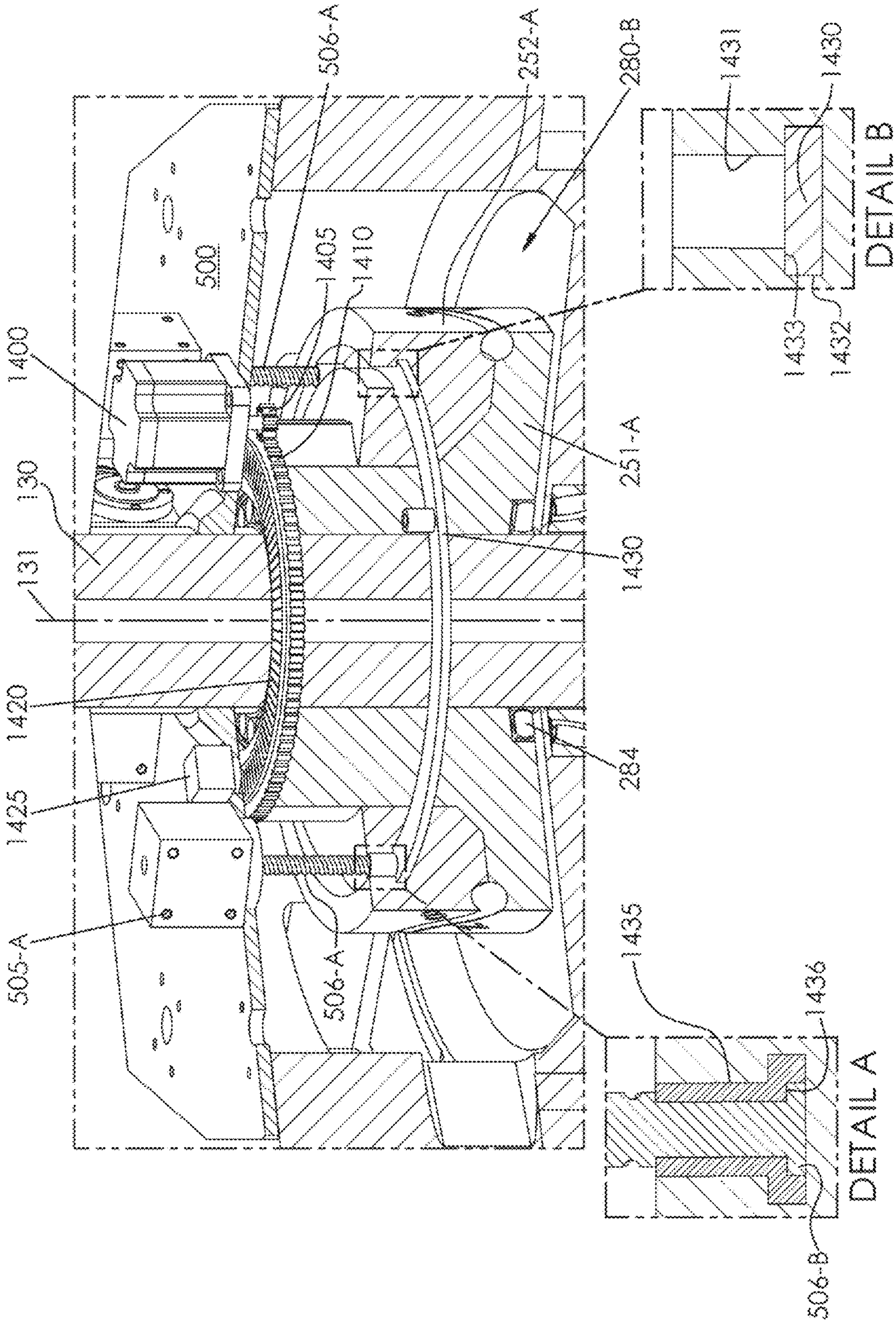
Figure 28:
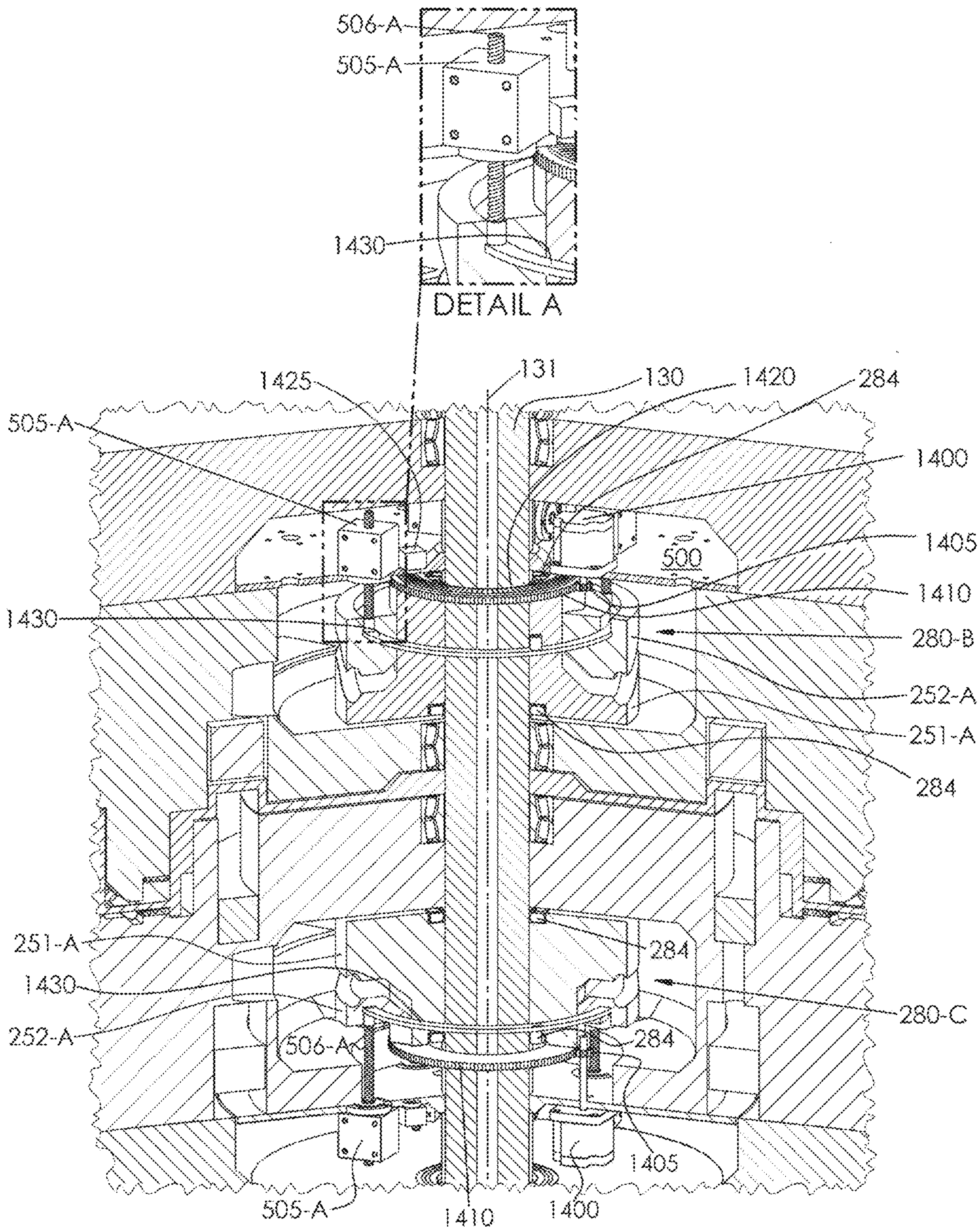
Figure 28:
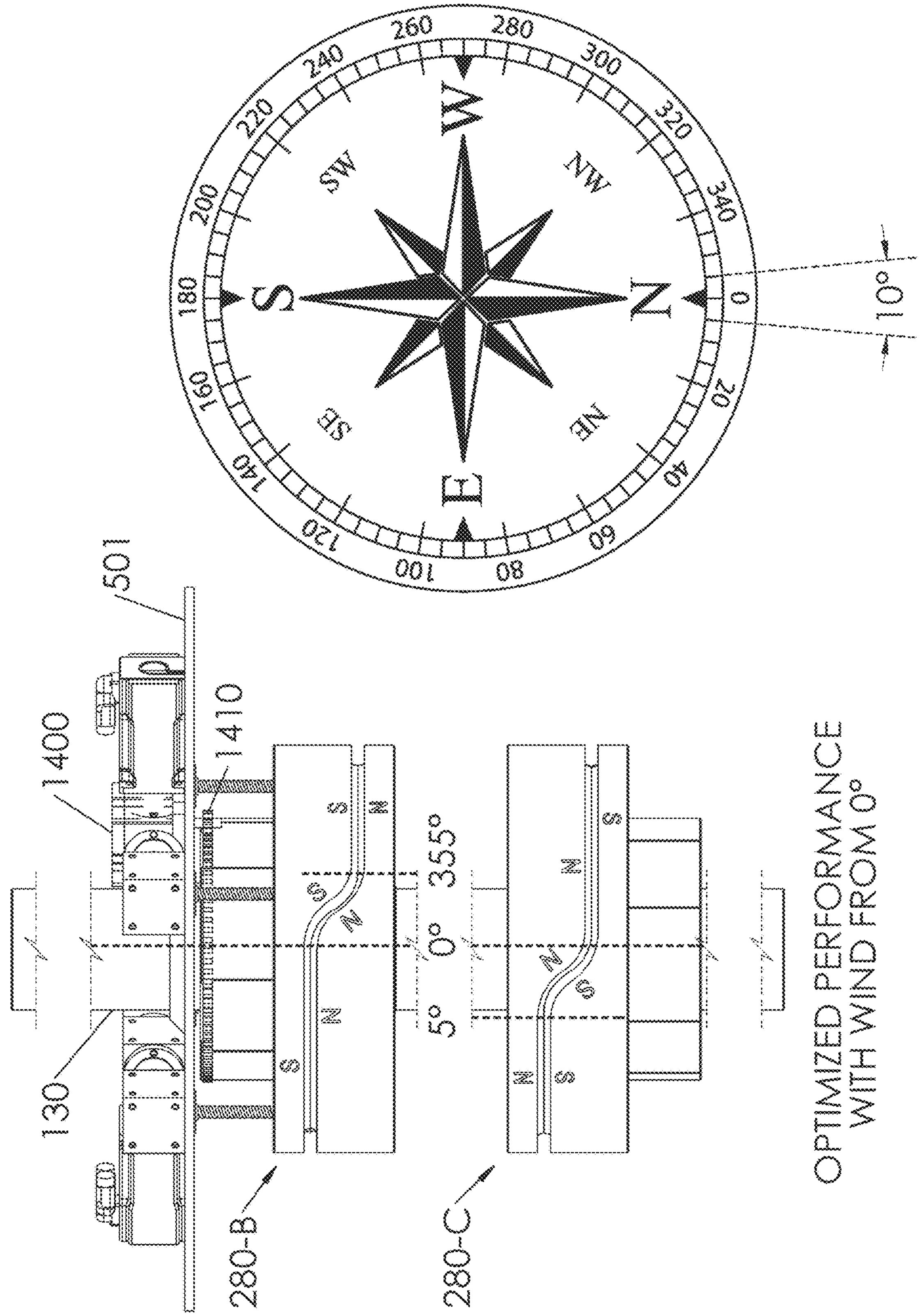
Figure 28:
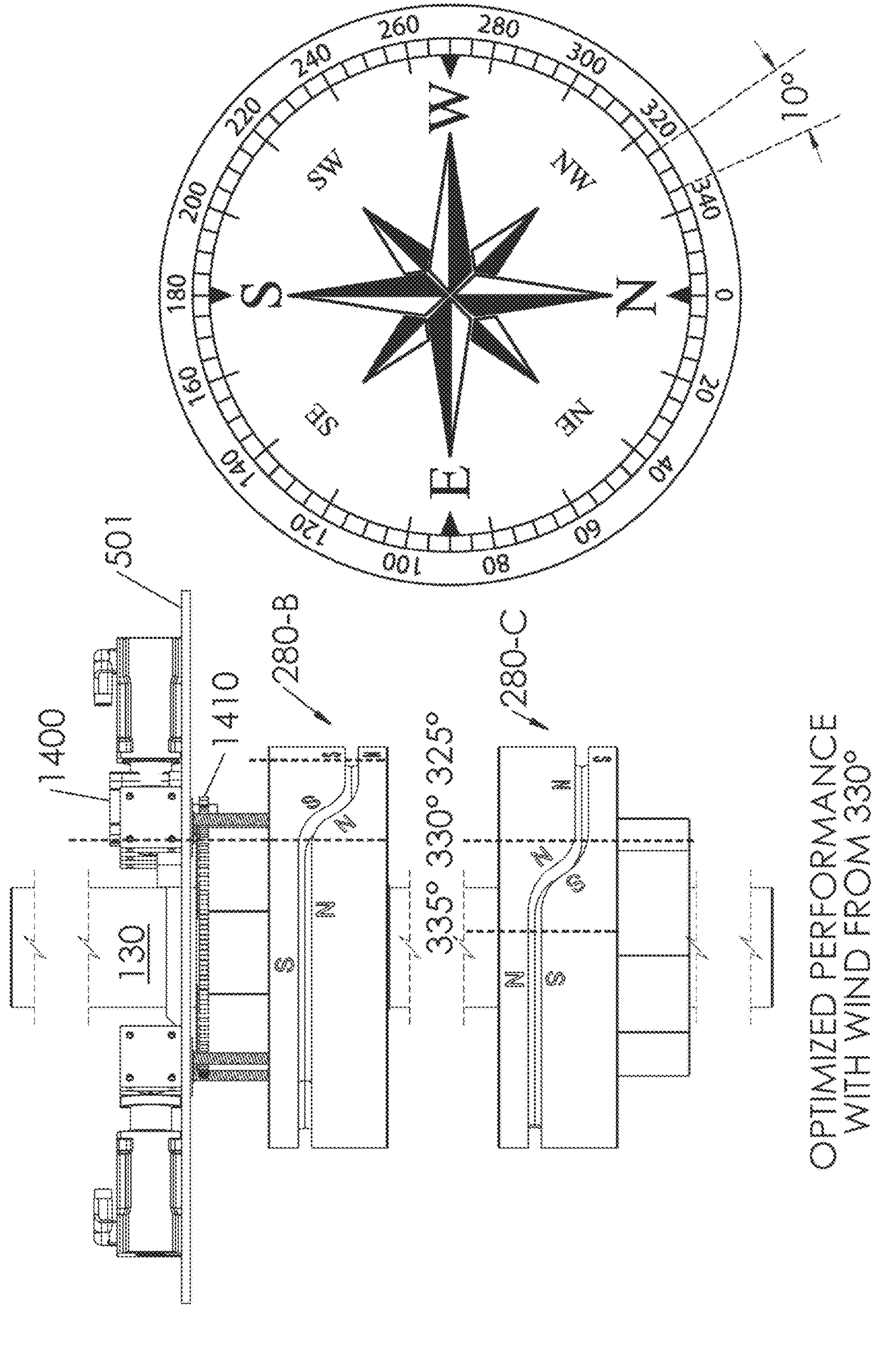
Figure 28:
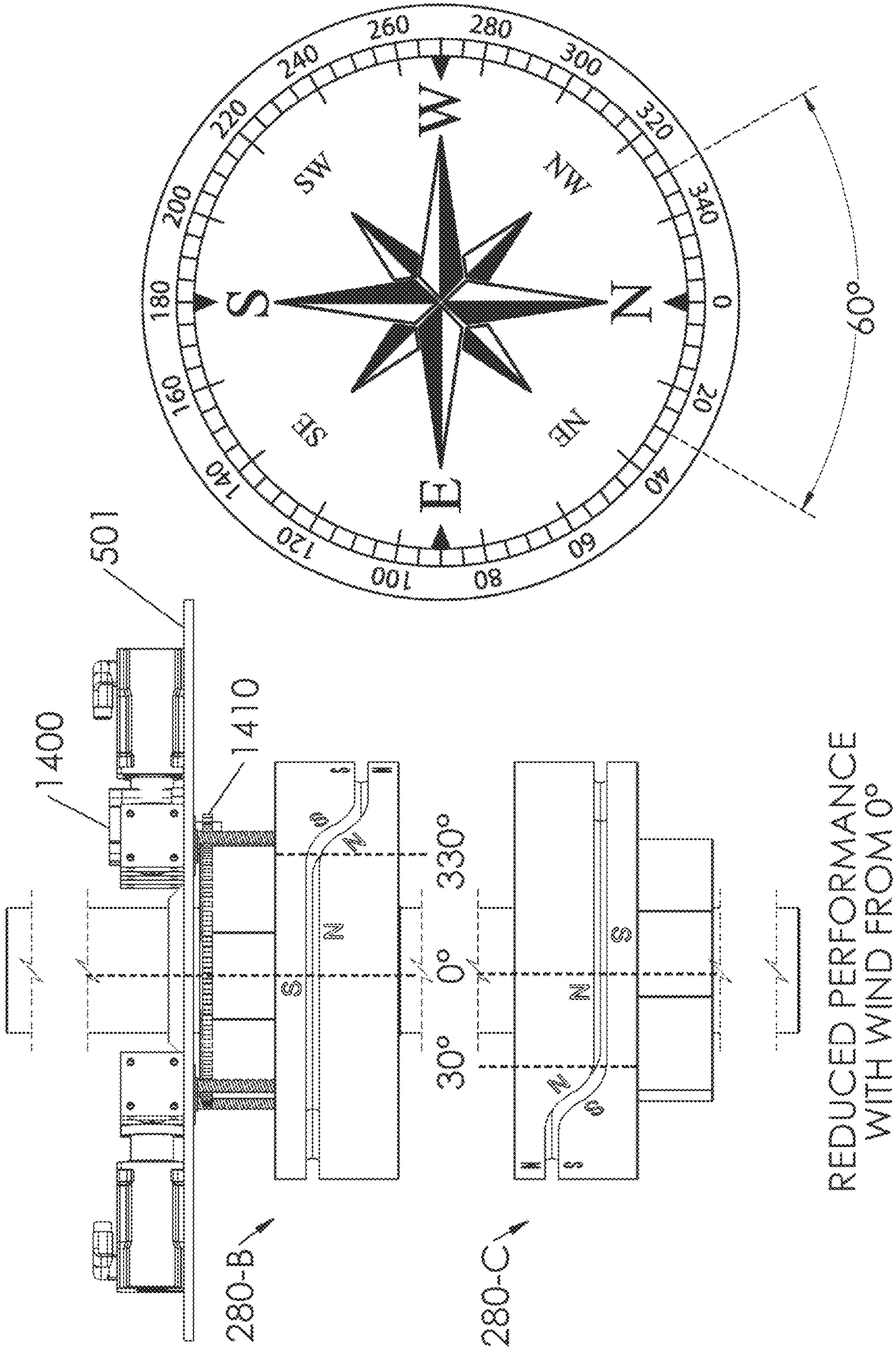

It should be appreciated that the computer may receive inputs from one or more (i) encoder sensors located within any motor, or located within or adjacent to any rotatable track assembly, whether shown or not shown, (ii) proximity sensors 585 (see FIGS. 13B, 13C) located on or adjacent to any perimeter plate embodiment 215 or 215-A as described in Section 9.5, or (iii) any encoder sensor located on or adjacent to any perimeter plate 215 or 215-A whether shown or not shown, or (iv) any encoder shown in the Section 12 described in this Section 16, including without limitation encoder ring 1310 (see FIGS. 26B and 27A) and related hub carrier 130-C and 130-D mounted sensor (not shown) and external encoder sensors 1425 (FIG. 28B).

It should be appreciated that all motors described in this Section 16 may have internal encoders, all configured to monitor, e.g., generate/transmit a signal relating to, the rotational position of the rotatable track assembly to which they are physically or optically coupled. Exemplary encoders include linear, rotary, position and optical encoder types, such as optical linear encoders or optical shaft encoders. The rotational encoder ensures that control inputs to the track orientation control mechanism, e.g., orientation control motor(s) 1220 and 1221 (see FIG. 26A), hydraulic/pneumatic pump(s) 1349, 1350 (see FIG. 27A), stepper motor(s) 1400 (see FIG. 28A), result in the correct rotational positioning of the respective rotatable track assembly(ies). The computer's failure to confirm correct rotational positioning of any rotatable track assembly embodiment described in this Section 16, including without limitation a rotatable track assembly movement that could cause an ECP in working mode to collide with (i) a counter-rotating ECP, or (ii) a separator plate or cowling component described in Section 15, will activate the brakes as described in Section 12.2.

16.2 Motorized Track Orientation Control—in-Direct Track Actuation

Referring now to FIGS. 26A-26C, one track orientation control mechanism includes an upper motorized track rotation assembly 1300 and lower motorized track rotation assembly 1301 (common components in the respective assemblies may have like reference numbers). In the embodiment illustrated in FIGS. 26A-26C, upper motorized track rotation assembly 1300 includes an upper rotatable track assembly 1306-A and lower motorized track rotation assembly 1301 includes a lower rotatable track assembly 1306-B. Each rotatable track assembly 1306-A and 1306-B includes an upper track section 1354 and lower track section 1352 connected by transition splines within which followers 253 coupled to each ECP shaft 140 travel. Each rotatable track assemblies 1306-A and 1306-B may be rotatably supported on the hub carrier 130-C by a bearing 1305. In other embodiments, a motorized track rotation assembly may be implemented with any articulation control system that is operably linked to the hub carrier 130-C including without limitation the (i) cam track assembly 250 (see Section 9.1, (ii) the track, e.g., stationary section 301 and movable section 302, of liquid-lubricant filled cam track assembly 300 (see Section 9.2, and (iii) magnetic array assembly 370 (see Section 9.3).

Each motorized track rotation assembly 1300 and 1301 may include components that are internal to the rotatable track assemblies 1306-A, 1306-B and may include one or more orientation control motors (e.g., electric, hydraulic, or pneumatic motors), such as upper orientation control motor 1220 and lower orientation control motor 1221 operably coupled with a ring gear 1315 of upper rotatable track assembly 1306-A and with a ring gear 1315 of lower rotatable track assembly 1306-B. Ring gear 1315 of each rotatable track assembly 1306-A, 1306-B may be supported on a ring gear boss 1320, which is attached to or an integral component of the associated rotatable track assembly 1306-A, 1306-B. Orientation motors 1220 and 1221 effect powered rotation of rotatable track assemblies 1306-A, 1306-B. Orientation motors 1220 and 1221 may operate synchronously and redundantly as shown. Alternatively, motors 1220 and 1221 may operate individually in opposite directions (asynchronously) if shaft 1265 is configured in two parts that are, uncoupled between track rotation assembly 1300 and 1301 or are operably coupled with an electric, hydraulic or pneumatic clutch (not shown) configured to selectively couple or uncouple the two parts to enable synchronous or asynchronous operation of the motors 1220 and 1221. The clutch may be computer controlled, and such computer control is driven by inputs from the (i) encoders described herein and (ii) the AOS (see Section fluid direction and speed sensors 810 (See Section 15 and FIG. 1A)).

Track rotation assemblies 1300 and 1301 may, for example, comprise continuous track 255 of cam track assembly 250 described above, or track assembly may comprise a circular track 303 of liquid-lubricant filled cam track assembly 300 described above, and follower 310 may comprise shaft 317 and inner magnetic coupling 321 of the liquid-lubricant filled cam track assembly 300 (FIG. 10). Each upper orientation control motor 1220, and lower orientation control motor 1221 may be mounted on a plate 500 that is fixed to hub carrier 130-C. Exemplary electrically-powered motors include direct current motors, electrodynamic rotary motors, dc motors with pwm (power pulse width modulation), brushless direct current motors and torque motors.

Operation of orientation control motors 1220 and 1221, or any orientation control motors within the KFECS 100, including, without limitation, all orientation motors within Section 16, may be controlled by inputs that are generated by a control algorithm that implements a predefined KFECS 100 performance profile or otherwise controls and modifies KFECS 100 performance in a control looped system based on readings from sensors monitoring KFECS performance and/or environmental conditions or from inputs entered by an operator.

A bearing housing 1222 houses bearings 1240 (see FIG. 26C) that rotationally support a motor shaft 1230 of upper orientation control motor 1220. Similarly, a bearing housing houses bearings 1240 (see FIG. 26B) that rotationally support a motor shaft 1230-A of lower orientation control motor 1221. Upper motor shaft 1230 drives a bevel gear 1250, that is operably coupled to a bevel gear 1260 fixed to an orientation control shaft 1265. Bevel gears 1250 and 1260 are disposed within a gear chamber 1200, for the upper orientation control motor 1220. Lower motor shaft 1230-A drives a bevel gear 1250-A, that is operably coupled to a bevel gear 1260 fixed to an orientation control shaft 1265. Bevel gears 1250-A and 1260 are disposed within a gear chamber 1215 for the lower orientation control motor 1221, with gear chambers 1200 and 1215 penetrating the hub carrier 130-C at different axial positions along the length of the hub carrier 130-C.

Orientation control shaft 1265 is supported by bearings 1270 within an axial channel 133-C formed in the hub carrier 130-C.

Orientation control shaft 1265 includes a bevel gear 1280 that is operably coupled to a bevel gear 1282 to drive pinion gear 1285 via linked shaft 1283. Orientation control shaft 1265 further includes a bevel gear 1290 that is operably coupled to a bevel gear 1291 to drive a pinion gear 1285-A via linked shaft 1283-A. Bevel gear 1280 and bevel gear 1282 are disposed within a gear chamber 1205, and bevel gear 1290 and bevel gear 1291 are disposed within gear chamber 1210. Gear chambers 1205 and 1210 each penetrate the hub carrier 130-C at different axial positions along the length of the hub carrier 130-C. Pinion gear 1285 is operably coupled to ring gear 1315 of associated upper rotatable track assembly 1306-A, and pinion gear 1285-A is operably coupled to ring gear 1315 of associated lower rotatable track assembly 1306-B.

A cover 1302 coupled to each of the rotatable track assemblies 1306-A and 1306-B may be provided to protect the pinion gears 1285 and ring gear 1315 from debris.

Thus, when either orientation control motor 1220 or 1221 rotates, the motorized track rotation assemblies 1300 and 1301 rotate the associated rotatable track assemblies 1306-A and 1306-B in any direction, or degree, about the longitudinal axis of the hub carrier 131 and results in moving the transition splines between the upper track section 1354 and lower track section 1352 that cause the ECPs 10 and 20 to transition between their working orientation to their slipstream orientation. When more than one hub 120 and 180 is configured as shown, a single orientation control motor 1220 or 1221 may control both hubs 120 and 180, or any number of additional hubs 120 and 180. This arrangement results in all hubs in a multi-hub system moving synchronously in the optimum direction of the oncoming flow or any other computer-controlled direction. One or more additional orientation control motor(s) may be provided for redundancy.

In an alternate embodiment, in a KFECS 100 with more than one hub 120 or 180, orientation control shaft 1265 can be split at any point between track rotation assemblies 1300 and 1301 (not shown). This split will permit each orientation control motor 1220 and 1221 to operate independently, thereby have the effect of delaying the time when the ECPs will articulate to their working mode to reduce the KFECS's energy conversion as directed by the computer, e.g. including without limitation during any periods of lower desired output, including during periods of lower electrical grid demand or during wind speed conditions that exceed a computer-controlled parameter.

16.3 Track Orientation Control—Direct Track Actuation

Referring to FIGS. 27A and 27B, a track orientation control system may comprise track motors 1360, 1361 that directly drive pinion gears 1360-A, 1360-B that are operatively coupled to a ring gear 1315 arranged coaxially with the longitudinal hub carrier axis 131 of rotation and associated with each hub. Track motors 1360, 1361 may be electric or fluid pressure, e.g., hydraulic or pneumatic, motors. Where track motors 1360, 1361 are hydraulic or pneumatic, a hydraulic/pneumatic track orientation control system 1340 includes an upper rotatable track assembly 1341 operably coupled to upper track motor 1360 and a lower rotatable hub assembly 1342 operably coupled to lower track motor 1361. An upper pump 1349 and a lower pump 1350 direct pressurized fluid flow, e.g., hydraulic or pneumatic, to an input line 1351 through ports 1351-A and 1351-D (see FIG. 27B), respectively to the ports 1351-B, 1351-C of upper hydraulic/pneumatic motors 1360 and 1361, respectively. Output/return pressurized fluid returns to the pumps 1349 and 1350 from the motors 1360 and 1361 via a return line 1355 from return ports 1355-B and 1355-C of the upper and lower motors 1360 and 1361, respectively, to the return ports 1355-A, 1355-D of the upper and lower pumps 1349 and 1350, respectively.

Fluid lines 1351 and 1355 extend through hub carrier 130 and may extend through an integral chase within the hub carrier 130, such as chase 132 described in Section 9.5 above. As track motors 1360, 1361 and pumps 1349, 1350 are fixed (non-rotatable) with respect to the hub carrier 130, fluid pressure may be transmitted from pumps 1349, 1350

(or one pump if a redundant pump is not employed) to and from the track motors 1360, 1361 via lines 1351, 1352 without requiring a rotating fluid pressure coupling.

Where track motors 1360, 1361 are electric motors, power and/or control signals may be transmitted to the track motors via electrical cables (not shown) configured to transmit power and/or control signals. Such electrical cables may extend through hub carrier 130 and may extend through an integral chase within the hub carrier 130, such as chase 132 described in Section 9.5 above. As track motors 1360, 1361 are fixed (non-rotatable) with respect to the hub carrier 130, electric power and/or control signals may be transmitted to the track motors 1360, 1361 via lines such electric cables without requiring a rotating electrical coupling.

Upper rotatable track assembly 1341 and lower rotatable hub assembly 1342 each include a ring gear 1315 that may be supported on a ring gear boss 1345, and which is attached to or an integral component of the associated rotatable track assembly 1341, 1342.

Upper track motor 1360 drives a pinion gear 1360-A and lower track motor 1361 drives a pinion gear 1361-A, and each pinion gear 1360-A and 1361-A are operably coupled to the ring gear 1315 of the associated upper or lower rotatable track assembly 1341, 1342.

The track orientation control system is configured to rotate the rotatable track assemblies 1341, 1342 having the same result of the hub orientation control motors 710 (see FIG. 1A) rotating the entirety of the hubs out of the oncoming flow of any degree. One or more computer controlled valves (not shown) may be provided in the hydraulic lines between the pair of upper and lower track motors 1360, 1361, whereby, if the valve were closed by a signal from the computer, it would result in each motor 1360, 1361 operating independently, thereby have the effect of delaying the time when the ECPs will articulate to their working mode to reduce the KFECS's energy conversion during periods of lower desired output, including during periods of lower electrical grid demand or during wind speed conditions that exceed a computer-controlled parameter.

A method of reducing energy conversion/output of a KFECS 100, irrespective of its number of hubs 120 or 180, is by reorienting the KFECS 100 so that transitioning of the ECPs 10 and 20 of the respective hub(s) between their working and slipstream orientations does not occur at a rotational position of the associated hub that is optimized for the direction of the oncoming fluid flow. In this embodiment, such reorienting is effected by the orientation control motors 1360 and 1361 (see FIG. 27A) rotating the rotatable track assemblies 1341 and 1342 to rotate about the longitudinal hub carrier axis 131 so that each advancing ECP 10 and 20—relative to the direction of the oncoming flow—will be in working mode for at least part of its movement against the oncoming flow, and each retreating ECP—relative to the direction of the oncoming flow—will be in slipstream mode for at least part of its movement with the oncoming flow. That is, the rotatable track assemblies 1341 and 1342 rotation may be rotated asynchronously, one clockwise, the other counterclockwise, thereby delaying the transition of each ECP between slipstream mode and working mode. The further departure from such synchronization, i.e., the greater the amount of movement against the direction of the oncoming flow while the ECP 10 or 20 is in working mode and the greater the amount of movement with the direction of the oncoming flow while the ECP is in slipstream mode, the less energy conversion will occur, and is described as "reduced performance mode."

16.4 Track Orientation Control—External Hub Control

Referring to FIGS. 28A-28C, an alternative embodiment of a track orientation control system may comprise one or more, e.g., for redundancy, motors 1400 (e.g., electric stepper motors) that drives a pinion gear 1405 operably engaged with a ring gear 1410, that is attached to or part of an upper rotatable track assembly 280-B and one or more motors 1400 that drives a pinion gear operably engaged with a ring gear, that is attached to or part of a lower rotatable track assembly 280-C. Motor 1400 is mounted to motor mounting plate 500 and is oriented so that pinion gear 1405 is parallel to the hub rotation axis 131. Each rotatable track assembly 280-B and 280-C includes an upper track section and lower track section connected transition splines within which followers coupled to each ECP shaft travel. By rotating each rotatable track assembly 280-B and 280-C via pinion gear 1405 and ring gear 1410, the positions of the upper track section, lower track section, and transition splines relative to fluid flow direction can be varied to vary the output of the respective hub (reduced performance mode).

Rotatable track assembly 280-B is an alternate embodiment of splined hub assembly 280 described above (see Section 9.1). Rotatable track assembly 280-B accepts bearings 284 that enables track assembly 280-B to rotate about the hub carrier axis 131. Upper rotatable track assembly 280-B includes a lower, stationary hub section 251-A and an upper, moveable hub section 252-A. In a mirror image arrangement, lower rotatable track assembly 280-C includes an upper, stationary hub section and a lower, moveable hub section.

Rotatable track assembly 280-B includes an lifting ring 1430 arranged coaxially with the hub carrier 130 and disposed within an annular groove 1431 formed in the upper, moveable section 252-A and open at its upper end. Lower splined hub assembly 280-C includes a lifting ring arranged coaxially with the hub carrier 130 and disposed within an annular groove formed in the lower, moveable section and open at its lower end. The annular groove has a lower section 1432 that is wider than an upper section. One or more linear actuators, such as ball screw motors 505-A, which drive ball screws 506-A, are mounted to a motor mounting plate 500 that is fixed to the hub carrier 130 above the upper rotatable track assembly 280-B. One or more linear actuators, such as ball screw motors and associated ball screws, are mounted to a motor mounting plate 500 that is fixed to the hub carrier 130 below the lower rotatable track assembly 280-C.

A distal end of each ball screws 506-A is captured within an associated lifting ring boss 1435 disposed within annular groove 1431 of upper splined hub assembly 280-B and attached to, or integral with, lifting ring 1430. Lifting ring boss 1435 and lifting ring 1431 are fixed within groove 1431, e.g., by a radial flange 1432 engaged with a radial shoulder 1433 formed in the groove 1431, to prevent the lifting ring boss 1435 and lifting ring 1431 from moving axially with respect to the groove 1431. In an embodiment, an end of the ball screw 506-A has a radial flange 506-B captured within an oversized counter-bore 1436 formed in the lifting ring boss 1435 to prevent the associated ball screw 506-A from separating from the lifting ring boss 1435 and enabling end of the ball screw 506-A to rotate within lifting ring boss 1435. Accordingly, ball screw 506-A is axially fixed within the groove 1431 to the lifting ring 1430 and lifting ring boss 1435.

Lifting ring 1430 and lifting ring boss 1435 are configured to slide circumferentially within the wider lower section 1432 of the groove 1431. In an embodiment lifting ring 1430 and lifting ring boss 1435 are configured to slide circumferentially without lubricant by (i) use of appropriate low-friction material for the construction of the groove 1431 and/or lifting ring 1430, such as Delrin® or of other materials with a low friction coating, such as Tungsten Disulfide. from which the lifting ring 1430 and groove 1431 may be made, and (ii) and relative dimensions of the ring 1430, the boss 1435, and the groove 1431. Accordingly, upper rotatable track assembly 280-B is able to rotate about hub carrier 130 while the ball screw 506-A and ball screw motor 505-A operatively engaged with the hub carrier 130 remain fixed with respect to the hub carrier 130.

Lower rotatable track assembly 280-C has a similarly, mirror-image arrangement of a fixedly mounted linear actuator (e.g., ball screw and ball screw motor), connected to a lifting ring 1430 and lifting ring bosses 1435 slidably disposed within an annular groove formed in the lower, moveable hub section of the lower rotatable track assembly 280-C.

Referring now to FIG. 28C, all track orientation control systems as described in Section 16 may interface with the AOS System and in an embodiment be configured with split cam track assemblies and controlled by the AOS System. Thus as the ball screws 506-A rotate, the upper, moveable hub section 252-A of the upper rotatable track assembly 280-B is separated from the lower, stationary hub section 251-A, and the lower, moveable section of the lower rotatable track assembly 280-C is separated from the upper, stationary hub section so that each moveable section 252-A will move toward its respective motor mounting plate 500 when actuated by the ball screw 506-A. Ball screw 506-A protrudes through the top of ball screw motor 505-A so as not to interfere with the split track assembly (see Section 9.1).

Referring now to FIG. 28D, the upper and lower rotatable hub assemblies 280-B and 280-C are positioned for optimum performance mode, meaning the ECPs articulate to working mode at the soonest time relative to the oncoming fluid flow for optimal energy conversion, and thus remain in working mode for the maximum degrees of rotation about the hub carrier 130. It should be appreciated that the articulation points about the hub carrier axis 131 necessary for optimal performance may vary and are not limited to the points illustrated in FIGS. 28D-28G.

Referring now to FIGS. 28D and 28F, the fluid is coming from 0 degrees (North in the illustrated example). In this orientation, the upper ECP moving counterclockwise will complete its articulation into working mode at 355 degrees, and the lower ECP moving clockwise will complete its articulation to working mode at 5 degrees. Thus, there is a 10 degree separation between the start of working mode for the upper and lower ECPs. FIGS. 28D and 28F each include a front view of motorized spline track assemblies 280-B and 280-C facing the oncoming fluid flow from 0° (North), and the splines (i.e., transitions between upper and lower track sections, see reference 261 in FIG. 8E) that control ECP articulation are positioned for optimal performance whereby both upper and lower ECP begin its articulation into working mode at 0 degrees about the longitudinal hub carrier axis (see FIG. 28A). In other words, the fluid is coming from the 0 degrees and the start of ECP articulation into working mode is also 0 degrees.

Referring now to FIG. 28E, the upper and lower rotatable hub assemblies 280-B and 280-C are positioned for optimum performance when the fluid is coming from 0 degrees (North in the illustrated example). In this orientation, the ECP of upper hub assembly 280-B moving counterclockwise will complete its articulation into working mode at 355 degrees, and the ECP of lower hub assembly 280-A moving clockwise will complete its articulation to working mode at 5 degrees. Thus, there is a 10 degree separation between the start of working mode for the upper and lower ECPs.

Referring now to FIG. 28F the upper and lower rotatable hub assemblies 280-B and 280-C are positioned for reduced performance when the fluid is coming from 0 degrees (North in the illustrated example). In this orientation, the ECP of upper hub assembly 280-B moving counterclockwise will complete its articulation 20 degrees past the optimal articulation point into working mode (i.e., 30 degrees as opposed to 10 degrees for optimal performance) and likewise the ECP of lower hub assembly 280-A moving clockwise will complete its articulation 20 degrees past its optimal articulation point into working mode (i.e., 330 degrees as opposed to 350 degrees for optimal performance). Consequently, the articulation of both the upper and lower ECPs into working mode will be delayed, with a 60 degree difference, in this example, of reduced performance as compared to FIG. 28D illustrating optimal performance with only a 10 degree difference between the points that the upper and lower ECPs articulate into working mode.

While the subject matter of this disclosure has been described and shown in considerable detail with reference to certain illustrative embodiments, including various combinations and sub-combinations of features, it will be obvious to those skilled in the art that such embodiments are provided by way of example only. Numerous variations, changes, and substitutions will now occur to those skilled in the art without departing from the preferred embodiments. It should be understood that various alternatives to the embodiments described herein may be employed in practicing the preferred embodiments. It is intended that the following claims define the scope of the preferred embodiments and that methods and structures within the scope of these claims and their equivalents be covered thereby.

Exemplary Embodiments

One or more of the following features and benefits may be encompassed by or achievable by embodiments described herein.

1. A system comprising:

first and second hubs, each hub being axially adjacent with respect to a hub axis of rotation to the other hub, wherein each hub is rotatable about the same hub axis of rotation, and wherein the first hub is configured to rotate in an opposite direction than the second hub;

one or more articulating plates extending radially from each hub and rotatable therewith, wherein each articulating plate is configured to be articulable about a plate articulation axis that is oriented radially with respect to the hub axis of rotation, and wherein each plate has opposed surfaces, a leading edge, and a trailing edge;

an articulation control system associated with each hub and configured to independently control orientation of each plate of the associated hub with respect to the associated plate articulation axis, wherein each plate is operably coupled to the articulation control system so that the articulation control system changes the orientation of the plate as the associated hub rotates about the hub axis of rotation, and wherein the articulation control system is configured to orient each plate in a slipstream orientation in which the opposed surfaces of the plate are generally parallel to the plane of rotation of the hub for a first portion of each rotation of the associated hub and in a working orientation in which the opposed surfaces are not parallel to the plane of rotation of the hub for a second portion of each rotation of the associated hub;

a separator plate disposed between the first and second hubs, wherein the separator plate includes a first portion and a second portion, and wherein the first and second portions of the separator plate are oriented radially with respect to the hub axis of rotation and are disposed at different axial locations with respect to the hub axis of rotation;

a top separator plate disposed at an opposite axial side of the first hub from the separator plate, wherein the top separator plate includes a first portion and a second portion, and wherein the first and second portions of the top separator plate are oriented radially with respect to the hub axis of rotation and are disposed at different axial locations with respect to the hub axis of rotation; and a bottom separator plate disposed at an opposite axial side of the second hub from the separator plate, wherein the bottom separator plate includes a first portion and a second portion, and wherein the first and second portions of the top separator plate are oriented radially with respect to the hub axis of rotation and are disposed at different axial locations with respect to the hub axis of rotation.

2. The system of embodiment 1, wherein the articulation control system of the first hub and the articulation control system of the second hub are configured so that the first portion and second portion of each rotation of the first hub are different than the first portion and second portion of each rotation of the second hub.

3. The system of embodiment 1 or 2, wherein an axial spacing between the first portion of the top separator plate and the first portion of the separator plate is less than an axial spacing between the second portion of the top separator plate and the second portion of the separator plate, and wherein an axial spacing between the first portion of the bottom separator plate and the first portion of the separator plate is greater than an axial spacing between the second portion of the bottom separator plate and the second portion of the separator plate.

4. The system of any one of embodiments 1 to 3, wherein:

the articulating plates of the first hub pass between the first portion of the top separator plate and the first portion of the separator plate during the first portion of rotation of the first hub, the articulating plates of the first hub pass between the second portion of the top separator plate and the second portion of the separator plate during the second portion of rotation of the first hub, the articulating plates of the second hub pass between the first portion of the top separator plate and the first portion of the separator plate during the second portion of rotation of the second hub, and the articulating plates of the second hub pass between the second portion of the bottom separator plate and the second portion of the separator plate during the first portion of rotation of the second hub.

5. The system of any one of embodiments 1 to 4, wherein the separator plate, the top separator plate, and the bottom separator plate each have a transition between their respective first and second portions.

6. The system of any one of embodiments 1 to 5, further comprising:

first and second upper connector plates extending in an axial direction with respect to the hub axis of rotation between the separator plate and the upper separator plate, wherein each of the first and second upper connector plates is disposed on an opposite side of the hub axis of rotation; and first and second lower connector plates extending in an axial direction with respect to the hub axis of rotation between the separator plate and the lower separator plate, wherein each of the first and second lower connector plates is disposed on an opposite side of the hub axis of rotation.

7. The system of any one of embodiments 1 to 6, further comprising at least one counter-rotating transmission between the first and second hubs to rotationally couple the first hub to the second hub, wherein the counter-rotating transmission comprises:

a ring gear on each hub and the axially-adjacent hub, wherein each ring gear is coaxially arranged with respect to the hub axis of rotation; and a plurality of pinion gears angularly spaced about the hub axis of rotation, wherein each pinion gear is rotatable about a pinion axis that is oriented radially with respect to the hub axis of rotation, and wherein the pinion gears are disposed between the ring gears on the first hub and the second hub, such that rotation of the first hub about the hub axis of rotation in a first direction causes a corresponding rotation of the second hub in a second direction about the hub axis of rotation opposite the first direction.

8. The system of any one of embodiments 1 to 7, further comprising a vertical support structure supporting the separator plate, the top separator plate, and the bottom separator plate.

9. The system of embodiment 8, wherein the support structure comprises a coupling fixed in an axial position with respect to the hub axis of rotation and a plurality of structural supports, wherein each structural support is connected at one end to the coupling and at an opposite end to one of the separator plate, the top separator plate and the bottom separator plate.

10. The system of embodiment 9, wherein the coupling is configured to be rotatable about the hub axis of rotation.

11. A system comprising:

at least one hub rotatable about a hub axis of rotation;

one or more articulating plates extending radially from each hub and rotatable therewith, wherein each articulating plate is configured to be articulable about a plate articulation axis that is oriented radially with respect to the hub axis of rotation, and wherein each articulating plate comprises a shaft rotatably mounted to the hub and defining the articulation axis of the associated articulating plate;

an articulation control system associated with each hub and configured to independently control orientation of each articulating plate of the associated hub with respect to the associated plate articulation axis, wherein each articulating plate is operably coupled to the articulation control system so that the articulation control system changes the orientation of the articulating plate as the associated hub rotates about the hub axis of rotation, wherein each articulation control system comprises:

a rotatable track assembly having a continuous track about its perimeter, wherein the continuous track circumscribes the hub axis of rotation, and wherein the rotatable track assembly is rotatable about the hub axis of rotation; and a follower assembly coupled to each shaft of the associated hub, wherein the follower assembly traverses the continuous track as the associated hub and articulating plate rotate about the hub axis of rotation to vary the orientation of the articulating plate with respect to the articulation axis of the articulating plate; wherein the continuous track includes a first section, a second section, and first and second transition sections between the first and second sections and wherein, as the follower assembly traverses the first section of the track, engagement of the follower assembly with the first track section causes the associated articulating plate to assume a first orientation with respect to the articulation axis of the articulating plate, as the follower assembly traverses the second section of the track, engagement of the follower assembly with the second track section causes the associated articulating plate to assume a second orientation with respect to the articulation axis of the articulating plate, as the follower assembly traverses the first transition section of the track, engagement of the follower assembly with the first transition section causes the associated articulating plate to transition from the first orientation with respect to the articulation axis of the articulating plate to the second orientation with respect to the articulation axis of the articulating plate, and as the follower assembly traverses the second transition section of the track, engagement of the follower assembly with the second transition section causes the associated articulating plate to transition from the second orientation with respect to the articulation axis of the articulating plate to the first orientation with respect to the articulation axis of the articulating plate; and a track orientation control mechanism operatively coupled to the rotatable track assembly of each articulation control system and configured to effect powered rotation of each rotatable track assembly to alter the rotational positions of the first section, the second section, the first transition section, and the second transition section about the hub axis of rotation.

12. The system of embodiment 11, wherein the track orientation control mechanism comprises:

a first gear associated with each rotatable track assembly and arranged coaxially with the hub axis of rotation; and a second gear associated with each rotatable track assembly and operatively engaged with the first gear of the associated rotatable track assembly.

13. The system of embodiment 12, wherein the first gear comprises a ring gear and the second gear comprises a pinion gear.

14. The system of embodiment 12 or 13, wherein the first gear and the second gear are located internally to the associated rotatable track assembly.

15. The system of embodiment 12 or 13, wherein the first gear and the second gear are located externally to the associated rotatable track assembly.

16. The system of any one of embodiments 12 to 15, wherein the track orientation control mechanism further comprises a rotary encoder coupled to the rotatable track assembly.

17. The system of any one of embodiments 12 to 15, wherein the track orientation control mechanism further comprises:

at least one motor;

an orientation control shaft operatively coupled to the at least one motor;

a coupling gear associated with each second gear to transmit rotation of the orientation control shaft into rotation of the second gear.

18. The system of embodiment 17, wherein the orientation control shaft is oriented generally parallel to the hub axis of rotation and each second gear is oriented radially with respect to the hub axis of rotation.

19. The system of embodiment 17 or 18, wherein the motor is operatively coupled to the orientation control shaft by respective bevel gears associated with each of the motor and the orientation control shaft.

20. The system of any one of embodiments 17 to 19, wherein the coupling gear associated with each second gear comprises a bevel gear associated with the second gear and operatively engaged with a bevel gear of the orientation control shaft.

21. The system of any one of embodiments 17 to 20, wherein the motor comprises an electric motor or a hydraulic motor.

22. The system of embodiment 12, wherein the track orientation control mechanism further comprises a track motor operatively coupled to each second gear.

23. The system of embodiment 22, wherein each second gear includes a shaft oriented radially with respect to the hub axis of rotation.

24. The system of embodiment 22, wherein each second gear includes a shaft oriented generally parallel to the hub axis of rotation.

25. The system of any one of embodiments 22 to 24, wherein the track motor comprises an electric, hydraulic, or pneumatic motor.

26. The system of embodiment 22, wherein the track motor comprises a hydraulic or pneumatic motor, and wherein the track orientation control mechanism further comprises at least one pressure pump for generating hydraulic or pneumatic pressure, as applicable, and pressure lines connecting each track motor to the at least one pressure pump.

27. The system of embodiment 26, wherein the pressure lines comprise input pressure lines and output pressure lines.

28. The system of embodiment 12, wherein the rotatable track assembly comprises a stationary hub section and a movable hub section, wherein the track orientation control mechanism comprises a track motor mounted to a motor mounting plate and configured to rotate the second gear, and wherein the system further comprises a linear actuator mounted to the motor mounting plate and engaged with the movable hub section so as to permit relative rotation between the rotatable track assembly and the linear actuator.

29. The system of embodiment 28, wherein the linear actuator comprises a ball screw motor mounted to the motor mounting plate and a ball screw extending into an annular groove formed in the movable hub section and wherein the ball screw is fixed against axial movement with respect to the annular groove and is configured to move circumferentially within the annular groove.

30. The system of embodiment 28 or 29, wherein the movable hub section includes a female conical mating surface and the stationary hub section includes a male conical mating surface, so that the stationary track member and the movable track member are self aligning.

31. The system of any one of embodiments 28 to 30, wherein each plate has opposed surfaces, a leading edge, and a trailing edge, and wherein the articulation control system is configured to orient each plate in a slipstream orientation in which the opposed surfaces of the plate are generally parallel to the plane of rotation of the hub for a first portion of each rotation of the hub and in a working orientation in which the opposed surfaces are not parallel to the plane of rotation of the hub for a second portion of each rotation of the hub, wherein the linear actuator is configured to axially separate the stationary hub section from the movable hub section to disengage the follower assembly of each articulating plate from the fixed track of the rotatable track assembly; wherein the system further comprises an articulation override system configured to override the articulation control system and orient each plate in its slipstream orientation at any angular position about the hub axis of rotation, and wherein the articulation override system comprises:

rocker arms coupling the movable hub section to a primary override ring that is coaxially oriented with respect to the hub axis of rotation so that axial movement of the movable hub section causes a corresponding axial movement of the primary override ring; and an actuator cam attached to the shaft of each articulating plate configured to be contacted by the axially moving primary override ring and retain each articulating plate at its slipstream orientation.

32. The system of any one of embodiments 11 to 31, further comprising a separator plate disposed adjacent the at least one hub, wherein the separator plate is configured to be rotatable with respect to the hub axis of rotation and wherein the separator plate is operably coupled to a motor for selectively effecting powered rotation of the separator plate with respect to the hub axis of rotation.

33. The system of embodiment 32, wherein the separator plate includes a first portion and a second portion, and wherein the first and second portions of the separator plate are oriented radially with respect to the hub axis of rotation and are disposed at different axial locations with respect to the hub axis of rotation.

34. The system of embodiment 32 or 33, further comprising a cowling surrounding the at least one hub, wherein the cowling is fixed to the separator plate and rotatable therewith.

35. The system of any one of embodiments 32 to 34, wherein the powered rotation of the separator plate is synchronized with the powered rotation of the rotatable track assembly.

36. The system of embodiment 33 or 35, further comprising:

a motor and a gear driven by the motor; and a gear fixed to the separator plate and operatively engaged with the gear driven by the motor.

37. The system of embodiment 36, wherein the motor is mounted in a fixed position with respect to the hub axis of rotation, the gear driven by the motor is a pinion gear, and the gear fixed to the separator plate is a beveled ring gear arranged coaxially with respect to the hub axis of rotation.

38. The system of embodiment 37, wherein the motor is mounted to a motor mounting plate in the fixed position with respect to the hub axis of rotation, and the system further comprises dual bearing races comprising an upper bearing between the motor mounting plate and a separator plate assembly including the separator plate and a lower bearing between the motor mounting plate and the hub.

39. The system of any one of embodiments 11 to 38, further comprising:

a fluid flow direction sensor; and a computer controller configured to control operation of the track orientation control mechanism to alter the rotational positions of the first section, the second section, the first transition section, and the second transition section about the hub axis of rotation based at least in part on a signal from the fluid flow sensor.

40. A system comprising:

at least one hub rotatable about a hub axis of rotation;

one or more articulating plates extending radially from each hub and rotatable therewith, wherein each articulating plate is configured to be articulable about a plate articulation axis that is oriented radially with respect to the hub axis of rotation, wherein each plate has opposed surfaces, a leading edge, and a trailing edge and one or more lips projecting transversely with respect to one of the opposed surfaces; and an articulation control system associated with each hub and configured to independently control orientation of each plate with respect to the associated plate articulation axis, wherein each plate is operably coupled to the articulation control system so that the articulation control system changes the orientation of the plate as the associated hub rotates about the hub axis of rotation.

41. The system of embodiment 40, wherein the one or more lips comprise one or more of a leading edge lip extending transversely from the leading edge of the plate, a trailing edge lip extending transversely from the trailing edge of the plate, and an inboard end lip extending transversely from an inboard end of the plate.

42. The system of embodiment 40 or 41, wherein each plate has opposed surfaces, a leading edge, and a trailing edge, and wherein the articulation control system is configured to orient each plate in a slipstream orientation in which the opposed surfaces of the plate are generally parallel to the plane of rotation of the associated hub for a first portion of each rotation of the hub and in a working orientation in which the opposed surfaces are not parallel to the plane of rotation of the associated hub for a second portion of each rotation of the hub.

43. The system of embodiment 42, comprising a plurality of articulating plates disposed at angularly-spaced positions about each hub and wherein adjacent articulating plates that are in their slipstream orientations overlap one another, wherein each articulating plate has a leading edge pocket of reduced thickness on a first surface of the plate and a trailing edge pocket of reduced thickness on a second surface of the plate, and wherein the leading edge pocket of one articulating plate nests with the trailing edge pocket of an adjacent overlapped articulating plate when the plates are in their slipstream orientations.

44. The system of any one of embodiments 40 to 43, wherein the one or more lips comprise a leading edge lip extending transversely from the leading edge of the plate and wherein the leading edge lip includes a rounded surface extending across the width of the leading edge lip.

45. A system comprising:

at least one hub rotatable about a hub axis of rotation;

one or more articulating plates extending radially from the hub and rotatable therewith, wherein each articulating plate is configured to be articulable about a plate articulation axis that is oriented radially with respect to the hub axis of rotation, wherein each plate has opposed surfaces, a leading edge, and a trailing edge;

an articulation control system configured to independently control orientation of each plate with respect to the associated plate articulation axis, wherein each plate is operably coupled to the articulation control system so that the articulation control system changes the orientation of the plate as the hub rotates about the hub axis of rotation, wherein the articulation control system is configured to orient each plate in a slipstream orientation in which the opposed surfaces of the plate are generally parallel to the plane of rotation of the hub for a first portion of each rotation of the hub and in a working orientation in which the opposed surfaces are not parallel to the plane of rotation of the hub for a second portion of each rotation of the hub; and a cowling surrounding the at least one hub, wherein a part of the cowling associated with each hub is closed on a side of the cowling corresponding to the first portion of the hub's rotation and includes an intake port and an exhaust port on a side the cowling corresponding to the second portion of the hub's rotation, and wherein the cowling is operably coupled to a motor for selectively effecting powered rotation of the cowling with respect to the hub axis of rotation.

46. A method for regulating output of an energy conversion system, wherein the energy conversion system comprises at least one hub rotatable about a hub axis of rotation and one or more articulating plates extending radially from each hub and rotatable therewith, wherein each articulating plate is configured to be articulable about a plate articulation axis that is oriented radially with respect to the hub axis of rotation, and wherein each articulating plate is operably coupled to a cam track extending around the hub axis of rotation to change the orientation of the articulating plate with respect to its plate articulation axis as the hub rotates about the hub axis of rotation, wherein the method comprises rotating the cam track about the hub axis of rotation to vary the rotational positions at which each articulating plate changes its orientation with respect to its plate articulation axis.

47. The method of embodiment 46, wherein the cam track is part of a rotatable track assembly that is rotatable about the hub axis of rotation, and wherein rotating the cam track comprises operatively engaging a first gear associated with the rotatable track assembly with a second gear associated with the rotatable track assembly.

48. The method of embodiment 47, wherein the first gear comprises a ring gear and the second gear comprises a pinion gear and wherein the ring gear and pinion gear are internal to the rotatable track assembly.

49. The method of embodiment 47, wherein the first gear comprises a ring gear and the second gear comprises a pinion gear and wherein the ring gear and pinion gear are external to the rotatable track assembly.

50. The method of embodiment 47, further comprising operatively coupling a motor to the second gear.

51. The method of embodiment 50, wherein operatively coupling the motor to the second gear comprises:

operatively coupling the motor to an orientation control shaft to transmit rotation by the motor to the orientation control shaft; and operatively coupling the orientation control shaft to the second gear to transmit rotation of the orientation control shaft to rotation of the second gear.

52. The method of embodiment 50, wherein operatively coupling the motor to the second gear comprises operatively coupling a track motor to each second gear.

53. The method of embodiment 52, wherein each track motor is fixed with respect to the hub axis of rotation and wherein the track motor is a fluid pressure motor, and the method further comprises transmitting fluid pressure from a pump that is fixed with respect to the hub axis of rotation to each track motor.

54. The method of any one of embodiments 46 to 53, further comprising monitoring a rotational position of the cam track with a rotary encoder.

55. A system for powering or controlling articulation control systems for one or more rotating hubs, wherein one of the articulation control systems is associated with each hub, wherein the system comprises:

a chase or bore that passes through the rotating one or more hubs and service lines passing through the chase or bore, wherein the service lines comprise at least one of electric and/or signal cables and fluid pressure lines, and wherein the service lines provide power and/or control to each articulation control system without rotatable couplings.

56. The system of embodiment 55, wherein each articulation control mechanism comprises:

a rotatably track assembly;

a first gear associated with each rotatable track assembly and arranged coaxially with the hub; and a second gear associated with each rotatable track assembly and operatively engaged with the first gear of the associated rotatable track assembly.

57. The system of embodiment 56, wherein the first gear comprises a ring gear, and the second gear comprises a pinion gear.

58. The system of embodiment 56, further comprising a track motor operatively coupled to each second gear, wherein each track motor comprises one of an electric motor, a hydraulic motor, and a pneumatic motor, and the service lines comprise one of electrical cables connected to the electric motor, hydraulic lines connected to the hydraulic motor, and pneumatic lines connected to the pneumatic motor, as applicable.

59. The system of embodiment 56, further comprising a track motor operatively coupled to each second gear, wherein each track motor comprises a fluid pressure motor and the service lines comprise fluid lines connected to each fluid pressure motor, and wherein the system further comprises at least one fluid pressure pump connected to the fluid pressure motors via the fluid lines.

60. The system of embodiment 59, further comprising:

a hub carrier defining a hub axis of rotation on which the one or more rotating hubs are rotatably mounted for rotation with respect to the hub carrier about the hub axis of rotation;

a motor associated with each articulation control system and fixed with respect to the hub carrier, wherein the service lines pass through the hub carrier to each motor.

61. The system of embodiment 60, wherein each articulation control mechanism comprises:

a rotatable track assembly;

a first gear associated with each rotatable track assembly and arranged coaxially with the one or more rotating hubs; and a second gear associated with each rotatable track assembly and operatively engaged with the first gear of the associated rotatable track assembly, wherein the second gear is operatively coupled to the motor.

62. The system of embodiments 61, wherein the first gear comprises a ring gear, and the second gear comprises a pinion gear.

63. The system of embodiments 61 or 62, wherein each motor comprises one of an electric motor, a hydraulic motor, and a pneumatic motor, and the service lines comprise one of electrical cables connected to the electric motor, hydraulic lines connected to the hydraulic motor, and pneumatic lines connected to the pneumatic motor, as applicable.

64. The system of embodiments 61 or 62, wherein each motor comprises a fluid pressure motor and the service lines comprise fluid lines, and the system comprises at least one pump fixed with respect to the hub carrier, wherein the fluid lines connect the pump to the fluid pressure motor 65. The system of any one of embodiments 55 to 64, wherein the one or more rotating hubs comprise two or more counter-rotating hubs configured to be rotatable in opposite directions about the hub axis of rotation.

The invention claimed is:

1. A system comprising:

a hub carrier;

at least one hub rotatably mounted to the hub carrier for rotation with respect to the hub carrier about a hub axis of rotation;

one or more articulating plates extending radially from each hub and rotatable therewith, wherein each articulating plate is configured to be articulable about a plate articulation axis that is oriented radially with respect to the hub axis of rotation, and wherein each articulating plate comprises a shaft rotatably mounted to the hub and defining the articulation axis of the associated articulating plate;

an articulation control system associated with each hub and configured to independently control orientation of each articulating plate of the associated hub with respect to the associated plate articulation axis, wherein each articulating plate is operably coupled to the articulation control system so that the articulation control system changes the orientation of the articulating plate as the associated hub rotates about the hub axis of rotation, wherein each articulation control system comprises:

a rotatable track assembly having a continuous track about its perimeter, wherein the continuous track circumscribes the hub axis of rotation, and wherein the rotatable track assembly is rotatably mounted to the hub carrier for rotation with respect to the hub carrier about the hub axis of rotation; and a follower assembly coupled to each shaft of the associated hub, wherein the follower assembly traverses the continuous track as the associated hub and articulating plate rotate about the hub axis of rotation to vary the orientation of the articulating plate with respect to the articulation axis of the articulating plate; wherein the continuous track includes a first section, a second section, and first and second transition sections between the first and second sections and wherein, as the follower assembly traverses the first section of the track, engagement of the follower assembly with the first track section causes the associated articulating plate to assume a first orientation with respect to the articulation axis of the articulating plate, as the follower assembly traverses the second section of the track, engagement of the follower assembly with the second track section causes the associated articulating plate to assume a second orientation with respect to the articulation axis of the articulating plate, as the follower assembly traverses the first transition section of the track, engagement of the follower assembly with the first transition section causes the associated articulating plate to transition from the first orientation with respect to the articulation axis of the articulating plate to the second orientation with respect to the articulation axis of the articulating plate, and as the follower assembly traverses the second transition section of the track, engagement of the follower assembly with the second transition section causes the associated articulating plate to transition from the second orientation with respect to the articulation axis of the articulating plate to the first orientation with respect to the articulation axis of the articulating plate;

a track orientation control mechanism operatively coupled to the rotatable track assembly of each articulation control system and configured to effect powered rotation of each rotatable track assembly to alter the rotational positions of the first section, the second section, the first transition section, and the second transition section about the hub axis of rotation; and a computer controller configured to control operation of the track orientation control mechanism to effect powered rotation of each rotatable track assembly to regulate energy conversion of the one or more articulating plates of each hub.

2. The system of claim 1, wherein the track orientation control mechanism comprises:

a first gear associated with each rotatable track assembly and arranged coaxially with the hub axis of rotation; and a second gear associated with each rotatable track assembly and operatively engaged with the first gear of the associated rotatable track assembly.

3. The system of claim 2, wherein the first gear comprises a ring gear and the second gear comprises a pinion gear.

4. The system of claim 2, wherein the first gear and the second gear are located internally to the associated rotatable track assembly.

5. The system of claim 2, wherein the first gear and the second gear are located externally to the associated rotatable track assembly.

6. The system of claim 2, wherein the track orientation control mechanism further comprises a rotary encoder coupled to the rotatable track assembly.

7. The system of claim 2, wherein the track orientation control mechanism further comprises a track motor operatively coupled to each second gear.

8. The system of claim 7, wherein each second gear includes a shaft oriented radially with respect to the hub axis of rotation.

9. The system of claim 7, wherein each second gear includes a shaft oriented generally parallel to the hub axis of rotation.

10. The system of claim 7, wherein the track motor comprises an electric, hydraulic, or pneumatic motor.

11. The system of claim 7, wherein the track motor comprises a hydraulic or pneumatic motor, and wherein the track orientation control mechanism further comprises at least one pressure pump for generating hydraulic or pneumatic pressure, as applicable, and pressure lines connecting each track motor to the at least one pressure pump.

12. The system of claim 11, wherein the pressure lines comprise input pressure lines and output pressure lines.

13. The system of claim 2, wherein the rotatable track assembly comprises a stationary hub section and a movable hub section, wherein the track orientation control mechanism comprises a track motor mounted to a motor mounting plate and configured to rotate the second gear, and wherein the system further comprises a linear actuator mounted to the motor mounting plate and engaged with the movable hub section so as to permit relative rotation between the rotatable track assembly and the linear actuator.

14. The system of claim 13, wherein the linear actuator comprises a ball screw motor mounted to the motor mounting plate and a ball screw extending into an annular groove formed in the movable hub section and wherein the ball screw is fixed against axial movement with respect to the annular groove and is configured to move circumferentially within the annular groove.

15. The system of claim 13, wherein each plate has opposed surfaces, a leading edge, and a trailing edge, and wherein the articulation control system is configured to orient each plate in a slipstream orientation in which the opposed surfaces of the plate are generally parallel to the plane of rotation of the hub for a first portion of each rotation of the hub and in a working orientation in which the opposed surfaces are not parallel to the plane of rotation of the hub for a second portion of each rotation of the hub, wherein the linear actuator is configured to axially separate the stationary hub section from the movable hub section to disengage the follower assembly of each articulating plate from the fixed track of the rotatable track assembly; wherein the system further comprises an articulation override system configured to override the articulation control system and orient each plate in its slipstream orientation at any angular position about the hub axis of rotation, and wherein the articulation override system comprises:

rocker arms coupling the movable hub section to a primary override ring that is coaxially oriented with respect to the hub axis of rotation so that axial movement of the movable hub section causes a corresponding axial movement of the primary override ring; and an actuator cam attached to the shaft of each articulating plate configured to be contacted by the axially moving primary override ring and retain each articulating plate at its slipstream orientation.

16. The system of claim 1, further comprising a separator plate disposed adjacent the at least one hub, wherein the separator plate is configured to be rotatable with respect to the hub axis of rotation and wherein the separator plate is operably coupled to a motor for selectively effecting powered rotation of the separator plate with respect to the hub axis of rotation.

17. The system of claim 16, wherein the separator plate includes a first portion and a second portion, and wherein the first and second portions of the separator plate are oriented radially with respect to the hub axis of rotation and are disposed at different axial locations with respect to the hub axis of rotation.

18. The system of claim 16, wherein the powered rotation of the separator plate is synchronized with the powered rotation of the rotatable track assembly.

19. The system of claim 16, further comprising:

a motor and a gear driven by the motor; and a gear fixed to the separator plate and operatively engaged with the gear driven by the motor.

20. The system of claim 19, wherein the motor is mounted in a fixed position with respect to the hub axis of rotation, the gear driven by the motor is a pinion gear, and the gear fixed to the separator plate is a beveled ring gear arranged coaxially with respect to the hub axis of rotation.

21. The system of claim 20, wherein the motor is mounted to a motor mounting plate in the fixed position with respect to the hub axis of rotation, and the system further comprises dual bearing races comprising an upper bearing between the motor mounting plate and a separator plate assembly including the separator plate and a lower bearing between the motor mounting plate and the hub.

22. The system of claim 1, further comprising:

a fluid flow direction sensor; wherein the computer controller is configured to control operation of the track orientation control mechanism to alter the rotational positions of the first section, the second section, the first transition section, and the second transition section about the hub axis of rotation based at least in part on a signal from the fluid flow direction sensor.

23. A method for regulating output of an energy conversion system, wherein the energy conversion system comprises at least one hub rotatable about a hub axis of rotation and one or more articulating plates extending radially from each hub and rotatable therewith, wherein each articulating plate is configured to be articulable about a plate articulation axis that is oriented radially with respect to the hub axis of rotation, and wherein each articulating plate is operably coupled to a cam track extending around the hub axis of rotation to change the orientation of the articulating plate with respect to its plate articulation axis as the hub rotates about the hub axis of rotation, wherein the method comprises effecting computer-controlled, powered rotation of the cam track about the hub axis of rotation to vary the rotational positions at which each articulating plate changes its orientation with respect to its plate articulation axis to regulate energy conversion of the one or more articulating plates of each hub.

24. The method of claim 23, wherein the cam track is part of a rotatable track assembly that is rotatable about the hub axis of rotation, and wherein effecting powered rotation of the cam track comprises operatively engaging a first gear associated with the rotatable track assembly with a second gear associated with the rotatable track assembly.

25. The method of claim 24, wherein the first gear comprises a ring gear and the second gear comprises a pinion gear and wherein the ring gear and pinion gear are internal to the rotatable track assembly.

26. The method of claim 24, wherein the first gear comprises a ring gear and the second gear comprises a pinion gear and wherein the ring gear and pinion gear are external to the rotatable track assembly.

27. The method of claim 24, further comprising operatively coupling a motor to the second gear.

28. The method of claim 27, wherein operatively coupling the motor to the second gear comprises operatively coupling a track motor to each second gear.

29. The method of claim 28, wherein each track motor is fixed with respect to the hub axis of rotation and wherein the track motor is a fluid pressure motor, and the method further comprises transmitting fluid pressure from a pump that is fixed with respect to the hub axis of rotation to each track motor.

30. The method of claim 23, further comprising monitoring a rotational position of the cam track with a rotary encoder.

* * * * *